United States Patent
Hong et al.

(10) Patent No.: US 10,678,365 B2
(45) Date of Patent: Jun. 9, 2020

(54) DISPLAY DEVICE AND PRESSURE SENSOR STRUCTURE

(71) Applicant: SAMSUNG DISPLAY CO., LTD., Yongin-si, Gyeonggi-Do (KR)

(72) Inventors: Won Ki Hong, Suwon-si (KR); Tae Hee Lee, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/171,567

(22) Filed: Oct. 26, 2018

(65) Prior Publication Data
US 2019/0346957 A1 Nov. 14, 2019

(30) Foreign Application Priority Data
May 11, 2018 (KR) .......... 10-2018-0054244

(51) Int. Cl.
*G06F 3/041* (2006.01)
*G09G 5/00* (2006.01)

(52) U.S. Cl.
CPC .......... *G06F 3/0414* (2013.01); *G06F 3/0412* (2013.01); *G06F 3/0416* (2013.01); *G09G 5/006* (2013.01); *G06F 2203/04105* (2013.01); *G06F 2203/04106* (2013.01)

(58) Field of Classification Search
CPC .... G06F 3/0414; G06F 3/0412; G06F 3/0416; G06F 2203/04105; G06F 2203/04106; G06F 3/0443; G06F 3/0445; G09G 5/006
See application file for complete search history.

(56) References Cited

U.S. PATENT DOCUMENTS

| | | | |
|---|---|---|---|
| 7,077,009 B2 | 7/2006 | Lokhorst et al. | |
| 8,654,524 B2 | 2/2014 | Pance et al. | |
| 8,698,777 B2 | 4/2014 | Endo et al. | |
| 9,195,343 B1 | 11/2015 | Zarraga et al. | |
| 9,274,660 B2 | 3/2016 | Bernstein et al. | |
| 9,696,223 B2 | 7/2017 | Lisseman et al. | |
| 2003/0087119 A1* | 5/2003 | Iwabuchi | G06F 3/045 428/633 |
| 2014/0028575 A1 | 1/2014 | Parivar et al. | |
| 2015/0036061 A1* | 2/2015 | Chen | F21V 9/00 349/12 |

(Continued)

FOREIGN PATENT DOCUMENTS

| | | |
|---|---|---|
| KR | 10-1780258 | 9/2017 |
| KR | 10-2017-0129372 | 11/2017 |
| KR | 10-1811424 | 12/2017 |

*Primary Examiner* — Premal R Patel
(74) *Attorney, Agent, or Firm* — F. Chau & Associates, LLC

(57) ABSTRACT

A display device includes a display panel. A window is disposed on the display panel. A conductive sheet is disposed beneath the display panel such that the display panel is disposed between the window and the conductive sheet. A pressure sensor is disposed between the display panel and the conductive sheet. The pressure sensor includes a sensing area corresponding to a portion of the pressure sensor. A pressure concentration bump is disposed between the window and the conductive sheet. The pressure concentration bump overlaps the sensing area. The pressure sensor includes a first electrode disposed within the sensing area and a second electrode spaced apart from the first electrode.

34 Claims, 102 Drawing Sheets

(56) References Cited

U.S. PATENT DOCUMENTS

| | | | |
|---|---|---|---|
| 2015/0277646 A1* | 10/2015 | Ogura | G06F 1/16 |
| | | | 345/173 |
| 2016/0231852 A1* | 8/2016 | Moon | G06F 3/044 |
| 2017/0031509 A1* | 2/2017 | Yoon | G06F 3/044 |
| 2017/0228093 A1 | 8/2017 | Li | |
| 2017/0315657 A1* | 11/2017 | Lai | G06F 3/0412 |
| 2017/0336891 A1* | 11/2017 | Rosenberg | G06F 3/0412 |
| 2017/0351354 A1* | 12/2017 | Yoon | G06F 3/044 |
| 2018/0210586 A1* | 7/2018 | Ding | G06F 3/044 |
| 2018/0253180 A1* | 9/2018 | Bie | G06F 3/0414 |

\* cited by examiner

FIG. 34
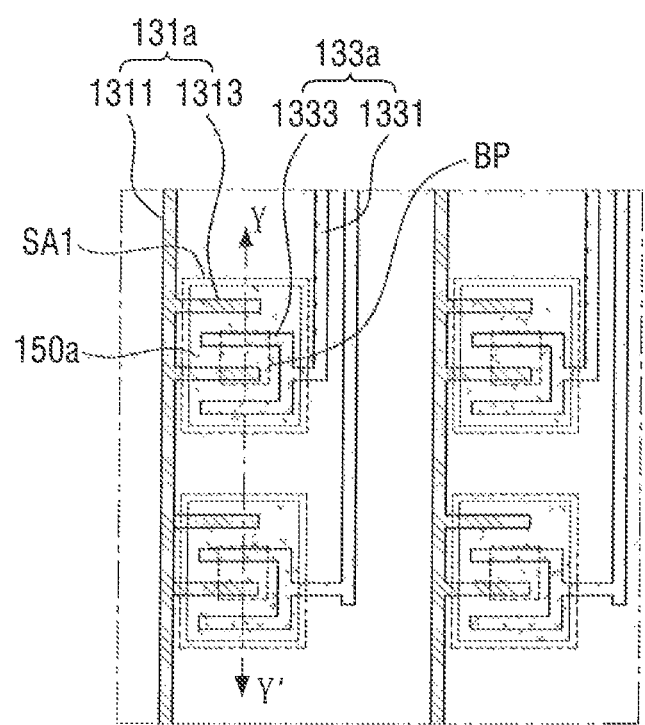
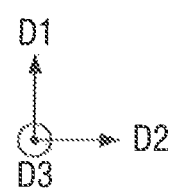

DISPLAY DEVICE AND PRESSURE SENSOR STRUCTURE

This application claims priority to Korean Patent Application No. 10-2018-0054244, filed on May 11, 2018, in the Korean Intellectual Property Office, the disclosure of which is herein incorporated by reference in its entirety.

TECHNICAL FIELD

The present invention relates to a display and, more specifically, to a display device and a pressure sensor structure.

DISCUSSION OF THE RELATED ART

A display device is a device for displaying an image. Display devices may be found within various electronic devices, such as smartphones, tablet PCs, digital cameras, notebook computers, navigation systems, and televisions. The display device generally includes a display panel for generating and displaying an image, as well as various input devices such as touch sensors.

Display devices incorporating touch sensors (e.g. touch-screens) are widely used in modern smartphones. Touch sensors have also recently been used to replace existing physical input device such as buttons and keypads.

Pressure sensors for detecting pressure intensity have also been incorporated into display devices. These pressure sensors may replace existing physical buttons.

SUMMARY

A display device includes a display panel. A window is disposed on the display panel. A conductive sheet is disposed beneath the display panel such that the display panel is disposed between the window and the conductive sheet. A pressure sensor is disposed between the display panel and the conductive sheet. The pressure sensor includes a sensing area corresponding to a portion of the pressure sensor. A pressure concentration bump is disposed between the window and the conductive sheet. The pressure concentration bump overlaps the sensing area. The pressure sensor includes a first electrode disposed within the sensing area and a second electrode spaced apart from the first electrode.

A display device includes a display panel. A window is disposed on the display panel. A conductive sheet is disposed beneath the display panel such that the display panel is disposed between the window and the conductive sheet. A pressure sensor is disposed between the display panel and the conductive sheet. The pressure sensor includes a plurality of sensing areas. A plurality of pressure concentration bumps is disposed between the window and the conductive sheet and each of the pressure concentration bumps overlaps a corresponding sensing area of the plurality of sensing areas.

A pressure sensor structure includes a pressure sensor having a base layer, a first electrode and a second electrode disposed on the base layer. The pressure sensor is in contact with a first surface of the base layer and the first electrode and the second electrode are spaced apart from each other. A pressure sensing layer is disposed on the first electrode and the second electrode and the pressure sensing layer is in contact with the first surface of the base layer. A pressure concentration bump is disposed on a second surface of the base layer and overlaps the pressure sensing layer.

BRIEF DESCRIPTION OF THE DRAWINGS

The above and other aspects and features of the present invention will become more apparent by describing in detail exemplary embodiments thereof with reference to the attached drawings, in which:

FIG. 34 is a plan view illustrating a first electrode, a second electrode, a pressure sensing layer, and a pressure concentration bump of a pressure sensor locate at the Q1 portion in FIG. 33;

FIGS. 36 to 63A are cross-sectional views illustrating display devices according to exemplary embodiments of the present disclosure taken along the line Y-Y' in FIG. 33;

DETAILED DESCRIPTION OF THE DRAWINGS

Figure 1:
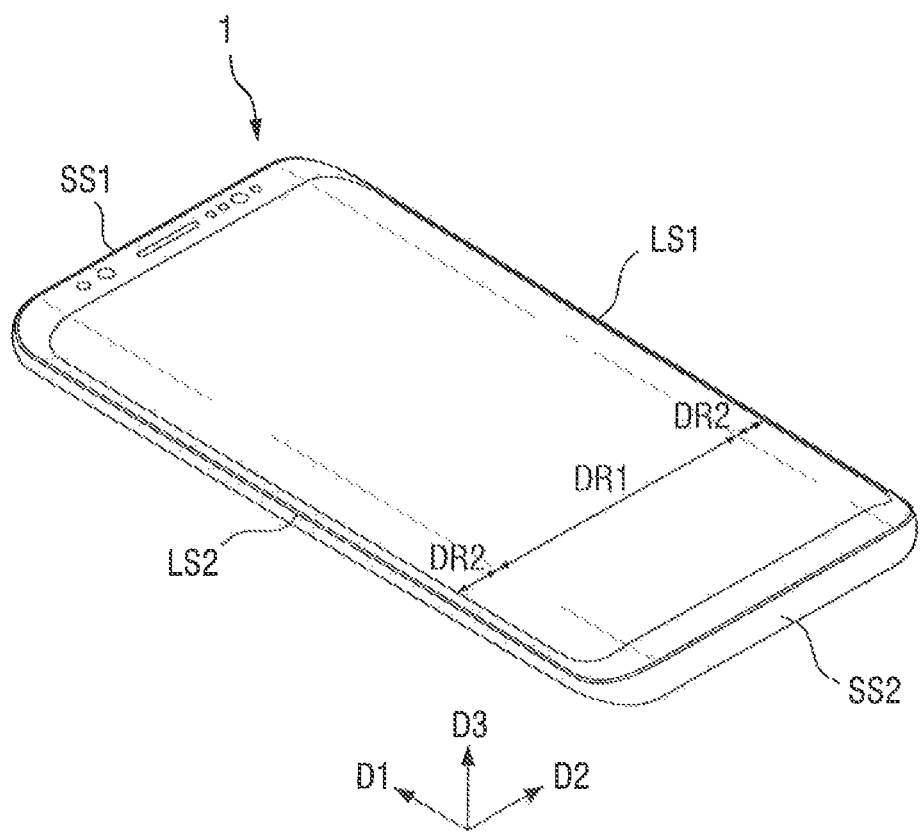
FIG. 1 is a perspective view illustrating a display device according to an exemplary embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art. Like reference numerals may refer to like elements throughout the specification and various drawings.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The sizes and thicknesses of the respective components shown in the drawings are shown for convenience of explanation, and the present invention is not necessarily limited to the size and thickness of the components shown in the drawings, which may be exaggerated for clarity.

Hereinafter, exemplary embodiments of the present invention will be described with reference to the attached drawings.

Figure 2:
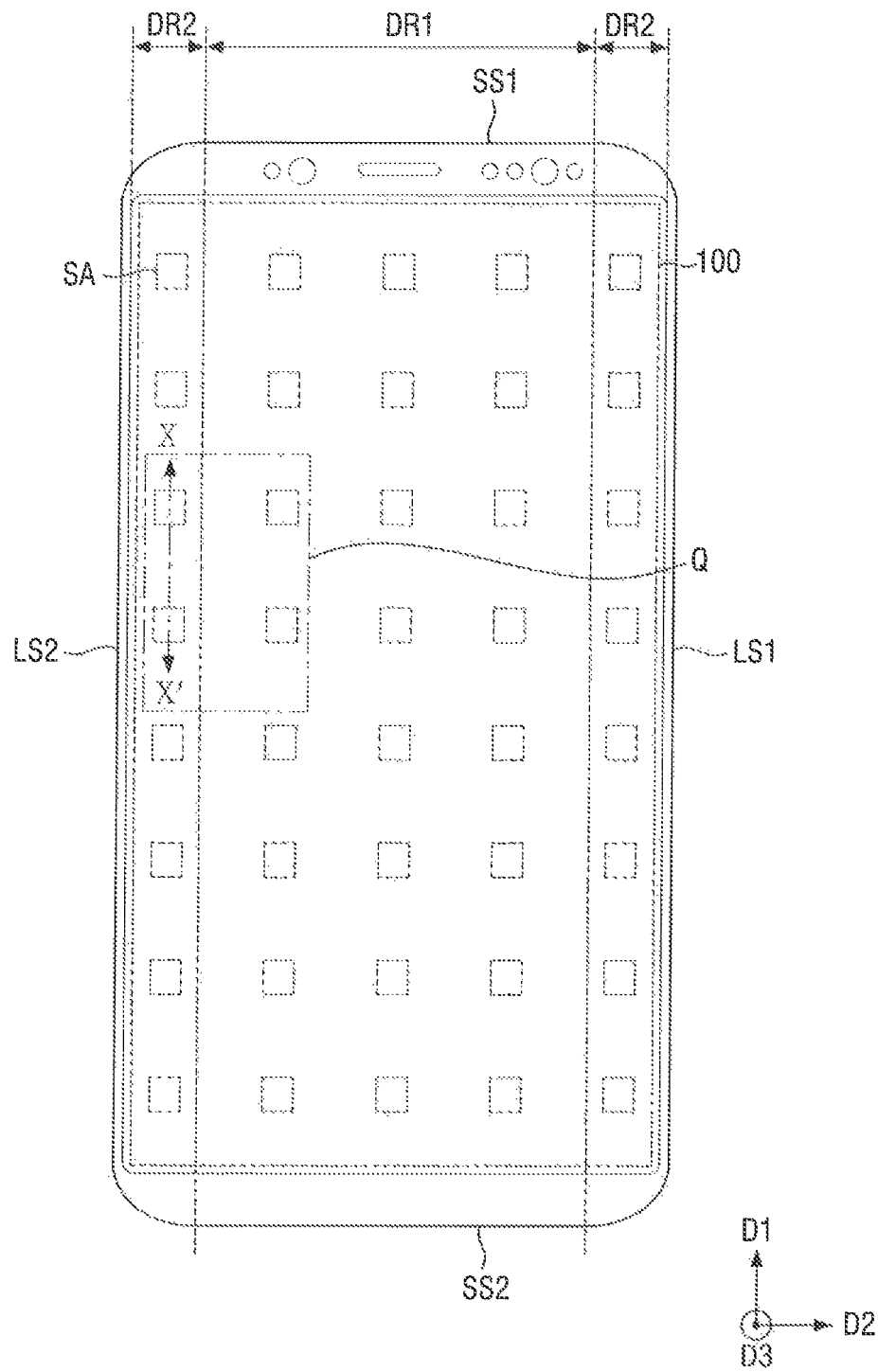
FIG. 2 is a plan view illustrating a display device according to an exemplary embodiment of the present disclosure.
Figure 3:
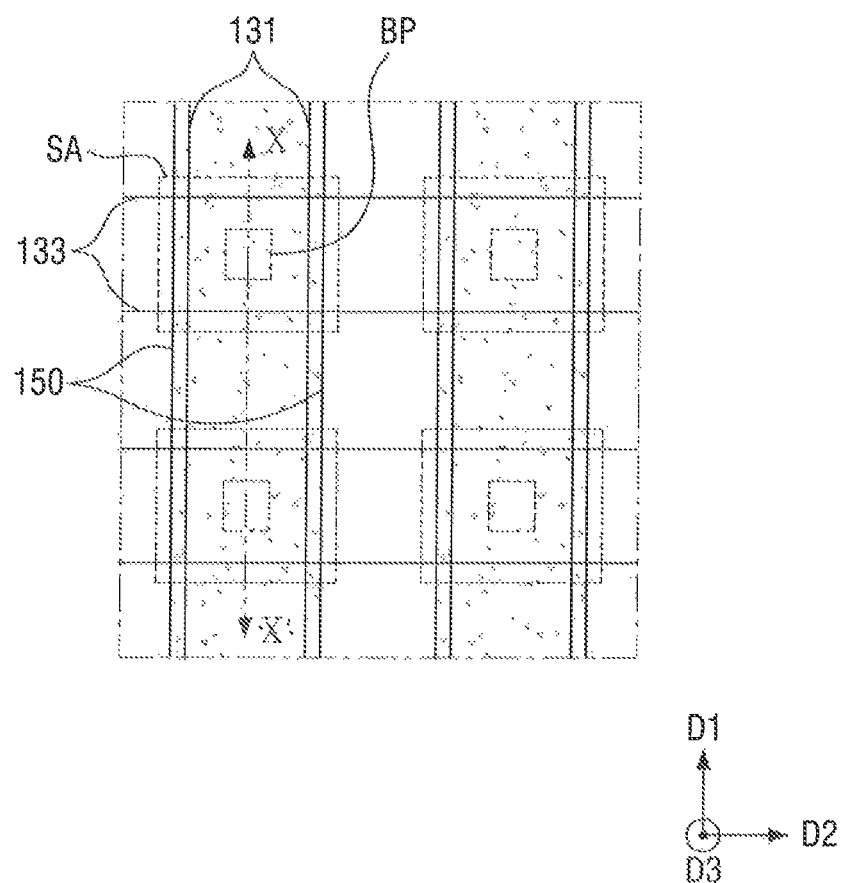
FIG. 3 is a plan view illustrating a first electrode, a second electrode, a pressure sensing layer, and a pressure concentration bump of a pressure sensor locate at the Q portion in FIG. 2.
Figure 4A:
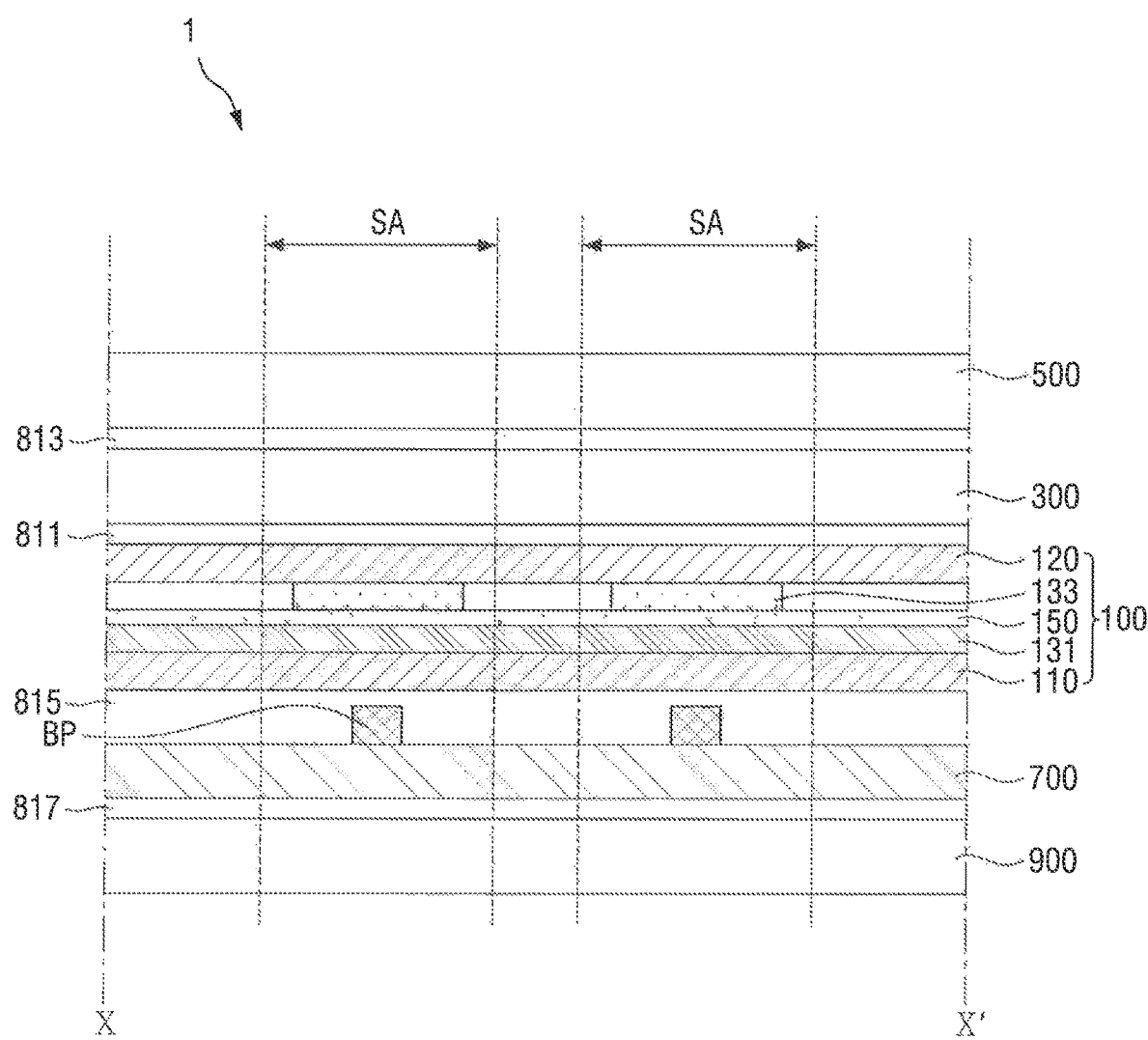
FIG. 4A is a cross-sectional view illustrating the display device according to an extemporary embodiment of the present disclosure taken along the line X-X' in FIG. 2.
Figure 4B:
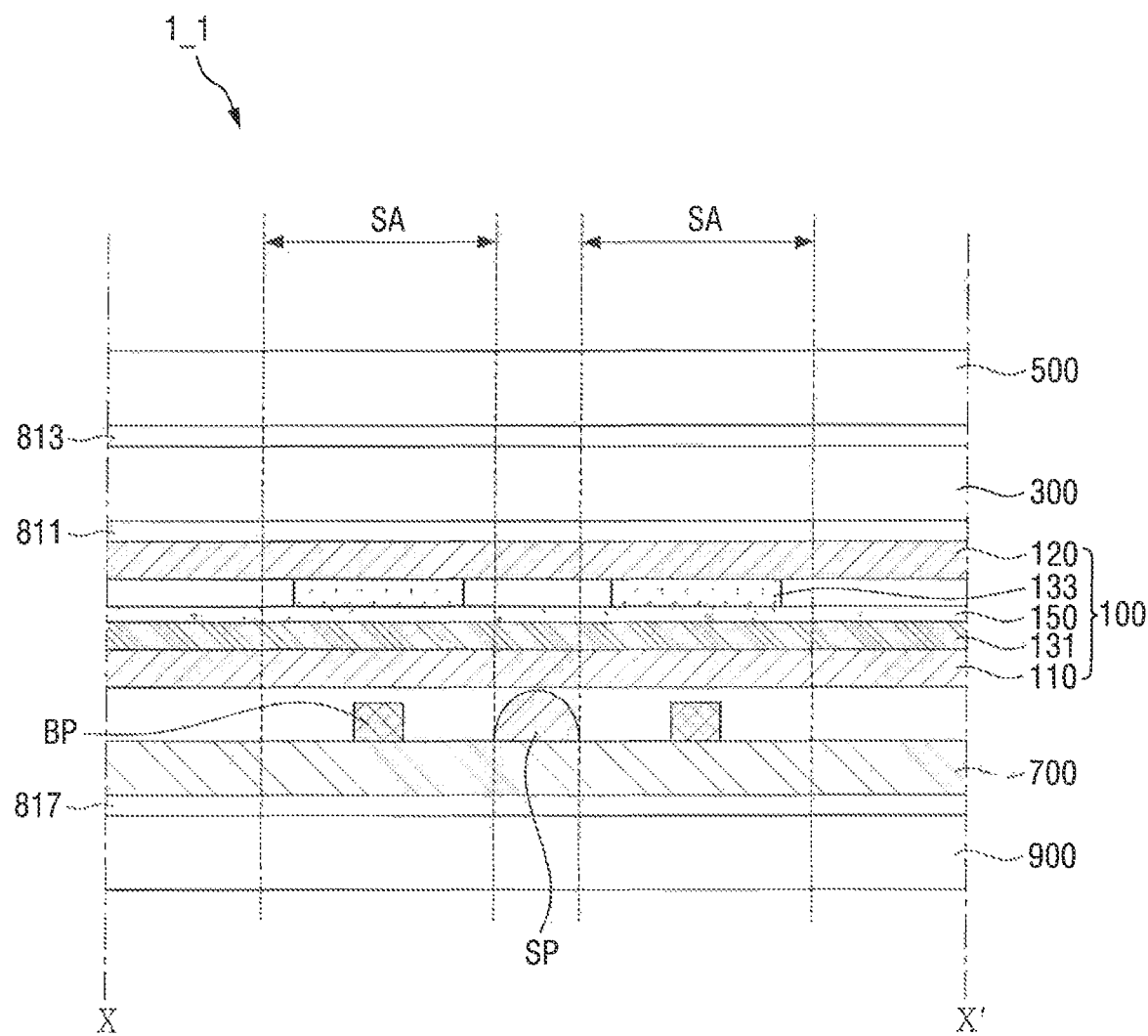
FIG. 4B is a cross-sectional view illustrating a modified structure of FIG. 4A.
Figure 5:
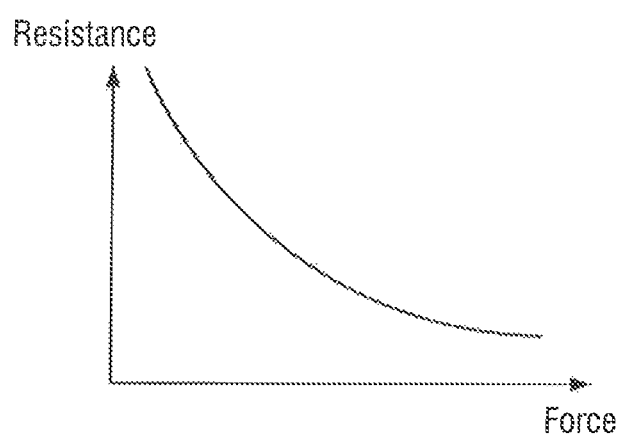
FIG. 5 is a graph illustrating an electrical resistance to pressure of a pressure sensing layer.

FIG. 1 is a perspective view illustrating a display device according to an exemplary embodiment of the present disclosure. FIG. 2 is a plan view illustrating a display device according to an exemplary embodiment of the present disclosure. FIG. 3 is a plan view illustrating a first electrode, a second electrode, a pressure sensing layer, and a pressure concentration bump of a pressure sensor locate at the Q portion in FIG. 2. FIG. 4A is a cross-sectional view illustrating a display device according to an exemplary embodiment of the present disclosure taken along the line X-X' in FIG. 2. FIG. 4B is a cross-sectional view illustrating a modified structure of FIG. 4A. FIG. 5 is a graph illustrating a relationship between electrical resistance and pressure of a pressure sensing layer.

Referring to FIGS. 1 to 5, a display device 1 includes a display panel 300, a window 500, a conductive sheet 700, a pressure sensor 100, and a pressure concentration bump BP. The display device 1 may further include a supporting bracket 900.

Unless otherwise defined, in this specification, the "upper side" and "upper surface" in the thickness direction refers to a surface that is closest to a viewer observing an image display of the display device. The thickness direction may be considered to be a third direction D3. Likewise, the "lower side" and "lower surface" refers to a side farthest from the viewer observing the image display of the display device. The lower surface is opposite to the upper surface. Further, the "upper", "lower", "left", and "right" in the plane direction indicate directions when viewed from above with the display surface in view and the lower surface out of view.

The display device 1 may have a substantially rectangular shape in a plan view. The display device 1 may have a true rectangular shape with 90° corners or a modified rectangular shape with rounded corners. The display device 1 may include two long sides LS1 and LS2 extending along the first direction D1 and two short sides SS1 and SS2 extending along the second direction D2. Although it is to be noted that the display device 1 may be substantially square with the length of the long sides LS1 and LS2 equaling the length of the short sides SS1 and SS2, however, for the purpose of providing a simplified explanation, the sides may still be so-named, in a member such as the rectangular display device 1 or the display panel 300 included therein, the long side located at the right side in the plane is referred to as a first long side LS1, the long side located at the left side in the plane is referred to as a second long side LS2, the short side located at the upper side in the plane is referred to as a first short side SS1, and the short side located at the lower side in the plane is referred to as a second short side SS2. The lengths of the long sides LS1 and LS2 of the display device 1 may be in the range of 1.5 to 2.5 times the lengths of the short sides SS1 and SS2.

The display device 1 may include a first area DR1 and a second area DR2. The first area DR1 occupies a first plane. The second area DR2 is connected to the first area DR1 and is bent or curved therefrom so as to deviate from the first plane. The second region DR2 may occupy second plane having a predetermined intersection angle with respect to the first plane (e.g. the second region DR2 may be substantially flat) or may have a curved surface. In the display device 1, the second area DR2 is disposed around the first area DR1 (e.g. the second area DR2 may surround the first area DR1 on one or two sides thereof). The first area DR1 of the display device 1 is used as a main display surface. In some exemplary embodiments of the present disclosure, not only the first area DR1 but also the second area DR2 may be used as a display area of the display device 1. Hereinafter, a case where the first area DR1 of the display device 1 is a flat portion and the second area DR2 thereof is a curved portion will be described as an example, but the present invention is not limited thereto.

The second area DR2, which is a curved portion, may have a constant degree of curvature, or may have a shape in which the degree of curvature changes.

The second area DR2 may be disposed at the edge of the display device 1. In an exemplary embodiment of the present disclosure, the second area DR2 may be disposed at the edges of both long sides LS1 and LS2 of the display device 1. However, the present invention is not limited thereto, and the second area DR2 may be disposed at the edge of one side of the display device 1, may be disposed at both short sides SS1 and SS2 thereof, may be disposed at the edges of three sides thereof, or may be disposed at the edges of all four sides.

The display panel 300 is a panel for displaying an image, for example, the display panel 300 may be an organic light emitting diode (OLED) display panel. In the following exemplary embodiments of the present disclosure, a case where an organic light emitting diode (OLED) display panel is used as the display panel 300 is exemplified, but the present invention is not limited thereto. Other types of display panels, such as a liquid crystal display (LCD) panel and an electrophoretic panel, may be used.

The display panel 300 includes a plurality of organic light emitting elements arranged on a substrate. The substrate may be a rigid substrate made of glass, quartz or the like, or a flexible substrate made of polyimide or another polymer resin. When a polyimide substrate is used as the substrate, the display panel 300 may be warped, bent, folded, or rolled.

A window 500 is disposed on the display panel 300. The window 500 is disposed on the display panel 300 to protect the display panel 300 and to transmit light emitted from the display panel 300 to the viewer. The window 500 may be transparent and may be made of glass, crystal, transparent plastic, or the like.

The window 500 may be disposed to overlap the display panel 300 and to cover the entire surface of the display panel 300. The window 500 may be larger in area than the display panel 300. For example, the window 500 may protrude outward from the display panel 300 at both short sides SS1 and SS2 of the display device 1. The window 500 may even protrude at both the long sides LS1 and LS2 of the display device 1. The protrusion distance of the window 500 at both the short sides SS1 and SS2 may be larger than the protrusion distance of the window 500 at both the long sides LS1 and LS2.

In some exemplary embodiments of the present disclosure, the window 500 and the display panel 300 may be coupled directly or indirectly through an upper bonding layer 813. Here, the meaning "being coupled directly" refers to a case where each of the window 500 and the display panel 300 are in direct contact with the upper bonding layer 813. Further, the meaning "being coupled indirectly" refers to a concept including a case where another component (for example, a touch sensor) is interposed between the window 500 and the display panel 300. The upper bonding layer 813 may be formed of an optical dear adhesive (OCA), age optical clear resin (OCR), or some other adhesive.

A pressure sensor 100 is disposed beneath the display panel 300 (e.g. the pressure sensor 100 is disposed between the display panel 300 and the bottom surface of the display device 1).

The pressure sensor 100 may overlap the display panel 300, and may be attached to the lower surface of the display panel 300 through an intermediate bonding layer 811 such as a pressure-sensitive adhesive layer or another adhesive layer.

In some exemplary embodiments of the present disclosure, the pressure sensor 100 may be disposed in the first area DR1 and the second area DR2 of the display device 1. For example, a part of the pressure sensor 100 may include a portion located at the flat portion of the display device 1 and a portion located at the curved portion of the display device 1.

The pressure sensor 100 may include a plurality of sensing areas SA. The sensing areas SA are areas capable of sensing pressure, and the respective sensing areas SA may sense the pressure of the corresponding position independently of each other. For example, each pressure sensing area SA may sense pressure exclusively within its domain. The sensing areas SA may be located in the first area DR1 and the second area DR2 of the display device 1.

The pressure sensor 100 includes a first electrode 131 and a second electrode 133 which are spaced apart from each other, and may further include a pressure sensing layer 150, a first base layer 110, and a second base layer 120.

The first base layer 110 and the second base layer 120 may be disposed to face each other and the remaining layers of the pressure sensor 100 may be disposed between the first base layer 110 and the second base layer 120.

Each of the first base layer 110 and the second base layer 120 may contain polyethylene, polyimide, polycarbonate, polysulfone, polyacrylate, polystyrene, polyvinyl chloride, polyvinyl alcohol, polynorbornene, and/or polyester. Each of the first base layer 110 and the second base layer 120 may be made of a glass material. In an exemplary embodiment of the present disclosure, each of the first base layer 110 and the second base layer 120 may be formed of a polyethylene terephthalate (PET) film or a polyimide (PI) film.

In some exemplary embodiments of the present disclosure, the first base layer 110 and the second base layer 120 may be coupled with each other through a bonding layer disposed along the edges thereof.

A first electrode 131 is disposed on one side of the first base layer 110 facing the second base layer 120. In some exemplary embodiments of the present disclosure, one first electrode 131 may extend along the first direction D1, and may be spaced apart from a proximate first electrode 131 along the second direction D2, as may be seen in FIG. 3.

The second electrode 133 is disposed on one side of the second base layer 120 facing the first base layer 110. In some exemplary embodiments of the present disclosure, one second electrode 133 may extend along the second direction D2, and may be spaced apart from a proximate second electrode 133 along the first direction D1, as may be seen in FIG. 3.

For example, the first electrode 131 and the second electrode 133 may be spaced apart from each other without being in direct contact with each other, and may be located on different layers (or different levels) from each other.

In some exemplary embodiments of the present disclosure, the first electrode 131 may be a driving electrode, and the second electrode 133 may be a sensing electrode.

The first electrode 131 and the second electrode 133 may include a conductive material such as silver (Ag), copper (Cu), aluminum (Al), another metal or a conductive polymer.

A pressure sensing layer 150 may be disposed between the first electrode 131 and the second electrode 133. In some exemplary embodiments of the present disclosure, the pressure sensing layer 150 may be disposed on the first electrode 131, and may at least partially contact one surface of the first base layer 110. In some exemplary embodiments of the present disclosure, the pressure sensing layer 150, similarly to the first electrode 131, may extend along the first direction D1 and may be spaced apart from a proximate pressure sensing layer 150 along the second direction D2.

The pressure sensing layer 150 may include a pressure sensitive material. The pressure sensitive material may include metal nanoparticles such as nickel, aluminum, tin, or copper, or carbon particles. The pressure sensitive material may be contained in the polymer resin in a particle form, but is not limited thereto. As shown in FIG. 5, as pressure (e.g. force) increases, the electrical resistance of the pressuring sensing layer 150 decreases. When using such characteristics, it is possible to sense whether or not pressure is applied and the intensity of pressure that is applied.

For example, the surface of the pressure sensing layer 150 may be in direct contact with the first electrode 131, and may be in direct contact with the second electrode 133 or at least adjacent to the surface of the second electrode 133. When pressure is applied to the pressure sensor 100, the surface of the pressure sensing layer 150 is in contact with the surfaces of the first electrode 131 and the second electrode 133 at the corresponding site. Accordingly, the first electrode 131 and the second electrode 133 may be electrically connected to each other through the pressure sensing layer 150. The pressure sensing layer 150 between the first electrode 131 and the second electrode 133 may act as an electrical resistor.

When pressure is not applied to the pressure sensing layer 150 or low pressure is applied thereto, the pressure sensing layer 150 has a high resistance. In this case, even if a driving voltage is applied to the first electrode 131, only a relatively small current flows toward the second electrode 133. In contrast, when the pressure applied to the pressure sensing layer 122 increases, the resistance of the pressure sensing layer 150 decreases, and thus the amount of current flowing between the first electrode 131 and the second electrode 133 increases.

Accordingly, when a driving voltage is applied to the first electrode 131, and the amount of current is sensed from the second electrode 133, it is possible to determine how much pressure is applied to the pressure sensing layer 150. It is to be understood that in sensing the current, a voltage may be detected and the value of the detected voltage used to determine the current.

The thickness of the pressure sensing layer 150 may be greater than the thickness of the first electrode 131 or the thickness of the second electrode 133, but the present invention is not limited thereto. In some exemplary embodiments of the present disclosure, the thickness of the pressure sensing layer 150 may be within the range of about 4 µm to about 12 µm. For example, the thickness of the pressure sensing layer 150 may be about 8 µm.

The first electrode 131, the second electrode 133, and the pressure sensing layer 150 may be disposed for each sensing area SA. The first electrode 131 and the pressure sensing layer 150 may run along the first direction D1 in parallel with each other. Further, the second electrode 133 may run along the second direction D2. The first electrode 131 and the pressure sensing layer 150 may overlap the second electrode 133 within each sensing area SA.

The second base layer 120 of the pressure sensor 100 may be disposed adjacent to the lower surface of the display panel 300 relative to the first base layer 110. Alternatively, the first base layer 110 of the pressure sensor 100 may be disposed adjacent to the lower surface of the display panel 300 relative to the second base layer 120.

A conductive sheet 700 is disposed under the pressure sensor 100.

The conductive sheet 700 may be configured to radiate heat, to block electromagnetic waves, to prevent false tough recognition, to ground, to enhance intensity, and the like. In some exemplary embodiments of the present disclosure, the conductive sheet 700 may be a graphite sheet or a copper sheet. The conductive sheet 700 may be coupled with the pressure sensor 100 through an intermediate bonding layer 815 such as a pressure-sensitive adhesive layer or another type of adhesive layer.

Pressure concentration bumps BP may be disposed on one surface of the conductive sheet 700 and may face the pressure sensor 100. The pressure concentration humps BP may be disposed to overlap the respective sensing areas SA and may be disposed to overlap the pressure sensing layer 150 disposed in each sensing area SA. The pressure concentrated bump BP may concentrate the pressure due to external force on the pressure sensing layer 150 in each sensing area SA without dispersing the pressure. Therefore, the pressure sensor 100 may be made to be more sensitive.

In some exemplary embodiments of the present disclosure, the pressure concentration bump BP may be attached onto one surface of the conductive sheet 700 and may face the pressure sensor 100. In some exemplary embodiments of the present disclosure, the pressure concentration bump BP may be formed on one surface of the conductive sheet 700 by coating or printing. Further, the pressure concentration bump BP may be attached onto one surface of the conductive sheet 700 through an adhesive layer such as an adhesive film, double-sided adhesive tape or the like.

The pressure concentrated bump BP may have a shape protruding toward one side. In some exemplary embodiments of the present disclosure, the sectional shape of the pressure concentration bump BP may be a rectangular shape, but is not limited thereto, and may have various shapes such as a hemispherical shape and polygonal shapes other than rectangular shape.

The pressure concentrated bump BP may be made of a material that is rigid, e.g. not relatively deformed by pressure. In some exemplary embodiments of the present disclosure, the pressure concentration bump BP may be made of a polymer resin such as an epoxy resin or an acrylic resin. Alternatively, the pressure concentration bump BP may be made of metal.

In some exemplary embodiments of the present disclosure, as shown in FIG. 4A, an intermediate bonding layer 815 may be disposed between pressure concentration bumps BP and the pressure sensor 100. Further, the space between the conductive sheet 700 and the pressure sensor 100 may be filled with the intermediate bonding layer 815.

The structure shown in FIG. 4A may be modified into a structure shown in FIG. 4B.

The display device 1_1 shown in FIG. 4B, unlike the display device 1 shown in FIG. 4A, may be configured such that a spacer SP may be disposed between the conductive sheet 700 and the pressure sensor 100. A cavity or space may be provided between the conductive sheet 700 and the pressure sensor 100 by the spacer SP. In some exemplary embodiments of the present disclosure, the space may be filled with air. In some exemplary embodiments of the present disclosure, the intermediate bonding layer 815 does not fully fill the space between the conductive sheet 700 and the pressure sensor 100, and instead extends along the edges of the conductive sheet 700 and the pressure sensor 100, so as to couple the conductive sheet 700 with the pressure sensor 100.

In some exemplary embodiments of the present disclosure, the spacer SP may be formed to have a dot shape, and may be disposed not to overlap the sensing area SA of the pressure sensor 100. Further, in some exemplary embodiments of the present disclosure, the height of the spacer SP may be higher than the height of the pressure concentration bump BP.

The spacer SP may be made of a material having higher flexibility than the pressure concentration bump BP. In some exemplary embodiments of the present disclosure, the spacer SIP may be made of an elastic material. Where the spacer SP is made of an elastic material, the spacer SP may be deformed by pressure, and when the pressure is removed/discontinued, the spacer SP may be restored to an original state by an elastic resilience. In some exemplary embodiments of the present disclosure, the elastic material may be, but is not limited to being, elastomer or rubber.

A bracket 900 is disposed beneath the conductive sheet 700. The bracket 900 may be a case, a storage container, or protective container for accommodating other components. For example, the bracket 900 may accommodate the window 500, the display panel 300, the pressure sensor 100, and the conductive sheet 700.

The bottom of the bracket 900 faces the conductive sheet 700. The conductive sheet 700 may be attached to the bottom of the bracket 900 through a lower bonding layer 817 such as a pressure-sensitive adhesive layer or another type of adhesive layer.

The pressure sensor 100 of the display device 1, according to the above-described embodiment, may be used in place of a physical input button or in combination with a physical input button. Since the pressure sensor 100 of the display device 1 can sense the intensity of a user input or the intensity of pressure, rather than just the existence of a touch, the pressure sensor 100 can be used as input means of the display device 1 and can provide various user interfaces to the user. For example, the pressure sensor 100 can detect whether the pressure is applied and the intensity of the pressure. Further, the display device 1 may be pre-programmed to produce a certain output according to the pressure applied to a specific position and/or the intensity thereof. For example, pre-programmed functions such as screen adjustment, screen lock, screen conversion, application call, application execution, image capturing, and call reception may be performed on the sensing of a particular pressure.

Further, since the display device 1 includes a pressure concentration bump BP overlapping the sensing area SA of the pressure sensor 100, the sensitivity of the pressure sensor 100 may be increased. Moreover, since the pressure concentration bump BP is disposed between the window 500 and the conductive sheet 700, for example, between the display panel 300 and the conductive sheet 700, the window 500, the display panel 300, the pressure sensor 100, the pressure concentration bump BP, and the conductive sheet 700 can be made into a single module.

According to some exemplary embodiments of the present disclosure, the pressure concentration bump BP may be disposed between the conductive sheet 700 and the pressure sensor 100. In such a case, all structures may be modified into the structure to which the spacer SP is applied, as shown in FIG. 4B.

Figure 6A:
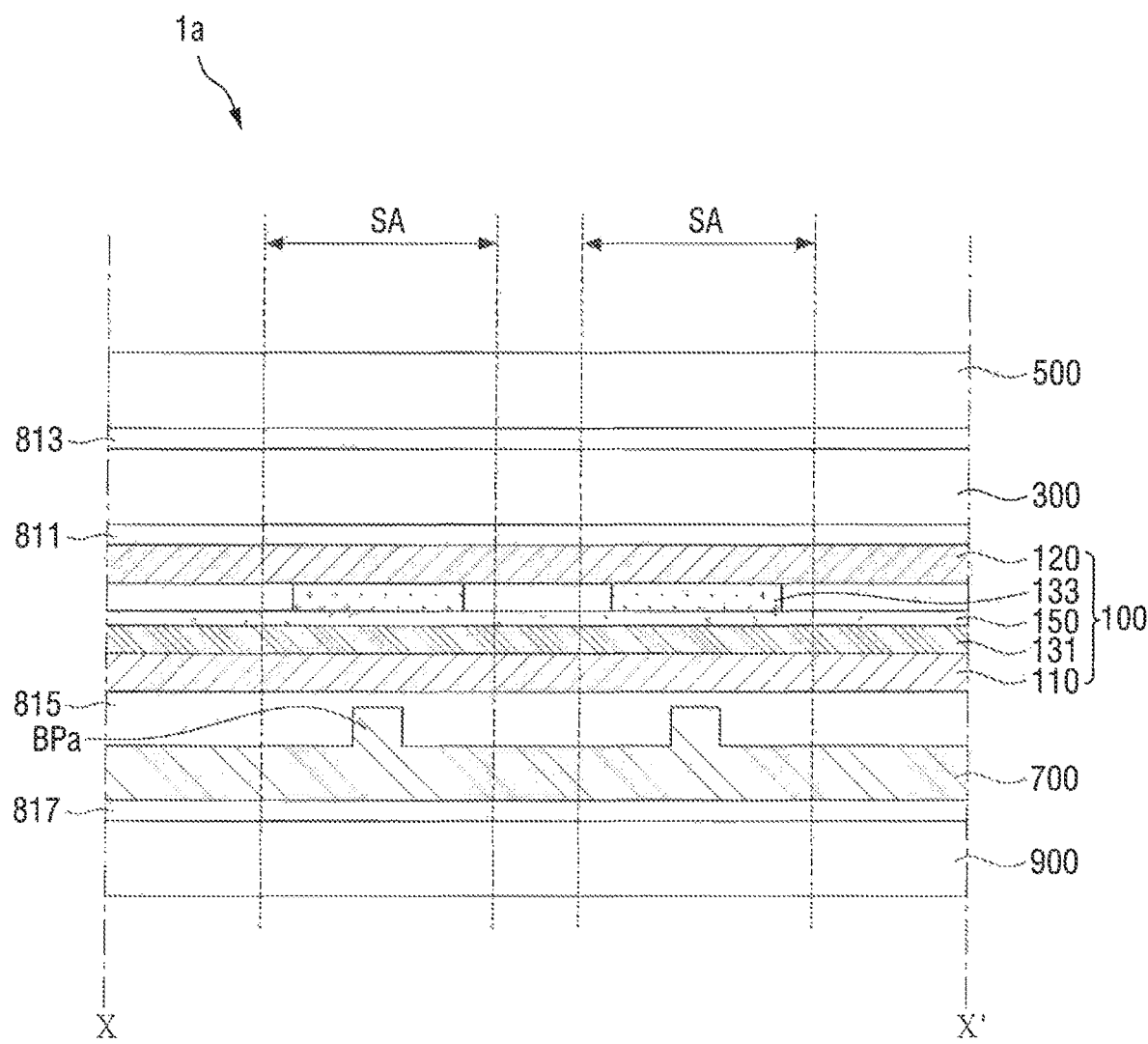
FIG. 6A is a cross-sectional view illustrating a display device according to an exemplary embodiment of the present disclosure taken along the line X-X' in FIG. 2.

FIG. 6A is a cross-sectional view illustrating a display device according to an exemplary embodiment of the present disclosure taken along the line X-X' in FIG. 2. Referring to FIG. 6A, a display device 1a may have a pressure concentration bump BPa that is integrated with the conductive sheet 700 (e.g. the pressure concentration bump BPa is formed as a continuous element with the conductive sheet 700), and other configurations of the display device 1a are substantially the same as or similar to those of the display device 1. Therefore, differences will be mainly described.

The pressure concentration bump BPa of the display device 1a may be disposed on one surface of the conductive sheet 700 facing the pressure sensor 100, may be integrated with the conductive sheet 700, and may be made of the same material as the conductive sheet 700. For example, when the conductive sheet 700 is a copper sheet, the pressure concentration bump BPa may be made of copper. In some exemplary embodiments of the present disclosure, the pressure concentration bump BPa may be formed by pressing the conductive sheet 700.

According to an exemplary embodiment of the present disclosure, since the conductive sheet 700 itself is processed and then used as the pressure concentration bump BPa, the structure of the display device 1a can be simplified in addition to the above-mentioned effect.

Figure 6B:
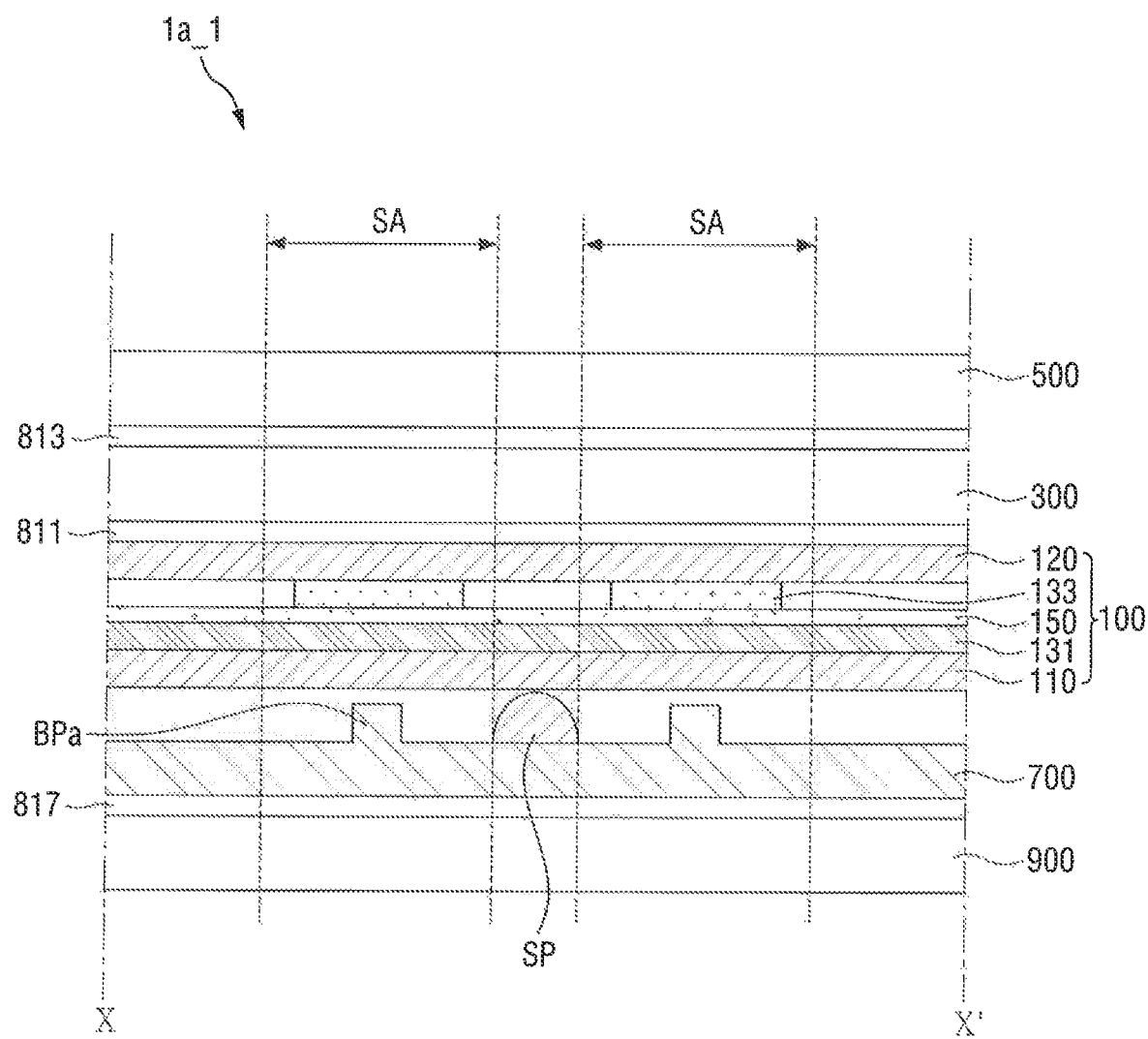
FIG. 6B is a cross-sectional view illustrating a modified structure of FIG. 6A.

FIG. 6B is a cross-sectional view showing a modified embodiment of the display device shown in FIG. 6A. Referring to FIG. 6B, a display device 1a_1 is different from the display device 1 shown in FIG. 6A in that a space SP is disposed between the conductive sheet 700 and the pressure sensor 100 and a space is provided between the conductive sheet 700 and the pressure sensor 100, and other configurations of the display device 1a_1 are substantially the same as or similar to those of the display device 1a. A description related to the spacer SP is the same as that described above with reference to FIG. 4B, and will thus be omitted.

Where the conductive sheet 700 is integrated with the pressure concentration bump BPa, all structures may be modified into the structure to which the spacer SP is applied, as shown in FIG. 6B.

Figure 7:
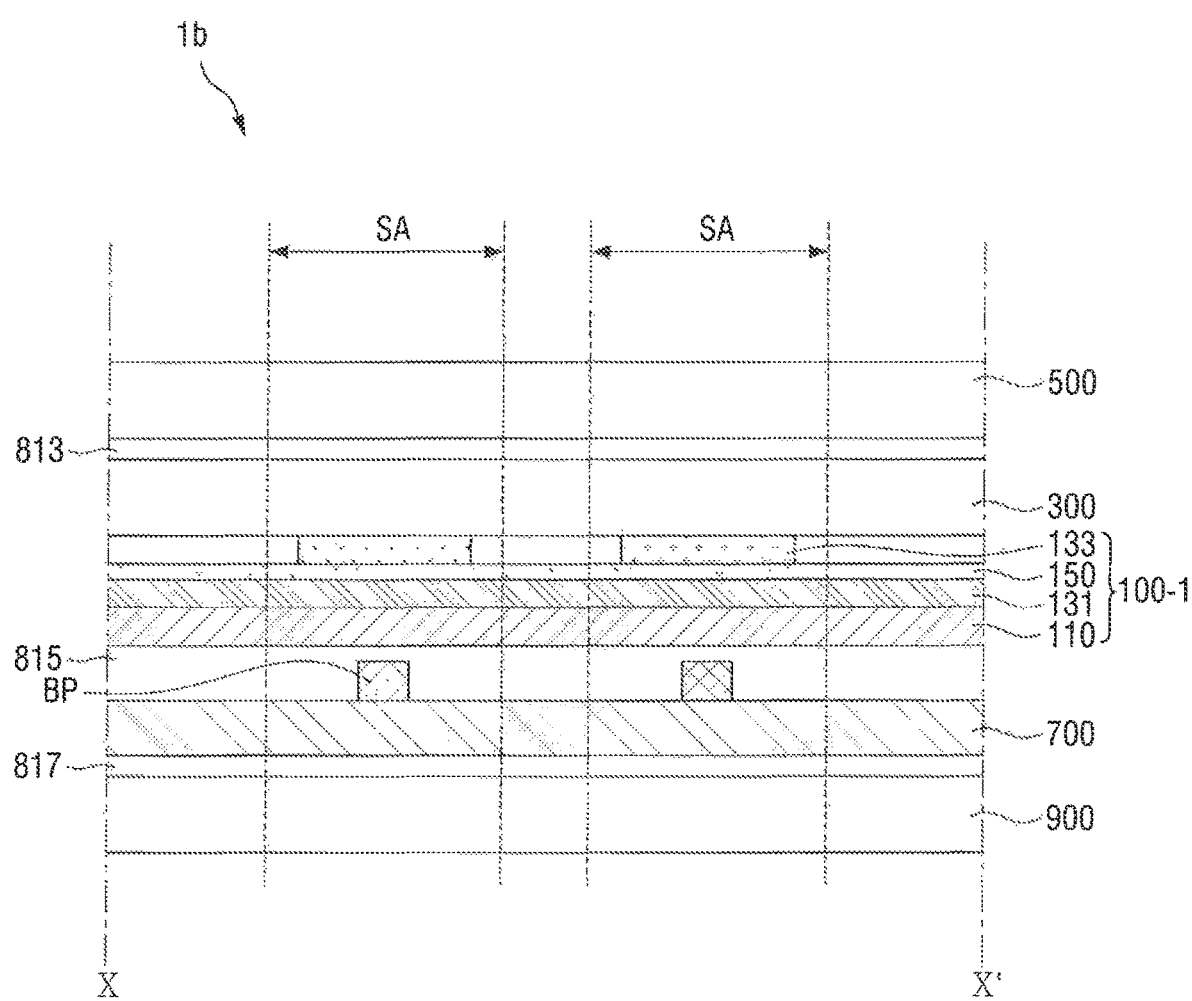
FIGS. 7 to 32 are cross-sectional views illustrating display devices according to exemplary embodiments of the present disclosure taken along the line X-X' in FIG. 2.

FIG. 7 is a cross-sectional view of a display device according to an exemplary embodiment of the present disclosure taken along the line X-X' in FIG. 2. Referring to FIG. 7, a display device 1b is different from the display device 1 shown in FIG. 4A in that the configuration of a pressure sensor 100_1 is different from the configuration of the pressure sensor 100, and other configurations of the display device 1b are substantially the same as or similar to those of the display device 1. Therefore, differences will be mainly described.

The pressure sensor 100_1, unlike the pressure sensor 100 shown in FIG. 4A, does not include the second base layer 120. Further, the second electrode 133 may be disposed on the lower surface of the display panel 300. For example, the display panel 300 may be used as a base layer.

In this embodiment, since one of the two base layers of the pressure sensor 100_1 and the intermediate bonding layer 811 may be omitted, the thickness of the display device 1b can be reduced in addition to the effects described with reference to FIGS. 1 to 5.

Figure 8:
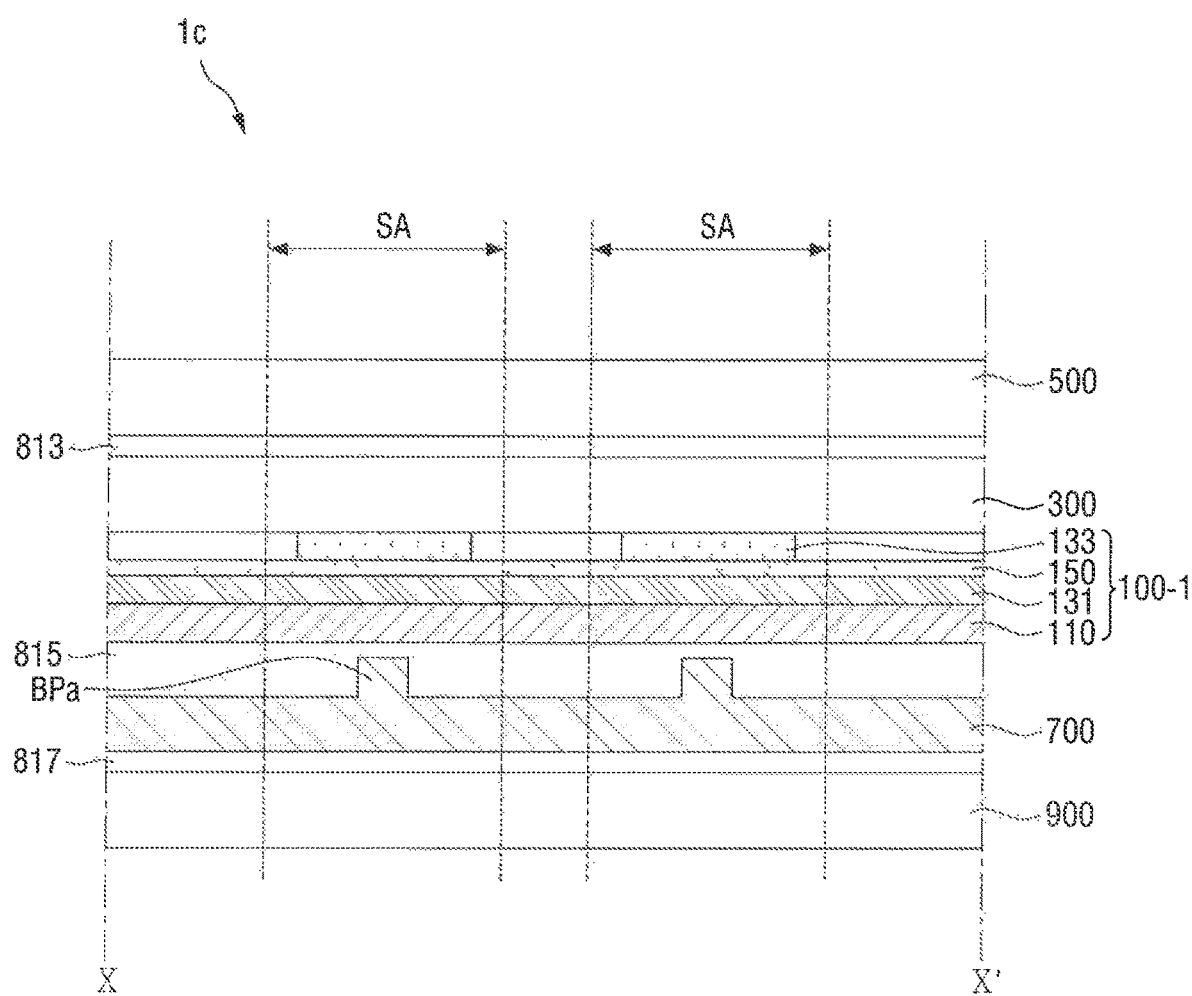

FIG. 8 is a cross-sectional view of a display device according to an exemplary embodiment of the present disclosure taken along the line X-X' in FIG. 2. Referring to FIG. 8, a display device 1c is different from the display device 1b shown in FIG. 7 in that the pressure concentration bump BPa is integrated with the conductive sheet 700, and other configurations of the display device 1c are substantially the same as or similar to those of the display device 1b. The description of the pressure concentration bump BPa have been made with reference to FIG. 6A.

In this embodiment, the structure of the display device 1c can be simplified and the thickness of the display device 1c can be reduced.

Figure 9A:
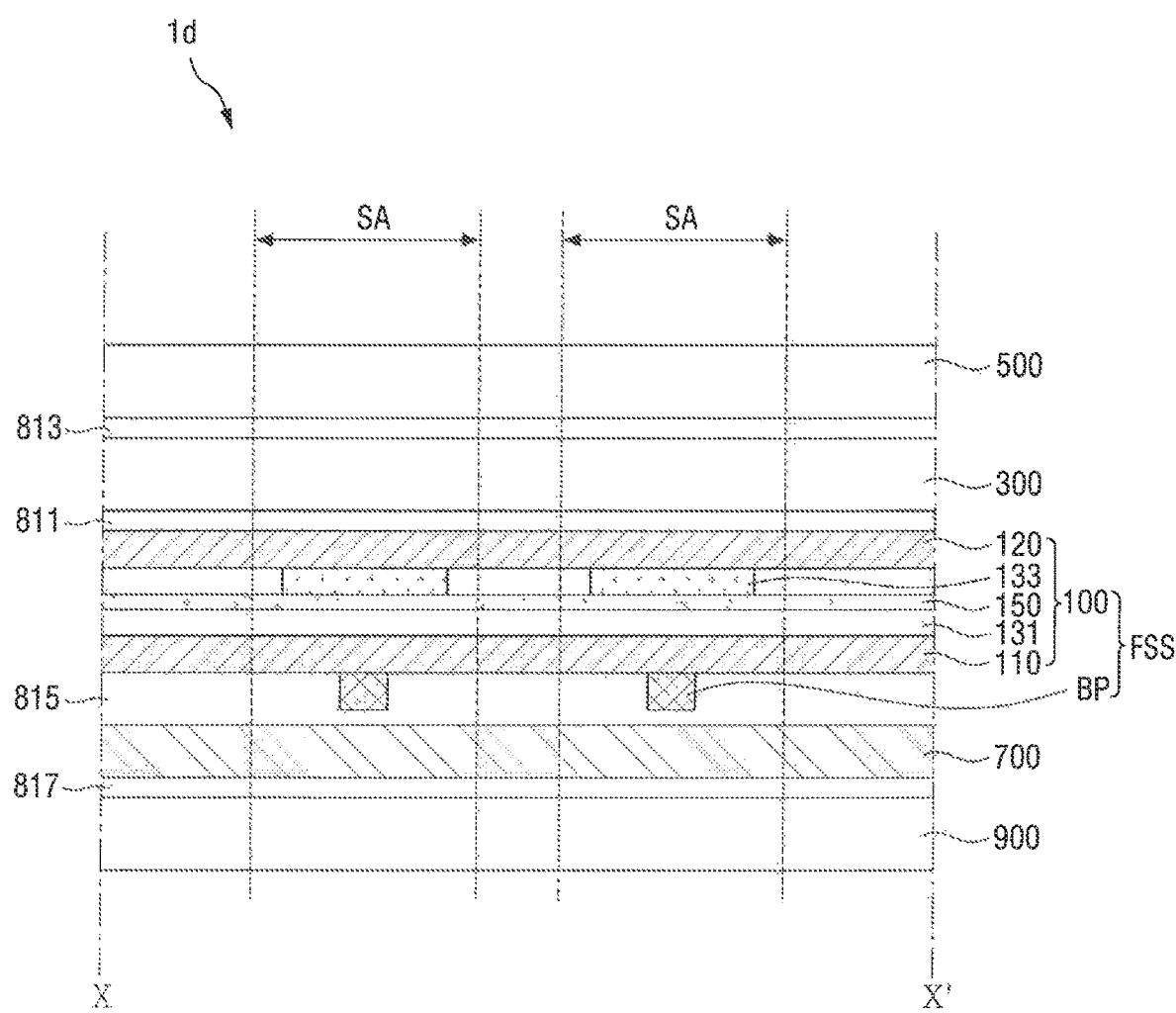

FIG. 9A is a cross-sectional view of a display device according to an exemplary embodiment of the present disclosure taken along the line X-X' in FIG. 2. Referring to FIG. 9A, a display device 1d is different from the display device 1 shown in FIG. 4A in that the pressure concentration bump BP is coupled with the pressure sensor 100 to form a pressure sensor structure FSS, for example, in that the pressure concentration bump BP is coupled with the lower surface of the first base layer 110 facing the conductive sheet 700, and other configurations of the display device 1d are substantially the same as or similar to those of the display device 1.

In this embodiment, since the pressure concentration bump BP is coupled with the pressure sensor 100 to form the pressure sensor structure FSS, the misalignment between the sensing area SA and the pressure concentration bump BP can be prevented.

Figure 9B:
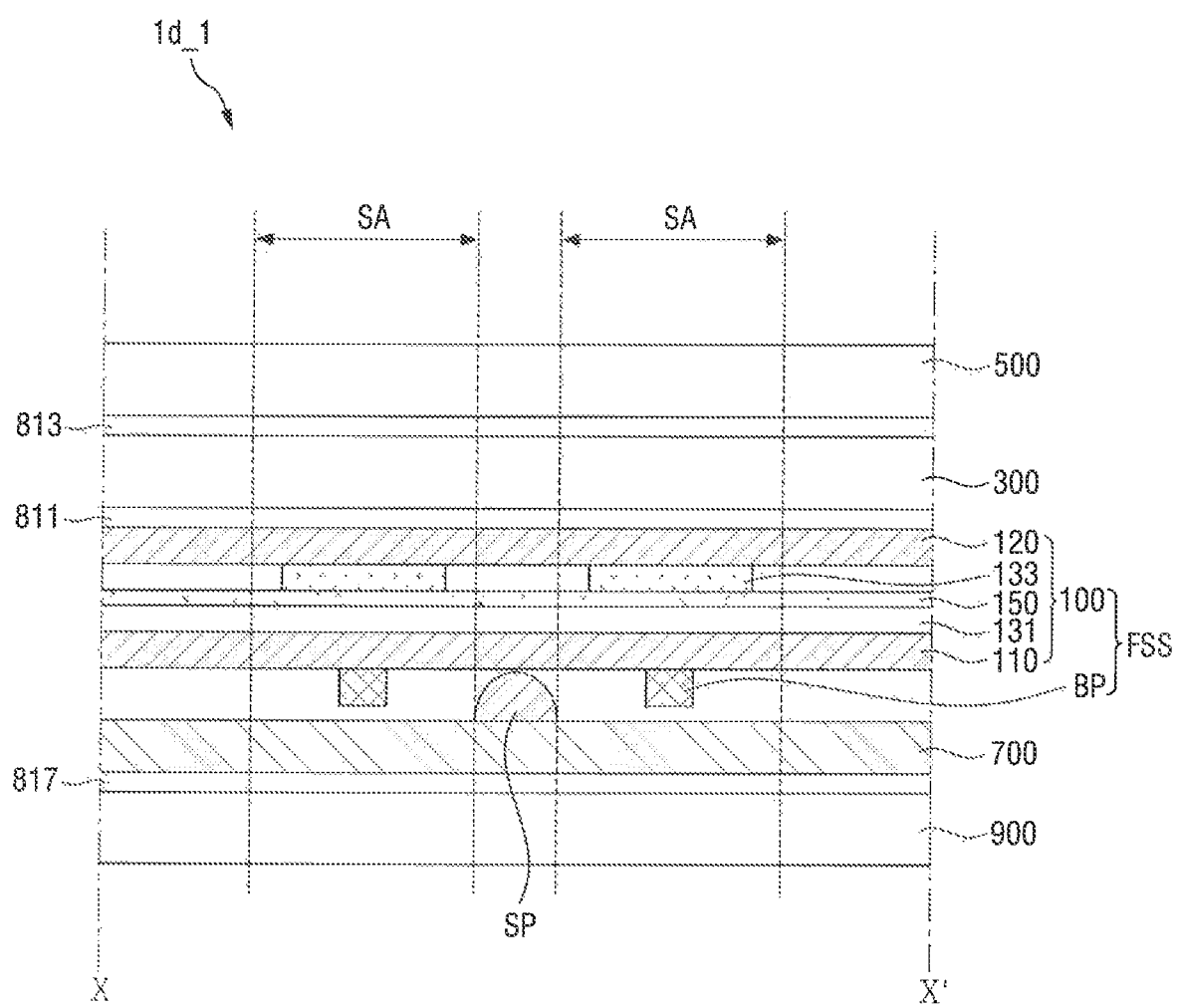

FIG. 9B is a cross-sectional view showing a modified embodiment of the display device shown in FIG. 9A. Referring to FIG. 9B, a display device 1d_1 is different from the display device 1d shown in FIG. 9A in that a space SP is disposed between the conductive sheet 700 and the pressure sensor 100 and a space is provided between the conductive sheet 700 and the pressure sensor 100, and other configurations of the display device 1d_1 are substantially the same as those of the display device 1d. A description related to the spacer SP is the same as that described above with reference to FIG. 4B, and will thus be omitted.

Where the pressure concentration bump BP is coupled with the pressure sensor 100 or the pressure concentration bump BP is coupled with the first base layer 110, all structures may be modified into the structure to which the spacer SP is applied, as shown in FIG. 9B.

Figure 10A:
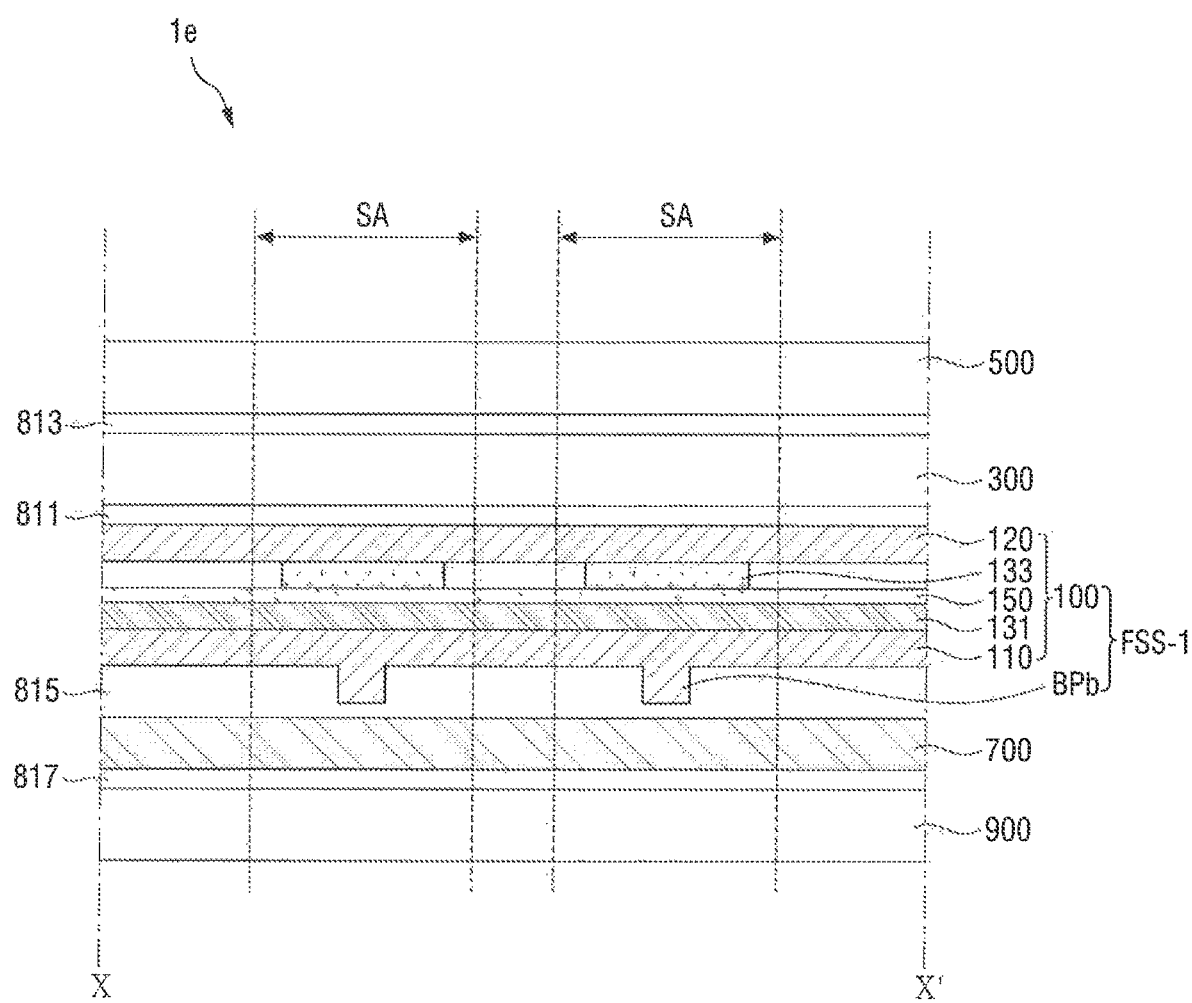

FIG. 10A is a cross-sectional view of a display device according to an exemplary embodiment of the present disclosure taken along the line X-X' in FIG. 2. Referring to FIG. 10A, a display device 1e is different from the display device 1d shown in FIG. 9A in that the display device 1e includes a pressure sensor structure FSS_1, and other configurations of the display device 1d are substantially the same as those of the display device 1.

The pressure concentration bump BPb of the pressure sensor structure FSS_1 may be disposed on the lower surface of the first base layer 110 facing the conductive sheet 700, may be integrated with the first base layer 110, and may be made of the same material as the first base layer 110. For example, when the first base layer 110 is a PET film, the pressure concentration bump BPb may be made of PET. In some exemplary embodiments of the present disclosure, the pressure concentration bump BPb may be formed by pressing the first base layer 110.

Since the first base layer 110 itself is processed and then used as the pressure concentration bump BPb, the structure of the pressure sensor structure FSS_1 and the structure of the display device 1e can be simplified.

Figure 10B:
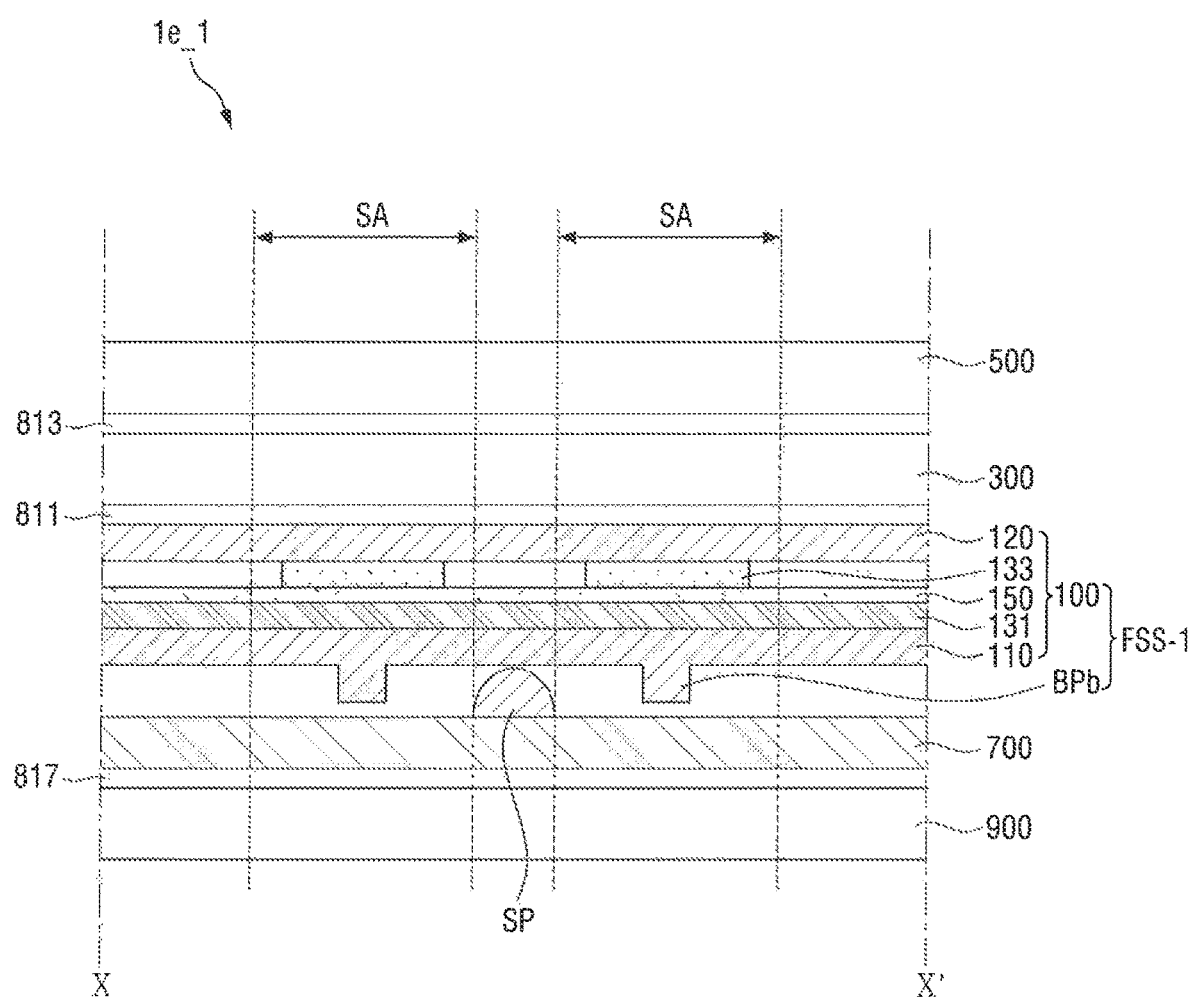

FIG. 10B is a cross-sectional view showing a modified embodiment of the display device shown in FIG. 10A. Referring to FIG. 10B, a display device 1e_1 is different from the display device 1e shown in FIG. 10.A in that a space SP is disposed between the conductive sheet 700 and the pressure sensor 100 and a space is provided between the conductive sheet 700 and the pressure sensor 100, and other configurations of the display device 1e_1 are substantially the same as those of the display device 1e. A description related to the spacer SP is the same as that described above with reference to FIG. 4B, and will thus be omitted.

Where the pressure concentration bump BPb is integrated with the pressure sensor 100 or the pressure concentration bump BPb is coupled with the first base layer 110, all structures may be modified into the structure to which the spacer SP is applied, as shown in FIG. 10B.

Figure 11:
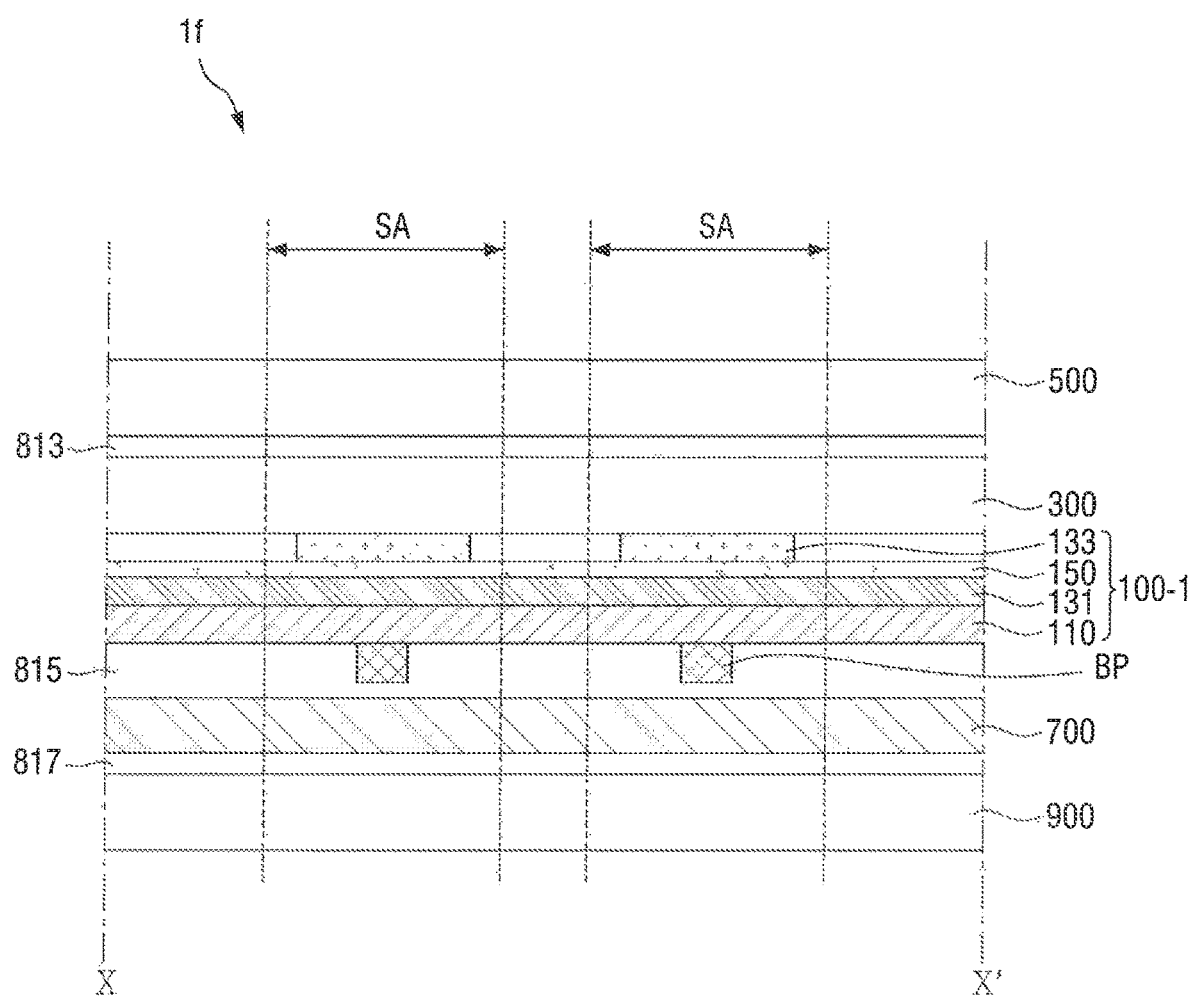

FIG. 11 is a cross-sectional view of a display device according to an exemplary embodiment of the present disclosure taken along the line X-X' in FIG. 2. Referring to FIG. 11, a display device 1f is different from the display device 1d shown in FIG. 9A in that the pressure sensor 100_1 does not include the second base layer 120, and rather, the second electrode 133 is disposed directly on the lower surface of the display panel 300, and the intermediate bonding layer 811 is omitted, and other configurations of the display device 1f are substantially the same as or similar to those of the display device 1d.

Figure 12:
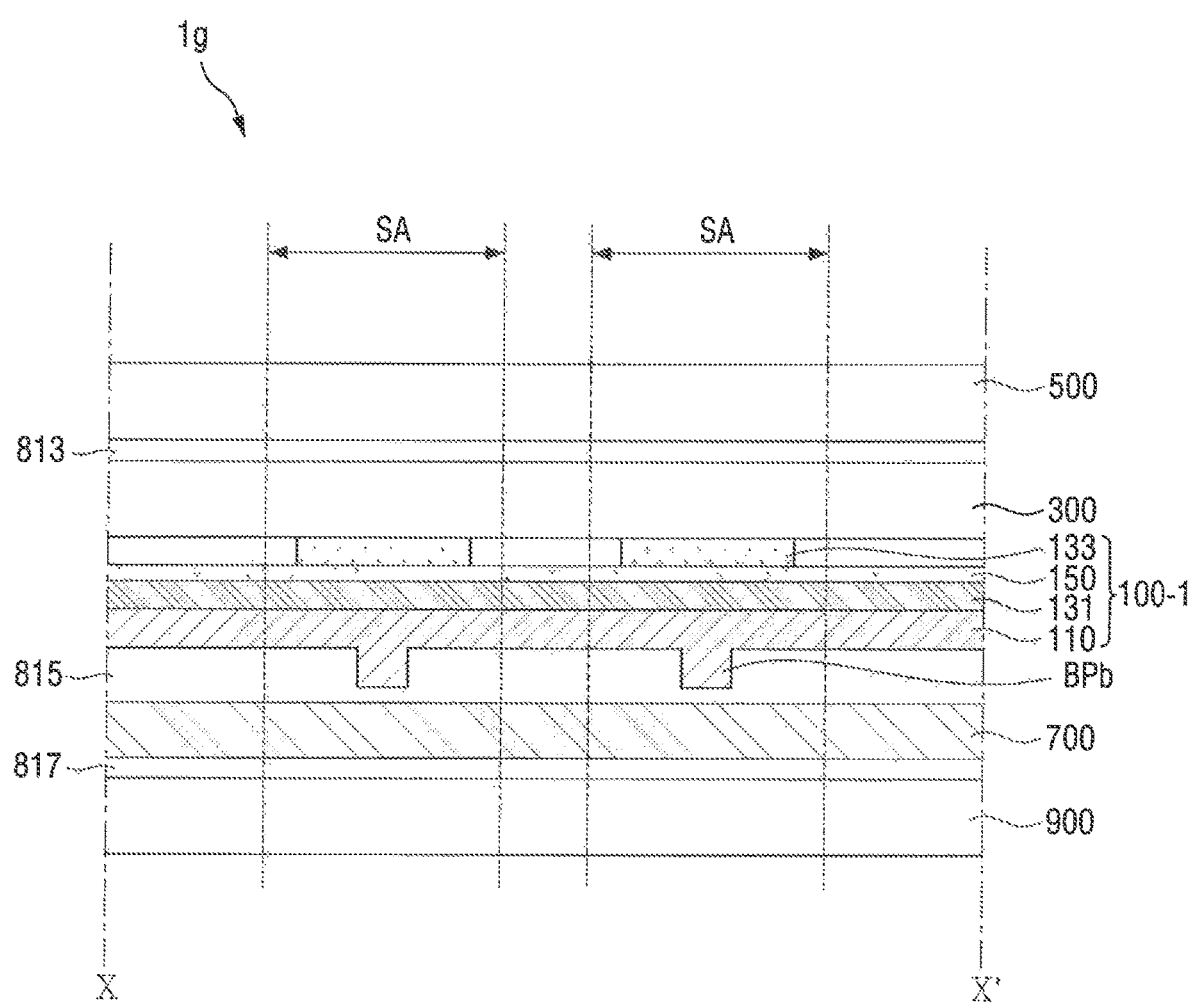

FIG. 12 is a cross-sectional view of a display device according to an exemplary embodiment of the present disclosure taken along the line X-X' in FIG. 2. Referring to FIG. 12, a display device 1g is different from the display device 1e shown in FIG. 10A in that the a pressure sensor 100_1 does not include the second base layer 120, the second electrode 133 is disposed directly on the lower surface of the display panel 300, and the intermediate bonding layer 811 is omitted, and other configurations of the display device 1g are substantially the same as or similar to those of the display device 1e.

Figure 13A:
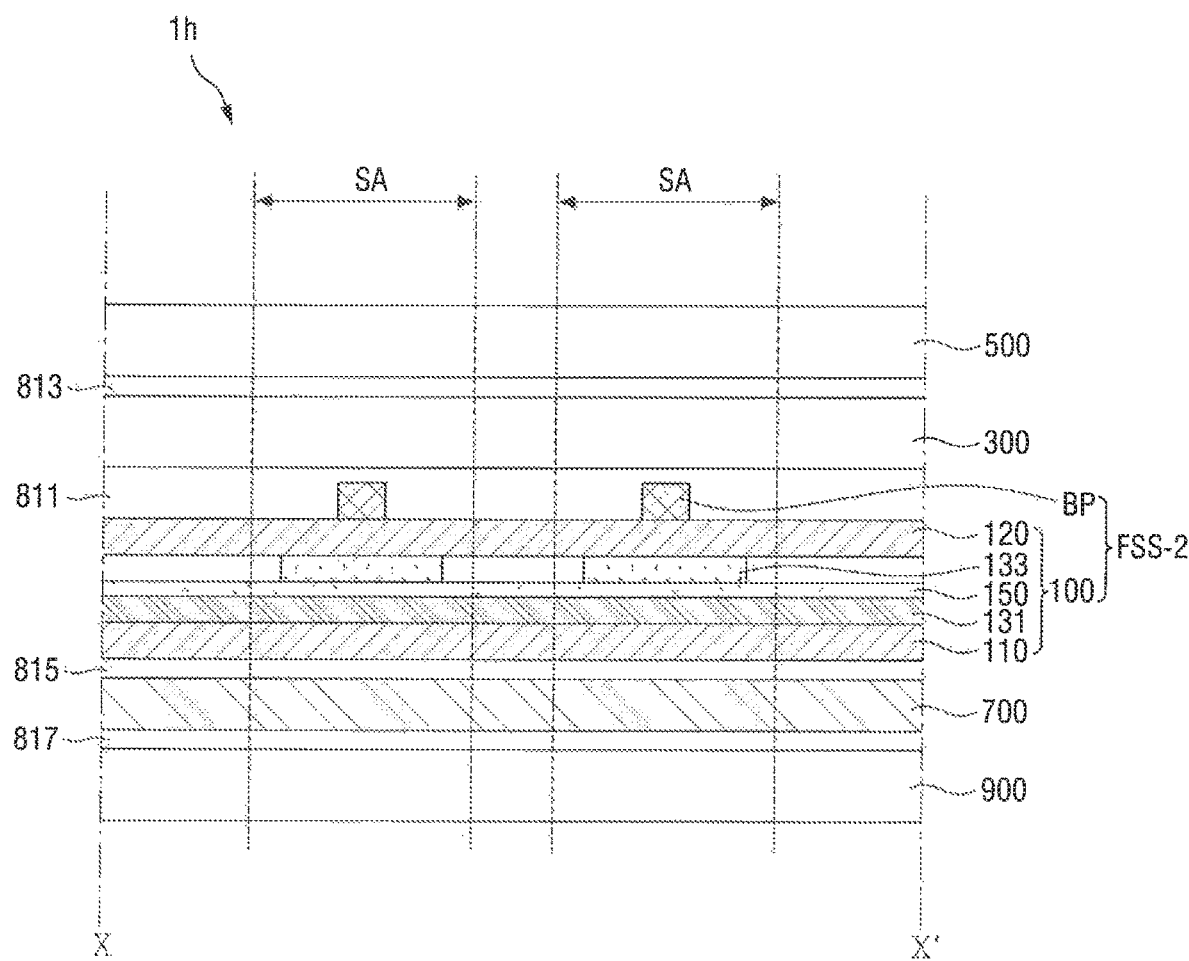

FIG. 13A is a cross-sectional view of a display device according to an exemplary embodiment of the present disclosure taken along the line X-X' in FIG. 2. Referring to FIG. 13A, a display device 1h is different from the display device 1 shown in FIG. 4A in that the pressure concentration bump BP is coupled with the pressure sensor 100 to form a pressure sensor structure FSS_2, and the pressure concentration bump BP is coupled with the upper surface of the second base layer 120 facing the display panel 300, and other configurations of the display device 1h are substantially the same as or similar to those of the display device 1.

In some exemplary embodiments of the present disclosure, as shown in FIG. 13A, an intermediate bonding layer 811 may be disposed between the pressure concentration bumps BP and the display panel 300. Further, the space between the pressure concentration bumps BP and the display panel 300 may be filled with the intermediate bonding, layer 811.

In this embodiment, since the pressure concentration bump BP is coupled with the pressure sensor 100 to form the pressure sensor structure FSS_2, the misalignment between the sensing area SA and the pressure concentration bump BP can be prevented.

Figure 13B:
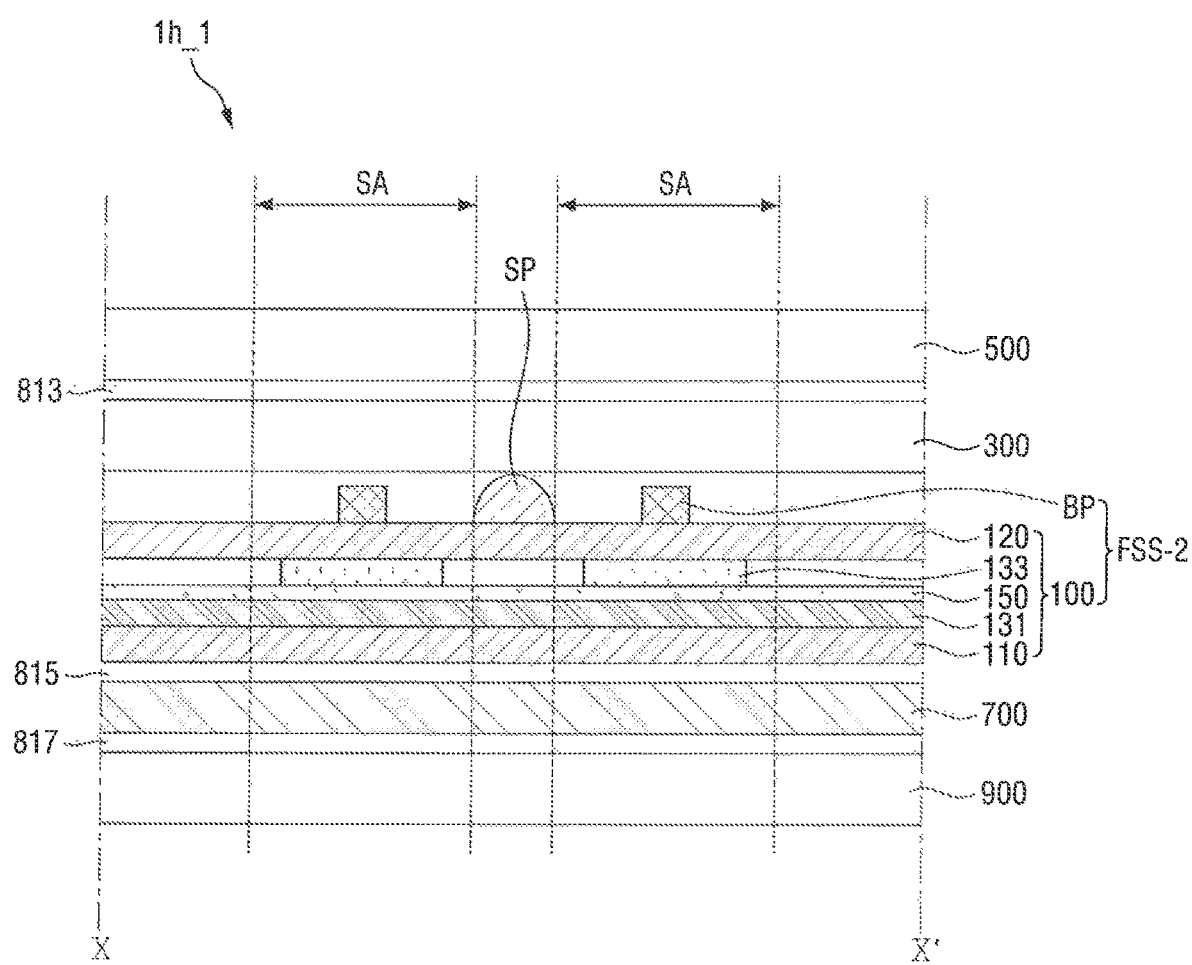

FIG. 13B is a cross-sectional view showing a modified embodiment of the display device shown in FIG. 13A. Referring to FIG. 13B, a display device 1h_1 is different from the display device 1h shown in FIG. 13A in that a space SP is disposed between the display panel 300 and the pressure sensor 100 and a space is provided between the display panel 300 and the pressure sensor 100, and other configurations of the display device 1h_1 are substantially the same as those of the display device 1h. A description related to the spacer SP is the same as that described above with reference to FIG. 4B, and will thus be omitted. A space may be provided between the display panel 300 and the pressure sensor 100 by the spacer SP. In some exemplary embodiments of the present disclosure, the space may be filled with air.

In some exemplary embodiments of the present disclosure, the intermediate bonding layer 811 may be disposed along the edge of the pressure sensor 100 to couple the pressure sensor 100 with the display panel 300.

A description related to the spacer SP is the same as that described above with reference to FIG. 4B, and will thus be omitted.

Where the pressure concentration bump BP is coupled with the pressure sensor 100 or the pressure concentration bump BP is coupled with the second base layer 120, all structures may be modified into the structure to which the spacer SP is applied, as shown in FIG. 13B.

Figure 14A:
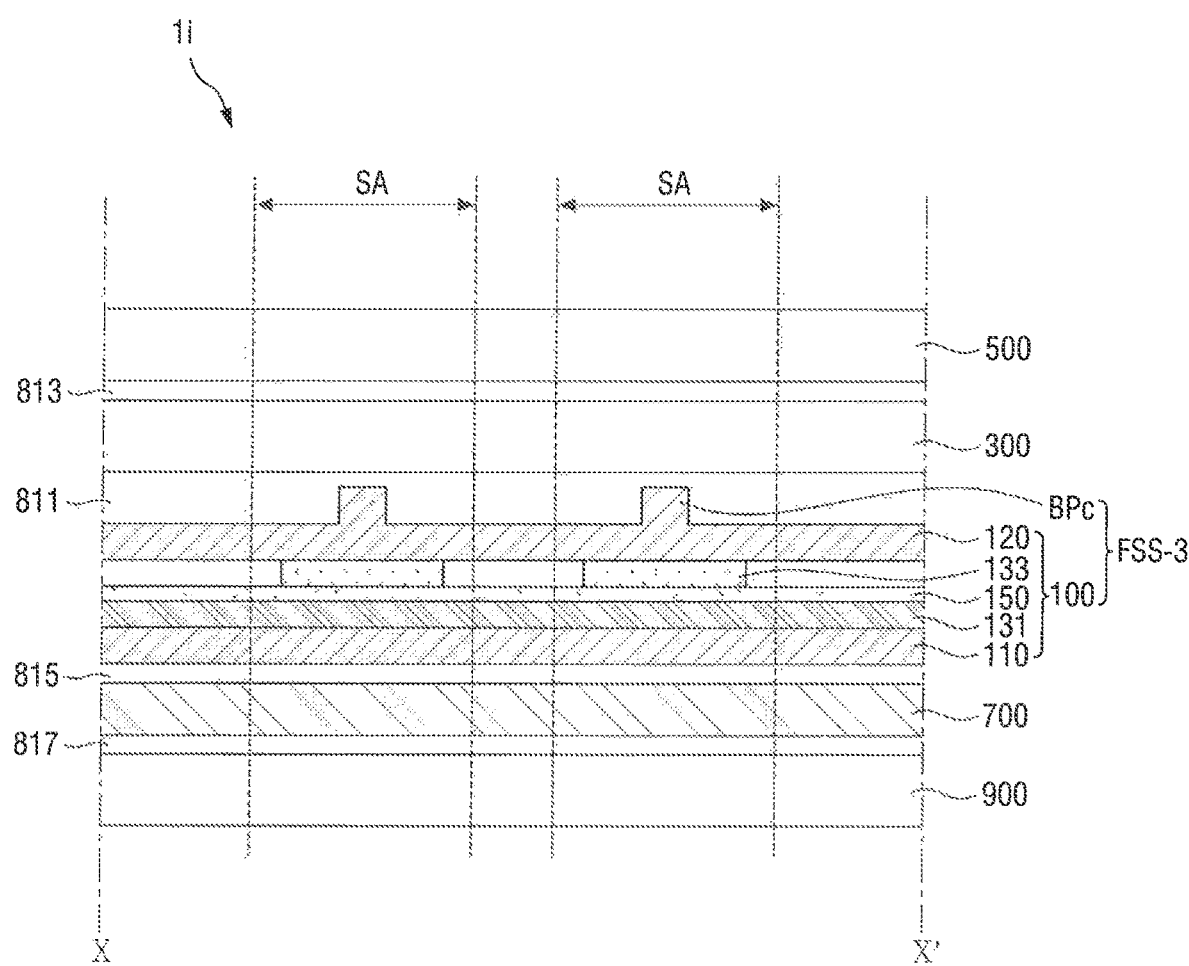

FIG. 14A is a cross-sectional view of a display device according to an exemplary embodiment of the present disclosure taken along the line X-X' in FIG. 2. Referring to FIG. 14A, a display device 1i is different from the display device 1h shown in FIG. 13A in that the pressure concentration bump BPc is coupled with the pressure sensor 100 to form a pressure sensor structure FSS_3, and the pressure concentration bump BPc is integrated with the second base layer 120 and made of the same material as the second base layer 120, and other configurations of the display device 1i are substantially the same as or similar to those of the display device 1h.

Figure 14B:
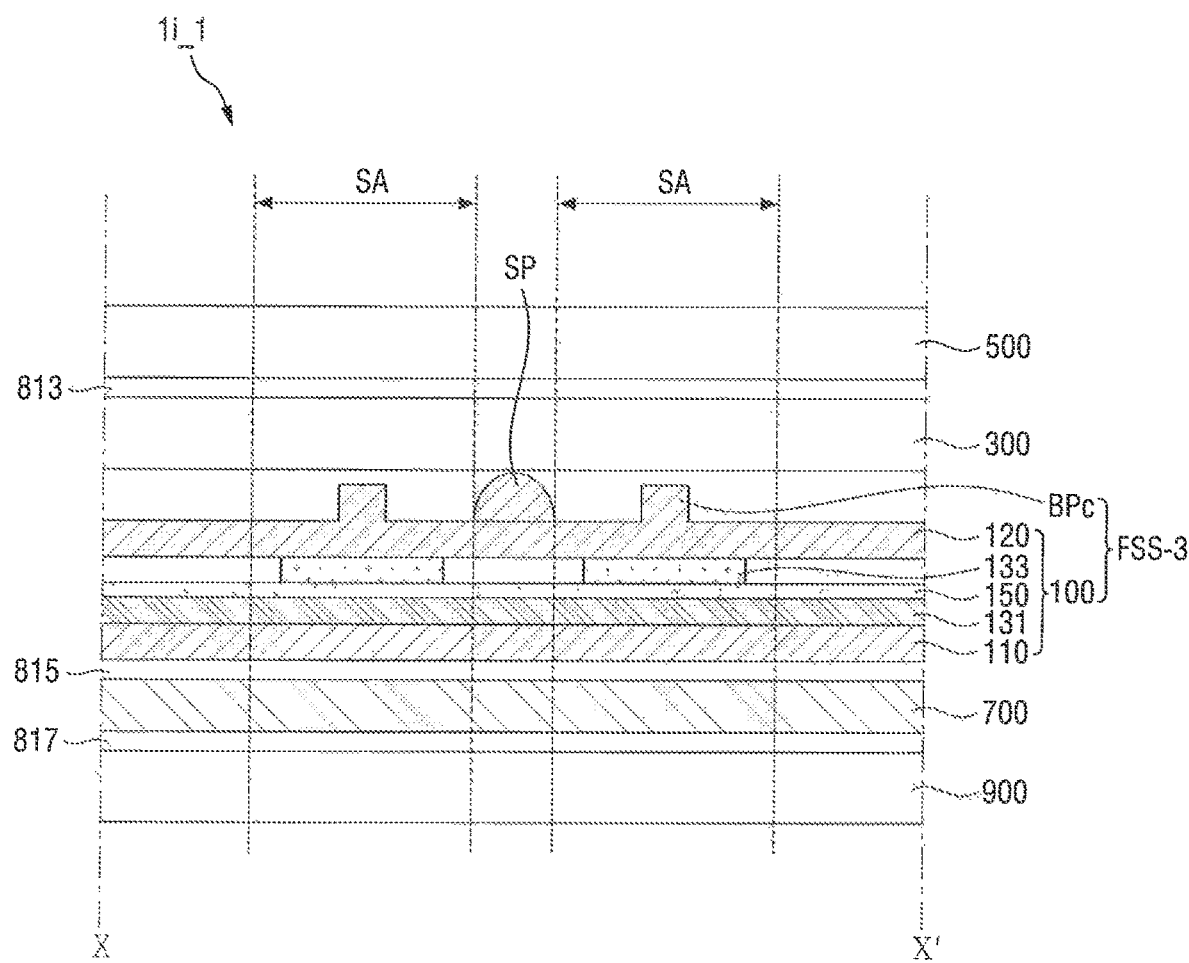

FIG. 14B is a cross-sectional view showing a modified embodiment of the display device shown in FIG. 14A. Referring to FIG. 14B, a display device 1i_1 is different from the display device 1i shown in FIG. 14A in that a space SP is disposed between the display panel 300 and the pressure sensor 100 and a space is provided between the display panel 300 and the pressure sensor 100, and other configurations of the display device 1i_1 are substantially the same as those of the display device 1i. A description related to the spacer SP is the same as that described above with reference to FIG. 4B, and will thus be omitted.

Where the pressure concentration bump BPc is coupled with the pressure sensor 100 or the pressure concentration bump BPc is coupled with the second base layer 120, all structures may be modified into the structure to which the spacer SP is applied, as shown in FIG. 14B.

Figure 15:
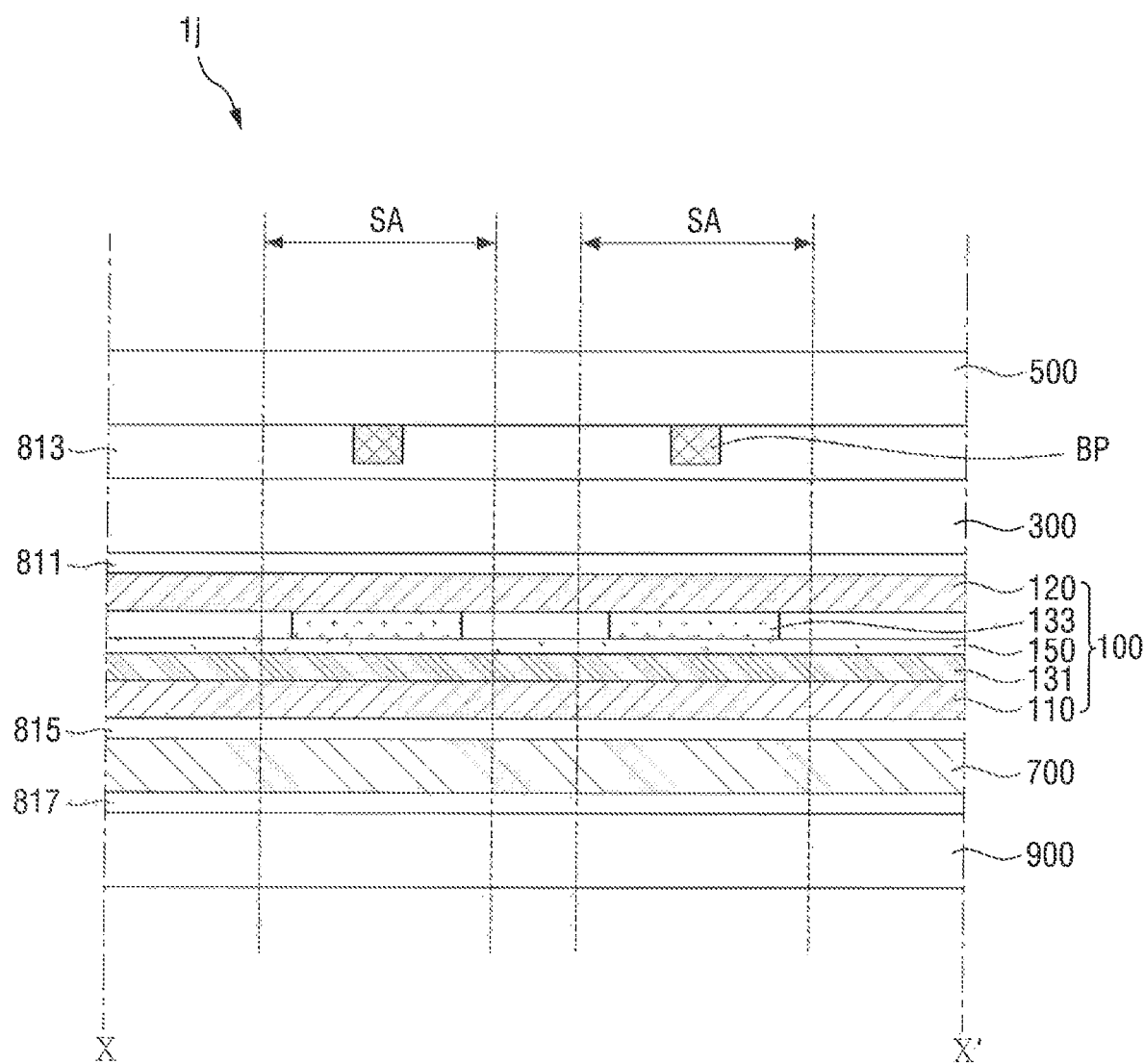

FIG. 15 is a cross-sectional view of a display device according to an exemplary embodiment of the present disclosure taken along the line X-X' in FIG. 2. Referring to FIG. 15, a display device 1j is different from the display device 1 shown in FIG. 4A in that the pressure concentration bump BP is coupled with the lower surface of the window 500 facing the display panel 300, and other configurations of the display device 1j are substantially the same as or similar to those of the display device 1.

In some exemplary embodiments of the present disclosure, the pressure concentration bump BP may be transmissive of visible light. For example, the pressure concentration bump BP may be made of an epoxy resin, an acrylic resin, or the like. The pressure concentration bump BP may be coated or printed on the lower surface of the window 500 or may be attached to the lower surface of the window 500 through an adhesive layer.

In some exemplary embodiments of the present disclosure, a refractive index matching layer may be disposed in the space between the pressure concentration bumps BP. The refractive index matching layer may be made of a material having a refractive index that is substantially the same as or similar to that of the pressure concentration bump BP.

In some exemplary embodiments of the present disclosure, the upper bonding layer 813 may have a refractive index that is substantially the same as or similar to that of the pressure concentration bump BP.

Figure 16:
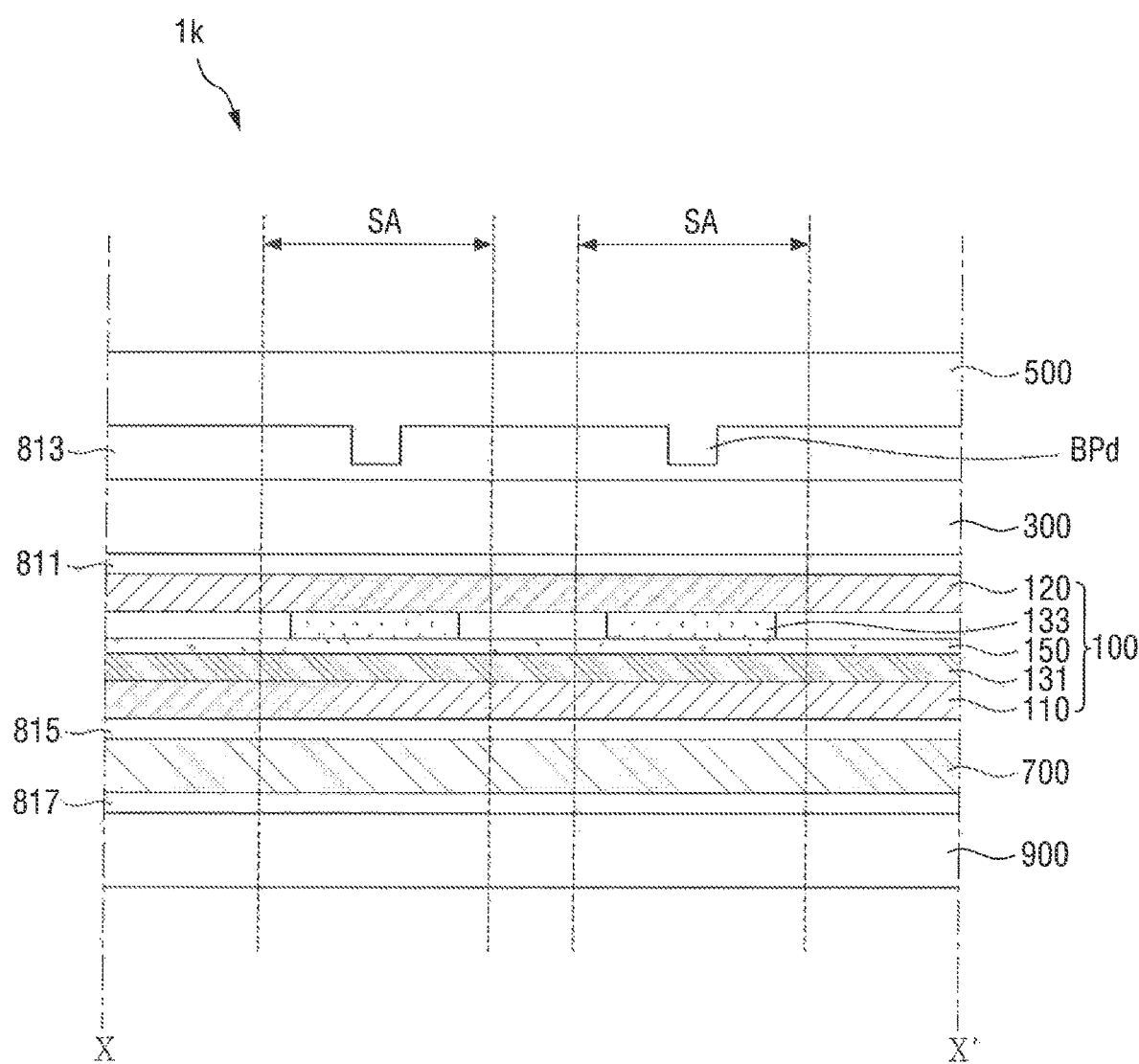

FIG. 16 is a cross-sectional view of a display device according to an exemplary embodiment of the present disclosure taken along the line X-X' in FIG. 2. Referring to FIG. 16, a display device 1k is different from the display device 1j shown in FIG. 15 in that the pressure concentration bump BPd is integrated with the window 500 and is made of the same material as the window 500, and other configurations of the display device 1k are substantially the same as or similar to those of the display device 1j.

The pressure concentration bump BPd may be formed by etching the window 500 itself.

Figure 17:
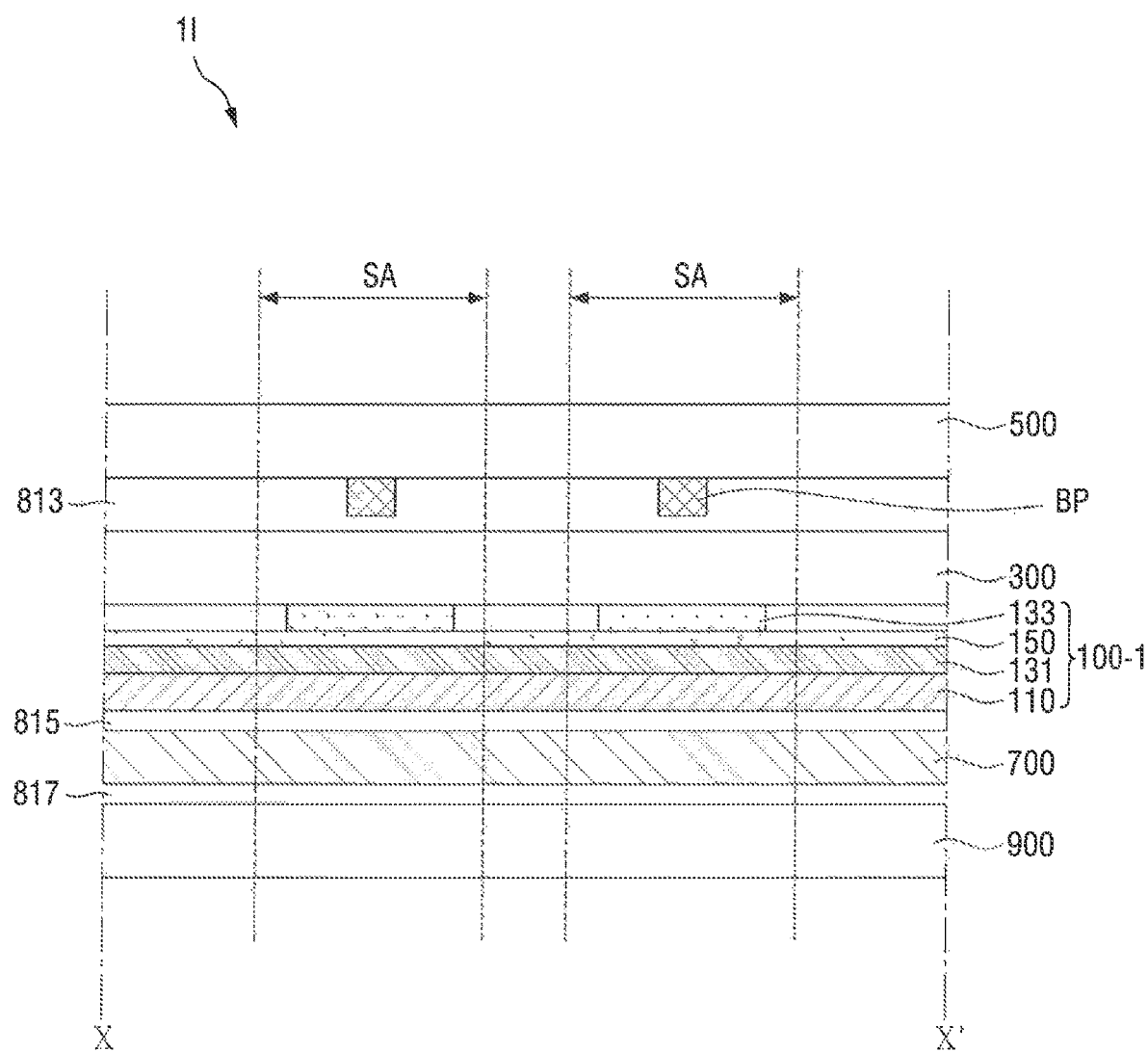

FIG. 17 is a cross-sectional view of a display device according to an exemplary embodiment of the present disclosure taken along the line X-X' in FIG. 2. Referring to FIG. 17, a display device 1l is different from the display device 1j shown in FIG. 15 in that the second electrode 133 of a pressure sensor 100_1 is formed directly on the lower surface of the display panel 300 and in that the intermediate bonding layer 811 is omitted, and other configurations of the display device 1k are substantially the same as or similar to those of the display device 1j.

Figure 18:
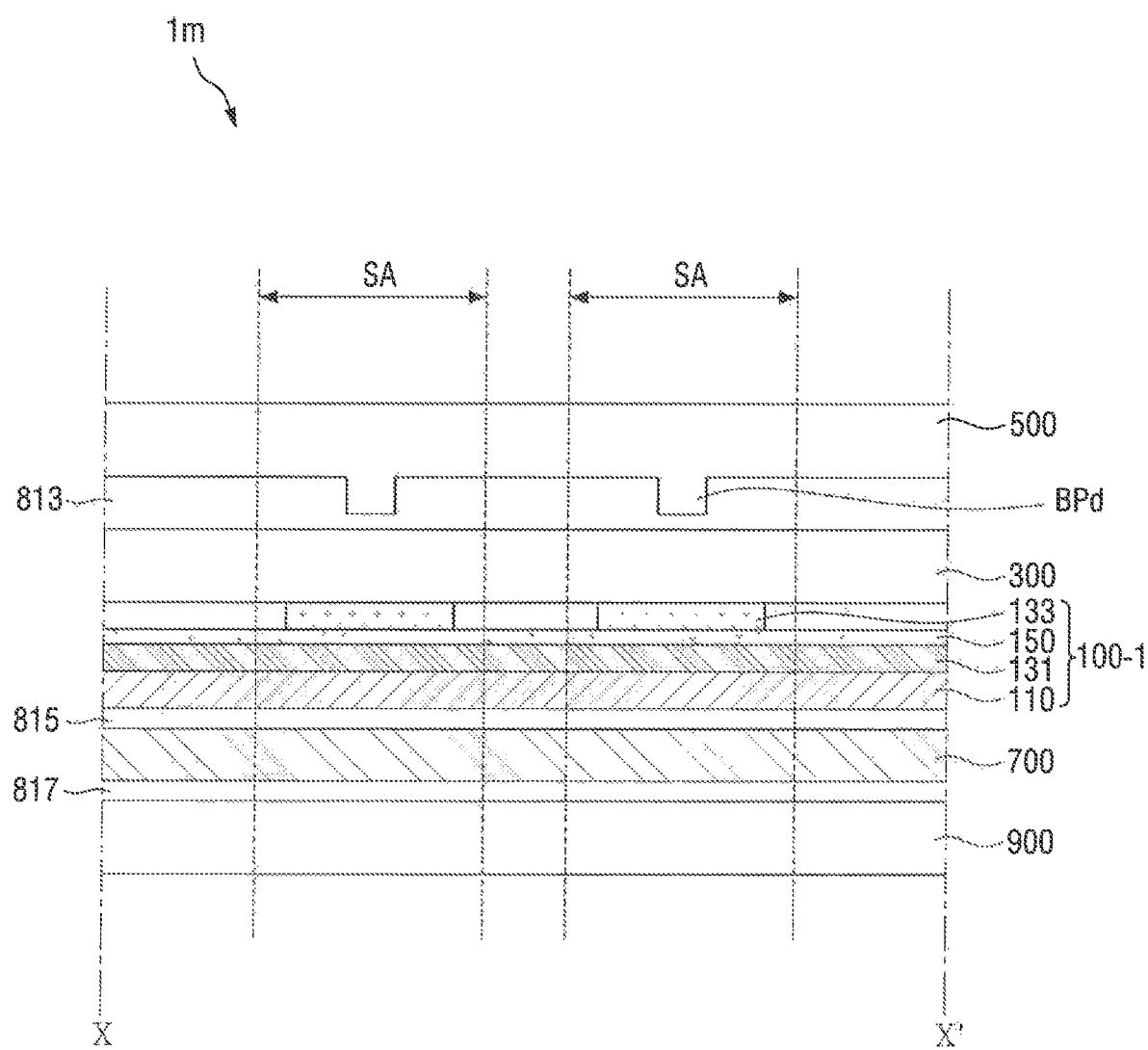

FIG. 18 is a cross-sectional view of a display device according to an exemplary embodiment of the present disclosure taken along the line X-X' in FIG. 2. Referring to FIG. 18, a display device 1m is different from the display device 1k shown in FIG. 16 in that the second electrode 133 of a pressure sensor 100_1 is formed directly on the lower surface of the display panel 300 and in that the intermediate bonding layer 811 is omitted, and other configurations of the display device 1m are substantially the same as or similar to those of the display device 1k.

Figure 19:
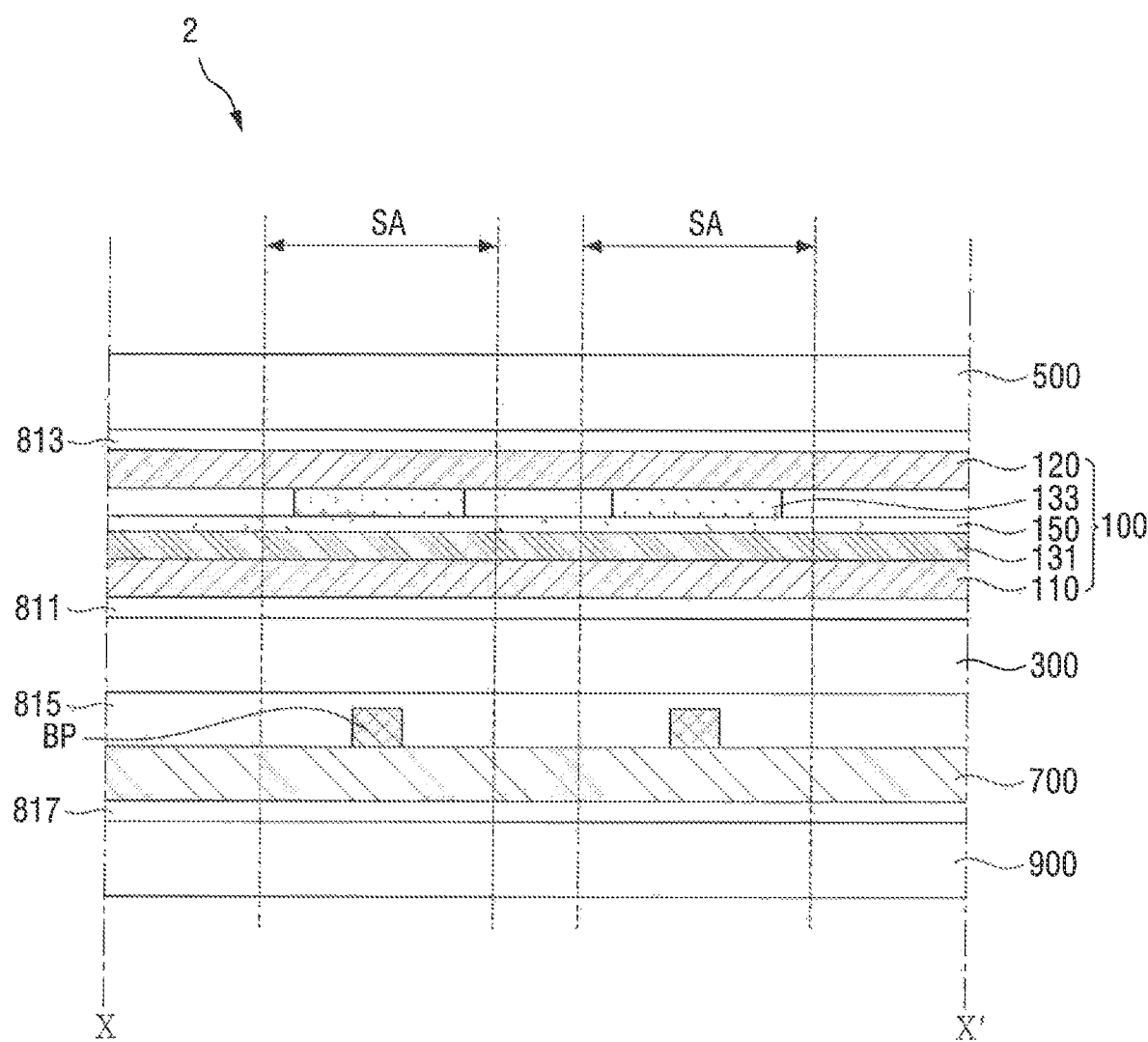

FIG. 19 is a cross-sectional view of a display device according to an exemplary embodiment of the present disclosure taken along the line X-X' in FIG. 2. Referring to FIG. 19, a display device 2 is different from the display device 1 shown in FIG. 4A in that the pressure sensor 100 is disposed between the display panel 300 and the window 500, and other configurations of the display device 2 are substantially the same as or similar to those of the display device 1.

In some exemplary embodiments of the present disclosure, the window 500 and the pressure sensor 100 may be coupled with each other through an upper bonding layer 813. Further, the pressure sensor 100 and the display panel 300 may be coupled with each other through an intermediate bonding layer 811, and the display panel 300 and the conductive sheet 700 can be coupled with each other through an intermediate bonding layer 815.

The first electrode 131 and the second electrode 133 of the pressure sensor 100 might not be visually recognized from the outside even if the pressure sensor 100 is disposed between the window 500 and the display panel 300. For example, the first electrode 131 and the second electrode 133 may be made of a transparent conductive material such as ITO or IZO. The first electrode 131 and the second electrode 133 may be formed as a metal mesh.

Figure 20:
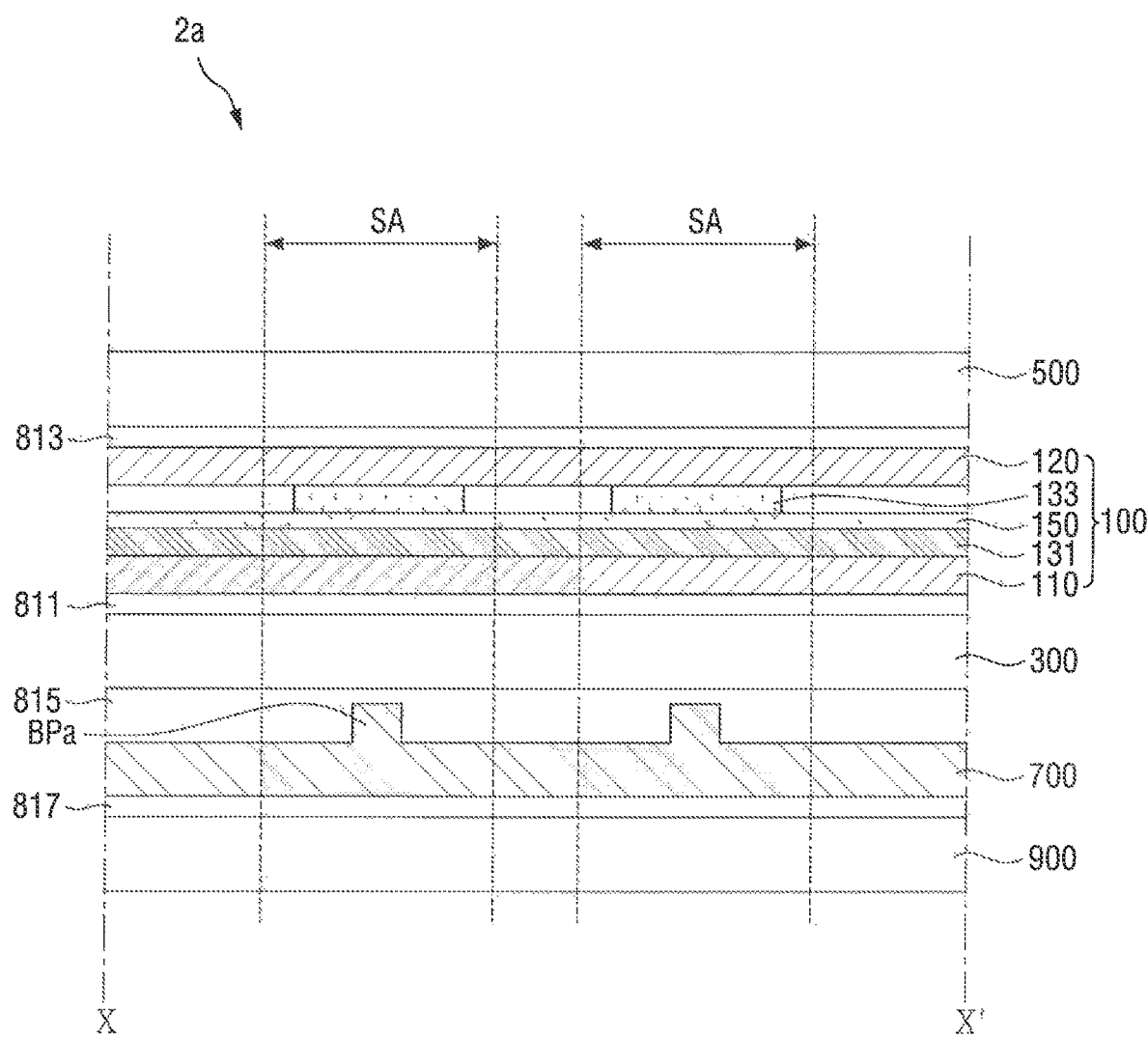

FIG. 20 is a cross-sectional view of a display device according to an exemplary embodiment of the present disclosure taken along the line X-X' in FIG. 2. Referring to FIG. 20, a display device 2a is different from the display device 2 shown in FIG. 19 in that the pressure concentrated bump BPa is integrated with the conductive sheet 700 and is made of the same material as the conductive sheet 700, and other configurations of the display device 2a are substantially the same as or similar to those of the display device 2.

Figure 21:
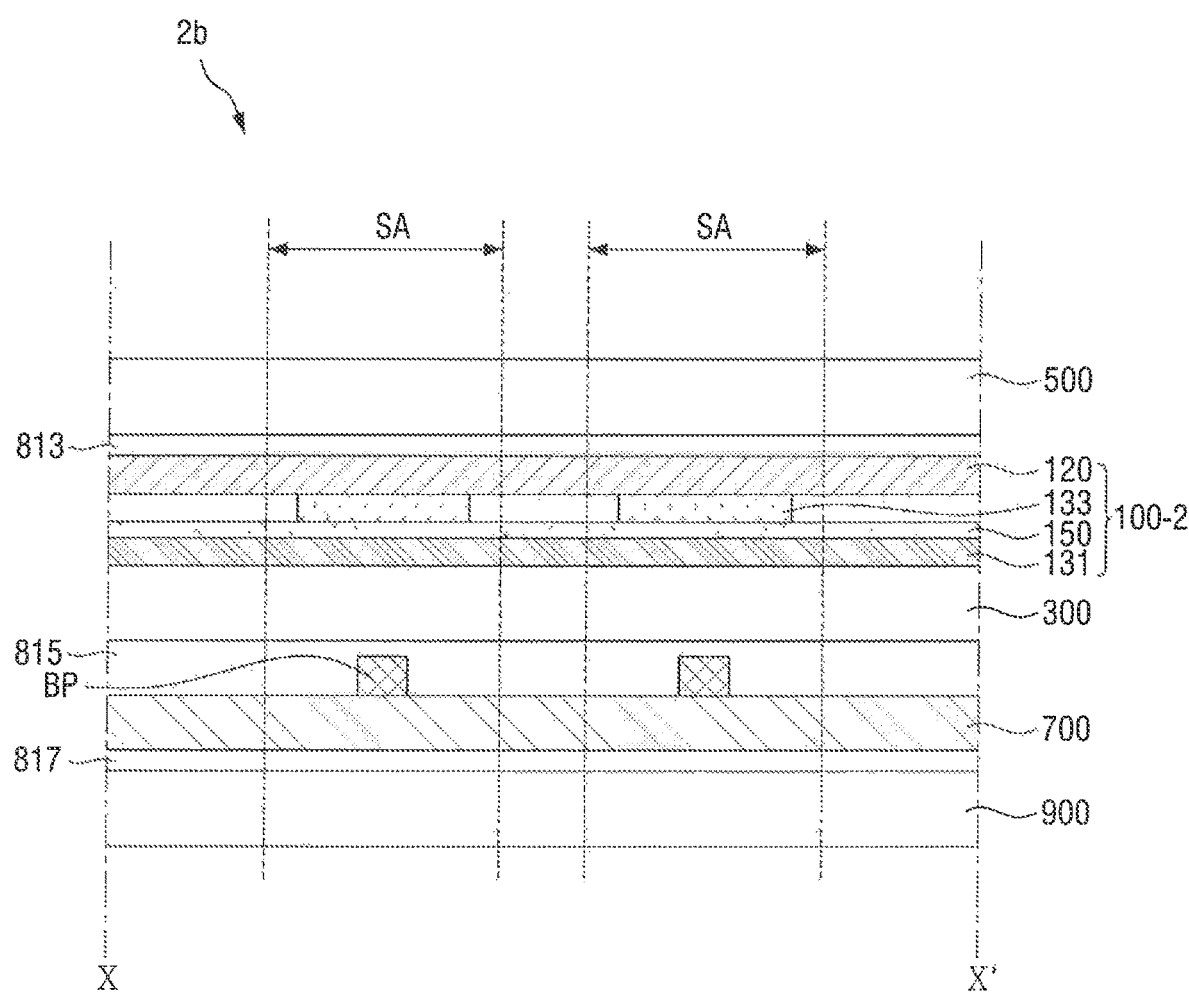

FIG. 21 is a cross-sectional view of a display device according to an exemplary embodiment of the present disclosure taken along the line X-X' in FIG. 2. Referring to FIG. 21, a display device 2b is different from the display device 2 shown in FIG. 19 in that the pressure sensor 100_2 does not include the first base layer 110 and the first electrode 131 is disposed directly on the upper surface of the display panel 300 facing the window 500 and in that the intermediate bonding layer 811 is omitted, and other configurations of the display device 2b are substantially the same as or similar to those of the display device 2.

Figure 22:
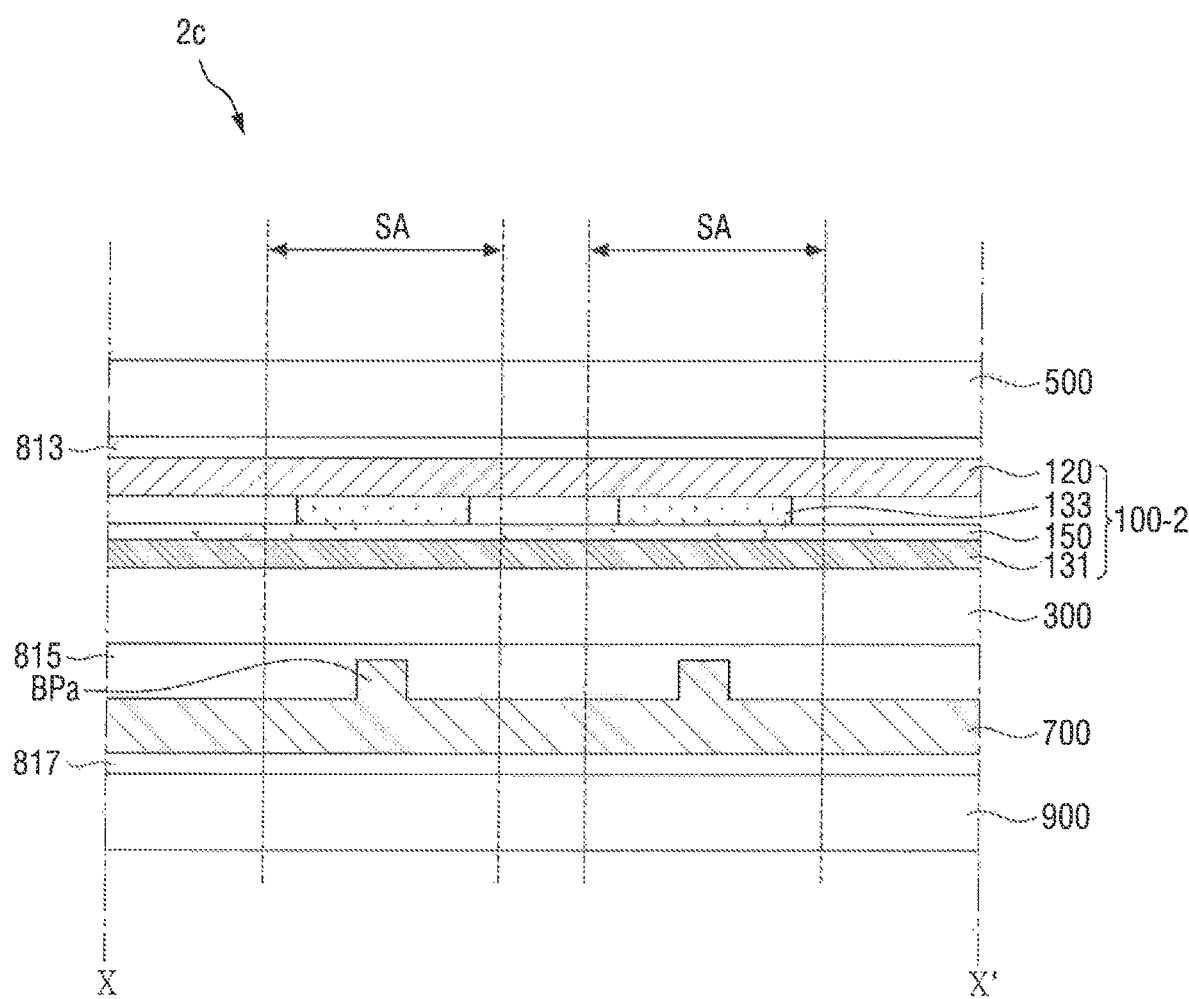

FIG. 22 is a cross-sectional view of a display device according to an exemplary embodiment of the present disclosure taken along the line X-X' in FIG. 2. Referring to FIG. 22, a display device 2c is different from the display device 2a shown in FIG. 20 in that the pressure sensor 100_2 does not include the first base layer 110 and the first electrode 131 is disposed directly on the upper surface of the display panel 300 facing the window 500 and in that the intermediate bonding layer 811 is omitted, and other configurations of the display device 2c are substantially the same as or similar to those of the display device 2a.

Figure 23:
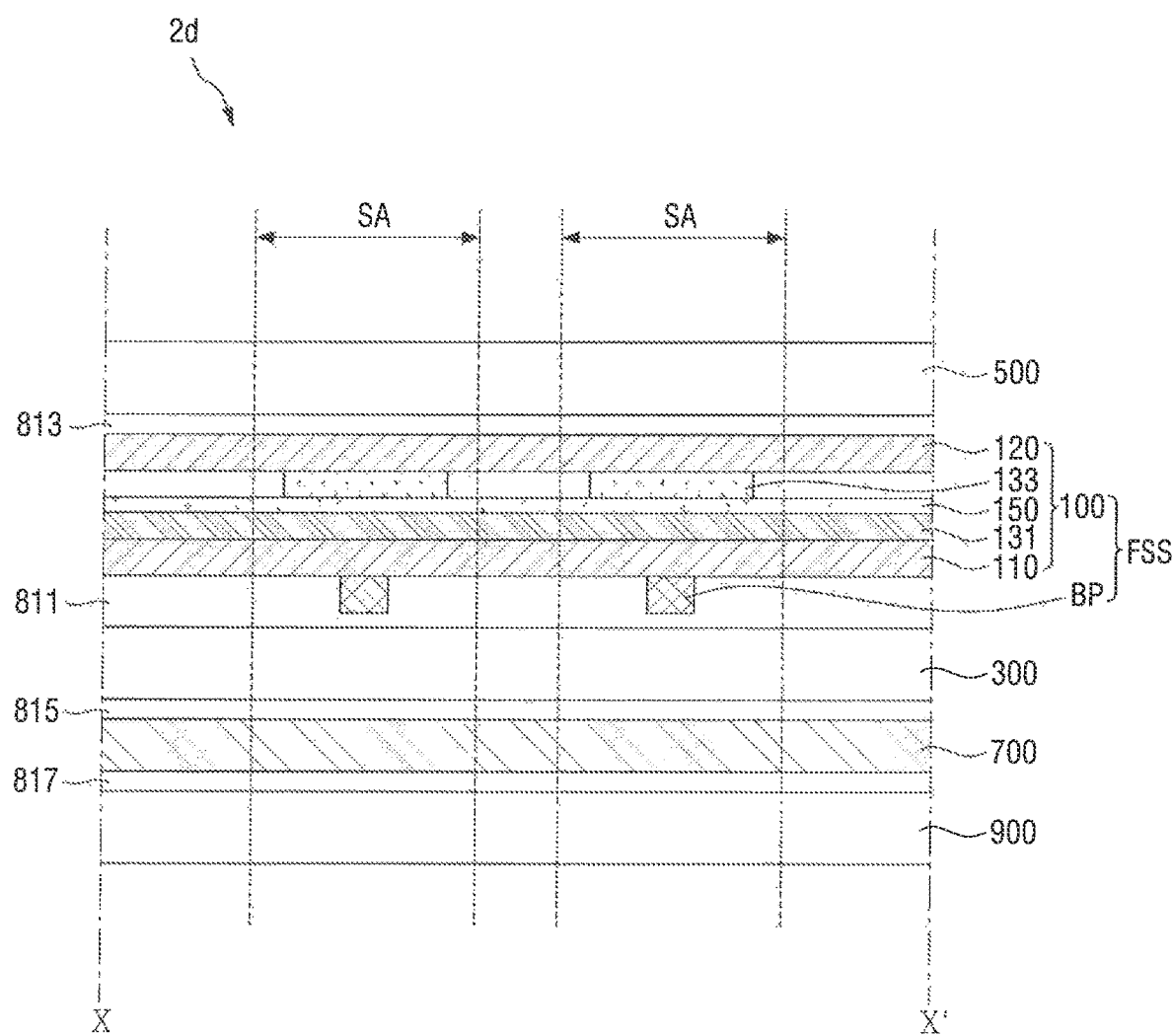

FIG. 23 is a cross-sectional view of a display device according to an exemplary embodiment of the present disclosure taken along the line X-X' in FIG. 2. Referring to FIG. 23, a display device 2d is different from the display device 2 shown in FIG. 19 in that the pressure concentration bump BP is coupled with the lower surface of the first base layer 110 of the pressure sensor 100 to form a pressure sensor structure FSS, and other configurations of the display device 2d are substantially the same as or similar to those of the display device 2.

Figure 24:
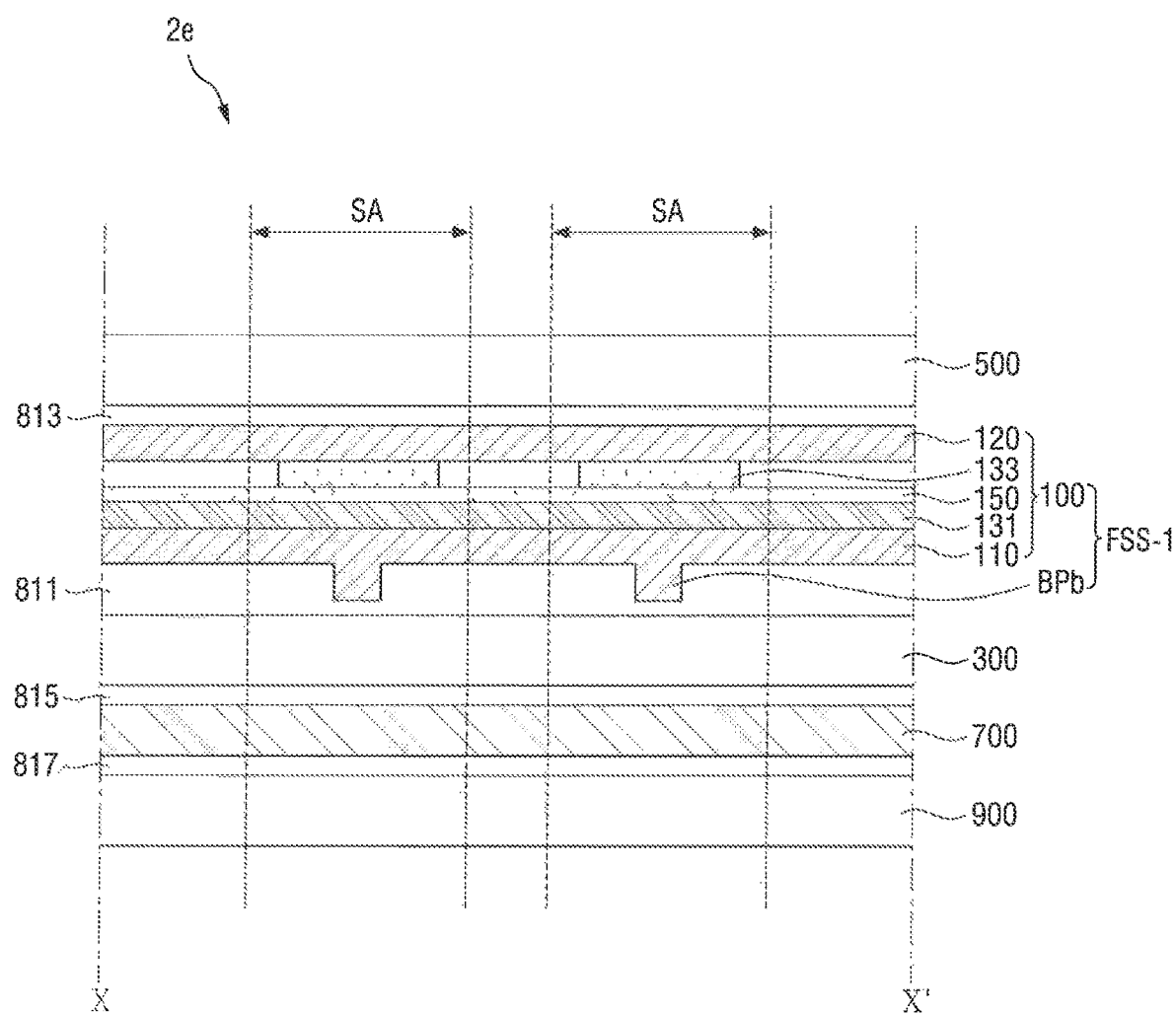

FIG. 24 is a cross-sectional view of a display device according to an exemplary embodiment of the present disclosure taken along the line X-X' in FIG. 2. Referring to FIG. 24, a display device 2e is different from the display device 2d shown in FIG. 23 in that the pressure concentration bump BPb and the pressure sensor 100 forms a pressure sensor structure FSS_1, and the pressure concentration bump BPb is integrated with the first base layer 110 of the pressure sensor 100 and is made of the same material as the first base layer 110, and other configurations of the display device 2e are substantially the same as or similar to those of the display device 2d.

Figure 25:
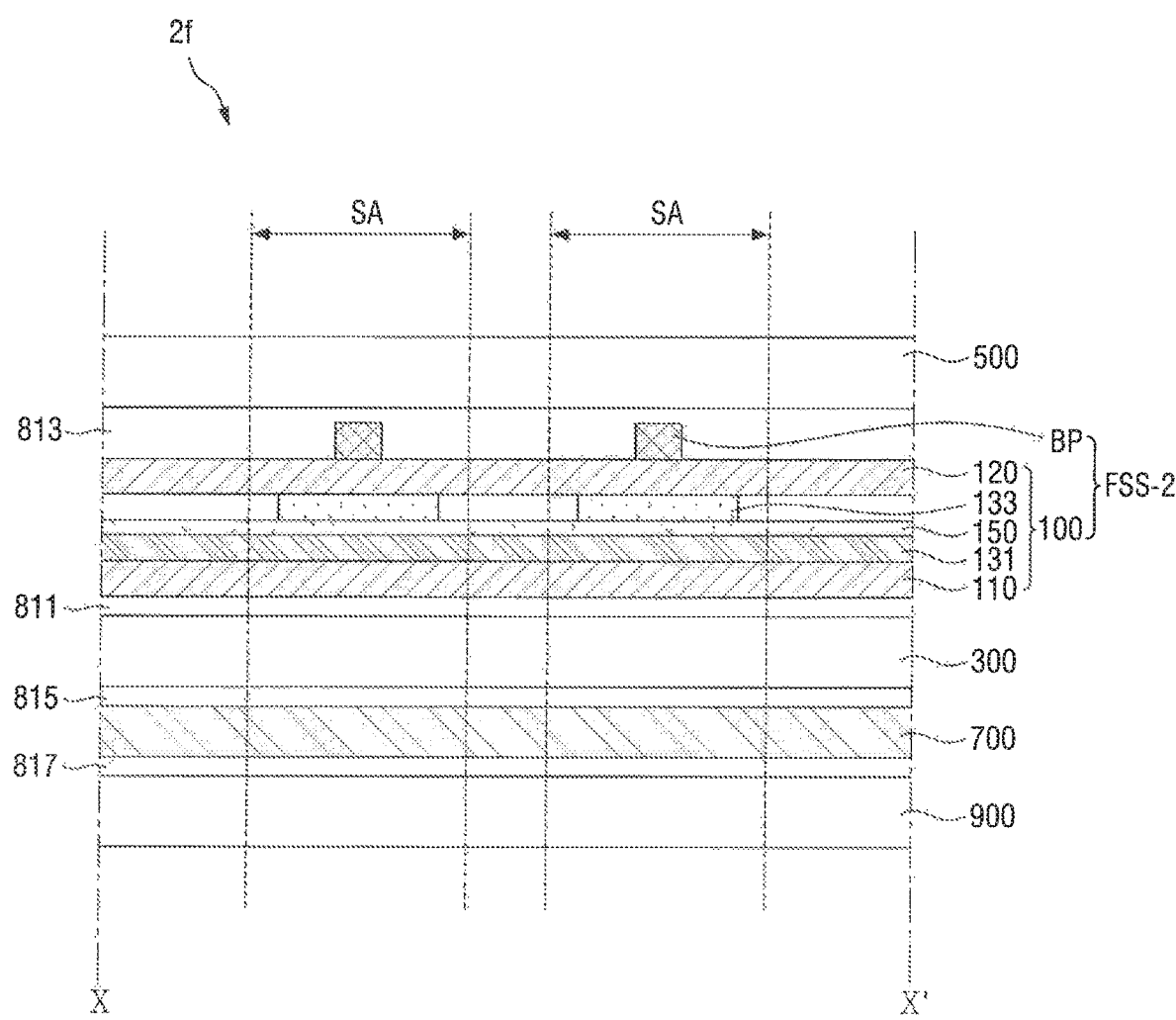

FIG. 25 is a cross-sectional view of a display device according to an exemplary embodiment of the present disclosure taken along the line X-X' in FIG. 2. Referring to FIG. 25, a display device 2f is different from the display device 2 shown in FIG. 19 in that the pressure concentration bump BP is coupled with the upper surface of the second base layer 120 of the pressure sensor 100 to form a pressure sensor structure FSS_2, and other configurations of the display device 2f are substantially the same as or similar to those of the display device 2.

Figure 26:
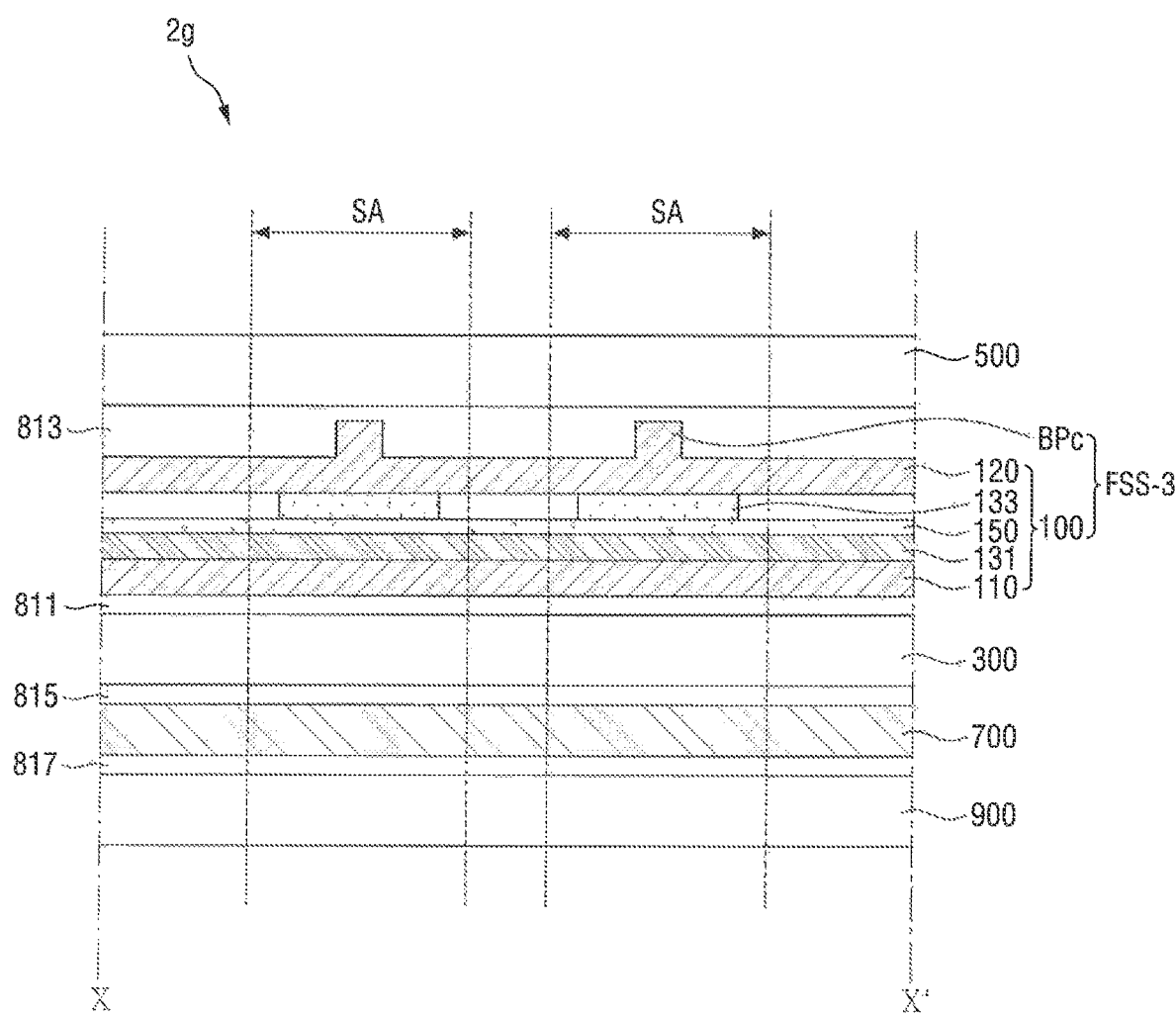

FIG. 26 is a cross-sectional view of a display device according to an exemplary embodiment of the present disclosure taken along the line X-X' in FIG. 2. Referring to FIG. 26, a display device 2g is different from the display device 2e shown in FIG. 24 in that the pressure concentration bump BPc and the pressure sensor 100 forms a pressure sensor structure FSS_3, and the pressure concentration bump BPc is integrated with the second base layer 120 of the pressure sensor 100 and is made of the same material as the second base layer 120, and other configurations of the display device 2g are substantially the same as or similar to those of the display device 2e.

Figure 27:
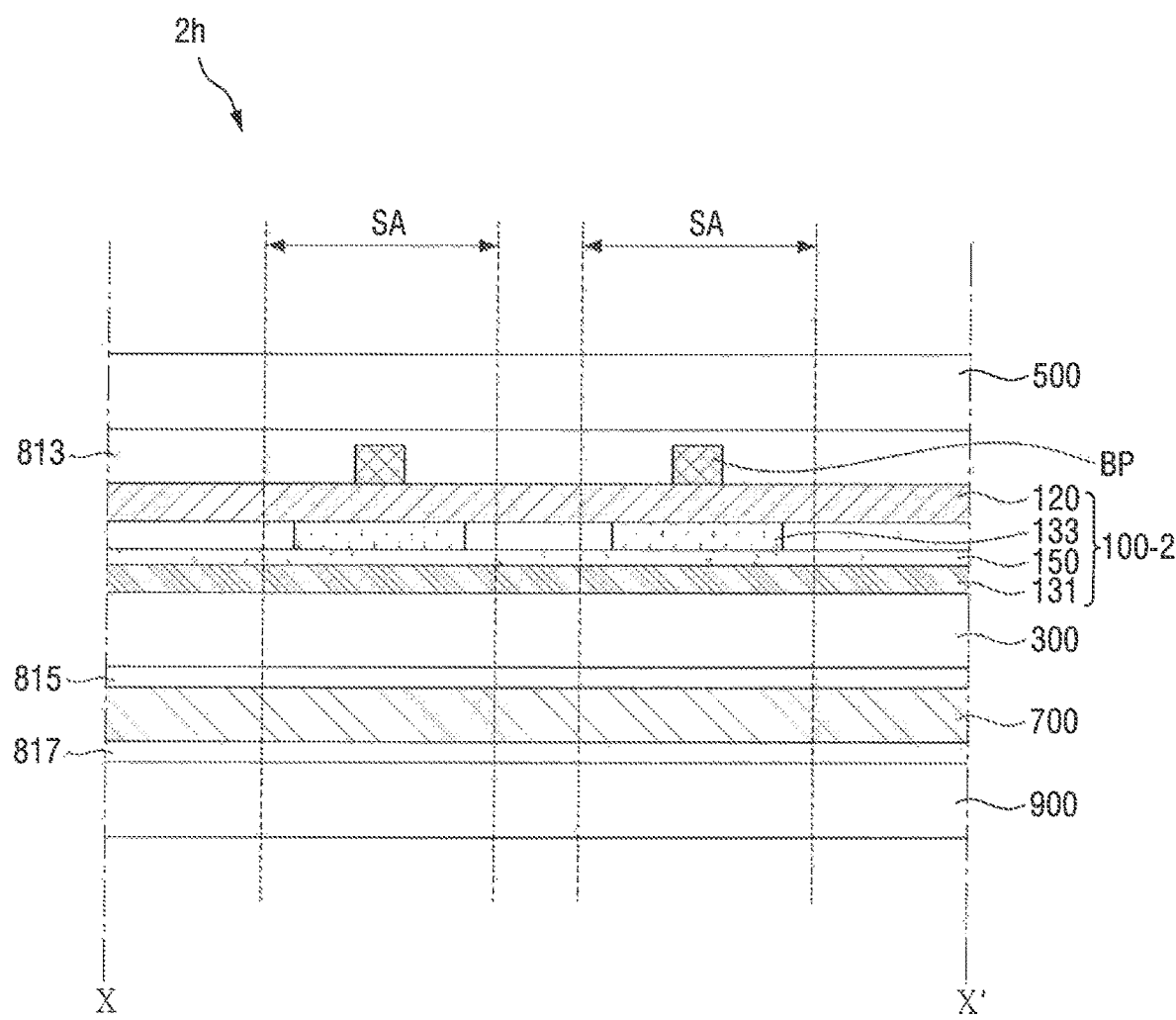

FIG. 27 is a cross-sectional view of a display device according to an exemplary embodiment of the present disclosure taken along the line X-X' in FIG. 2. Referring to FIG. 27, a display device 2h is different from the display device 2f shown in FIG. 25 in that the pressure sensor 100_2 does not include the first base layer 110 and the first electrode 131 is disposed directly on the upper surface of the display panel 300 facing the window 500 and in that the intermediate bonding layer 811 is omitted, and other configurations of the display device 2h are substantially the same as or similar to those of the display device 2f.

Figure 28:
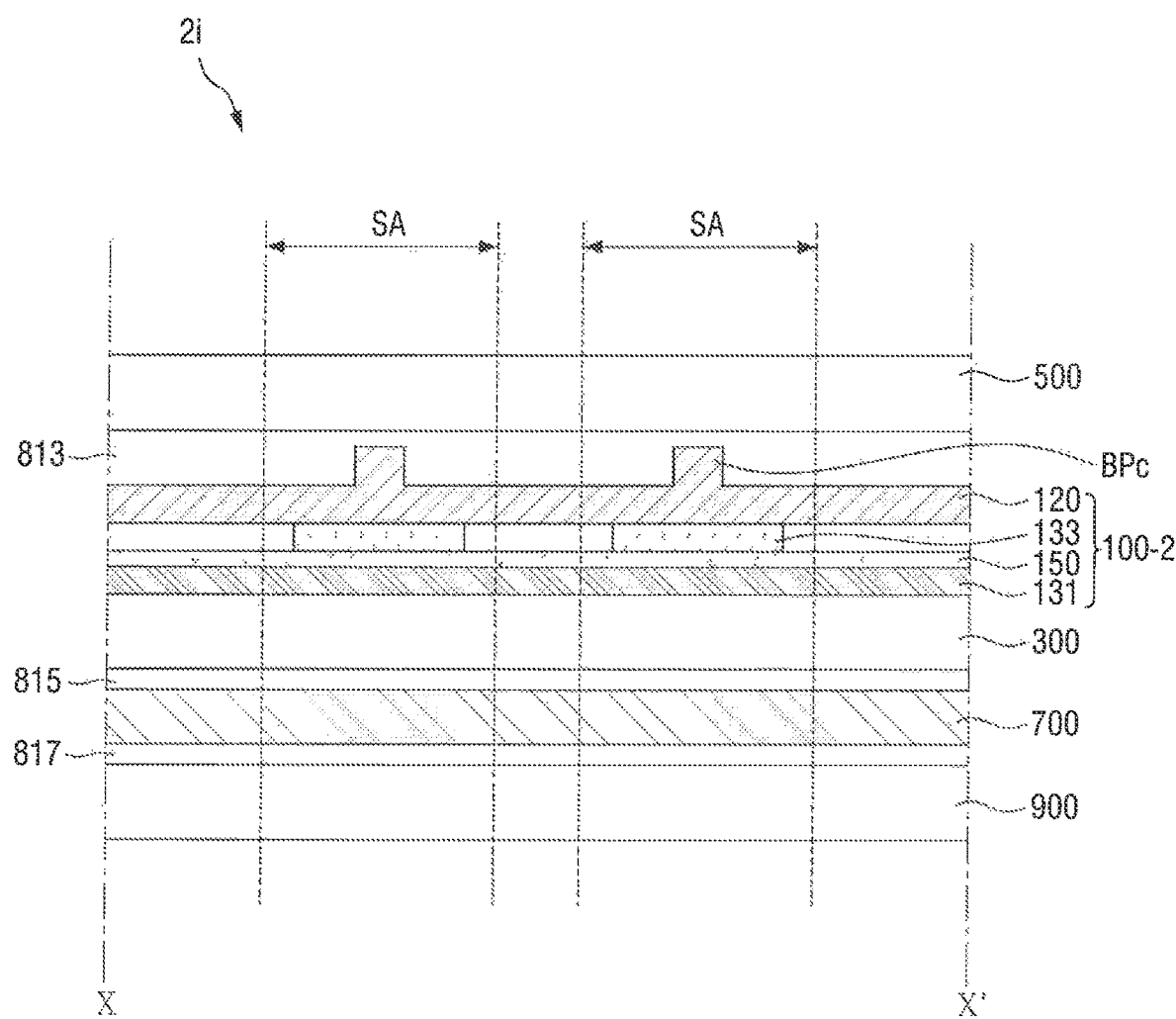

FIG. 28 is a cross-sectional view of a display device according to an exemplary embodiment of the present disclosure taken along the line X-X' FIG. 2. Referring to FIG. 28, a display device 2i is different from the display device 2g shown in FIG. 26 in that the pressure sensor 100_2 does not include the first base layer 110 and the first electrode 131 is disposed directly on the upper surface of the display panel 300 facing the window 500 and in that the intermediate bonding layer 811 is omitted, and other configurations of the display device 2i are substantially the same as or similar to those of the display device 2g.

Figure 29:
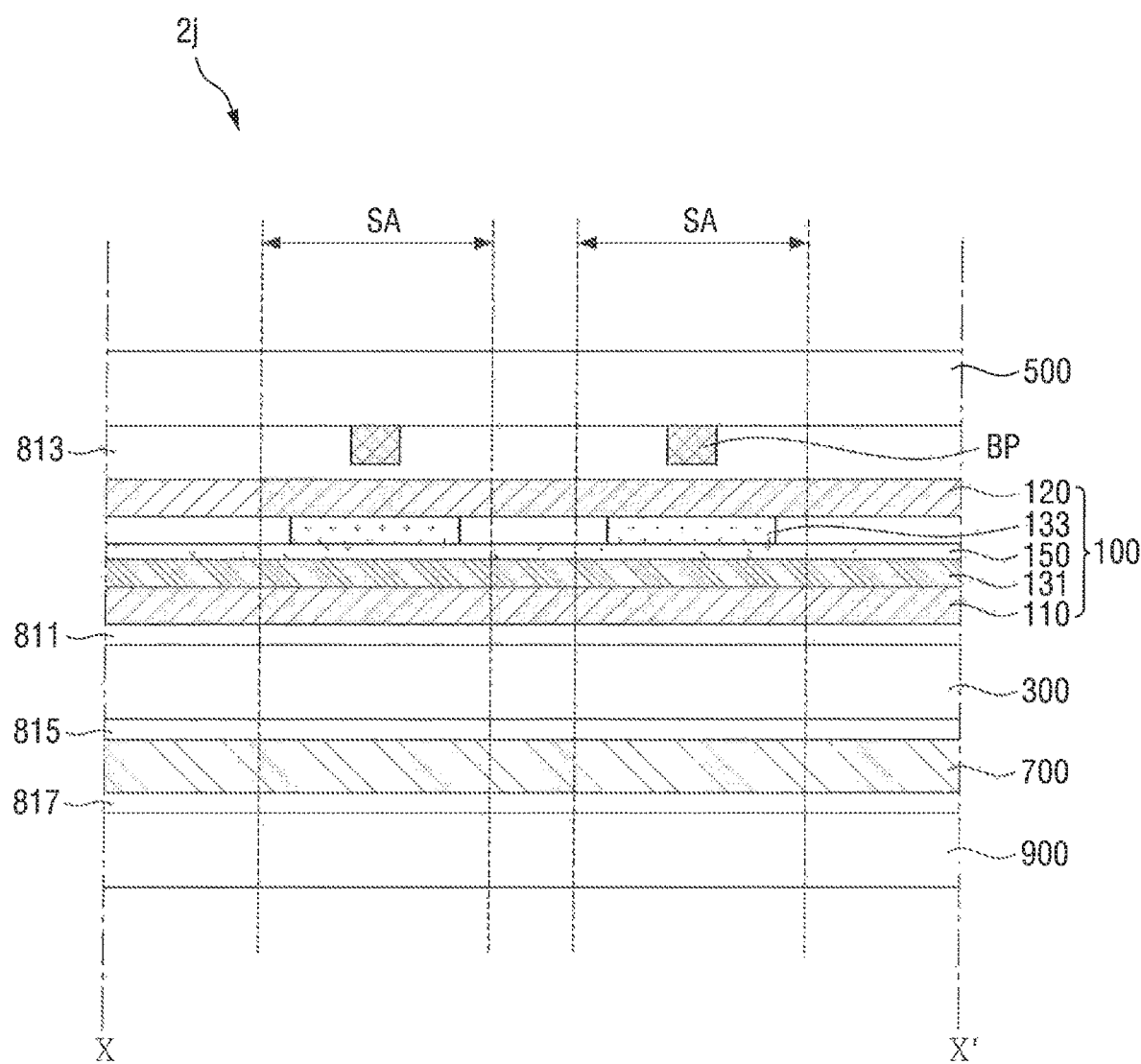
Figure 30:
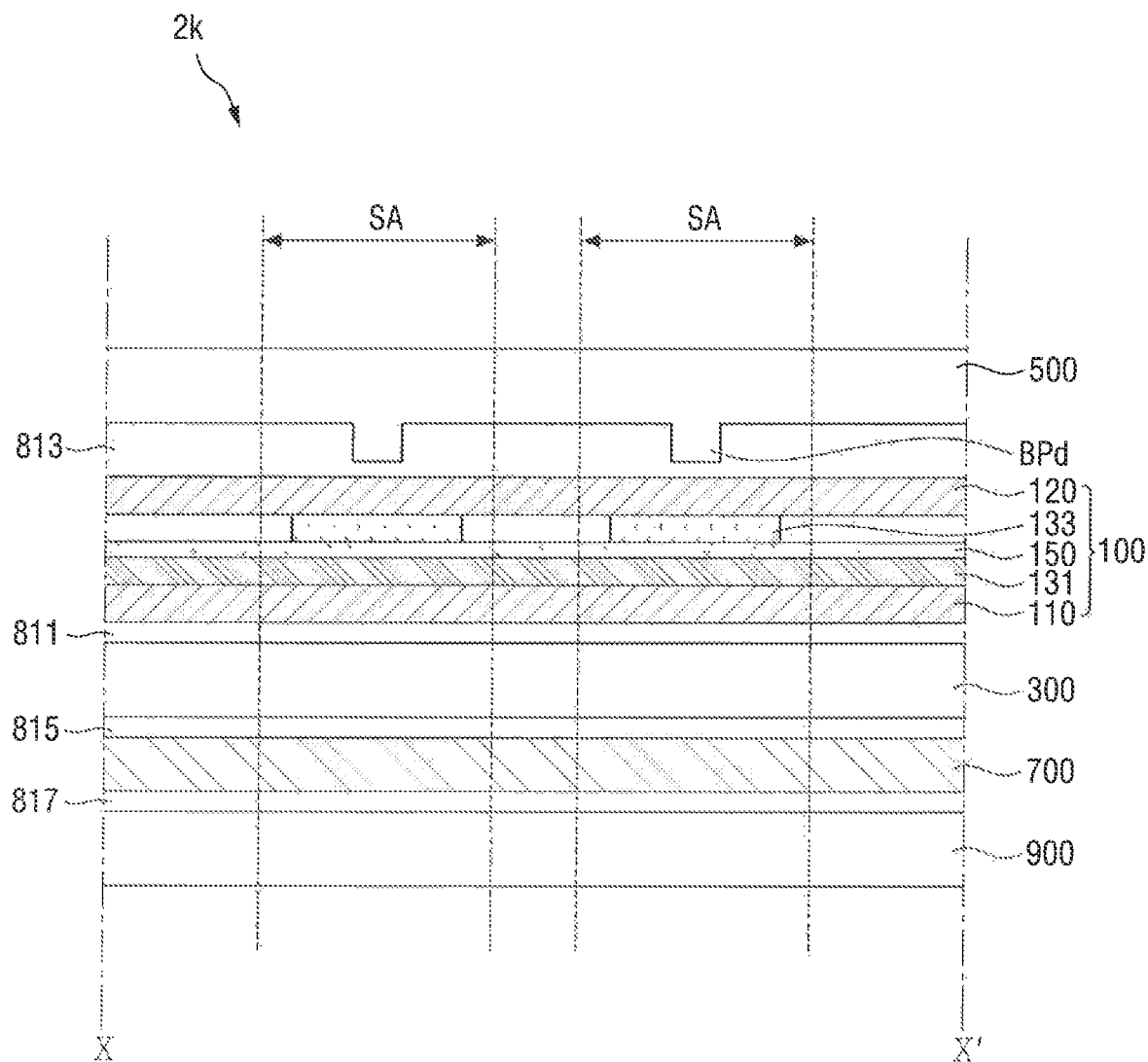

FIGS. 29 and 30 area cross-sectional views of display devices according to exemplary embodiments of the present disclosure taken along the line X-X' in FIG. 2. Referring to FIGS. 29 and 30, a display device 2j shown in FIG. 29 and a display device 2k shown in FIG. 30 are different from the display device 1j shown in FIG. 15 and the display device 1k shown in FIG. 16 in that the pressure sensor 100 is disposed between the window 500 and the display panel 300, and other configurations of the display devices 2j and 2k are substantially the same as or similar to those of the display devices 1j and 1k. In addition, as described above, the first electrode 131 and the second electrode 133 of the pressure sensor 100 may be made of a transparent conductive material or a metal mesh.

Figure 31:
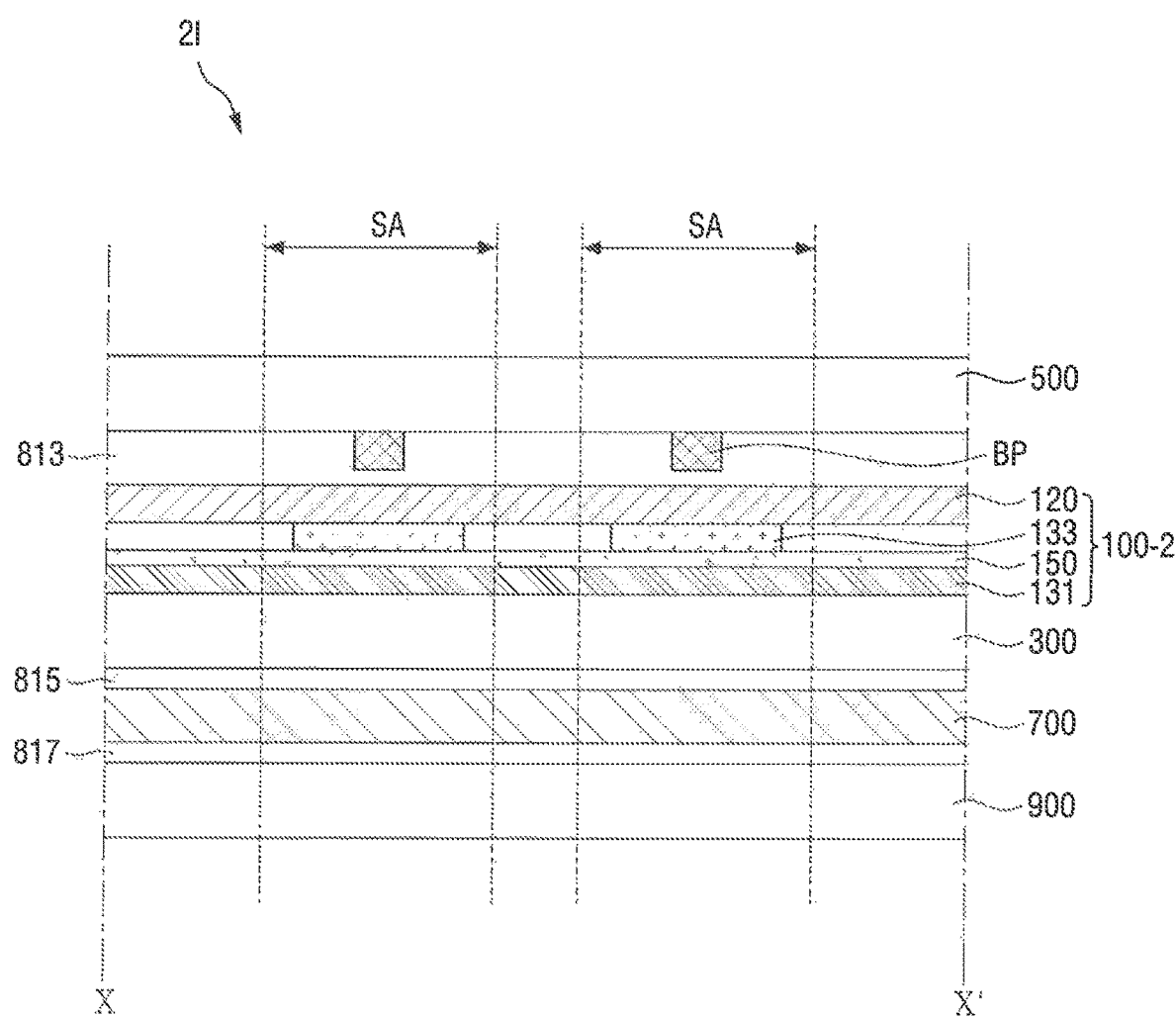
Figure 32:
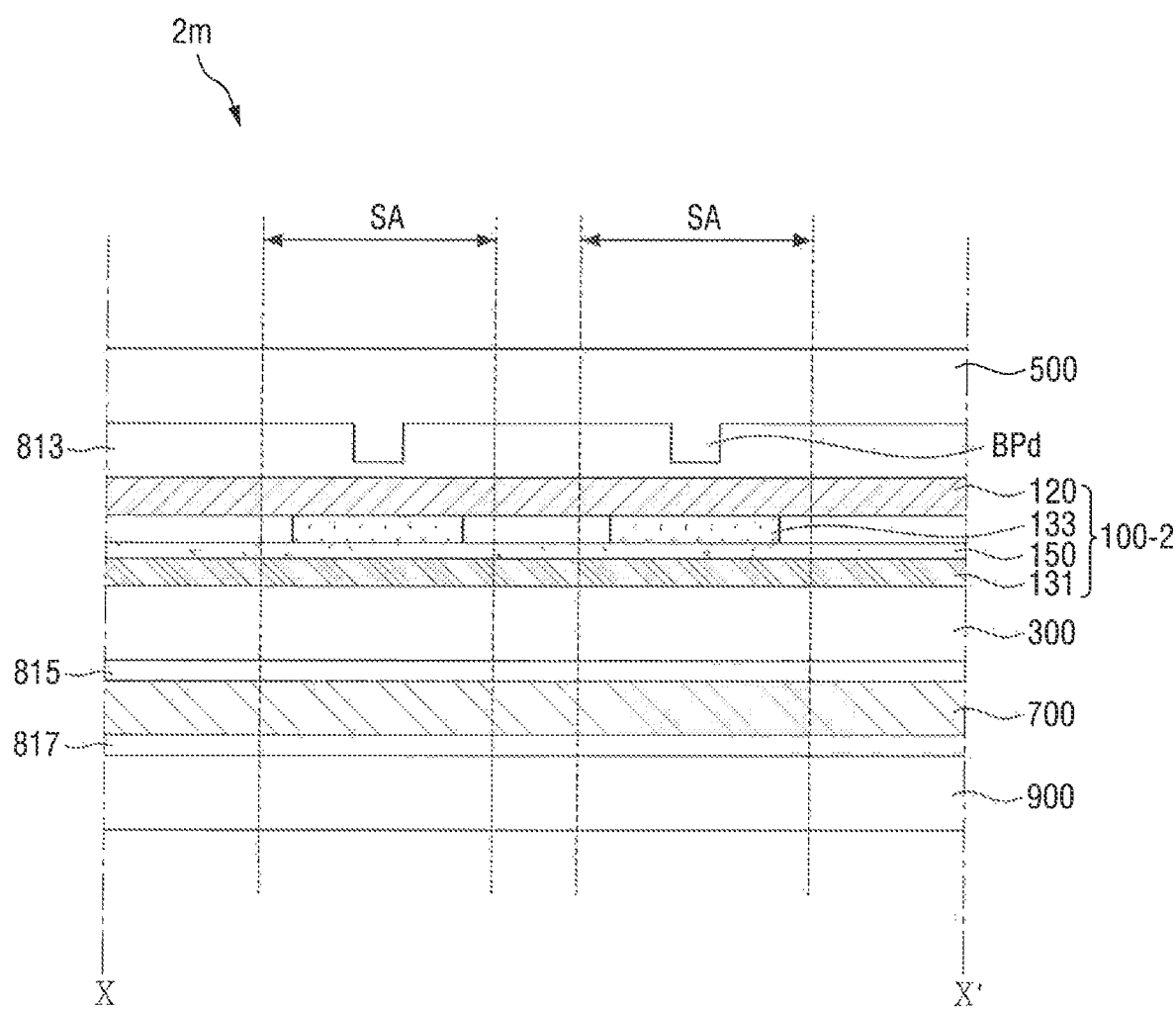

FIGS. 31 and 32 area cross-sectional views of display devices according to exemplary embodiments of the present disclosure taken along the line in FIG. 2. Referring to FIGS. 31 and 32, a display device 2l shown in FIG. 31 and a display device 2m shown in FIG. 32 are different from the display device 2j shown in FIG. 29 and the display device 2k shown in FIG. 30 in that the pressure sensor 100_2 does not include the first base layer 110 and the first electrode 131 is disposed directly on the upper surface of the display panel 300 facing the window 500 and in that the intermediate bonding layer 811 is omitted, and other configurations of the display devices 2l and 2m are substantially the same as or similar to those of the display devices 2j and 2k.

Figure 33:
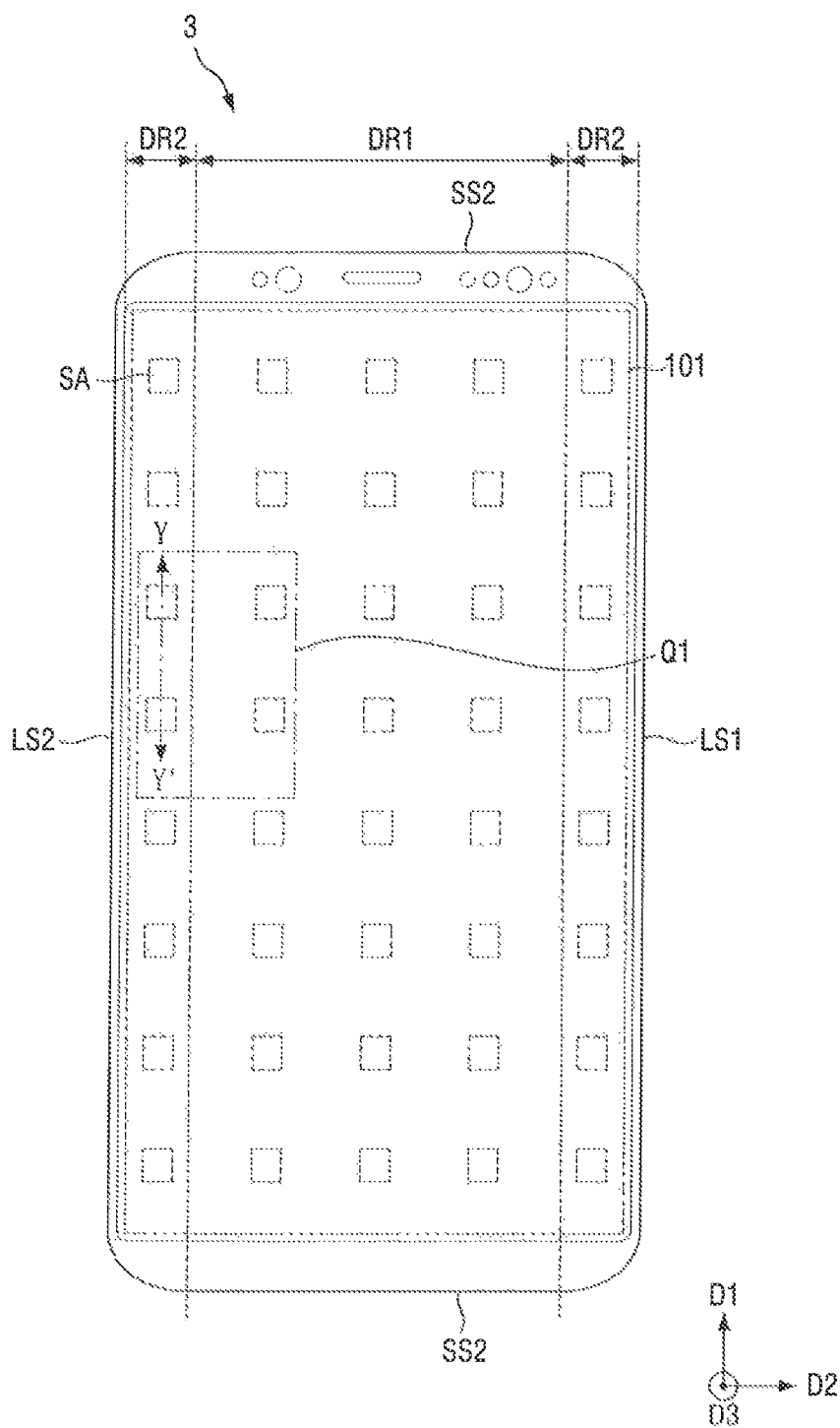
FIG. 33 is a plan view illustrating a display device according to an exemplary embodiment of the present disclosure.
Figure 35:
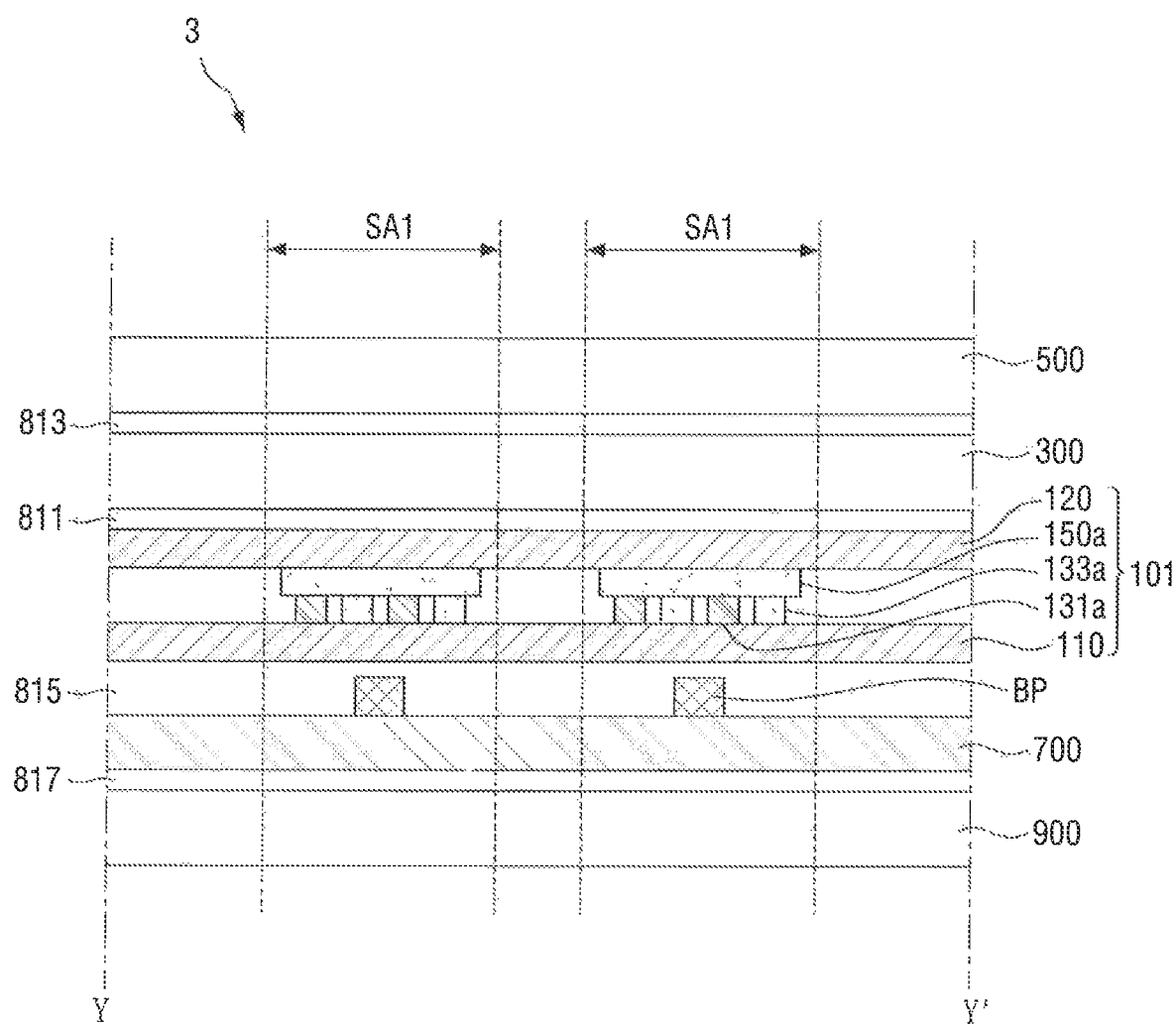
FIG. 35 is a cross-sectional view illustrating the display device taken along the line Y-Y' in FIG. 33.

FIG. 33 is a plan view of a display device according to an exemplary embodiment of the present disclosure, FIG. 34 is a plan view showing a first electrode, a second electrode, a pressure sensing layer, and a pressure concentration bump of a pressure sensor locate at the Q1 portion in FIG. 33, and FIG. 35 is a cross-sectional view of the display device taken along the Y-Y' in FIG. 33.

Referring to FIGS. 33 to 35, a display device 3 is different from the display device 1 described with reference to FIGS. 2 to 4A in that the structure of a pressure sensor 101 of the display device 3 is different from the structure of the pressure sensor 100 of the display device 1, and other configurations of the display device 3 are substantially the same as or similar to those of the display device 1. Hereinafter, differences will be mainly described.

The pressure sensor 101 may include a plurality of sensing areas SA1.

In terms of configuration, the pressure sensor 101 may include a first electrode 131a and a second electrode 133a, and may further include a pressure sensing layer 150a, a first base layer 110, and a second base layer.

The first electrode 131a and the second electrode 133a may be disposed on the same layer (or the same level), and may be spaced apart from each other. The first electrode 131a and the second electrode 133a may be made of the same material. For example, the first electrode 131a and the second electrode 133a may contain a conductive material such as silver (Ag), copper (Cu), or aluminum (Al).

Each of the first electrode 131a and the second electrode 133a may be a comb-shaped electrode. The first electrode 131a and the second electrode 133a may be arranged so that the comb shapes are engaged with each other (e.g. the teeth of the comb shapes are interlaced).

For example, each of the first electrode 131a and the second electrode 133a may include a stem electrode (or a connection electrode) and a branch electrode (or a finger electrode). The first electrode 131a and the second electrode 133a may be arranged such that branch electrodes are staggered. With such an arrangement, an area where the first electrode 131a and the second electrode 133a face each other increases, and thus effective pressure sensing can be performed.

Explaining the structures of the first electrode 131a and the second electrode 133a in more detail, the first electrode 131a of the pressure sensor 101 includes a first stem electrode 1311 extending in the first direction D1 and a plurality of first branch electrodes 1313 branched from the first stem electrode 1311 in the second direction D2.

The first stem electrode 1311 is disposed over a plurality of sensing areas SA1 and is arranged in parallel along the first direction D1 to provide a voltage (driving voltage) to each of the sensing areas SA. The first stem electrode 1311 is disposed up to the non-sensing area between the adjacent sensing areas SA1 along the first direction D1 to electrically connect portions of the first stem electrode 1311 placed between the adjacent sensing areas SA.

The plurality of first branch electrodes 1313 are branched from the first stem electrode 1311 and extend in the second direction D2. The first branch electrodes 1313 may be disposed in the sensing area SA1, and is not disposed in the non-sensing area other than in the sensing area SA1.

The first branch electrodes 1313 neighboring in one sensing area SA may be spaced apart from each other by a predetermined distance, and the second branch electrode 1333 of the second electrode 133a may be disposed in the corresponding space. The number of the first branched electrodes 1313 disposed in one sensing area SA1 may be changed depending on the area of the sensing area SA, but may be 2 to 20.

The second electrode 133a of the pressure sensor 101 includes a plurality of second stem electrode 1331 extending in the first direction D1 and a plurality of second branch electrodes 1333 branched from each of the second stem electrodes 1331.

Unlike the first stem electrode 1311, the second stem electrode 1331 covers one sensing area SA1. The separate second stem electrode 1331 is disposed for each sensing area SA1, and the second stem electrodes 1331 disposed in different sensing areas SA1 are electrically isolated from each other. Each of the second stem electrodes 1331 may be connected to an independent sensing wiring to transmit data on the amount of a voltage or current applied to the corresponding second electrode 133a to a controller.

The plurality of second branch electrodes 1333 are branched from the second stem electrode 1331 and extend in the second direction D2. The extending direction of the second branch electrode 1333 and the extending direction of the first branch electrode 1313 are opposite to each other. The plurality of second branch electrodes 1333 are disposed between the plurality of first branch electrodes 1313. The number of the first branch electrodes 1313 in one sensing area SA1 may be equal to the number of the second branch electrodes 1333 in one sensing area SA1, but the present invention is not limited thereto.

The first branch electrodes 1313 and the second branch electrodes 1333 may be alternately arranged in one sensing area SA1. The distance between the adjacent branch electrodes 1313 and 1333 in one sensing area SA1 may be uniform, but is not limited thereto. The distance between the nearest branch electrodes 1313 and 1333 in a proximate sensing area SA1 adjacent to one sensing area SA1 with a non-sensing area therebetween may be greater than the distance between the branch electrodes 1313 and 1333 in the one sensing area SA1.

In some exemplary embodiments of the present disclosure, the first sensing electrode 131a and the second sensing electrode 133a may be disposed on one surface of the first base layer 110 facing the second base layer 120.

The pressure sensing layer 150a may have a shape corresponding to the sensing area SA1. The pressure sensing layer 150a covers the corresponding sensing area SA1. The plurality of first branch electrodes 1313 and the plurality of second branch electrodes 1333 in the sensing area SA1 may overlap in the thickness direction with respect to the pressure sensing layer 150a.

In some exemplary embodiments of the present disclosure, the pressure sensing layers 150a disposed in the adjacent sensing areas SA1 may be spaced apart from each other without being connected to each other.

In some exemplary embodiments of the present disclosure, the pressure sensing layer 150a may be disposed on one surface of the second base layer 120 facing the first base layer 110.

As described in the display device 1, the pressure concentration bump BP may be disposed to overlap the sensing area SA1 or the pressure sensing layer 150a, and may be coupled with the upper surface of the conductive sheet 700 facing the pressure sensor 101.

Although it is shown in the drawing that the second base layer 120 is closer to the display panel 300 than the first base layer 110 is, this is only one example. Alternatively, the first base layer 110 is closer to the display panel 300 than the second base layer 120 is.

Further, although it is shown in the drawing that the pressure sensing layer 150a is closer to the display panel 300 than the first electrode 131a and the second electrode 133a are, this is only one example. Alternatively, the first electrode 131a and the second electrode 133a are closer to the display panel 300 than the the pressure sensing layer 150a is.

Figure 62:
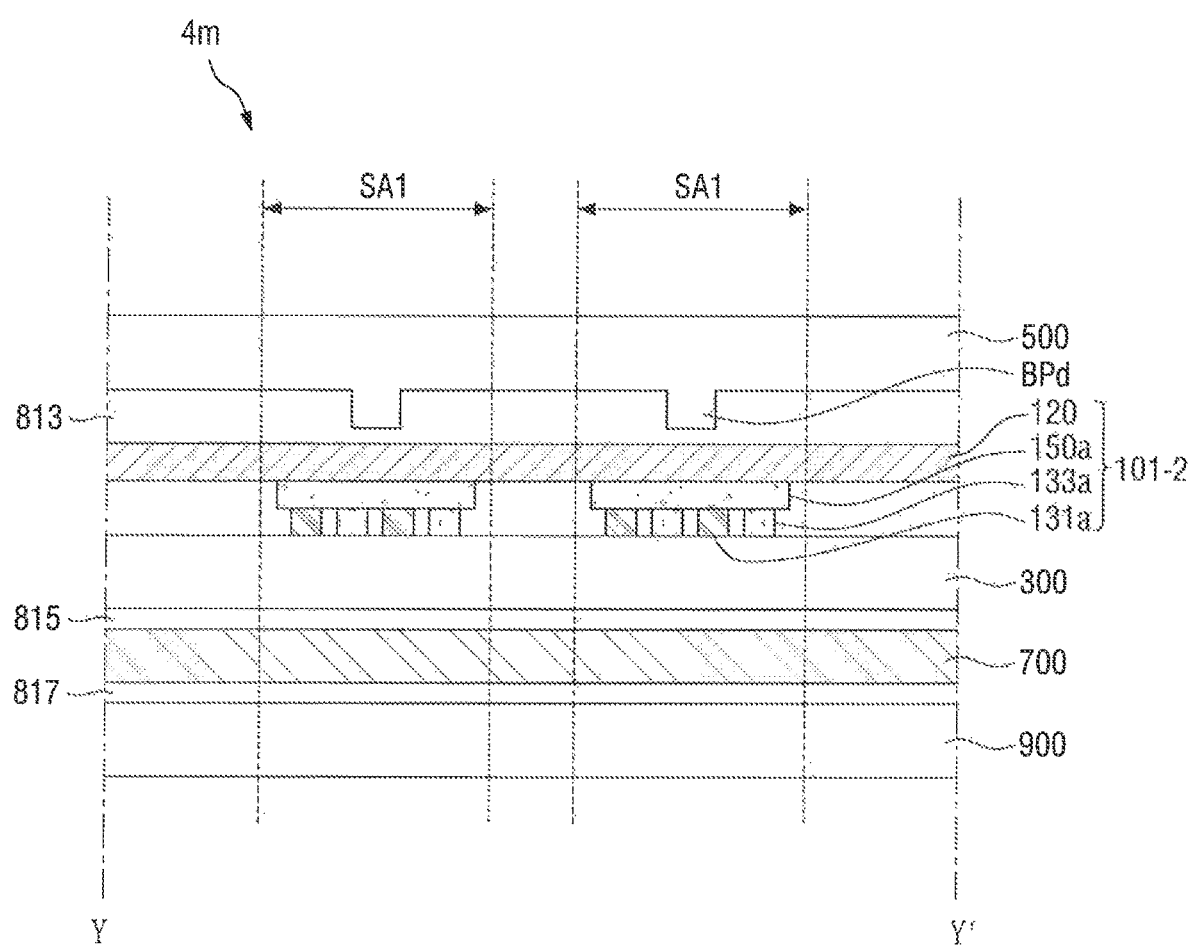
Figure 63A:
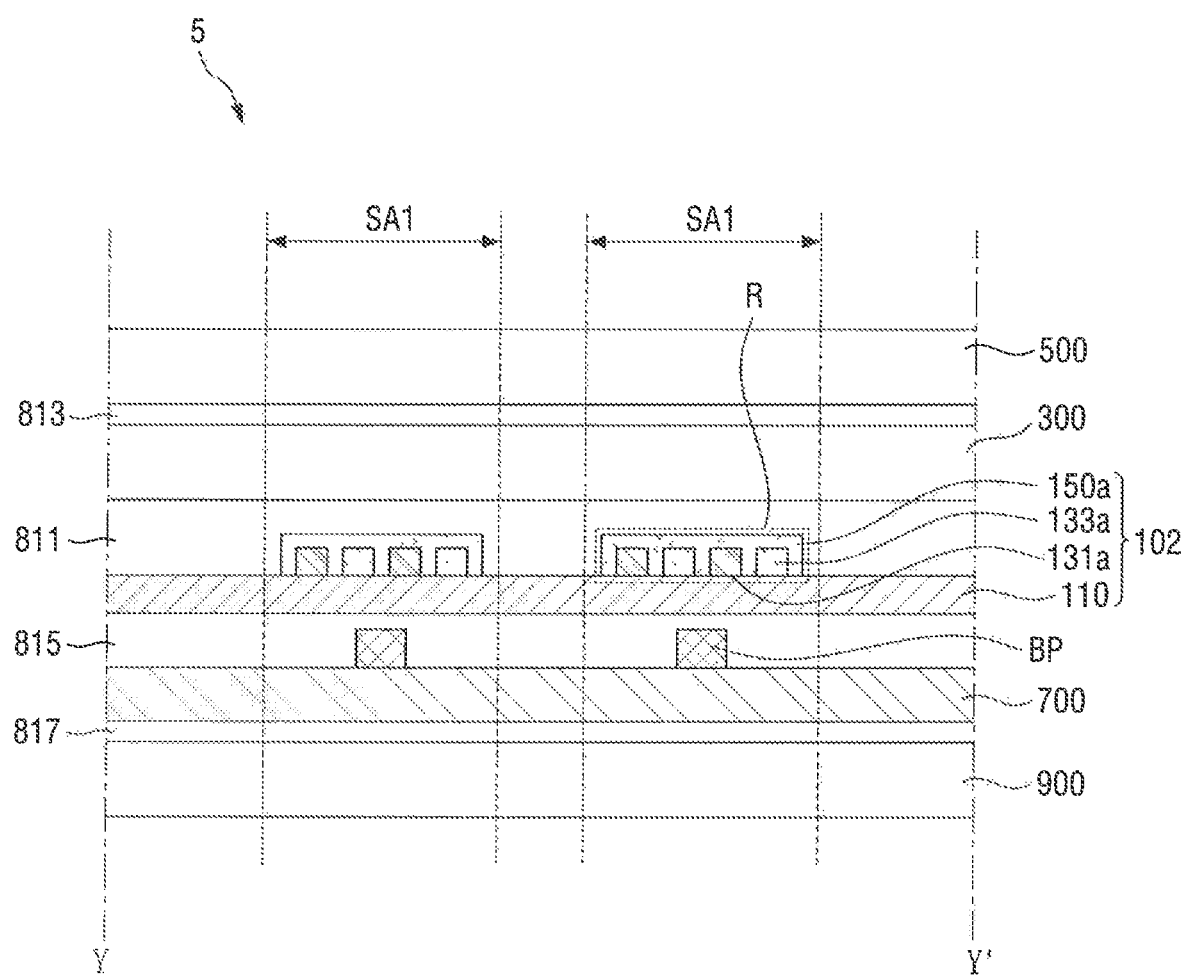
Figure 63B:
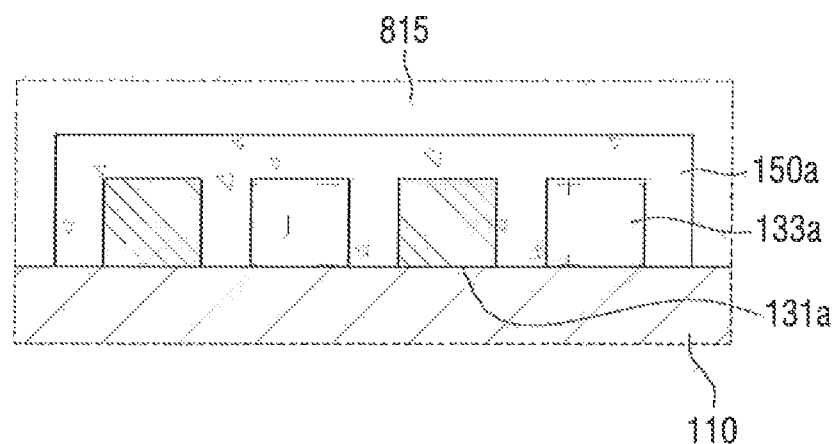
FIG. 63B is an enlarged cross-sectional view illustrating the portion in FIG. 63A.
Figure 63C:
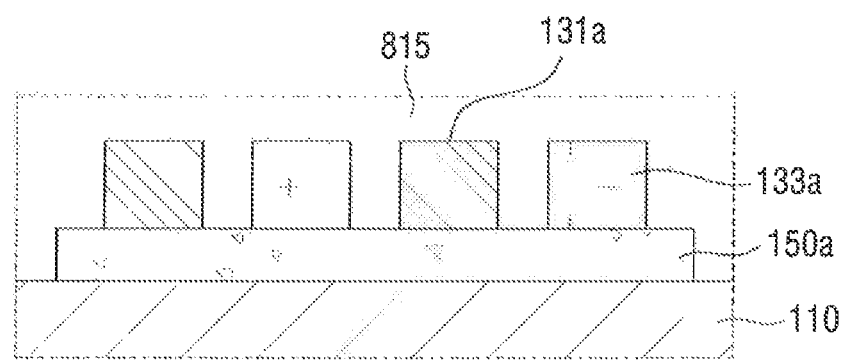
FIG. 63C is a cross-sectional view illustrating a modified structure of FIG. 63B.

FIGS. 36 to 63A are cross-sectional views of display devices according to exemplary embodiments of the present disclosure taken along the line Y-Y' in FIG. 33, FIG. 63B is an enlarged cross-sectional view of the R portion in FIG. 63A, FIG. 63C is a cross-sectional view showing the modified structure of FIG. 63B, and FIGS. 64 to 92 are cross-sectional views of display devices according to exemplary embodiments of the present disclosure taken along the line Y-Y' in FIG. 33.

Figure 36:
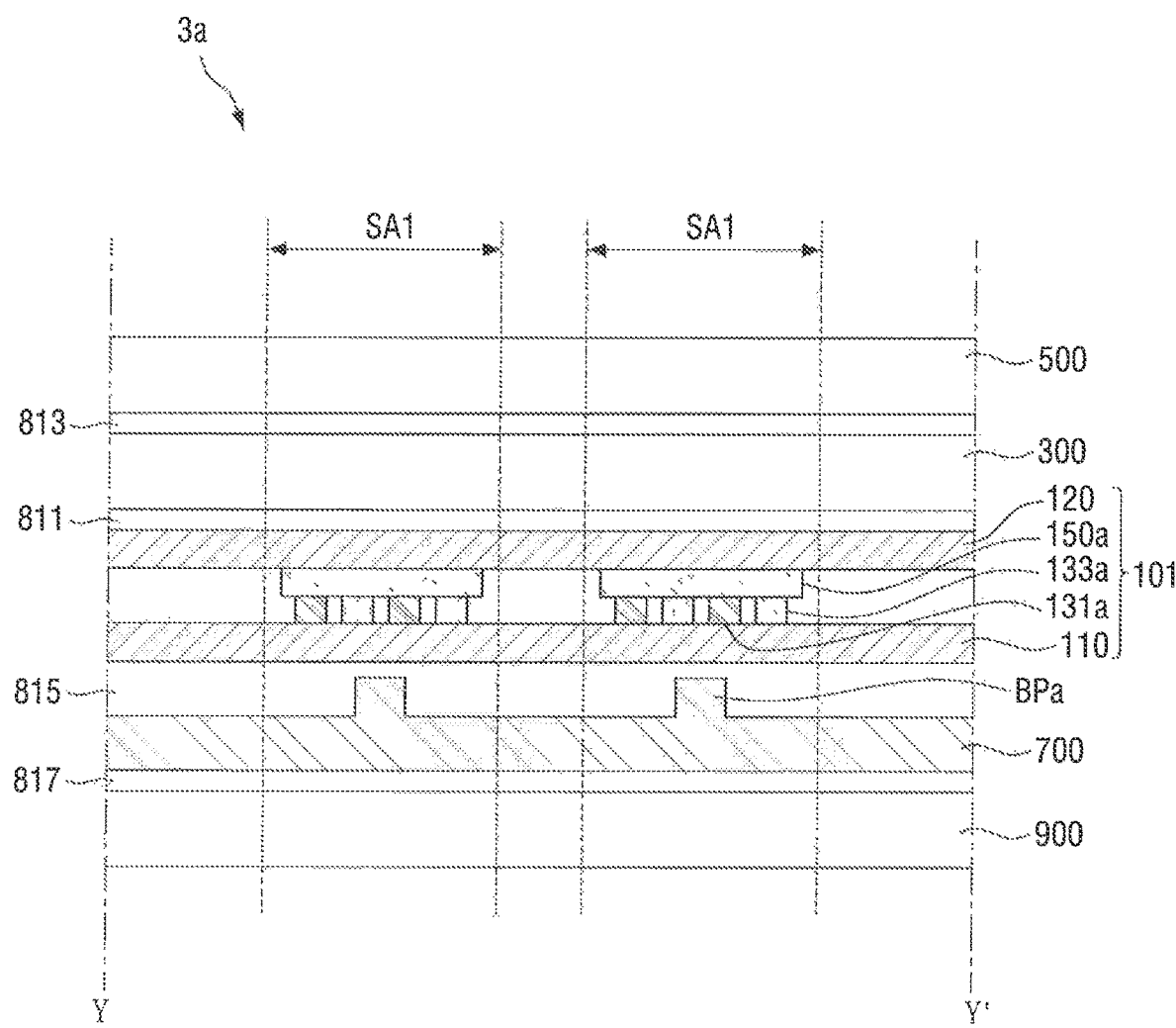

Referring to FIG. 36, a display device 3a is different from the display device 3 shown in FIGS. 33 to 35 in that the pressure concentration bump BPa is integrated with the conductive sheet 700 and is made of the same material as the conductive sheet 700, and other configurations of the display device 3a are substantially the same as or similar to those of the display device 3.

Figure 37:
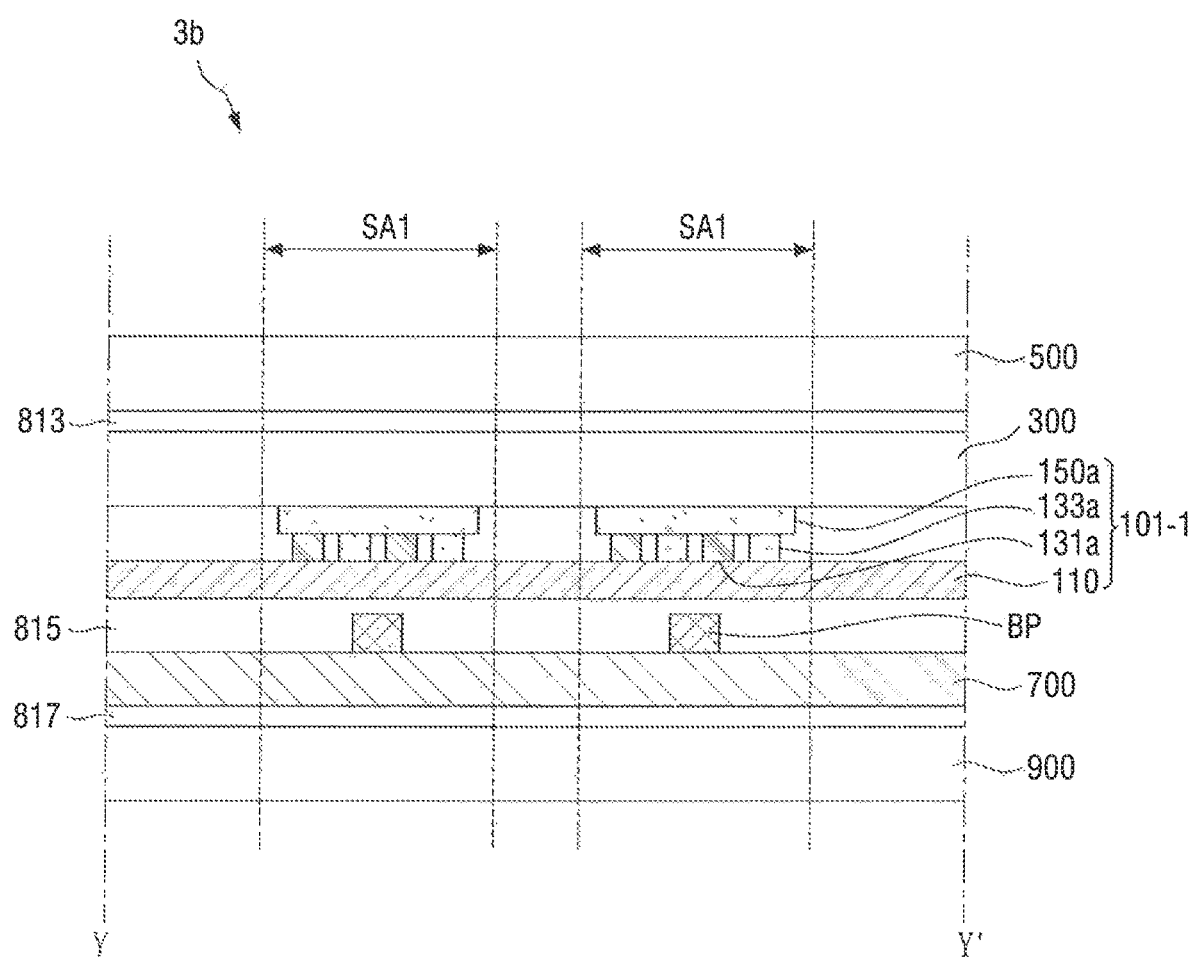
Figure 38:
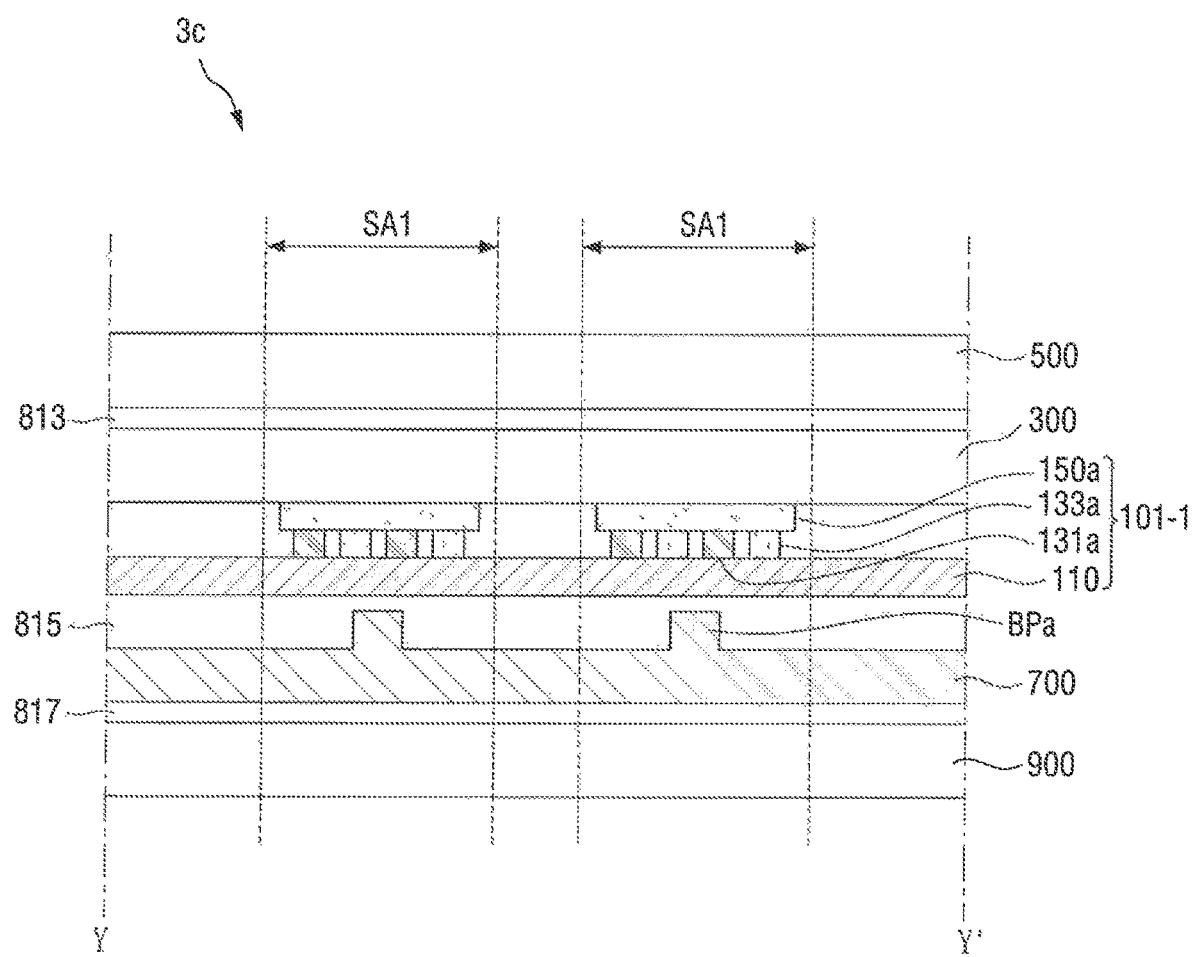

Referring to FIGS. 37 and 38, a display device 3b shown in FIG. 37 and a display device 3c shown in FIG. 38 are different from the display device 3 shown in FIGS. 33 to 35 and the display device 3a shown in FIG. 36 in that the pressure sensor 101_1 does not include the second base layer 120 and the pressuring sensing layer 150a is disposed directly on the lower surface of the display panel 300 and in that the intermediate bonding layer 811 is omitted, and other configurations of the display devices 3b and 3c are substantially the same as or similar to those of the display devices 3 and 3a.

Figure 39:
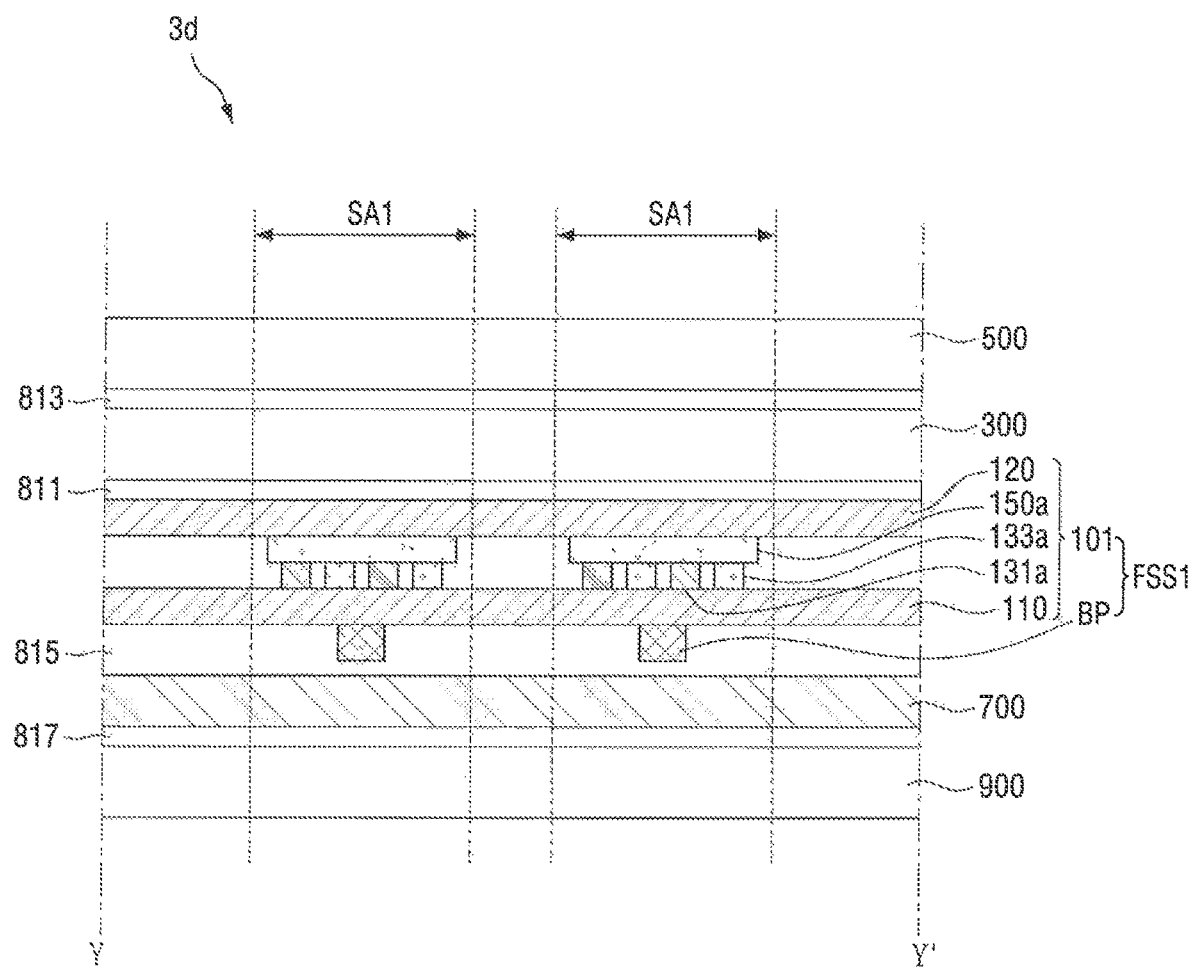

Referring to FIG. 39, a display device 3d is different from the display device 3 shown in FIGS. 33 to 35 in that the pressure concentration bump BP is coupled with the lower surface of the first base layer 110, and thus the pressure concentration bump BP and the pressure sensor 101 forms a pressure sensor structure FSS1, and other configurations of the display device 3d are substantially the same as or similar to those of the display devices 3.

Figure 40:
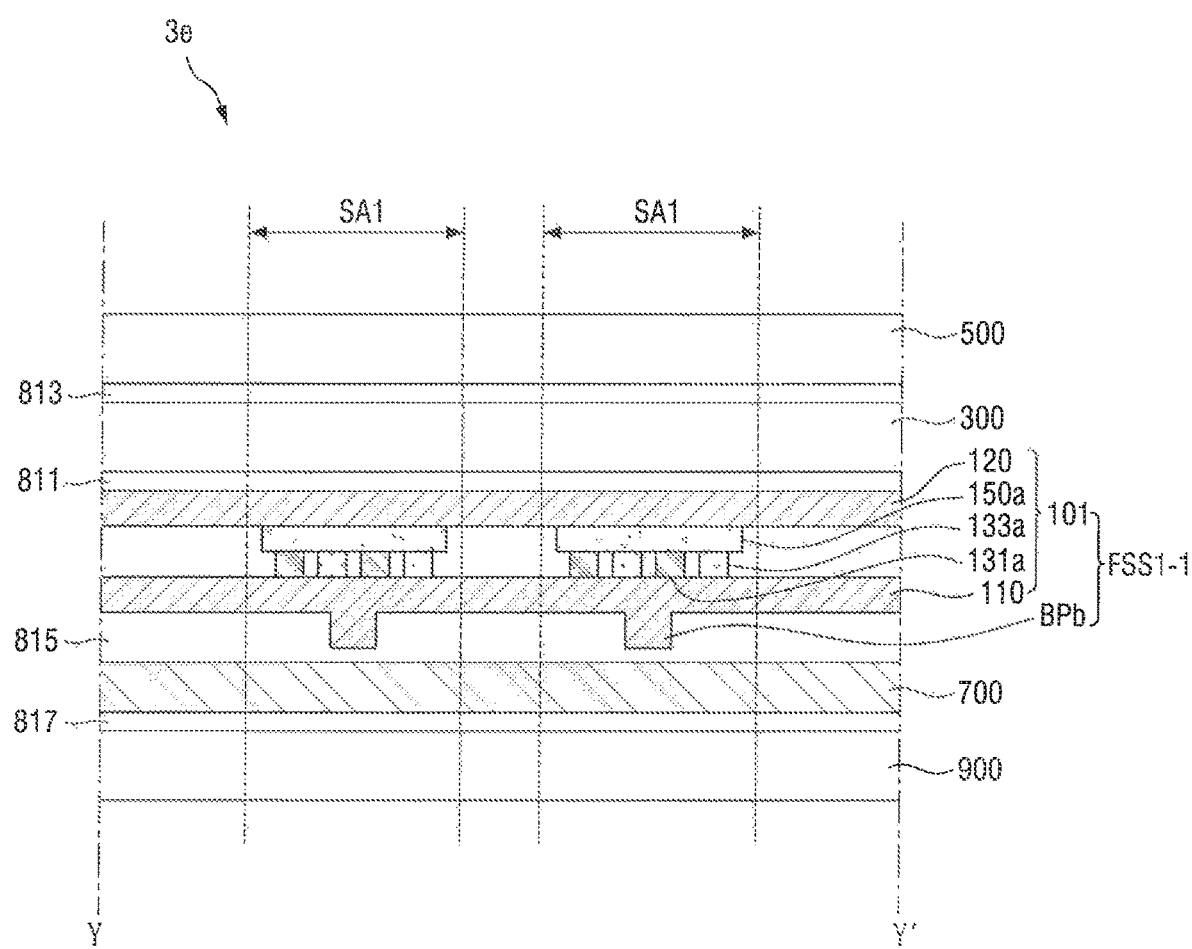

Referring to FIG. 40, a display device 3e is different from the display device 3d shown in FIG. 39 in that the pressure concentration bump BPb and the pressure sensor 101 forms a pressure sensor structure FSS1_1, and the pressure concentration bump BPb is integrated with the first base layer 110 of the pressure sensor 101 and made of the same material as the first base layer 110, and other configurations of the display device 3e are substantially the same as or similar to those of the display devices 3d.

Figure 41:
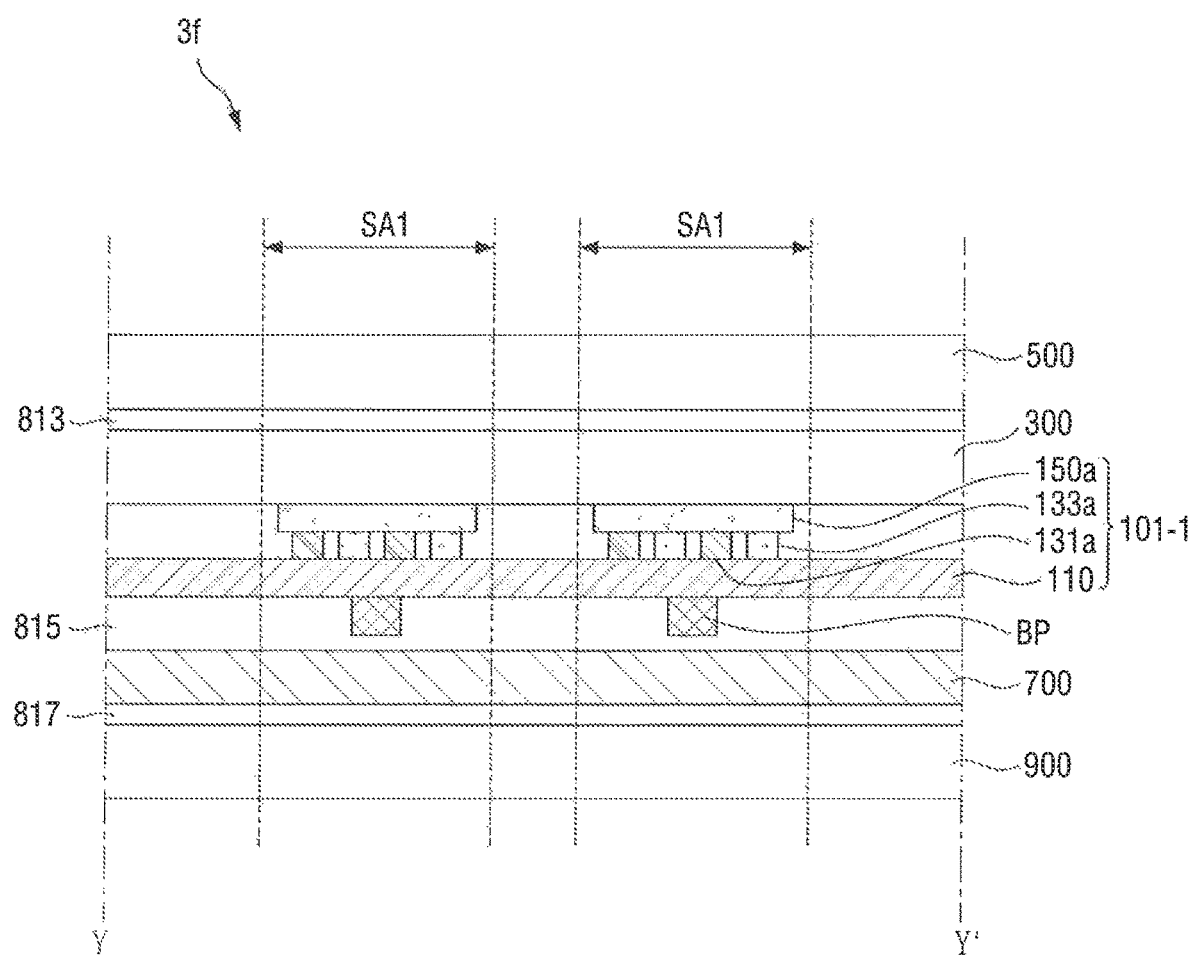
Figure 42:
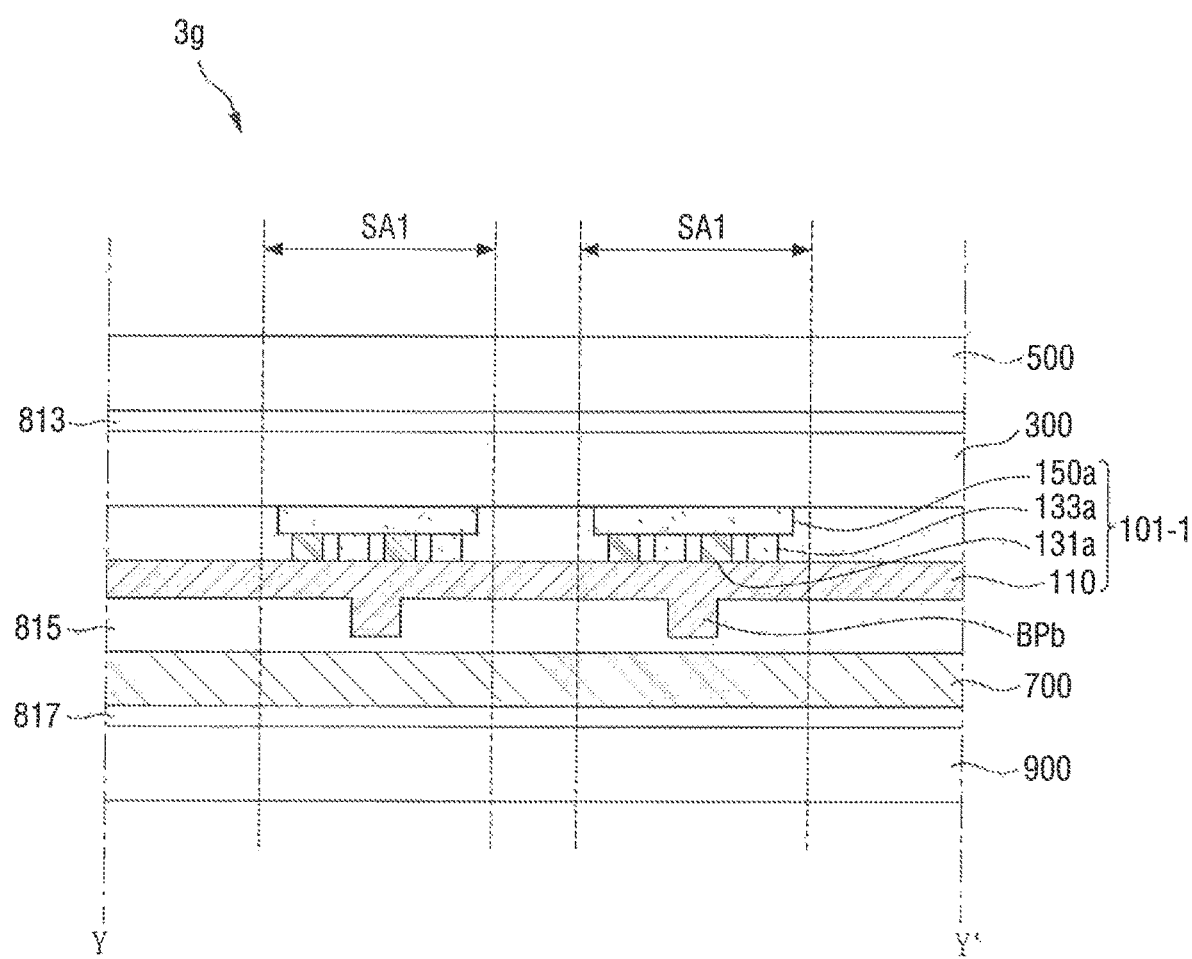

Referring to FIGS. 41 and 42, a display device 3f shown in FIG. 41 and a display device 3g shown in FIG. 42 are different from the display device 3*d* shown in FIG. 39 and the display device 3*e* shown in FIG. 40 in that the pressure sensor 101_1 does not include the second base layer 120 and the pressuring sensing layer 150*a* is disposed directly on the lower surface of the display panel 300 and in that the intermediate bonding layer 811 is omitted, and other configurations of the display devices 3*f* and 3*g* are substantially the same as or similar to those of the display devices 3*d* and 3*e*. According to an exemplary embodiment of the present disclosure, when the first electrode 131*a* and the second electrode 133*a* are closer to the display panel 300 than the pressure sensing layer 150*a* is, the first electrode 131*a* and the second electrode 133*a* may be formed directly on the lower surface of the display panel 300.

Figure 43:
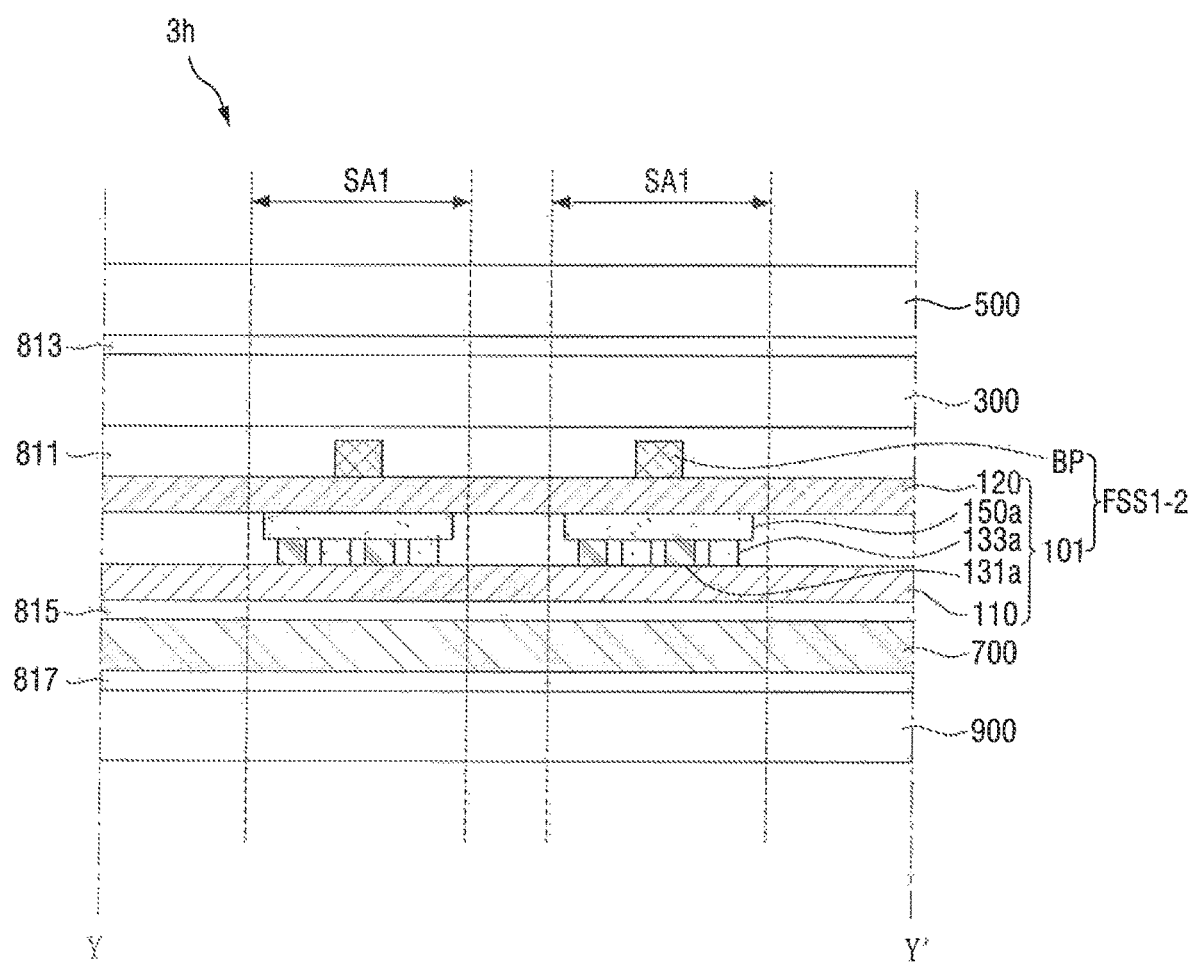

Referring to FIG. 43, a display device 3*h* is different from the display device 3 shown in FIGS. 33 to 35 in that the pressure concentration bump BP is disposed between the pressure sensor 101 and the display panel 300, the pressure concentration bump BP is coupled with the lower surface of the second base layer 120, and thus the pressure concentration bump BP and the pressure sensor 101 forms a pressure sensor structure FSS1_2, and other configurations of the display device 3*h* are substantially the same as those of the display devices 3.

Figure 44:
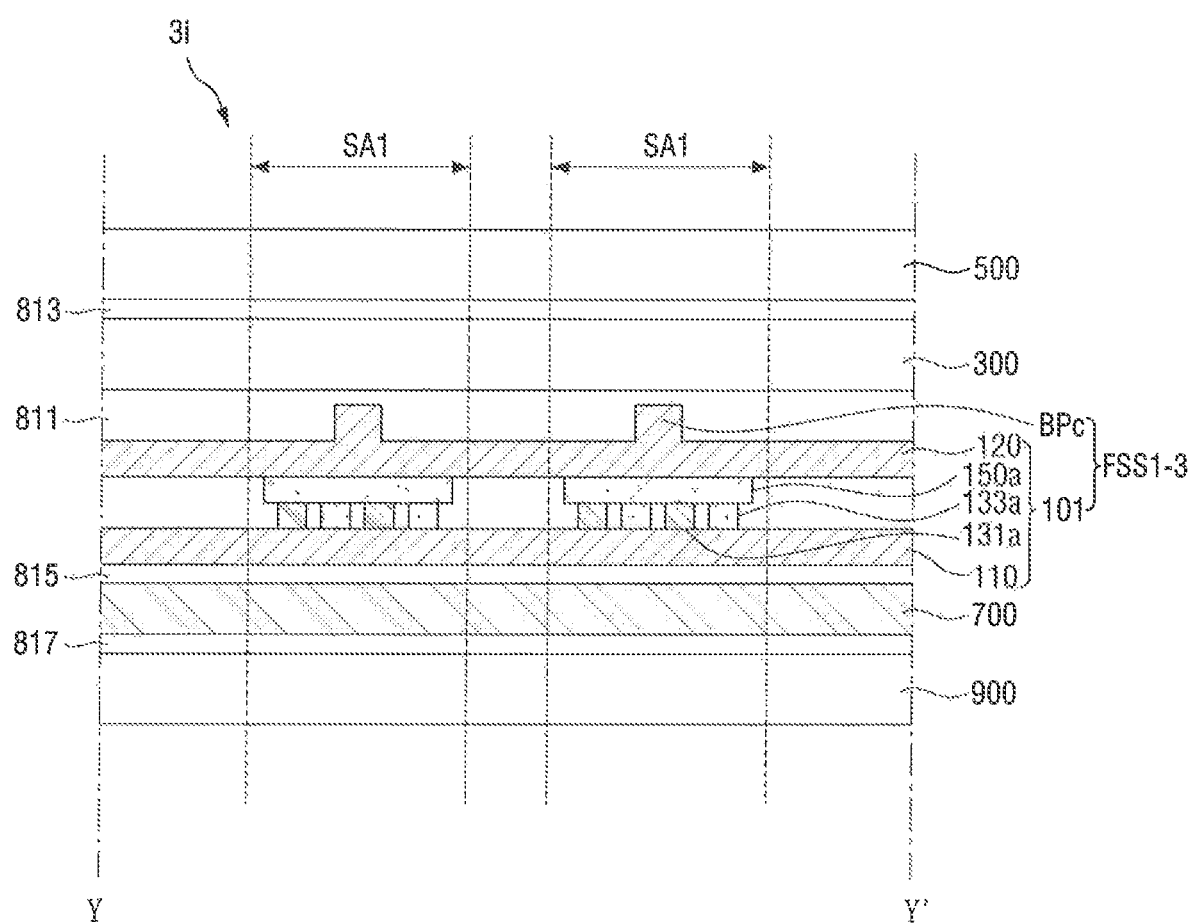

Referring to FIG. 44, a display device 3*i* is different from the display device 3*h* shown in FIG. 43 in that the pressure concentration bump BPc and the pressure sensor 101 forms a pressure sensor structure FSS1_3, and the pressure concentration bump BPc is integrated with the second base layer 120 of the pressure sensor 101 and made of the same material as the second base layer 120, and other configurations of the display device 3*i* are substantially the same as those of the display devices 3*h*.

Figure 45:
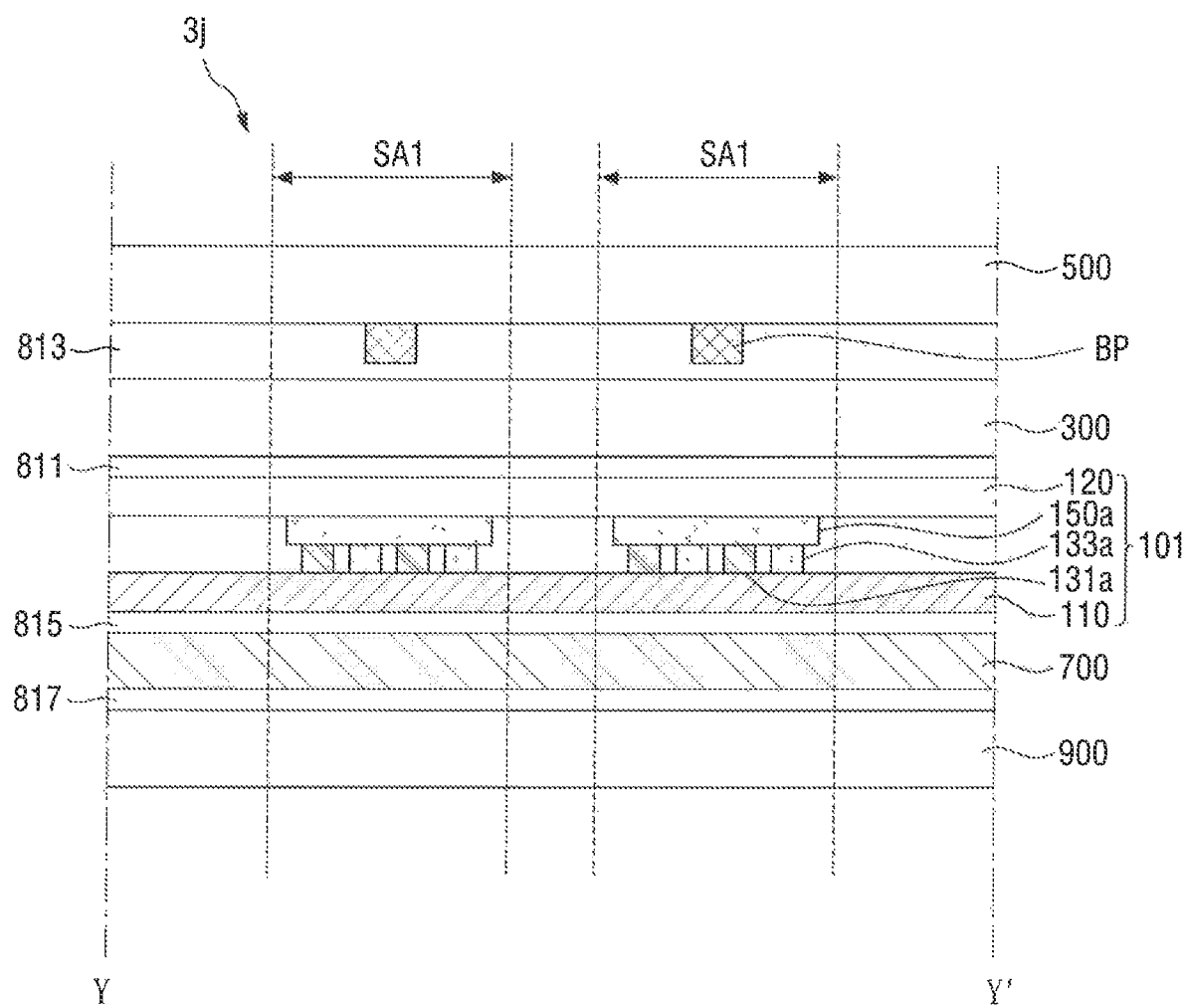

Referring to FIG. 45, a display device 3*j* is different from the display device 3 shown in FIGS. 33 to 35 in that the pressure concentration bump BP is disposed between the display panel 300 and the window 500, and the pressure concentration bump BP is coupled with the lower surface of the window 500 facing the display panel 300, and other configurations of the display device 3*j* are substantially the same as those of the display devices 3.

Figure 46:
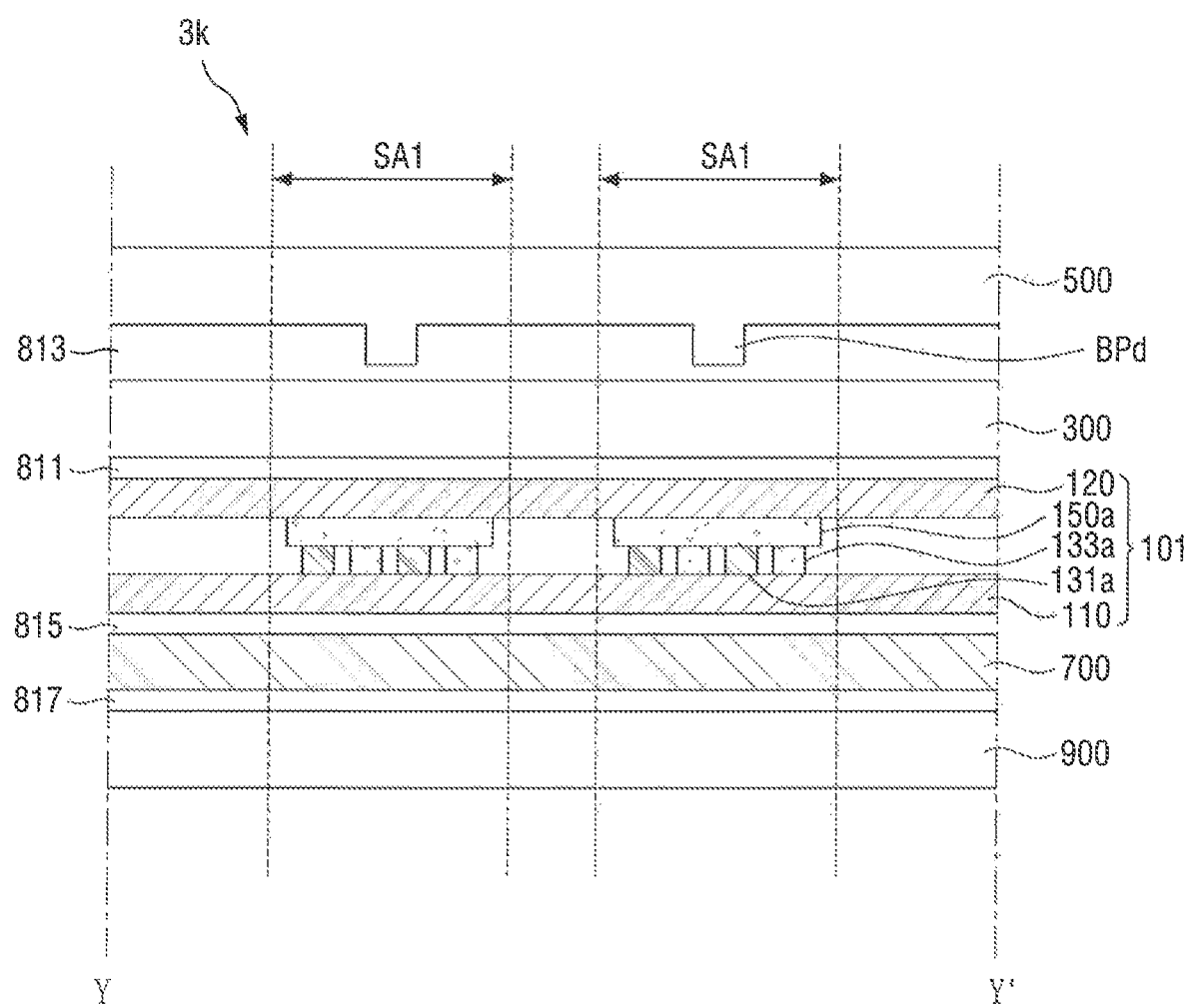

Referring to FIG. 46, a display device 3*k* is different from the display device 3 shown in FIGS. 33 to 35 in that the pressure concentration bump BPd is disposed on the lower surface of the window 500, and the pressure concentration bump BPd is integrated with the window 500 and made of the same material as the window 500, and other configurations of the display device 3*k* are substantially the same as those of the display devices 3.

Figure 47:
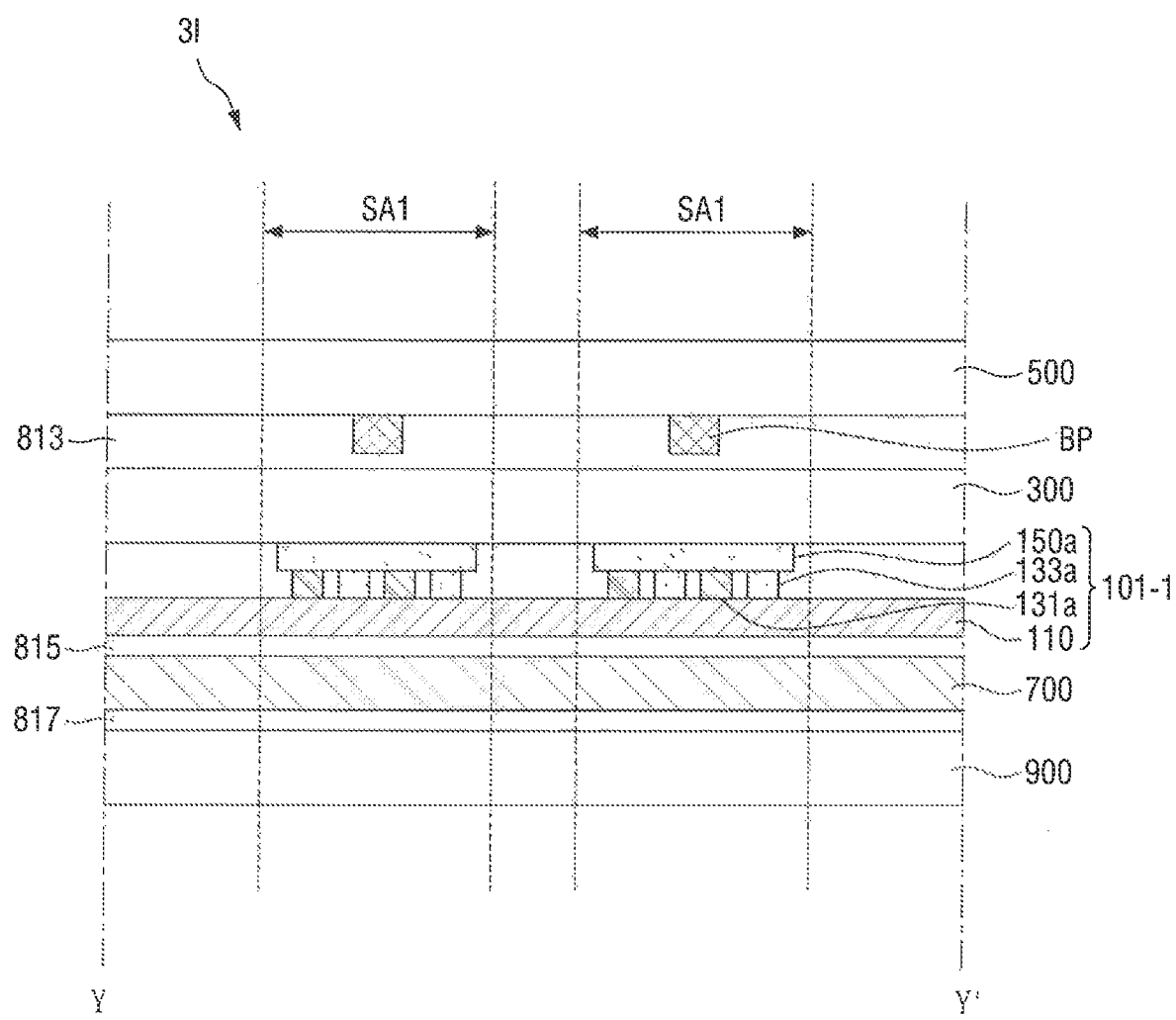
Figure 48:
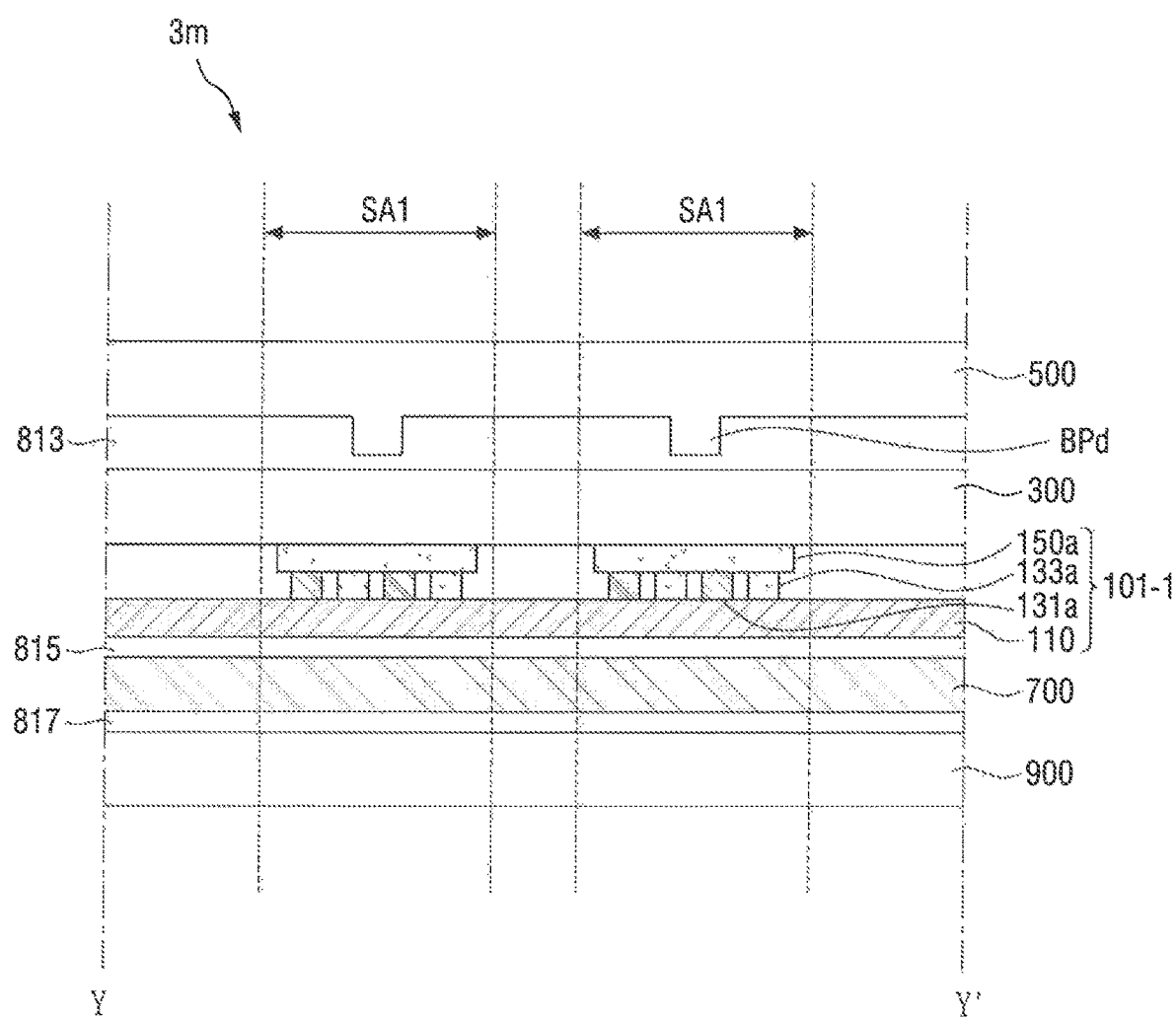

Referring to FIGS. 47 and 48, a display device 3*l* shown in FIG. 47 and a display device 3*m* shown in FIG. 48 are different from the display device 3*i* shown in FIG. 45 and the display device, 3*j* shown in FIG. 46 in that the pressure sensor 101_1 does not include the second base layer 120 and the pressuring sensing layer 150*a* is disposed directly on the lower surface of the display panel 300 and in that the intermediate bonding layer 811 is omitted, and other configurations of the display devices 3*l* and 3*m* are substantially the same as or similar to those of the display devices 3*i* and 3*j*. According to an exemplary embodiment of the present disclosure, the first electrode 131*a* and the second electrode 133*a* may be formed directly on the lower surface of the display panel 300.

Figure 49:
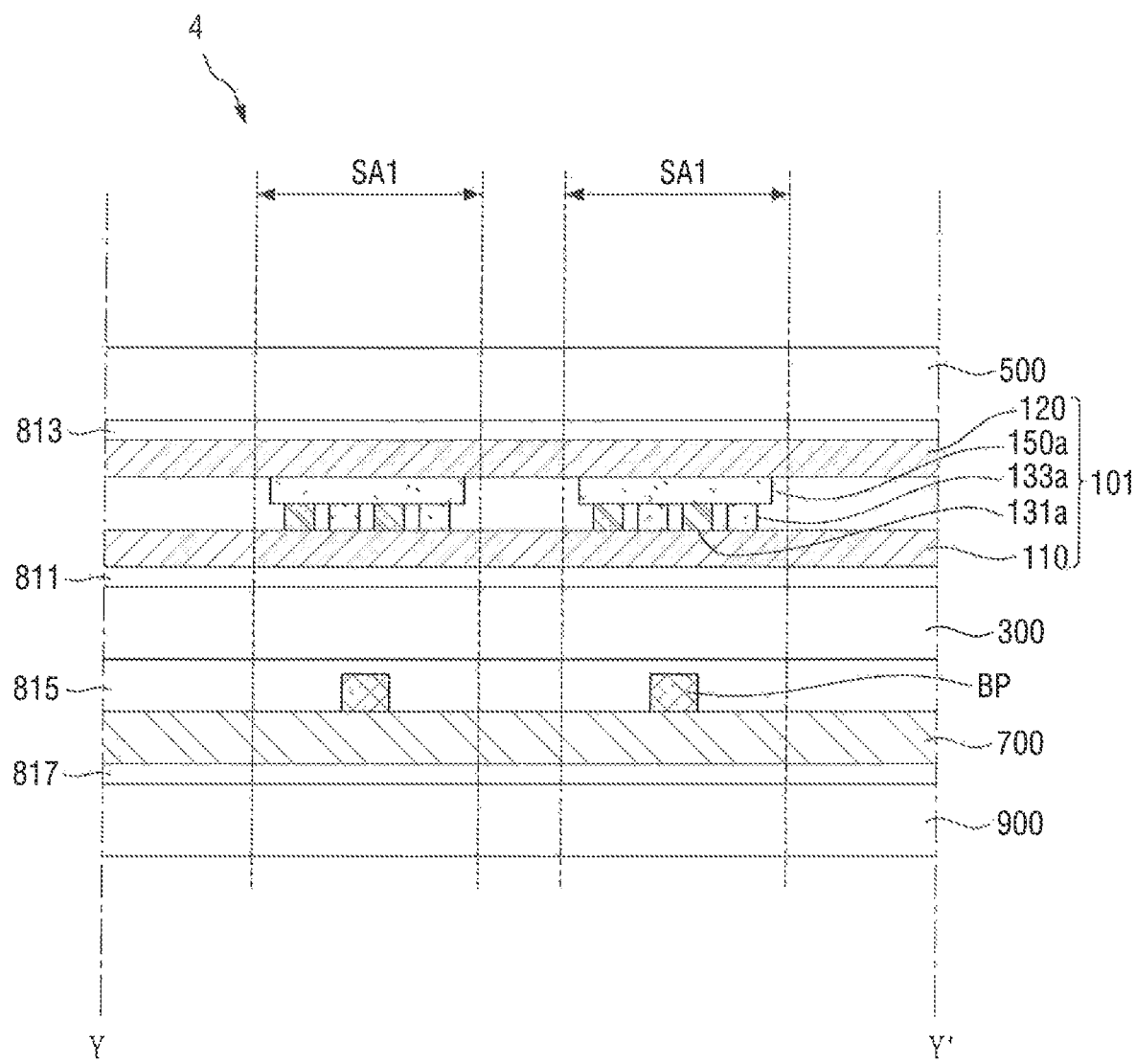
Figure 50:
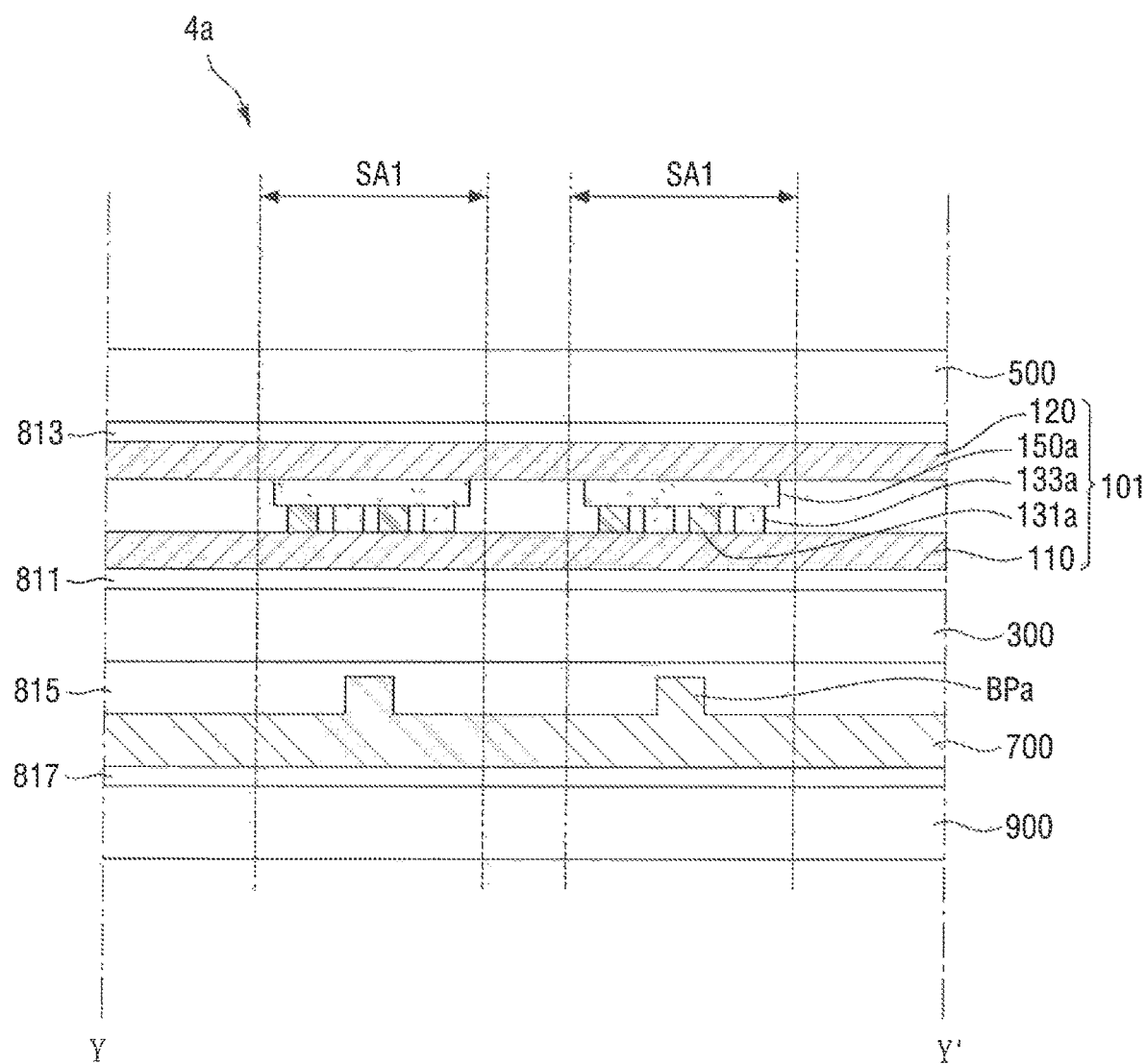

Referring to FIGS. 49 and 50, a display device 4 shown in FIG. 49 and a display device 4*a* shown in FIG. 50 are different from the display device 3 shown in FIGS. 33 to 35 and the display device 3*a* shown in FIG. 36 in that the pressure sensor 101 is disposed between the display panel 300 and the window 500, and other configurations of the display devices 4 and 4*a* are substantially the same as those of the display devices 3 and 3*a*.

In some exemplary embodiments of the present disclosure, the window 500 and the pressure sensor 101 may be coupled with each other through an upper bonding layer 813. Further, the pressure sensor 101 and the display panel 300 may be coupled with each other through an intermediate bonding layer 811, and the display panel 300 and the conductive sheet 700 may be coupled with each other through an intermediate bonding layer 815.

The first electrode 131*a* and the second electrode 133*a* of the pressure sensor 101 might not be visually recognized from the outside even if the pressure sensor 101 is disposed between the window 500 and the display panel 300. For example, the first electrode 131*a* and the second electrode 133*a* may be made of a transparent conductive material such as ITO or IZO, or may be formed in the form of a metal mesh.

Figure 51:
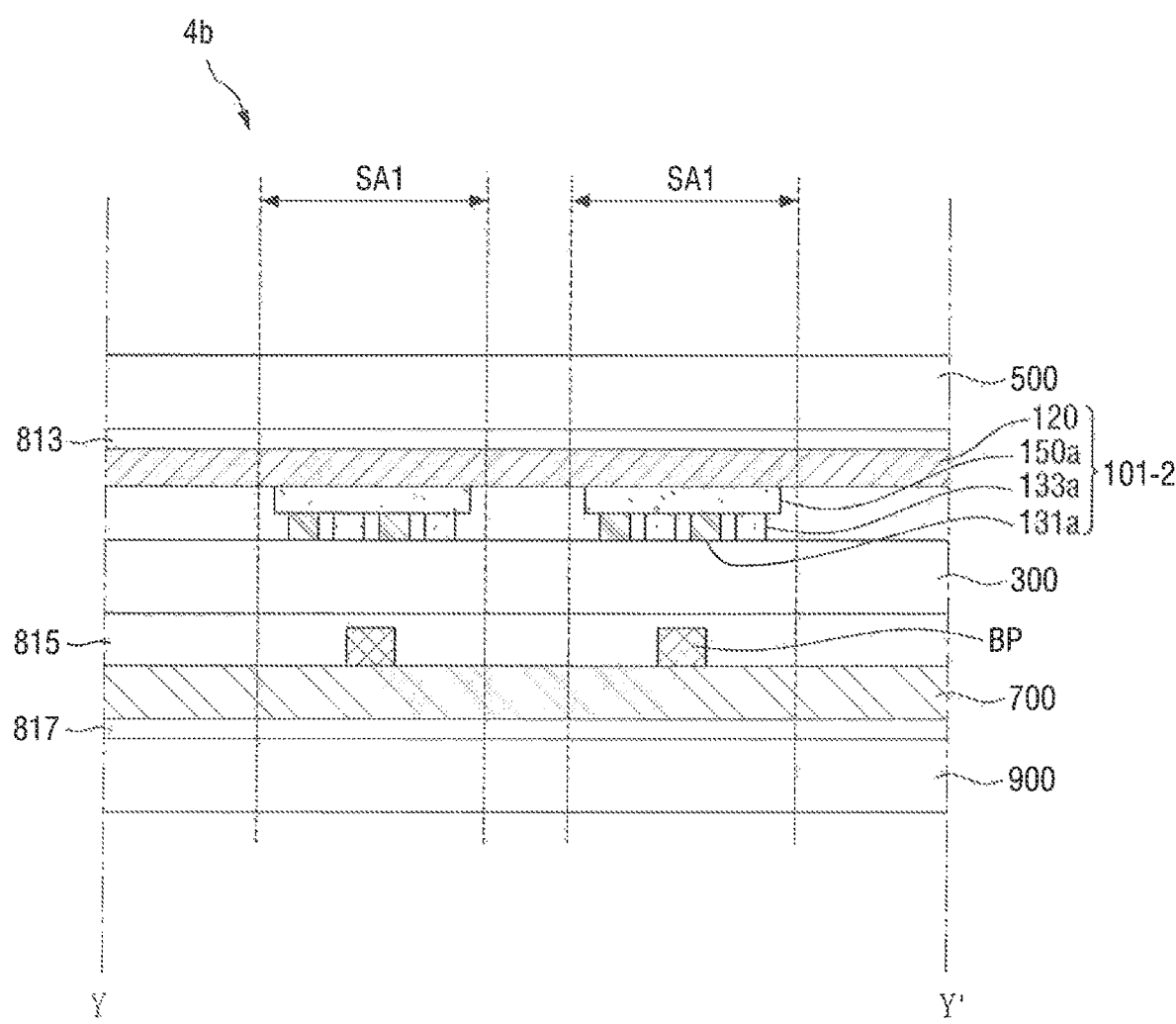
Figure 52:
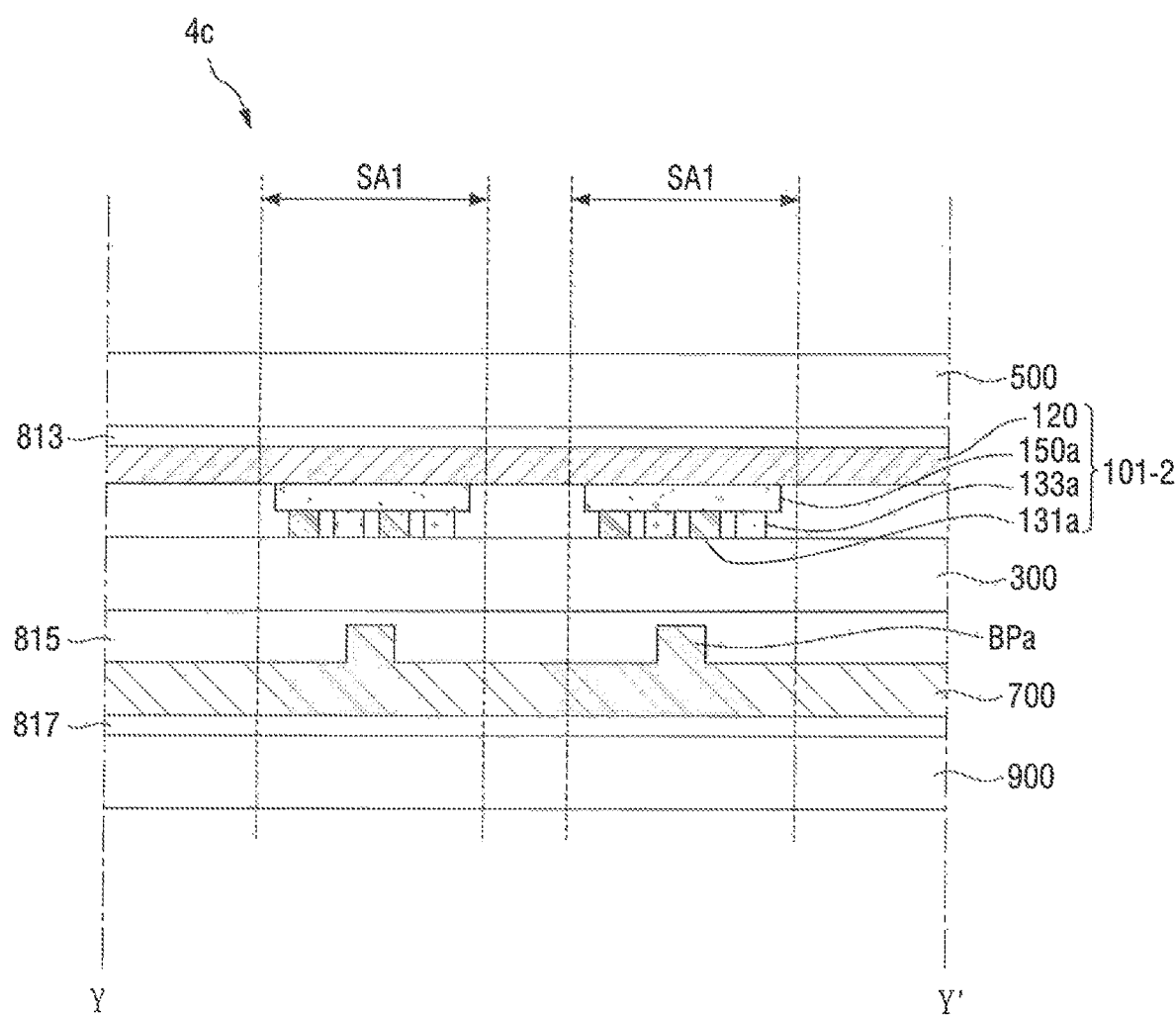

Referring to FIGS. 51 and 52, a display device 4*h* shown in FIG. 51 and a display device 4*c* shown in FIG. 52 are different front the display device 4 shown in FIG. 49 and the display device 4*a* shown in FIG. 50 in that the pressure sensor 101_2 does not include the first base layer 110 and the first electrode 131*a* and the second electrode 133*a* is disposed directly on the upper surface of the display panel 300, and in that the intermediate bonding layer 811 is omitted, and other configurations of the display devices 4*b* and 4*c* are substantially the same as or similar to those of the display devices 4 and 4*a*. According to an exemplary embodiment of the present disclosure, the pressure sensing layer 150*a* may be formed directly on the upper surface of the display panel 300, and the first electrode 131*a* and the second electrode 133*a* may be formed on the lower surface of the second base layer 120.

Figure 53:
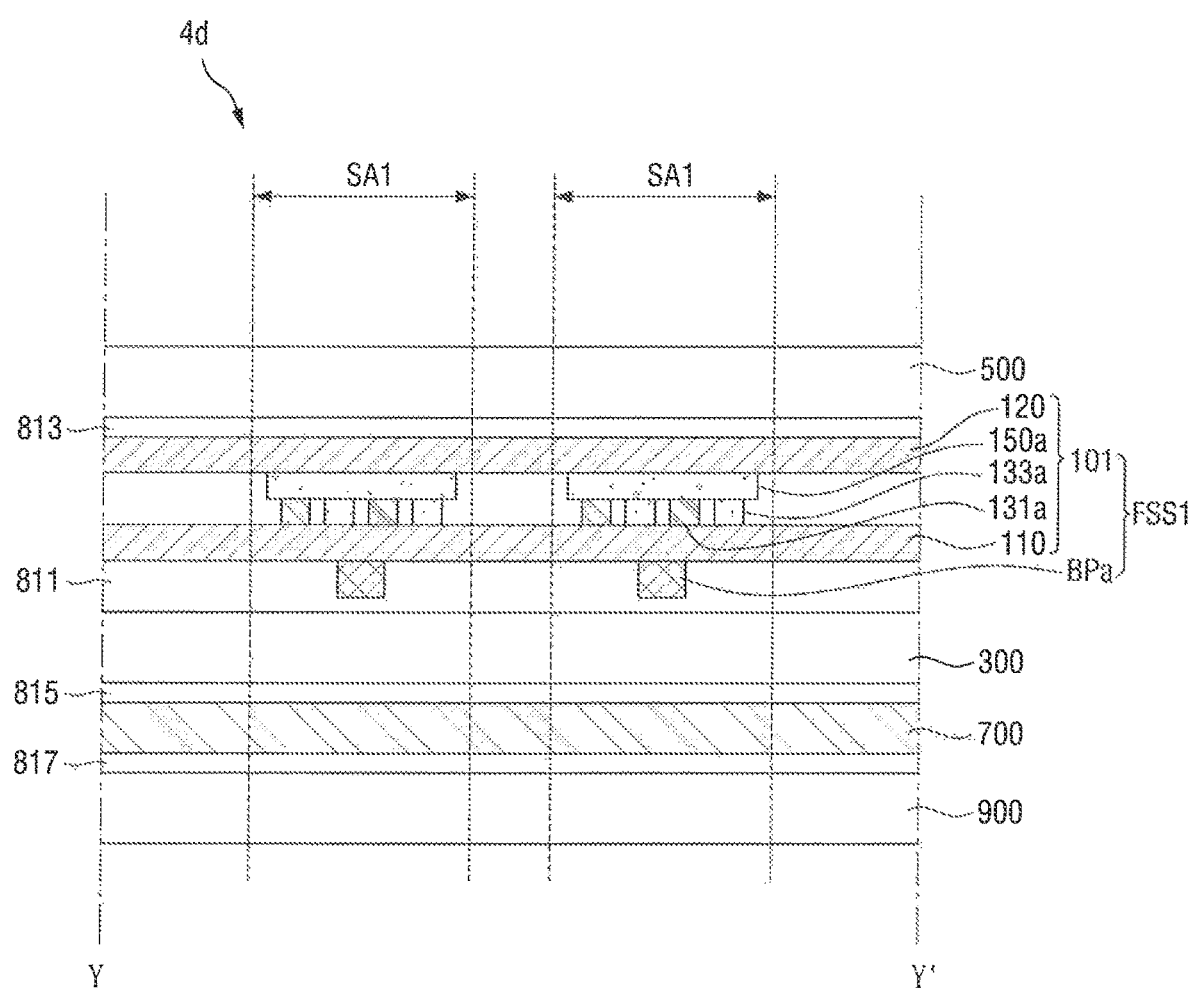
Figure 54:
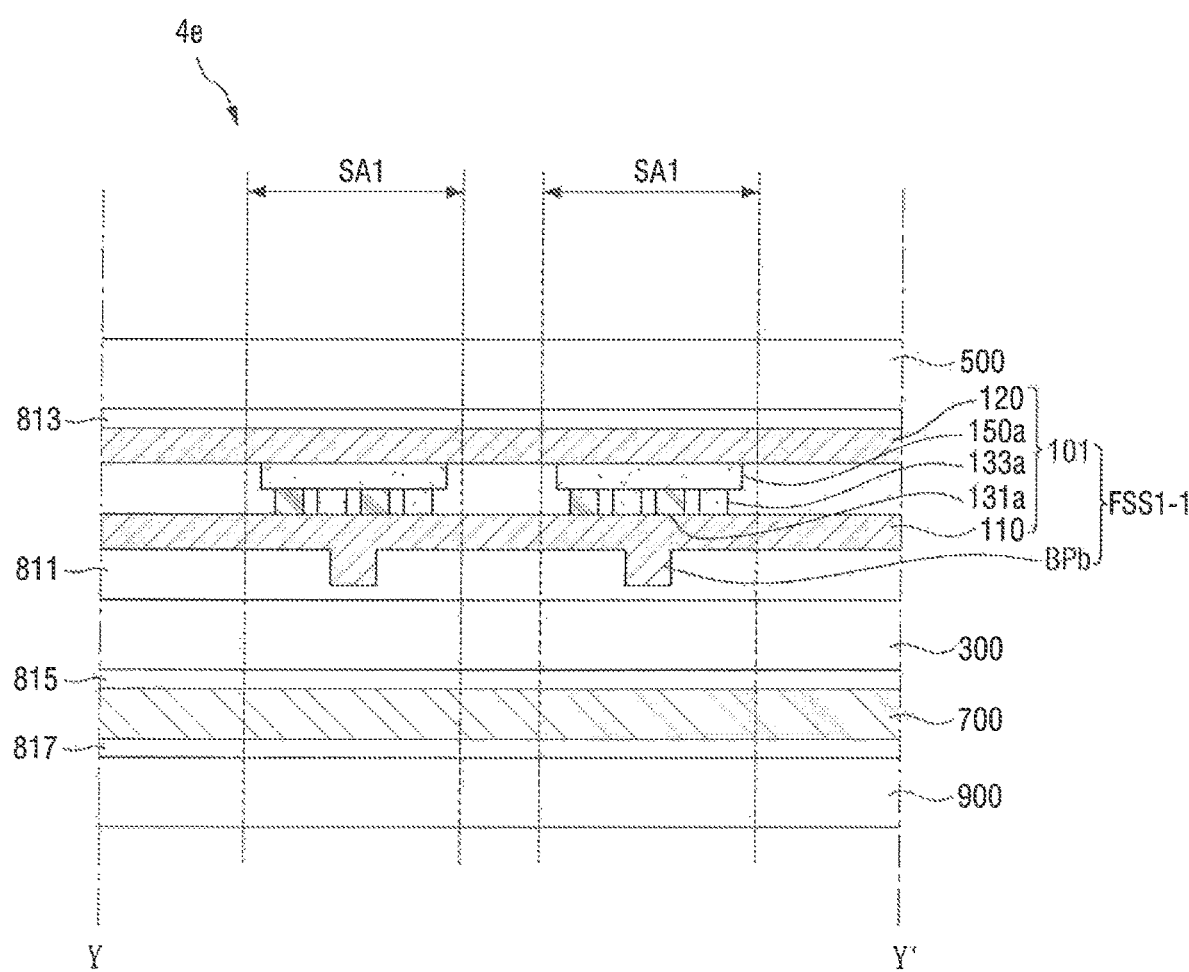
Figure 55:
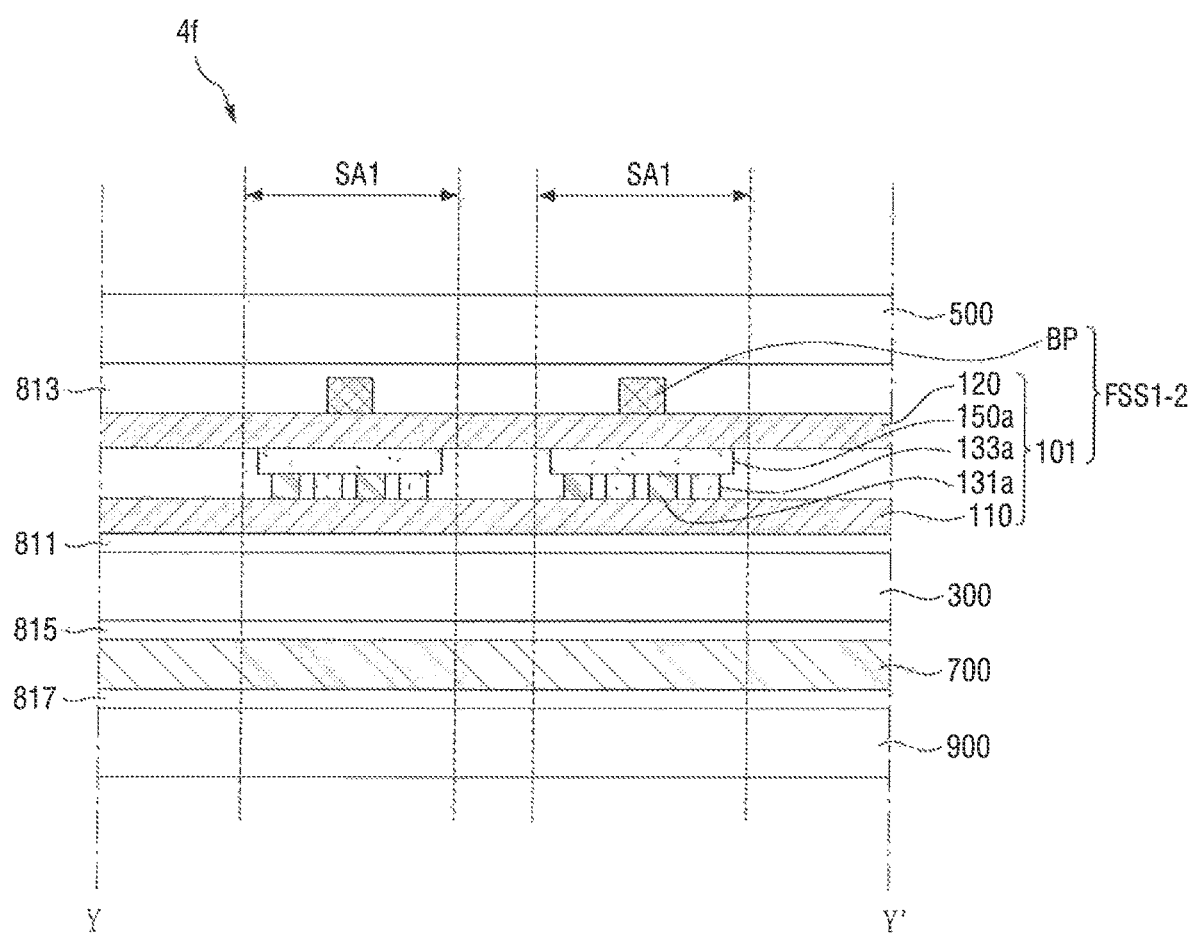
Figure 56:
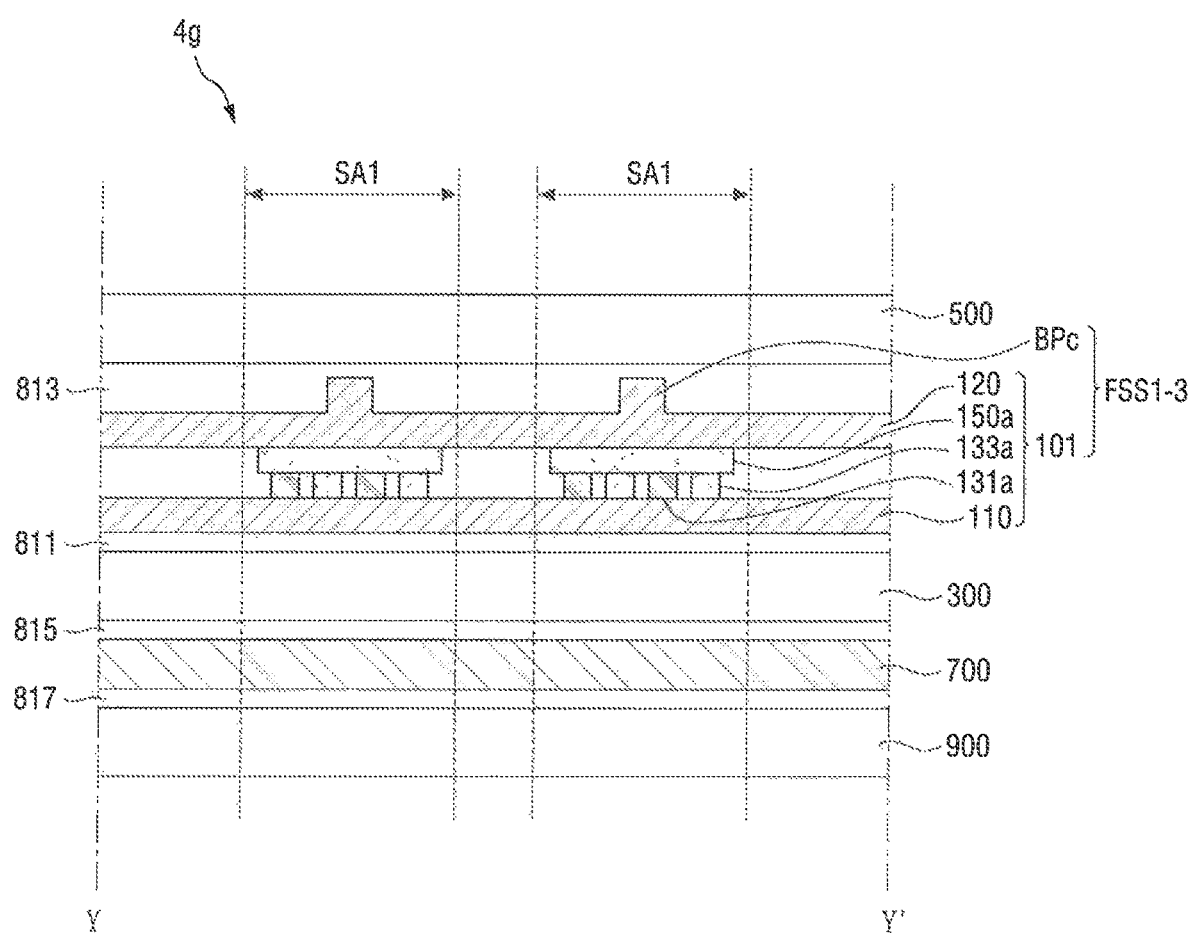

Referring to FIGS. 53, 54, 55 and 56, a display device 4*d* shown in FIG. 53 is different from the display device 3*d* shown in FIG. 39 in that the pressure sensing structure FSS1 is disposed between the display panel 300 and the window 500. Further, a display device 4*e* shown in FIG. 54 is different from the display device 3*e* shown in FIG. 40 in that the pressure sensing structure FSS1_1 is disposed between the display panel 300 and the window 500. Further, a display device 4*f* shown in FIG. 55 is different from the display device 3*h* shown in FIG. 43 in that the pressure sensing structure FSS1_2 is disposed between the display panel 300 and the window 500. Further, a display device 4*g* shown in FIG. 56 is different from the display device 3*i* shown in FIG. 44 in that the pressure sensing structure FSS1_3 is disposed between the display panel 300 and the window 500. As described above, the first electrode 131*a* and the second electrode 133*a* of the pressure sensor 101 may be made of a transparent conductive material or a metal mesh.

Figure 57:
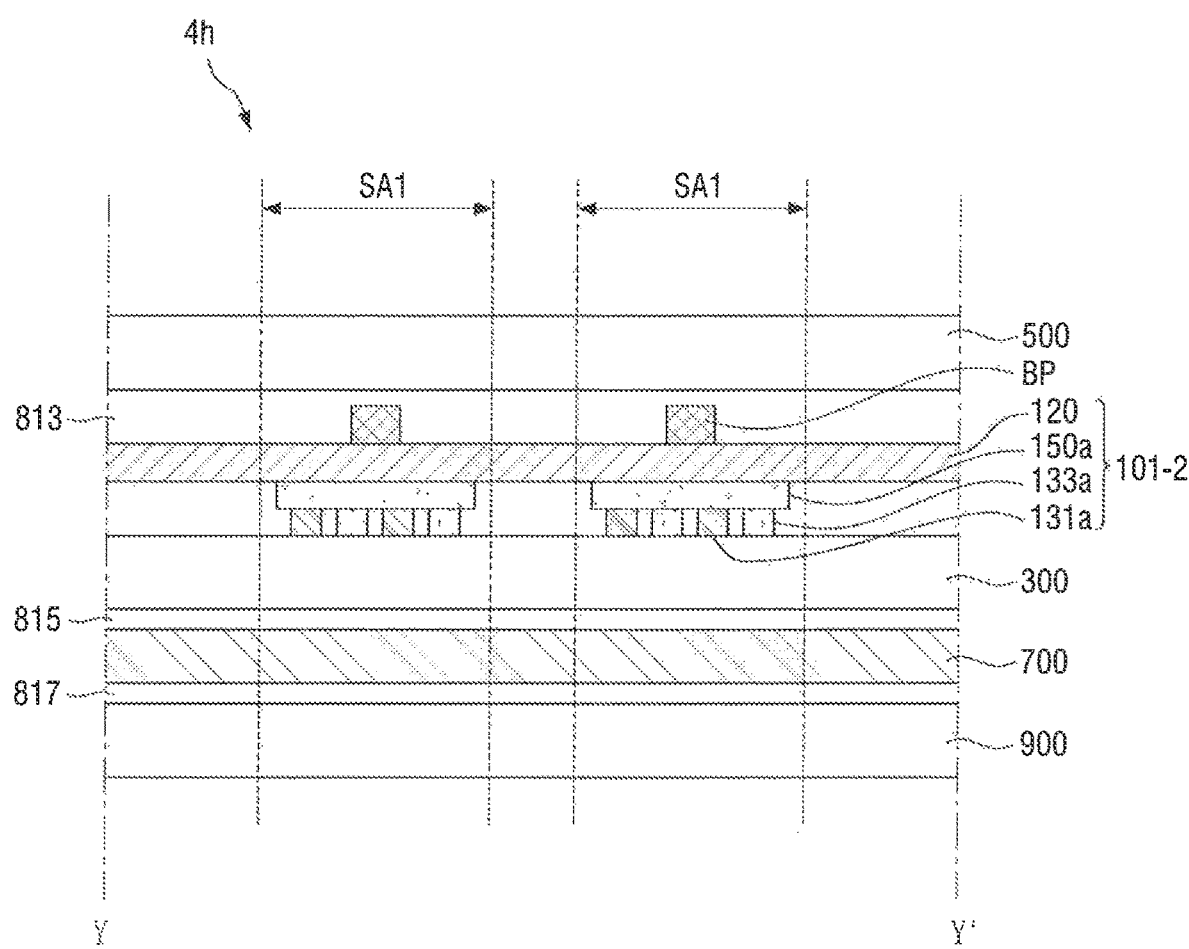
Figure 58:
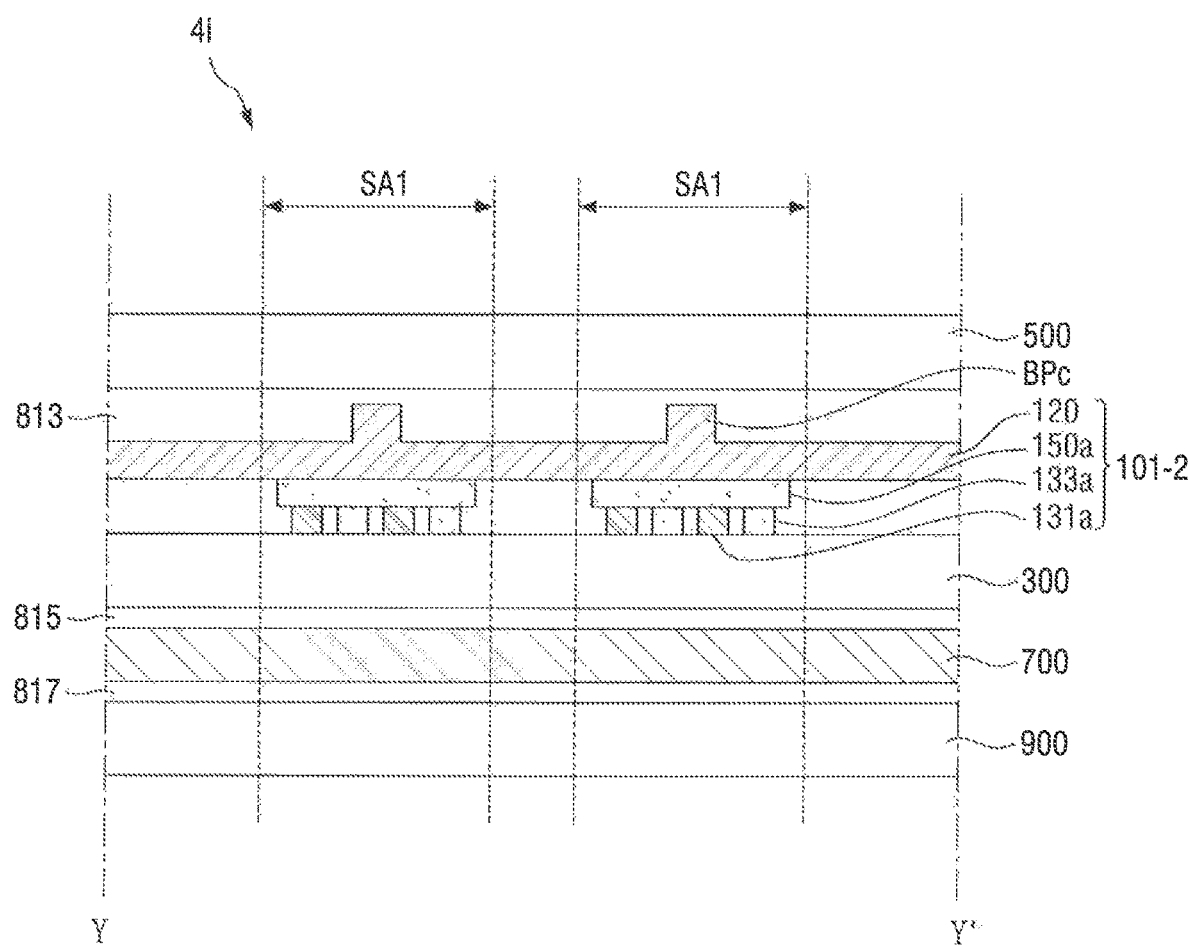

Referring to FIGS. 57 and 58, a display device 4*h* shown in FIG. 57 and a display device 4*i* shown in FIG. 58 are different from the display device 4*f* shown in FIG. 55 and the display device 4*g* shown in FIG. 56 in that the pressure sensor 101_2 does not include the first base layer 110 and the first electrode 131*a* and the second electrode 133*a* is disposed directly on the upper surface of the display panel 300, and in that the intermediate bonding layer 811 is omitted, and other configurations of the display devices 4*h* and 4*i* are substantially the same as or similar to those of the display devices 4*f* and 4*g*.

Figure 59:
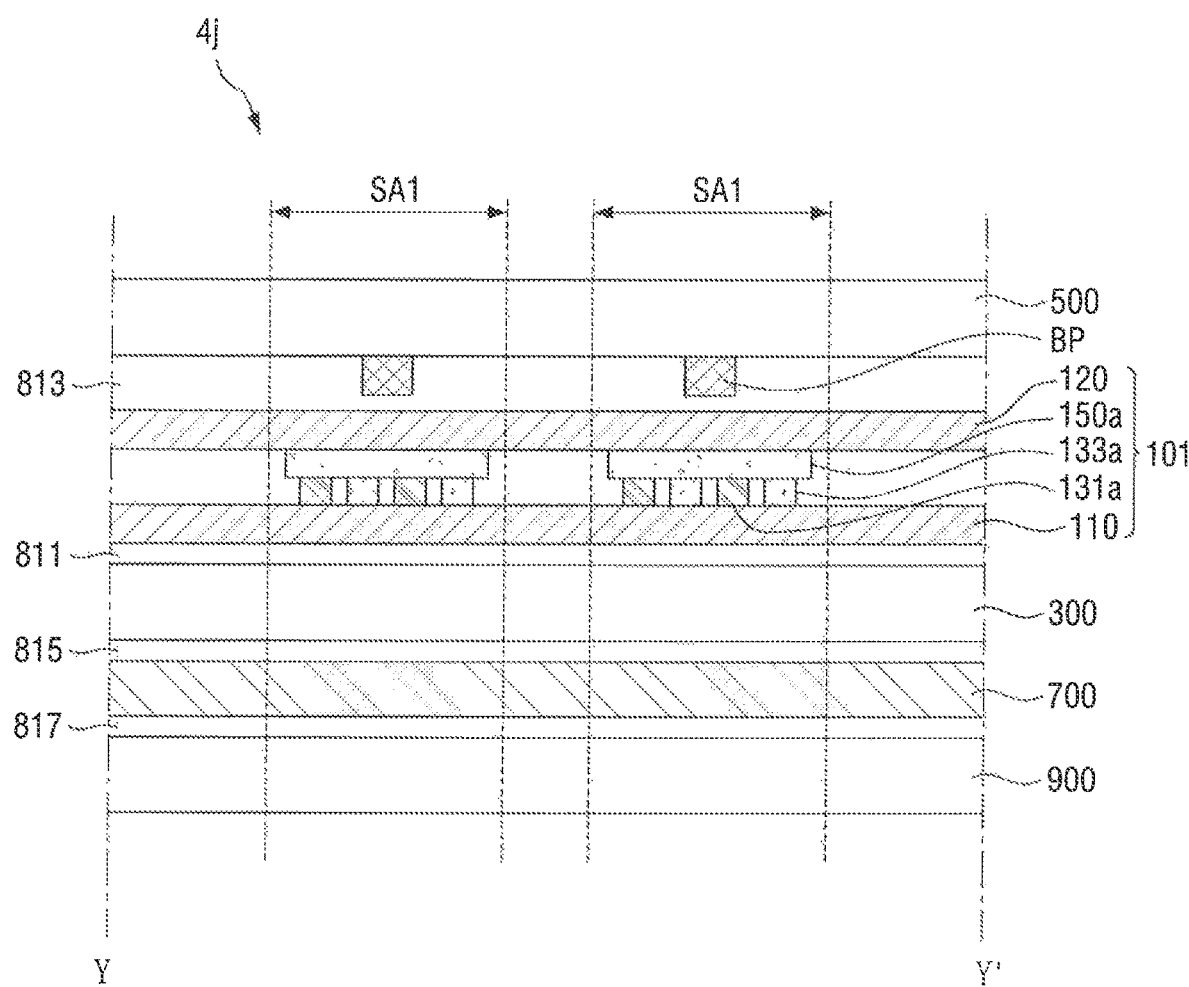
Figure 60:
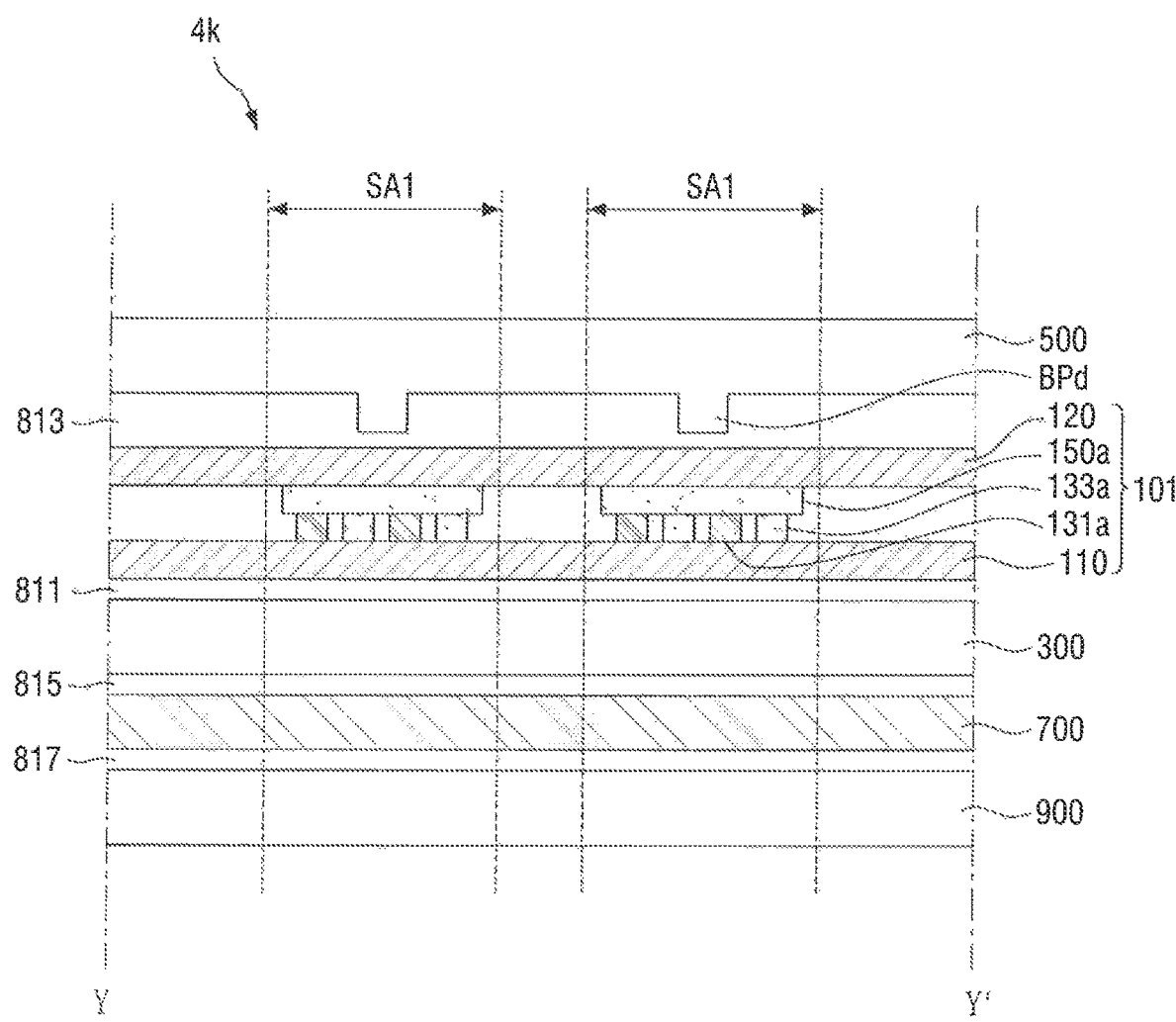

Referring to FIGS. 59 and 60, a display device 4*j* shown in FIG. 59 and a display device 4*k* shown in FIG. 60 are different from the display device 3*j* shown in FIG. 55 and the display device 3*k* shown in FIG. 46 in that the pressure sensor 101 is disposed between the display panel 300 and the window 500, and other configurations of the display devices 4*j* and 4*k* are substantially the same as or similar to those of the display devices 3*j* and 3*k*. As described above, the first electrode 131*a* and the second electrode 133*a* of the pressure sensor 101 may be made of a transparent conductive material or a metal mesh.

Figure 61:
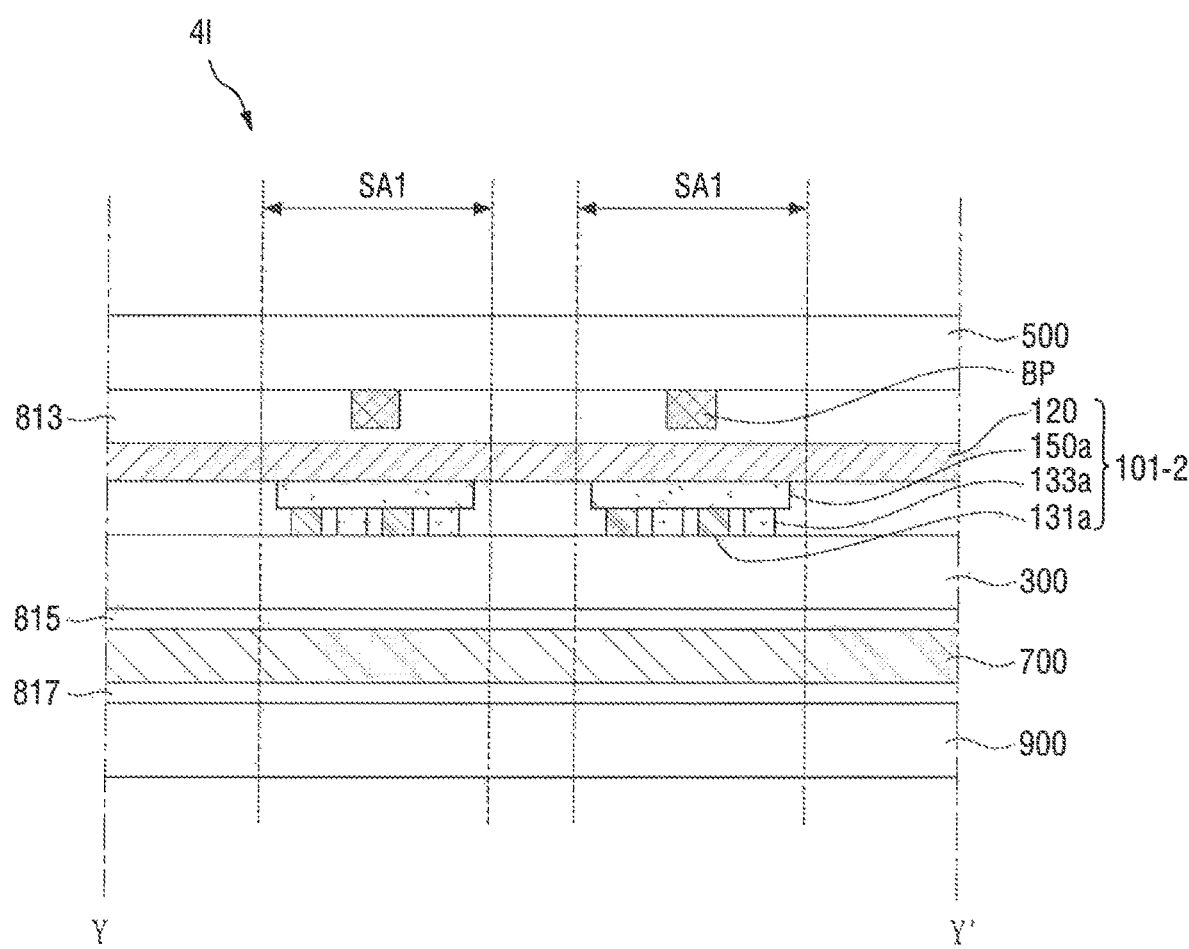

Referring to FIGS. 61 and 62, a display device 4*l* shown in FIG. 61 and a display device 4*m* shown in FIG. 62 are different from the display device 4*j* shown in FIG. 59 and the display device 4*k* shown in FIG. 60 in that the pressure sensor 101_2 does not include the first base layer 110 and the first electrode 131*a* and the second electrode 133*a* is disposed directly on the upper surface of the display panel 300, and in that the intermediate bonding layer 811 is omitted, and other configurations of the display devices 4*l* and 4*m* are substantially the same as or similar to those of the display devices 4*j* and 4*k*.

Referring to FIGS. 63A to 63C, a display device 5 is different from the display device 3 shown in FIGS. 33 to 35 in that the pressure sensor 102 does not include the second base layer 120, the pressure sensing layer 150*a* is disposed on one surface of the first base layer 110 and covers a part of the first electrode 131*a* and a part of the second electrode 133*a* such as the first branch electrode 1313 and the second branch electrode 1333, and a part of the pressure sensing layer 150*a* contacts the first base layer 110, and other configurations of the display device 5 and 4*m* are substantially the same as or similar to those of the display device 3.

In some exemplary embodiments of the present disclosure, the laminate structure of the pressure sensor 102 may be modified as shown in FIG. 63C. For example, the pressure sensor 102 may be modified into a structure in which the pressure sensing layer 150*a* is disposed on one surface of the first base layer 110 and a part of the first electrode 131*a* and a part of the second electrode 133*a* are disposed on the pressure sensing layer 150*a*. Hereinafter, for the convenience of explanation, a structure in which the first electrode 131*a* and the second electrode 133*a* are disposed on the first base layer 110 and the pressure sensing layer 150*a* covers a part of the first electrode 131*a* and a part the second electrode 133*a* such as the first branch electrode 1313 and the second branch electrode 1333 will be described as reference, but the present invention is not limited thereto.

Figure 64:
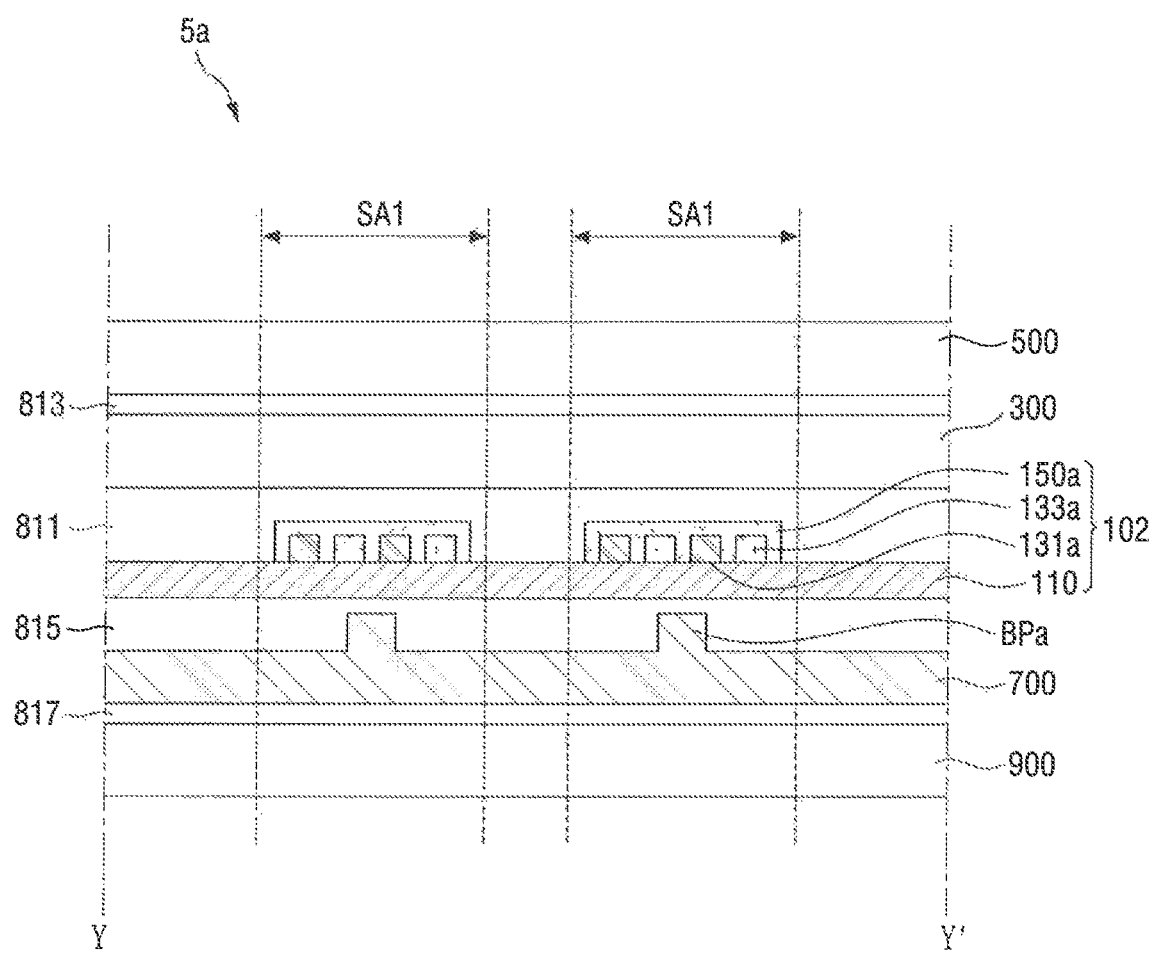
FIGS. 64 to 92 are cross-sectional views illustrating display devices according to exemplary embodiments of the present disclosure taken along the line Y-Y' in FIG. 33.

Referring to FIG. 64, a display device 5*a* is different from the display device 3*a* shown in FIG. 36 in that the display device 5*a* includes the above-mentioned pressure sensor 102 shown in FIGS. 63A to 63C, and other configurations of the display device 5*a* are substantially the same as or similar to those of the display devices 3*a*.

Figure 65:
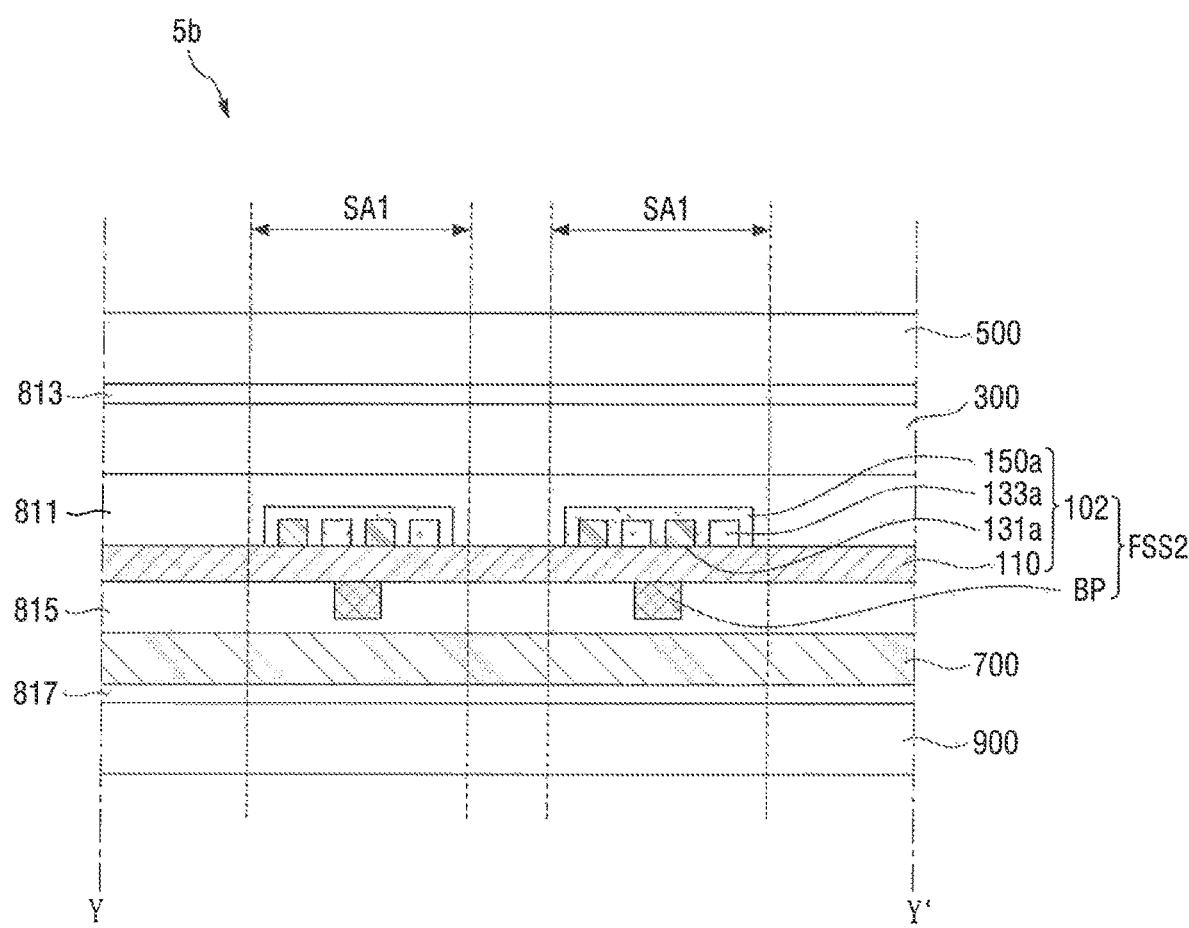

Referring to FIG. 65, a display device 5*b* is different from the display device 5 shown in FIG. 63A in that the pressure concentration bump BP is coupled with the lower surface of the first base layer 110, and thus the pressure concentration bump BP and the pressure sensor 102 form the pressure sensor structure FSS2.

Figure 66:
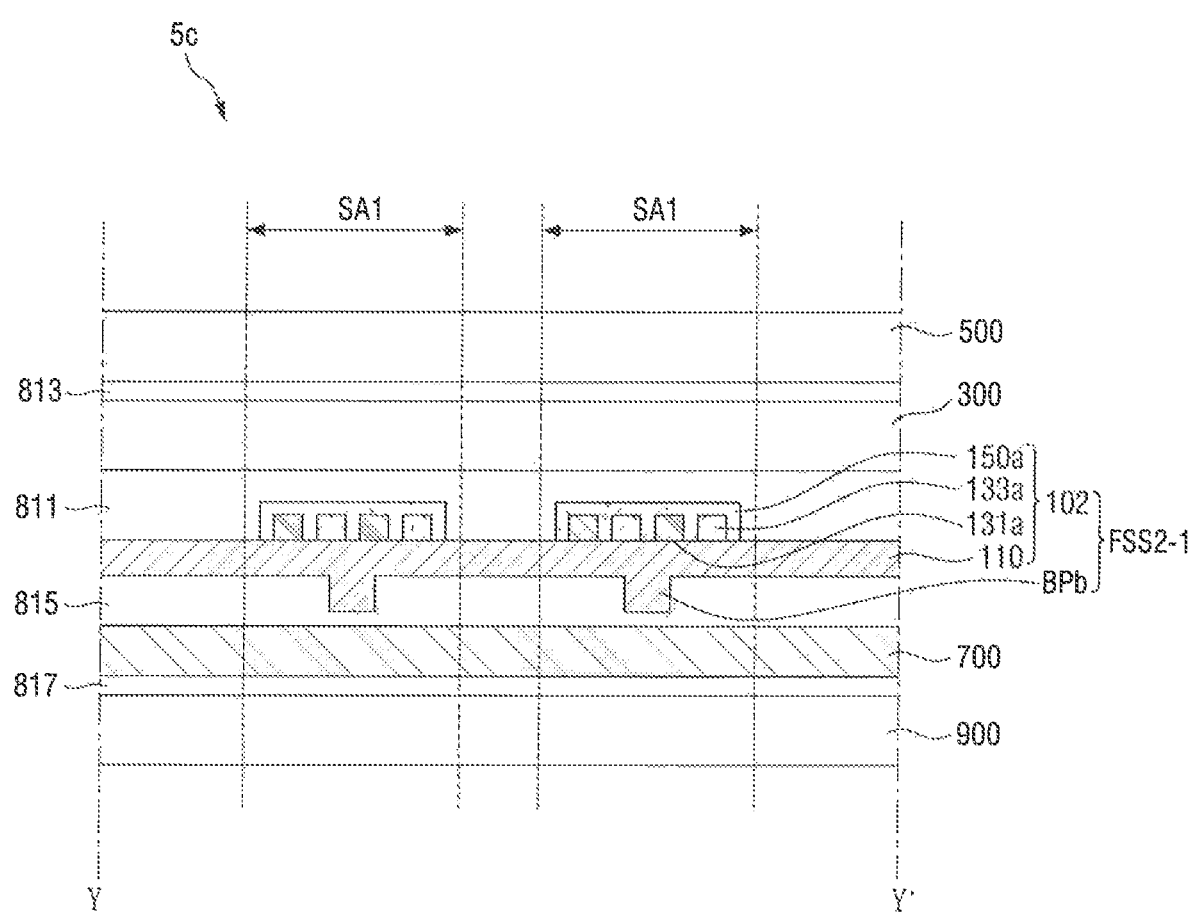

Referring to FIG. 66, a display device 5*c* is different from the display device 5*b* shown in FIG. 65 in that the pressure concentration bump BPb of the pressure sensor structure FSS2_1 is integrated with the first base layer 110 and is made of the same material as the first base layer 110.

Figure 67:
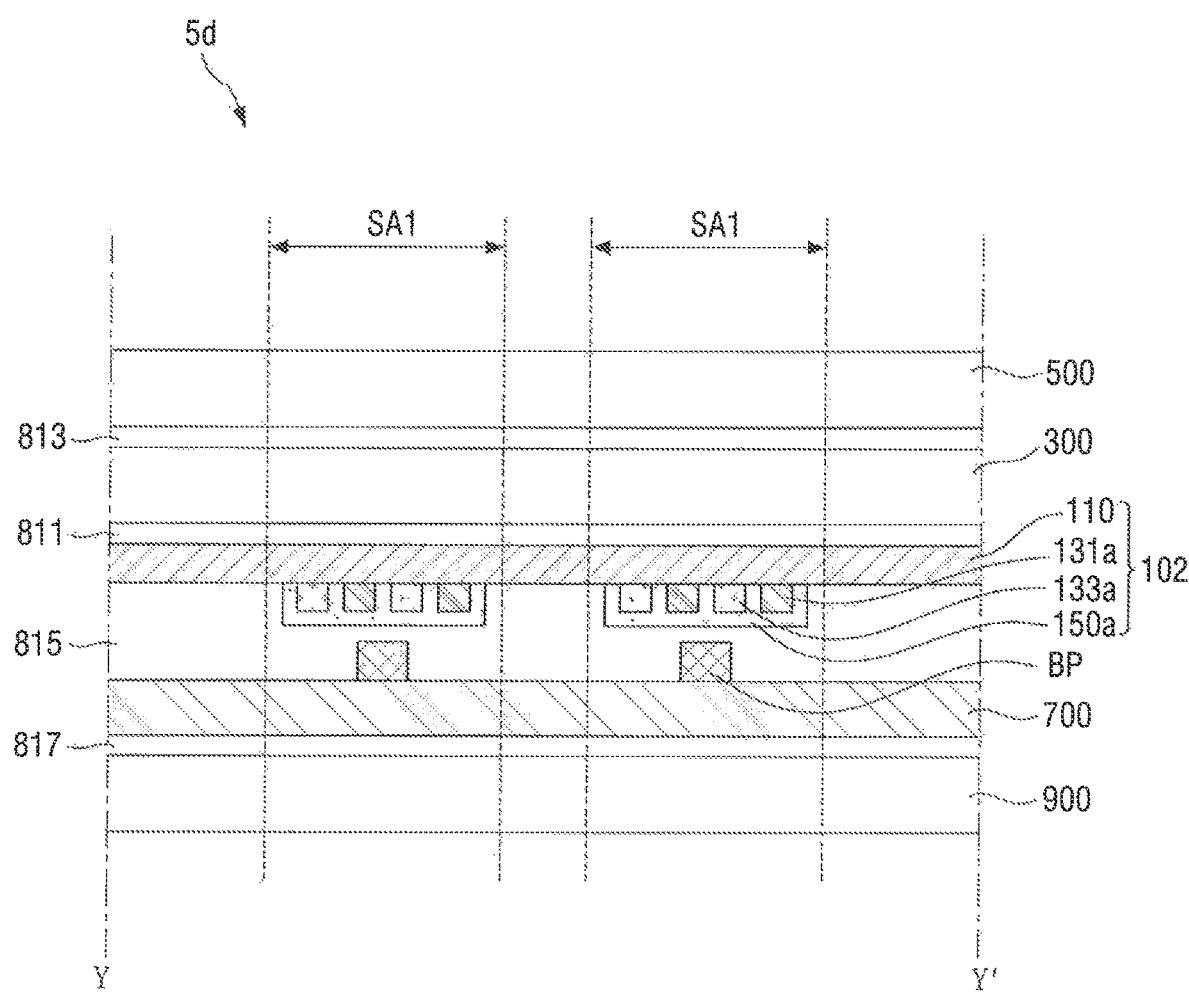
Figure 68:
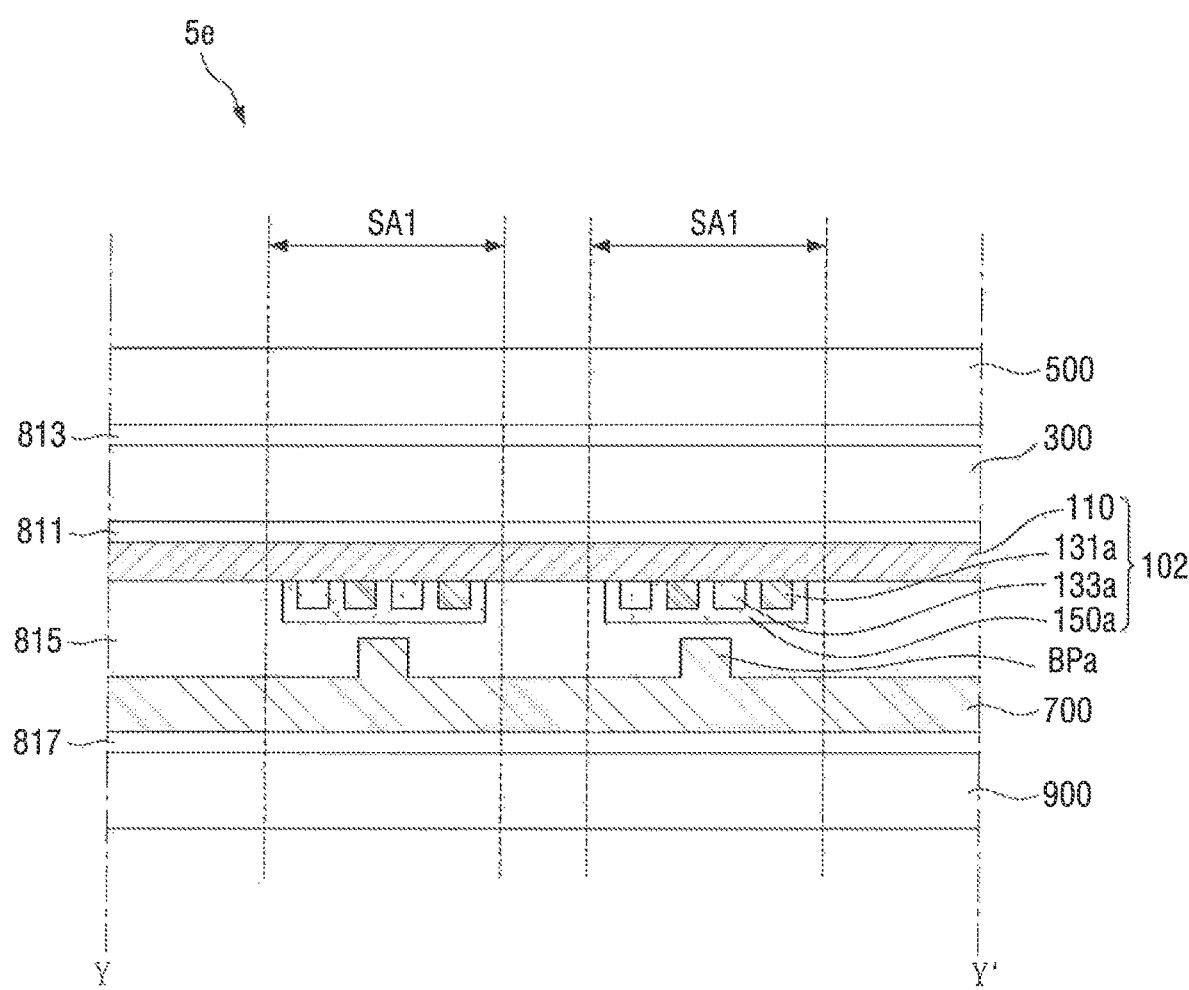
Figure 69:
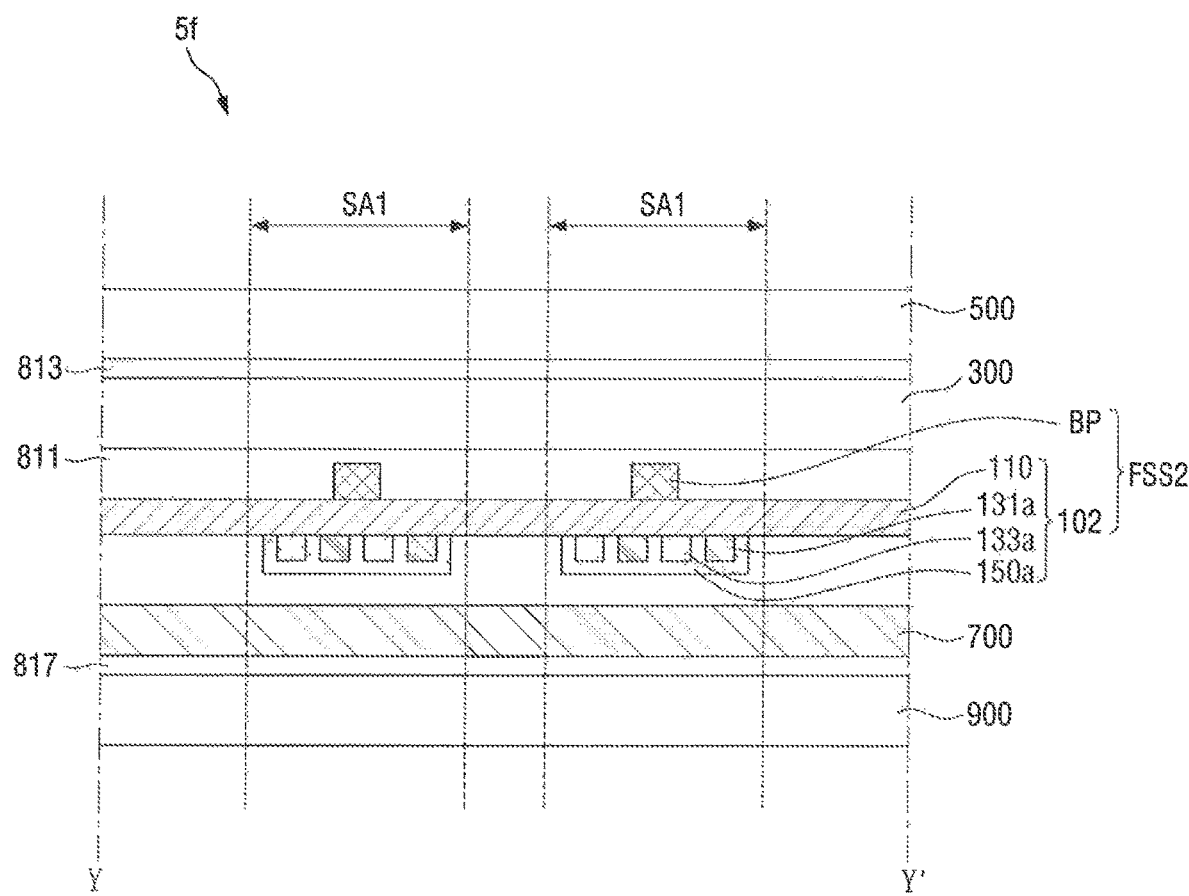
Figure 70:
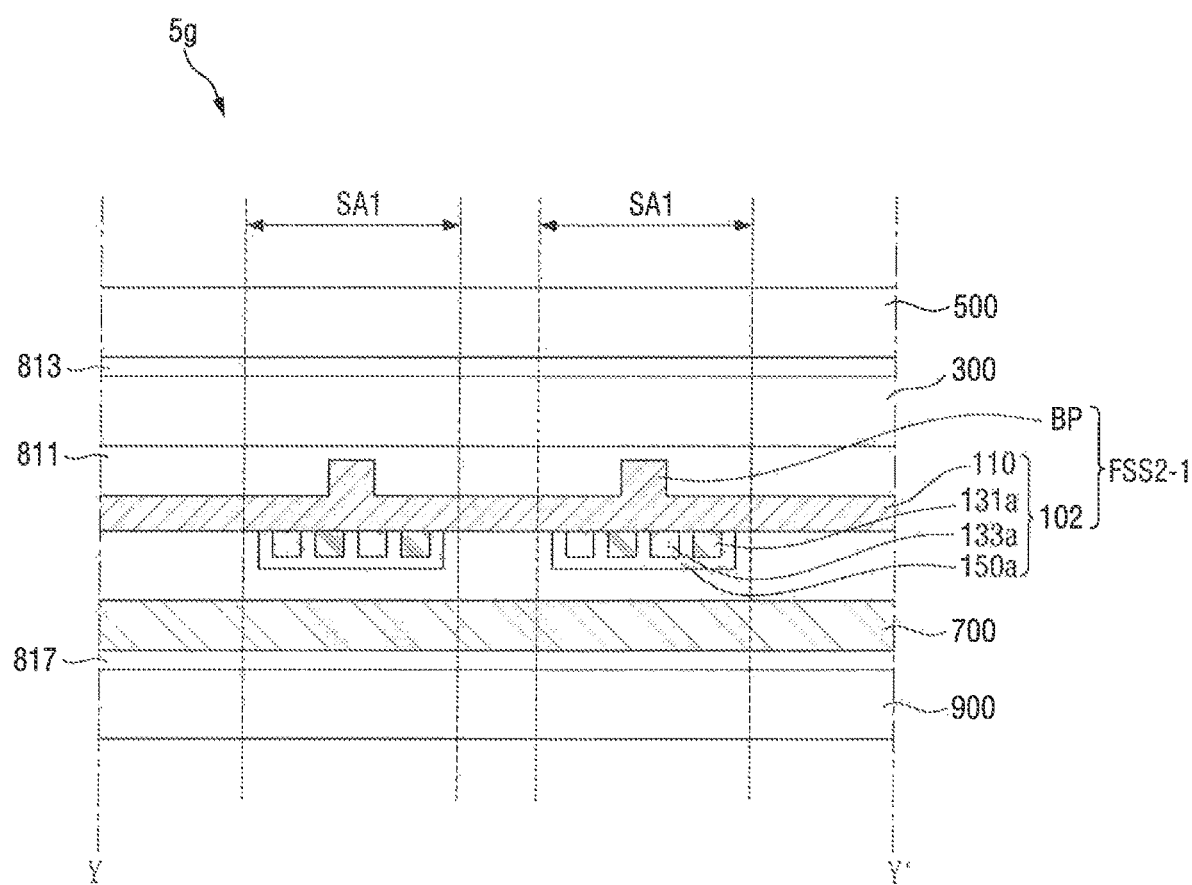

Referring to FIGS. 67, 68, 69 and 70, a display device 5*d* shown in FIG. 67, a display device 5*e* shown in FIG. 68, a display device 5*f* shown in FIG. 69, and a display device 5*g* shown in FIG. 70 are different from the display device 5 of FIG. 63A, the display device 5*a* of FIG. 64, the display device 5*b* of FIG. 65, and the display device 5*c* of FIG. 66 in that the pressure sensor 102 is disposed such that the first base layer 110 is located between the first electrode 131*a* and the display panel 300 and between the second electrode 133*a* and the display panel 300.

Figure 71:
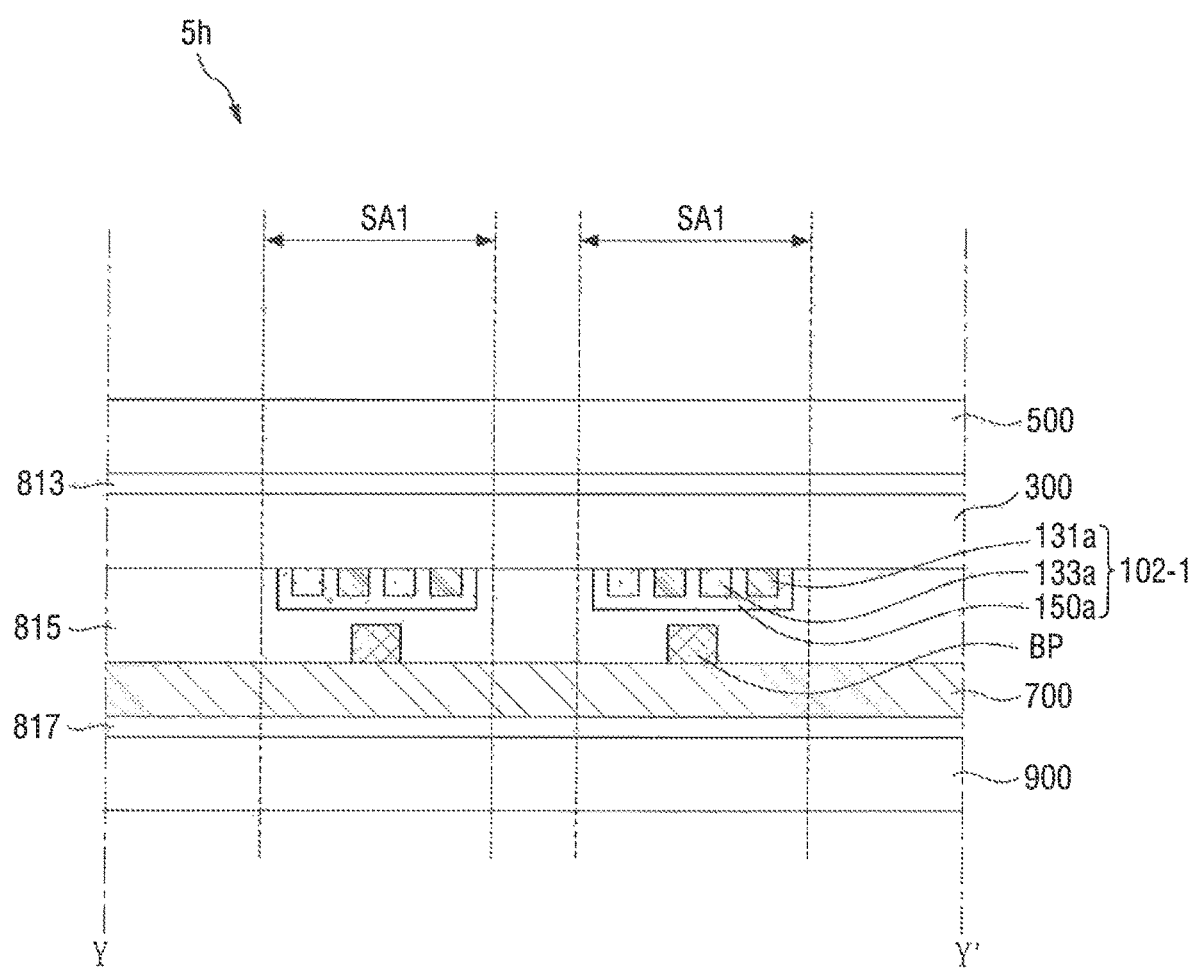
Figure 72:
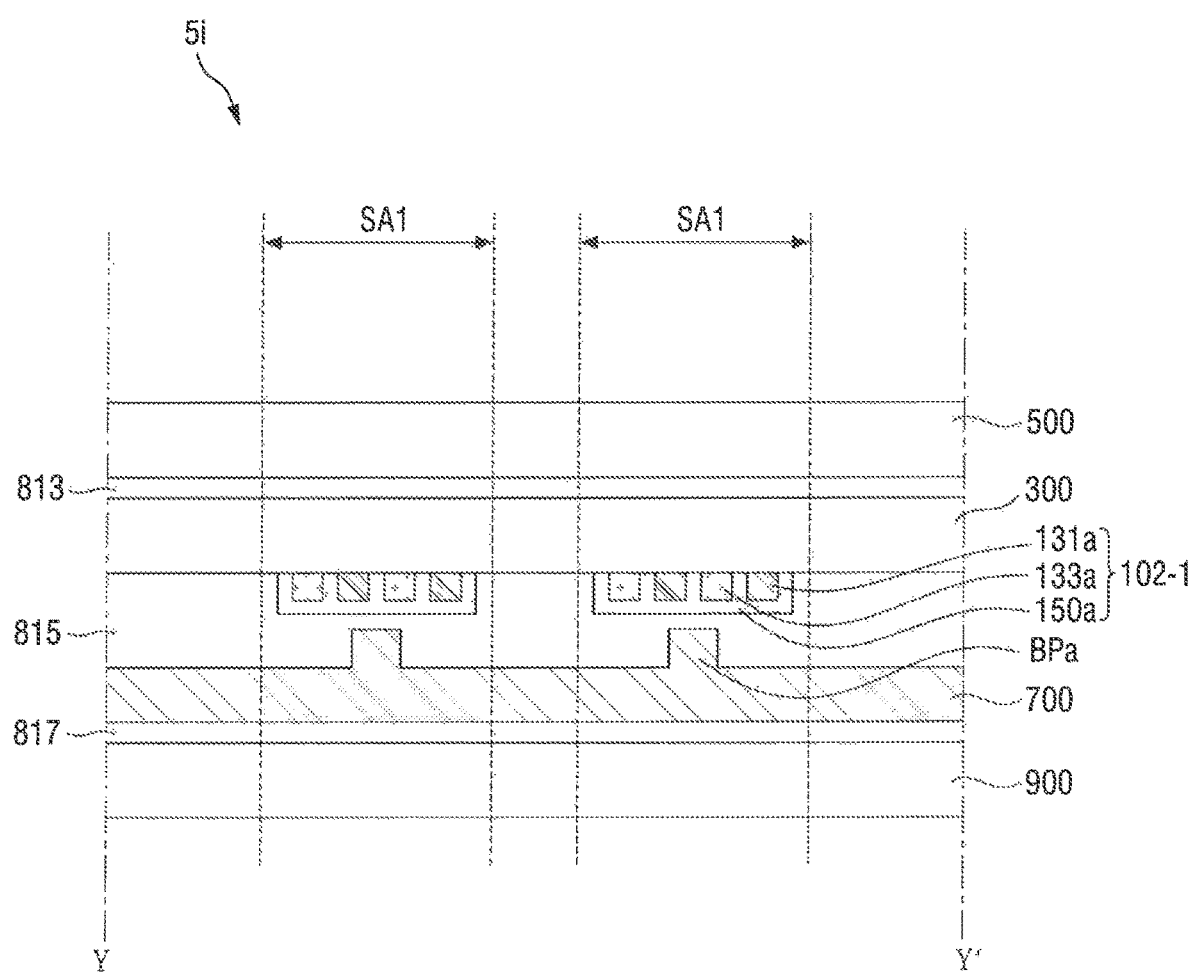

Referring to FIGS. 71 and 72, a display device 5*h* shown in FIG. 71 and a display device 5*i* shown in FIG. 72 are different from the display device 5*d* shown in FIG. 67 and the display device 5*e* shown in FIG. 68 in that the pressure sensor 102_1 does not include the first base layer 110, the first electrode 131*a*, the second electrode 133*a*, and the pressure sensing layer 150*a* are disposed directly on the lower surface of the display panel 300, and the intermediate bonding layer 811 is omitted, and other configurations of the display devices 5*h* and 5*i* are substantially the same as or similar to those of the display devices 5*d* and 5*e*.

Figure 73:
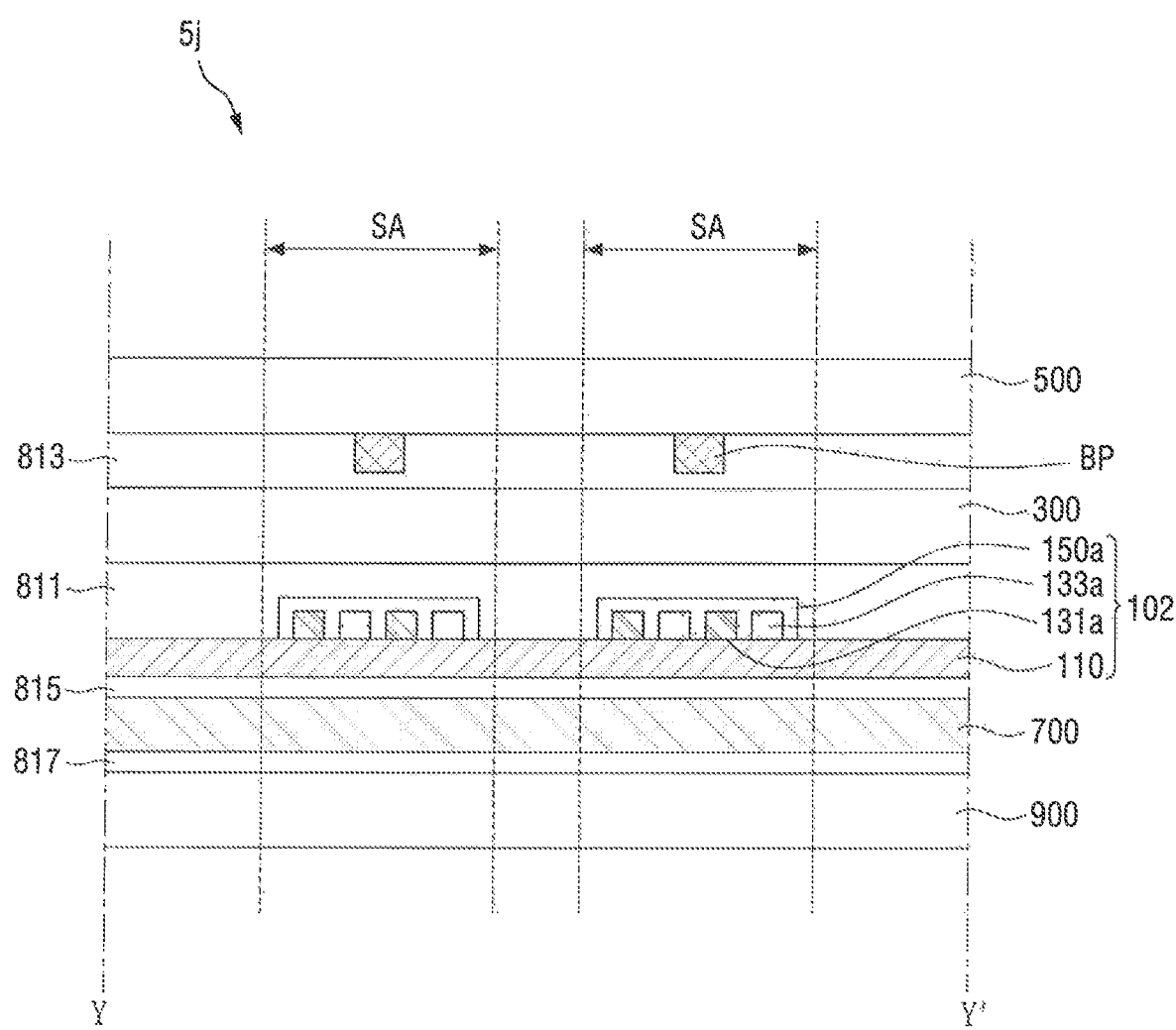

Referring to FIG. 73, a display device 5*j* is different from the display device 5 shown in FIG. 63A in that the pressure concentration bump BP is disposed between the display panel 300 and the window 500 and is coupled with the lower surface of the window 500 facing the display panel, and other configurations of the display device 5*j* are substantially the same as or similar to those of the display devices 5.

Figure 74:
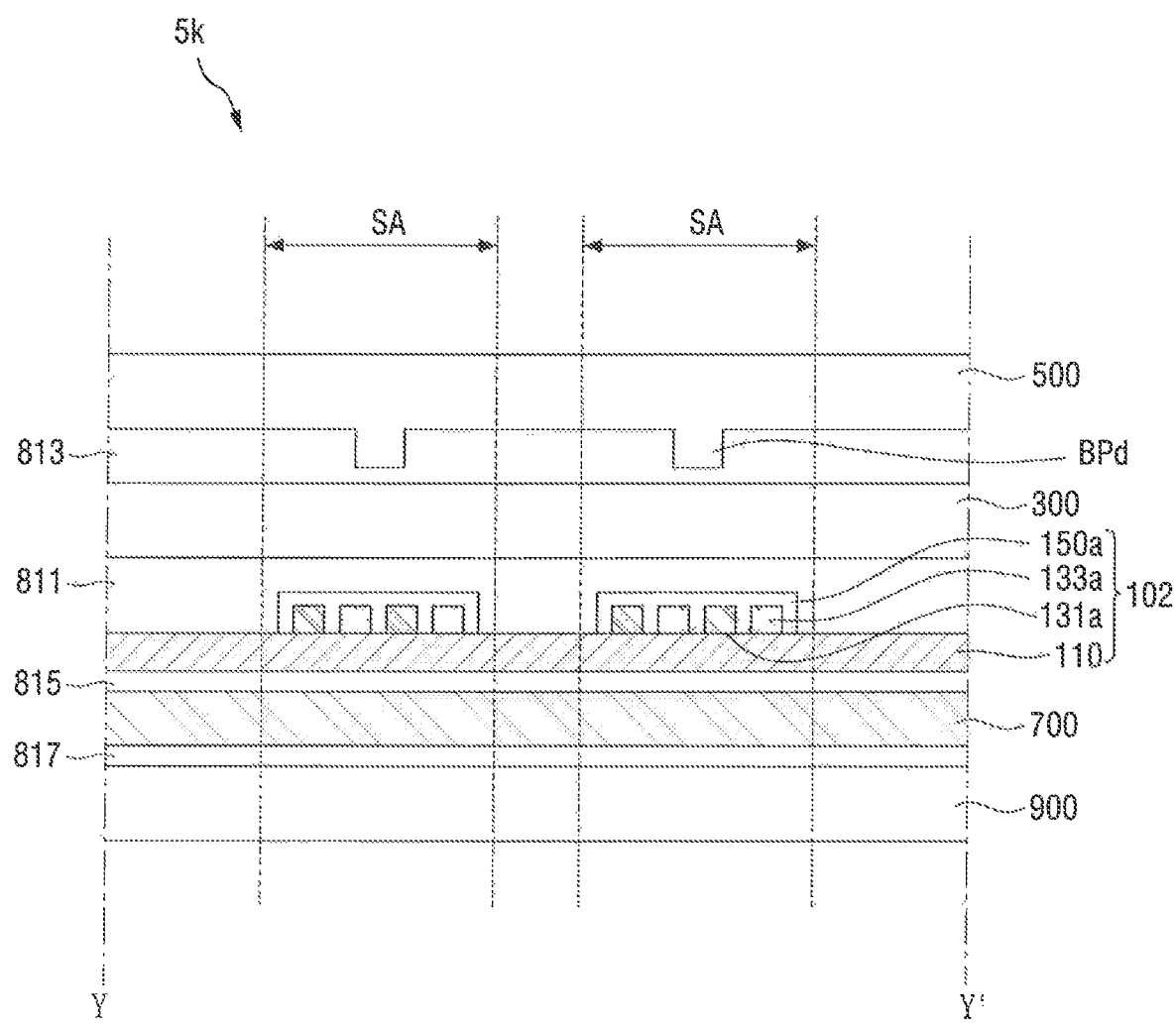

Referring to FIG. 74, a display device 5*k* is different from the display device 5*j* shown in FIG. 73 in that the pressure concentration bump BP is integrated with the window 500 and is made of the same material as the window 500.

Figure 75:
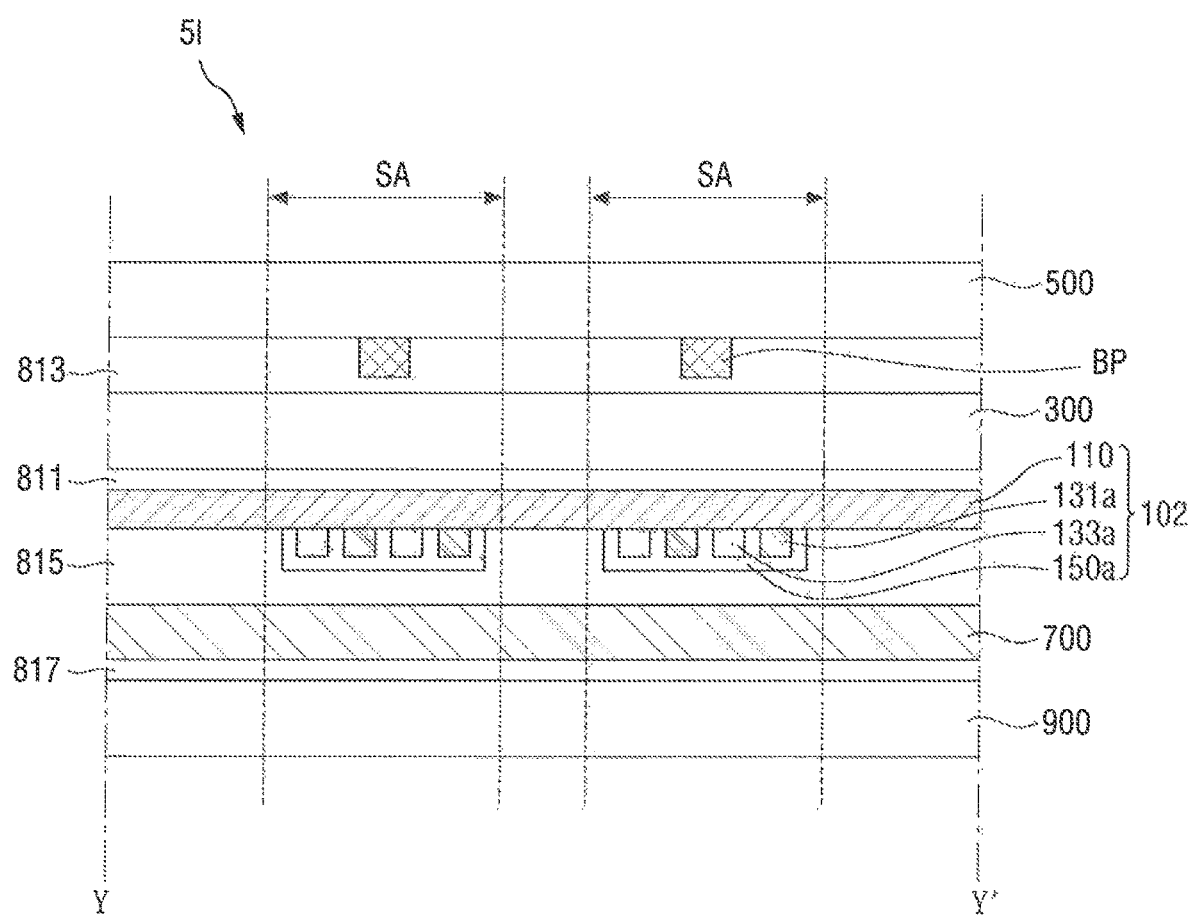
Figure 76:
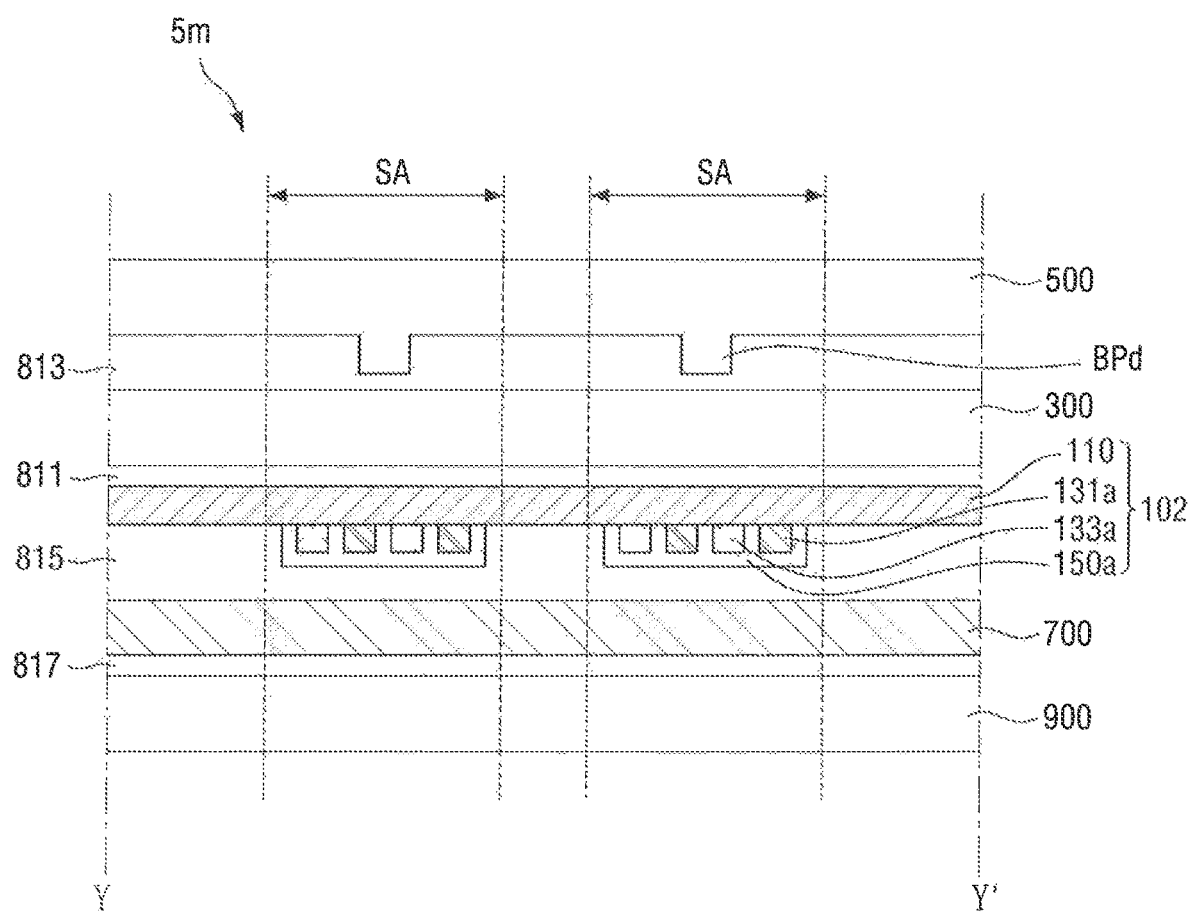

Referring to FIGS. 75 and 76, a display device 5*l* shown in FIG. 75 and a display device 5*m* shown in FIG. 76 are different from the display device 5*j* of FIG. 73 and the display device 5*k* of FIG. 74 in that the pressure sensor 102 is disposed such that the first base layer 110 is located between the first electrode 131*a* and the display panel 300 and between the second electrode 133*a* and the display panel 300.

Figure 77:
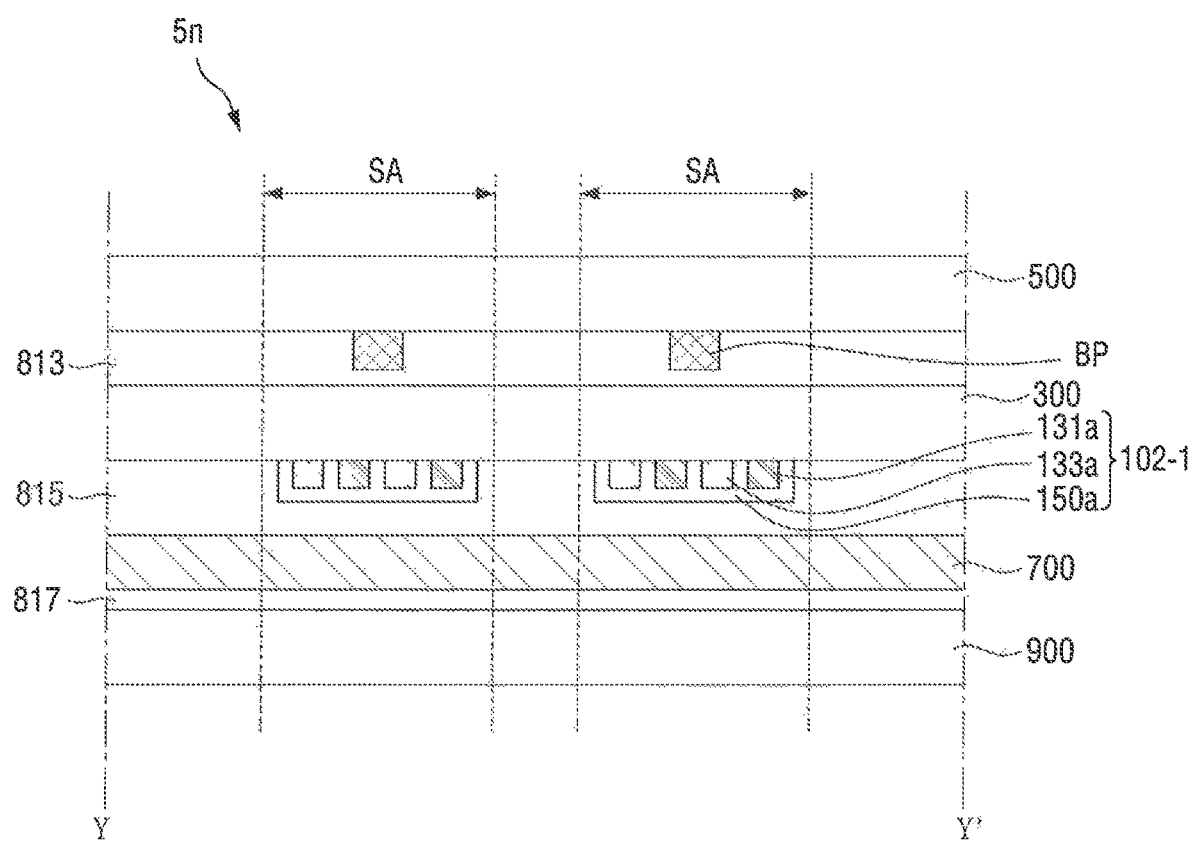
Figure 78:
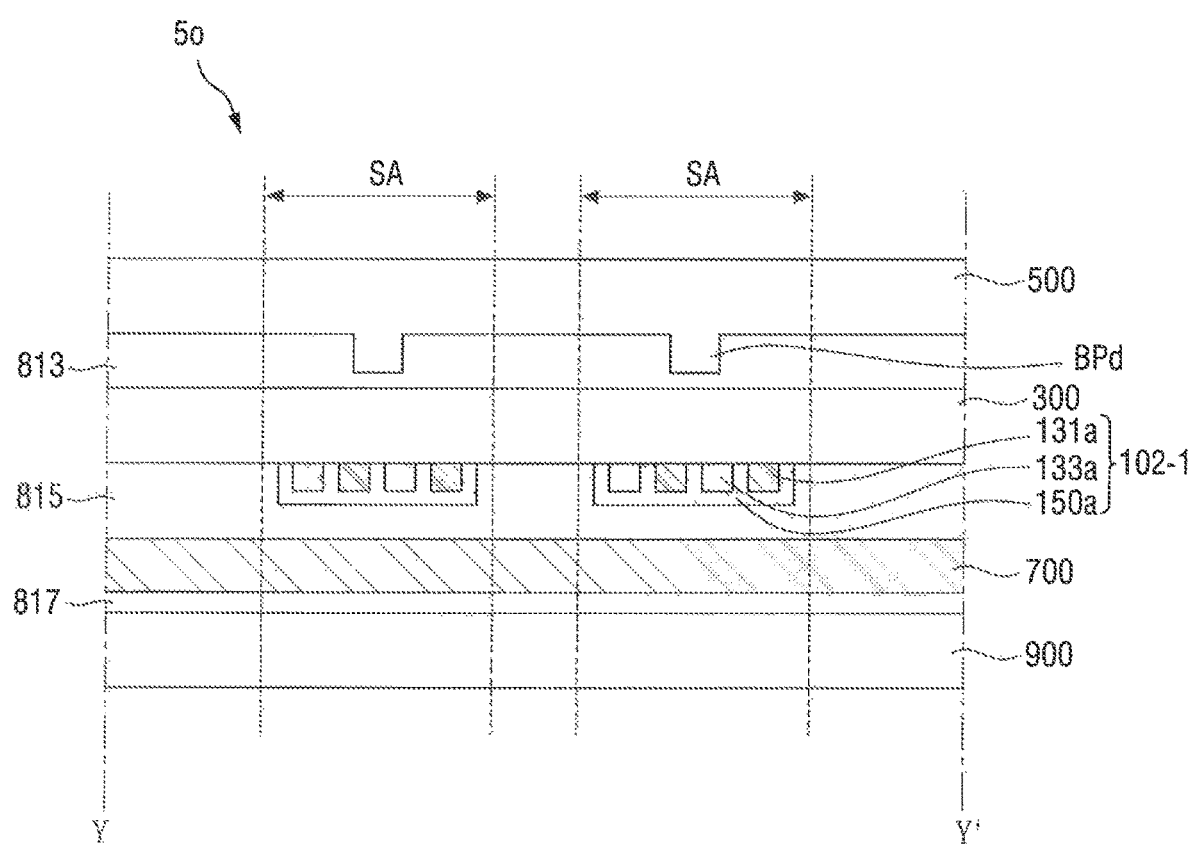

Referring to FIGS. 77 and 78, a display device 5*n* shown in FIG. 77 and a display device 5*o* shown in FIG. 78 are different from the display device 5*j* shown in FIG. 73 and the display device 5*k* shown in FIG. 74 in that the pressure sensor 102_1 does not include the first base layer 110, the first electrode 131*a*, the second electrode 133*a*, and the pressure sensing layer 150*a* are disposed directly on the lower surface of the display panel 300, and the intermediate bonding layer 811 is omitted.

Figure 79:
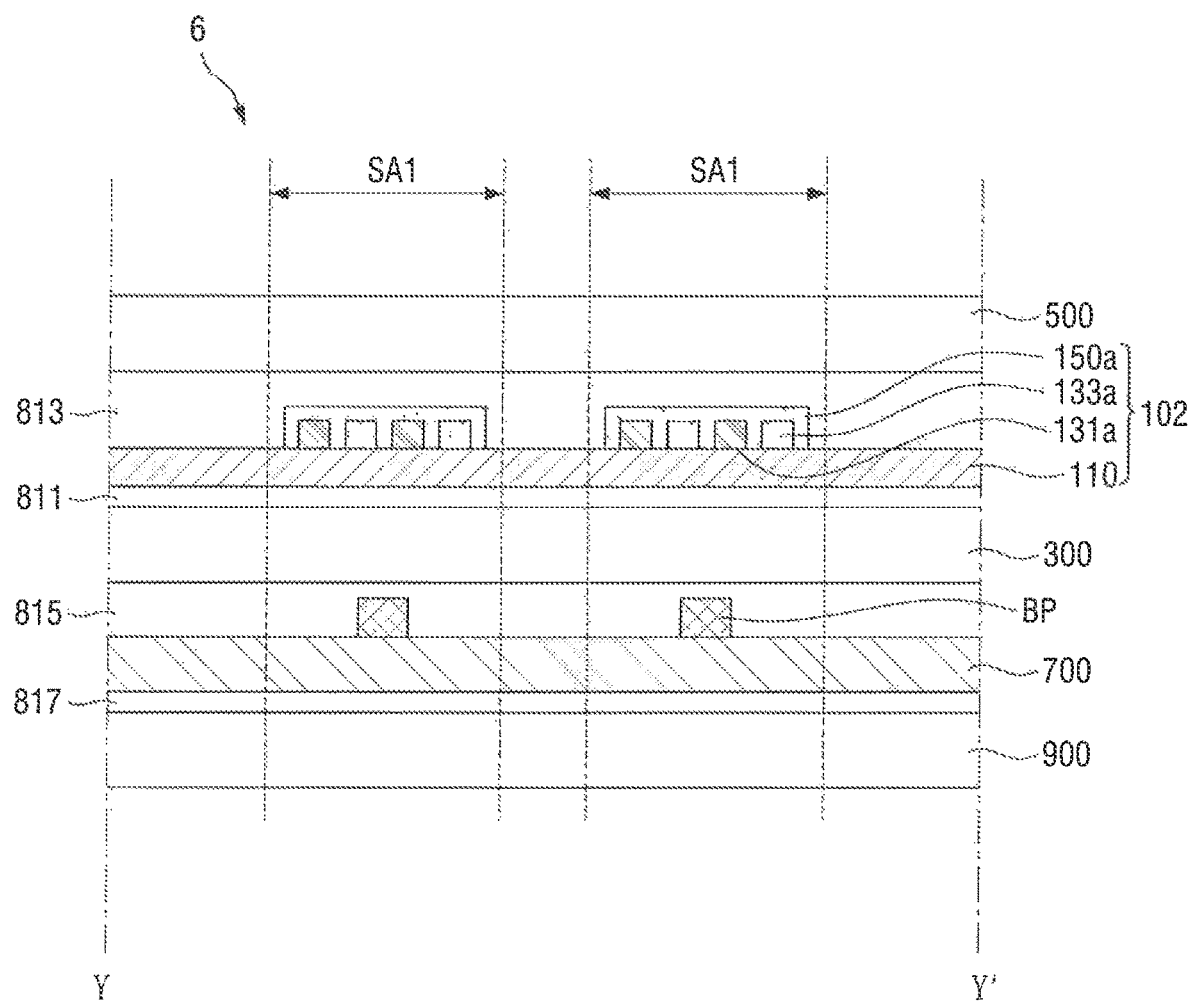
Figure 80:
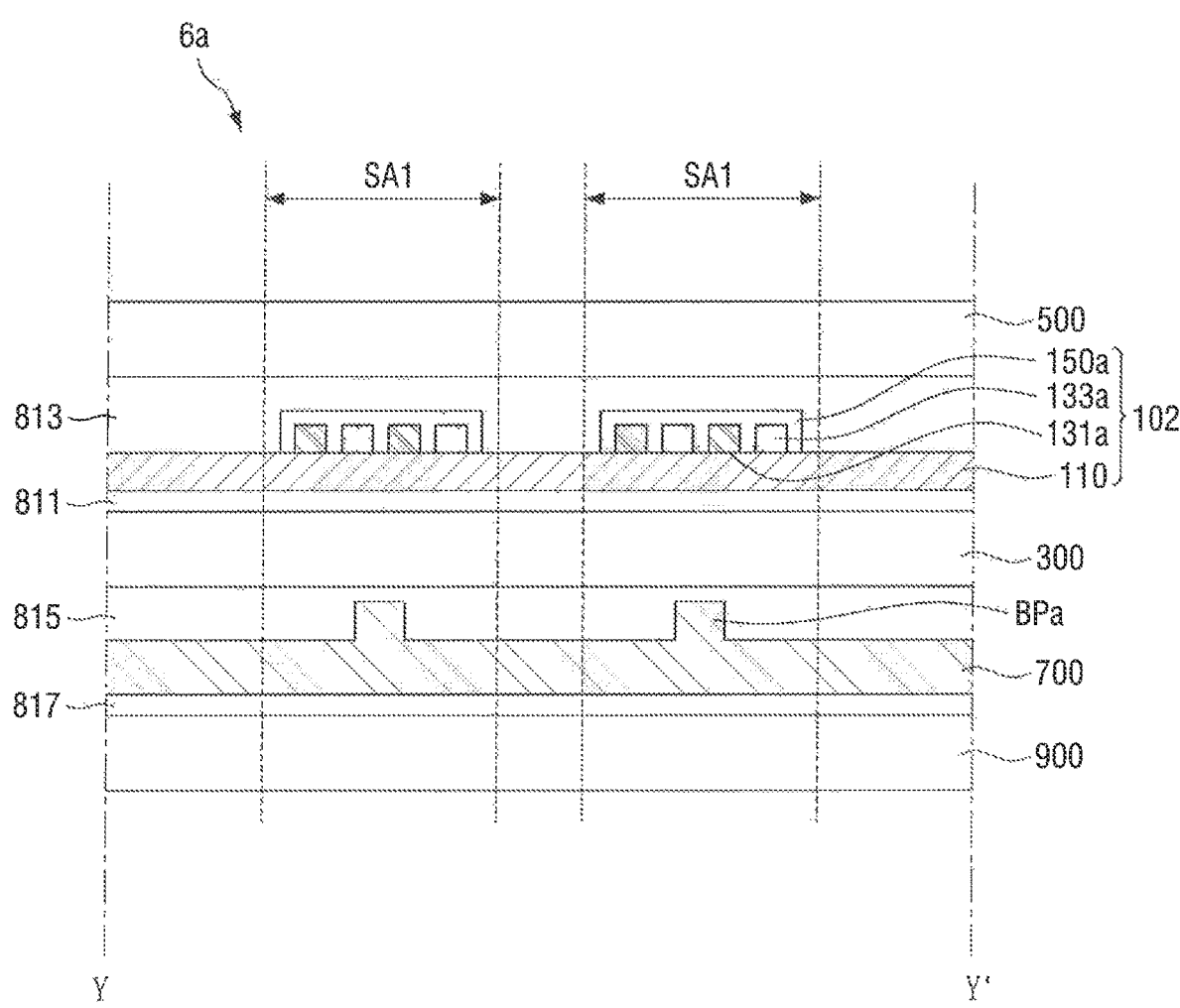
Figure 81:
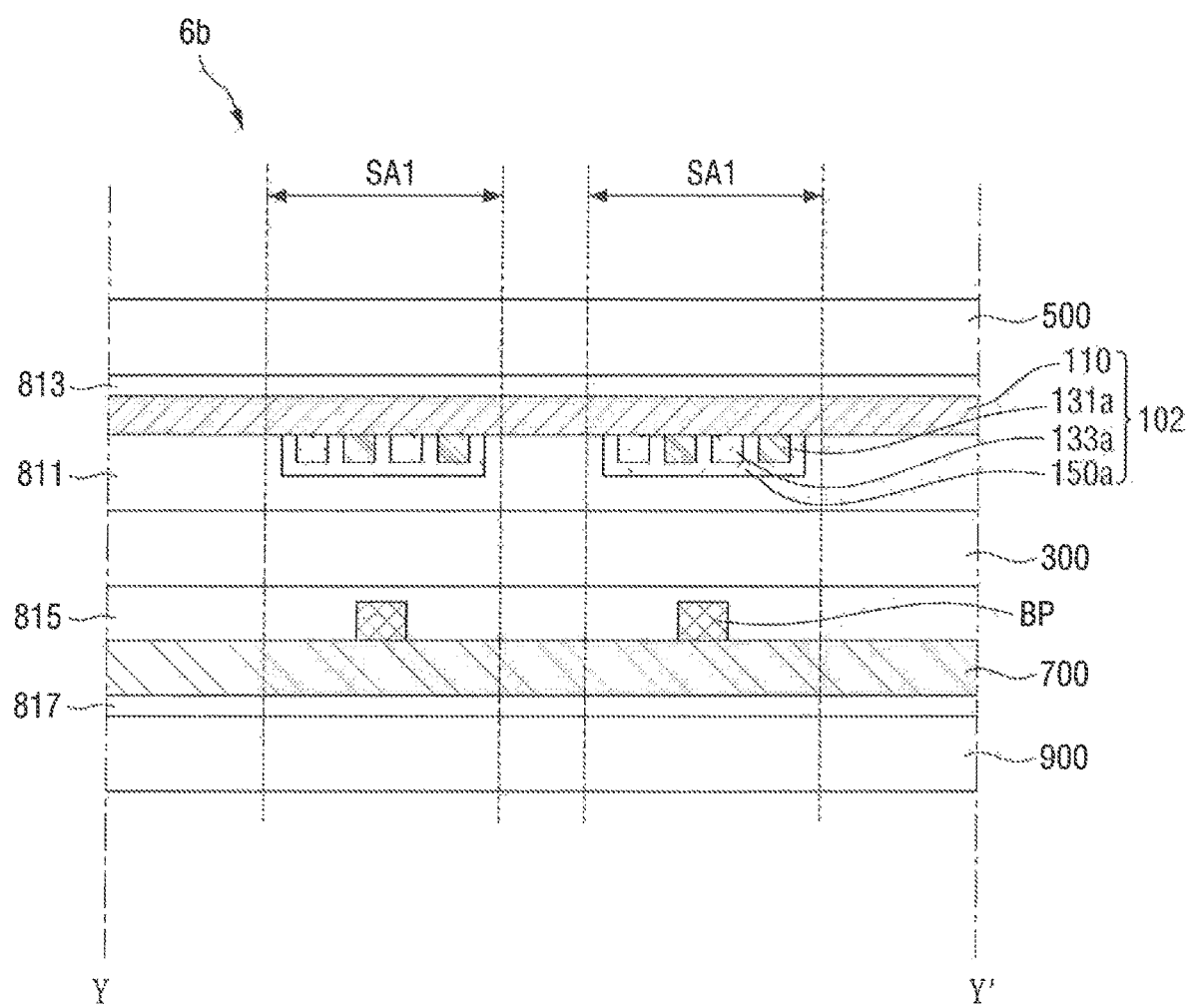
Figure 82:
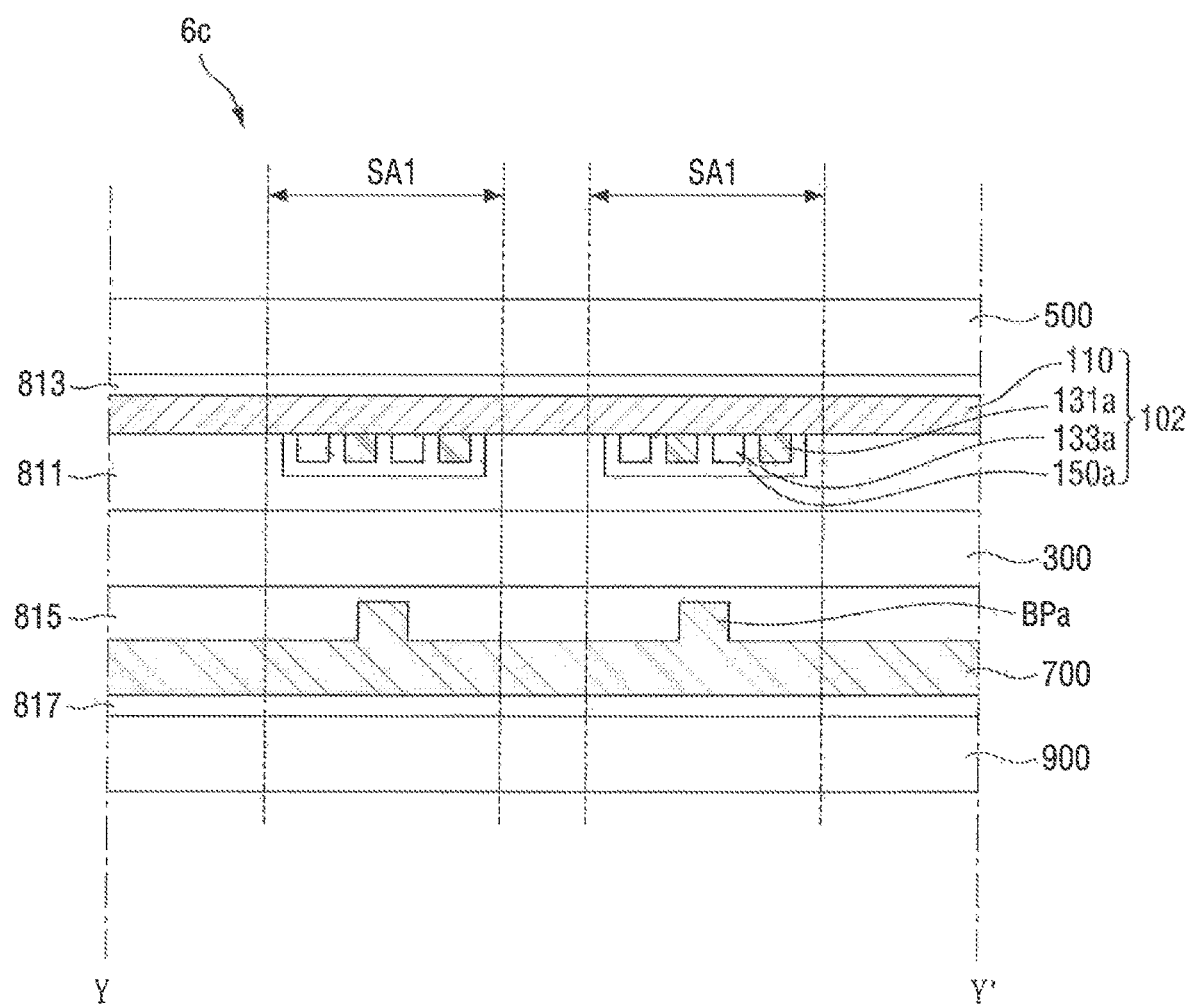

Referring to FIGS. 79, 80, 81 and 82, a display device 6 shown in FIG. 79, a display device 6*a* shown in FIG. 80, a display device 6*b* shown in FIG. 81, and a display device 6*c* shown in FIG. 82 are different from the display device 5 shown in FIG. 63A, the display device 5*a* shown in FIG. 64, the display device 5*d* shown in FIG. 67, and the display device 5*e* shown in FIG. 68 in that the pressure sensor 102 is disposed between the window 500 and the display panel 300, and other configurations of the display devices 6, 6*a*, 6*b*, and 6*c* are substantially the same as or similar to those of the display devices 5, 5*a*, 5*d* and 5*e*. As described above, the first electrode 131*a* and the second electrode 133*a* may be made of a transparent conductive material or a metal mesh so as not to be visually recognized from the outside.

Figure 83:
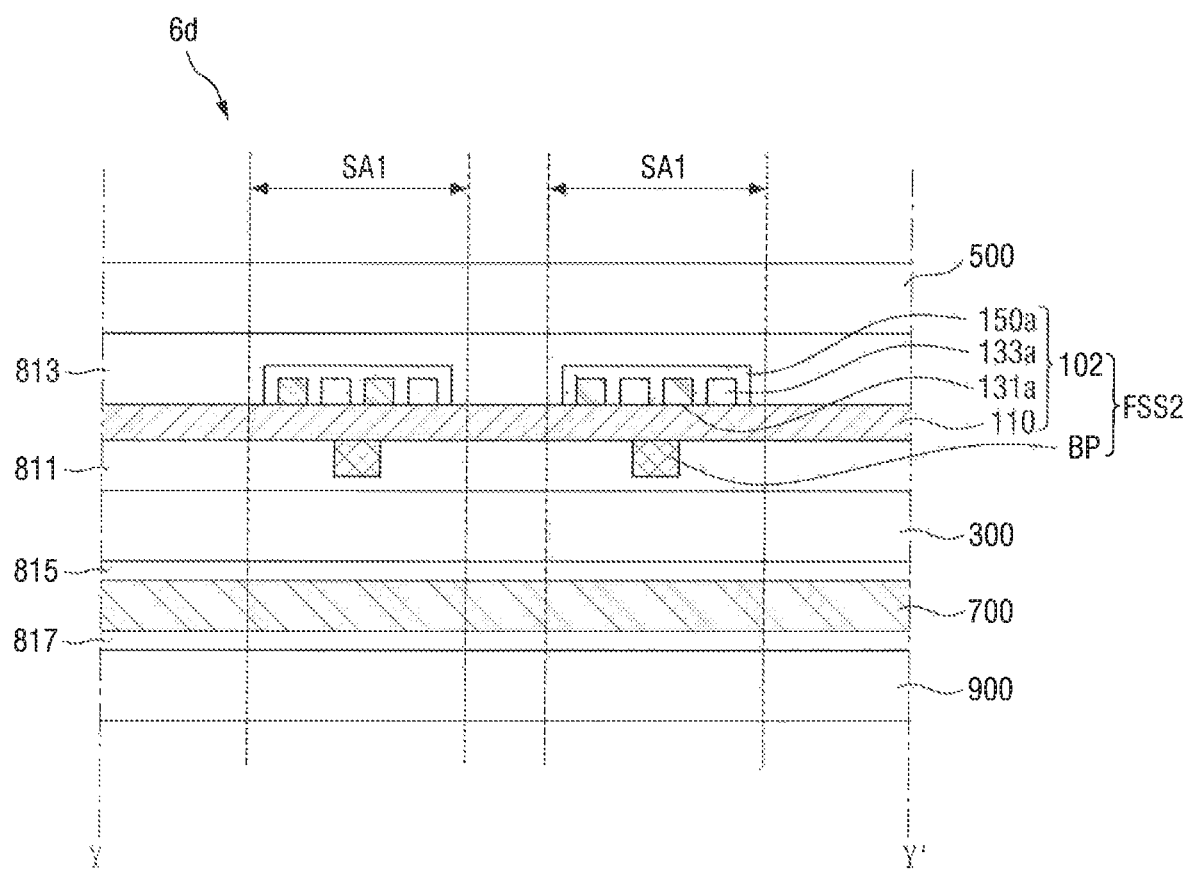
Figure 84:
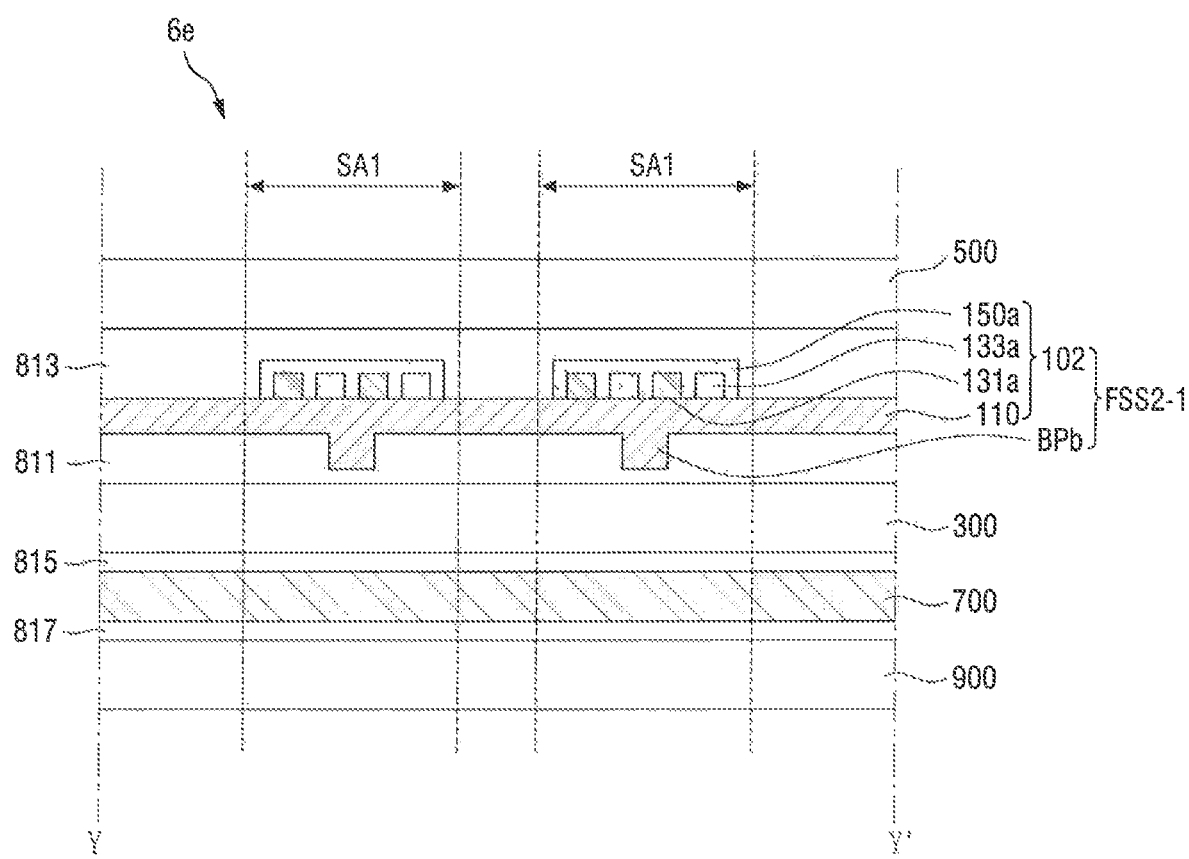
Figure 85:
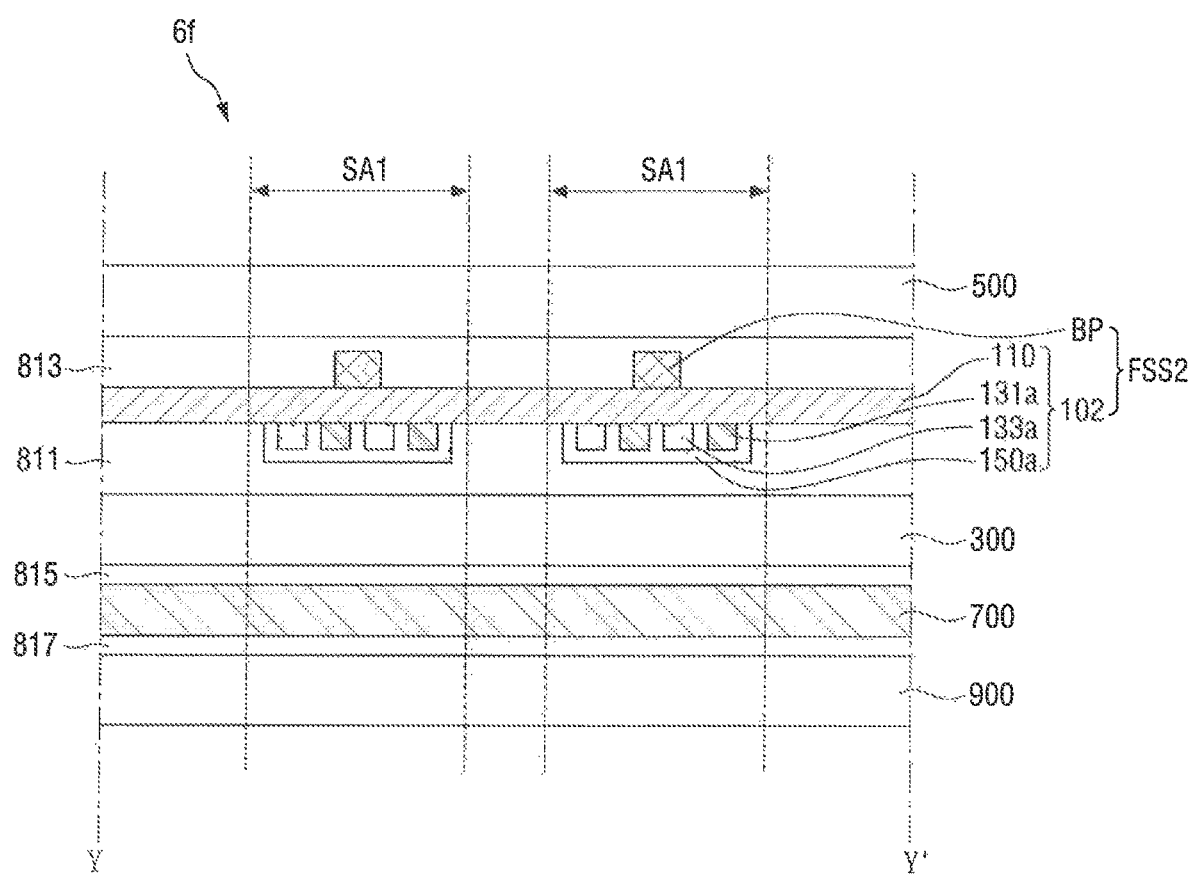

Referring to FIGS. 83, 84, 85 and 86, a display device 6*d* shown in FIG. 83 and a display device 6*f* shown in FIG. 85 are different from the display device 5*b* shown in FIG. 65 and the display device 5*f* shown in FIG. 69 in that the pressure sensor structure FSS2 is disposed between the window 500 and the display panel 300, and other configurations of the display devices 6*d* and 6*f* are substantially the same as or similar to those of the display devices 5*b* and 5*f*.

Figure 86:
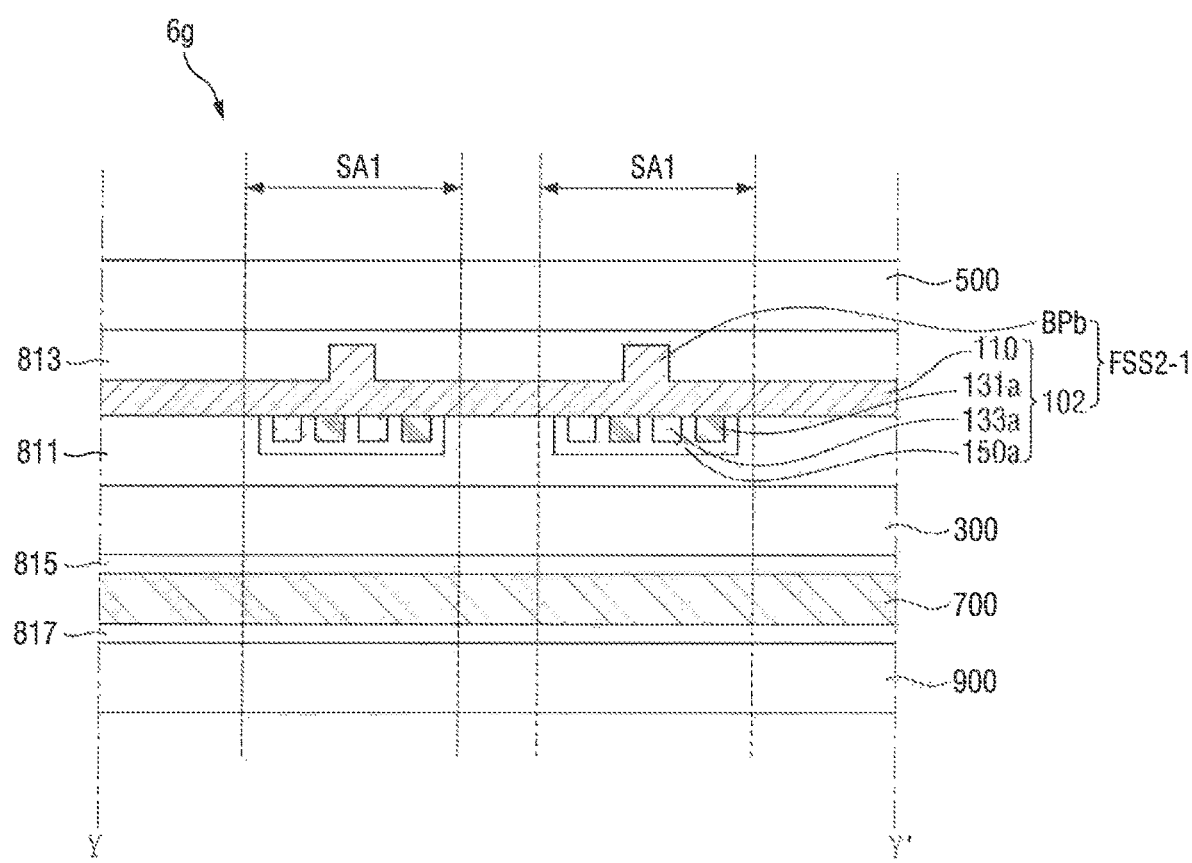

Further, a display device 6e shown in FIG. 84 and a display device 6g shown in FIG. 86 are different from the display device 5c shown in FIG. 66 and the display device 5g shown in FIG. 70 in that the pressure sensor structure FSS2_1 is disposed between the window 500 and the display panel 300, and other configurations of the display devices 6e and 6g are substantially the same as or similar to those of the display devices 5c and 5g.

Figure 87:
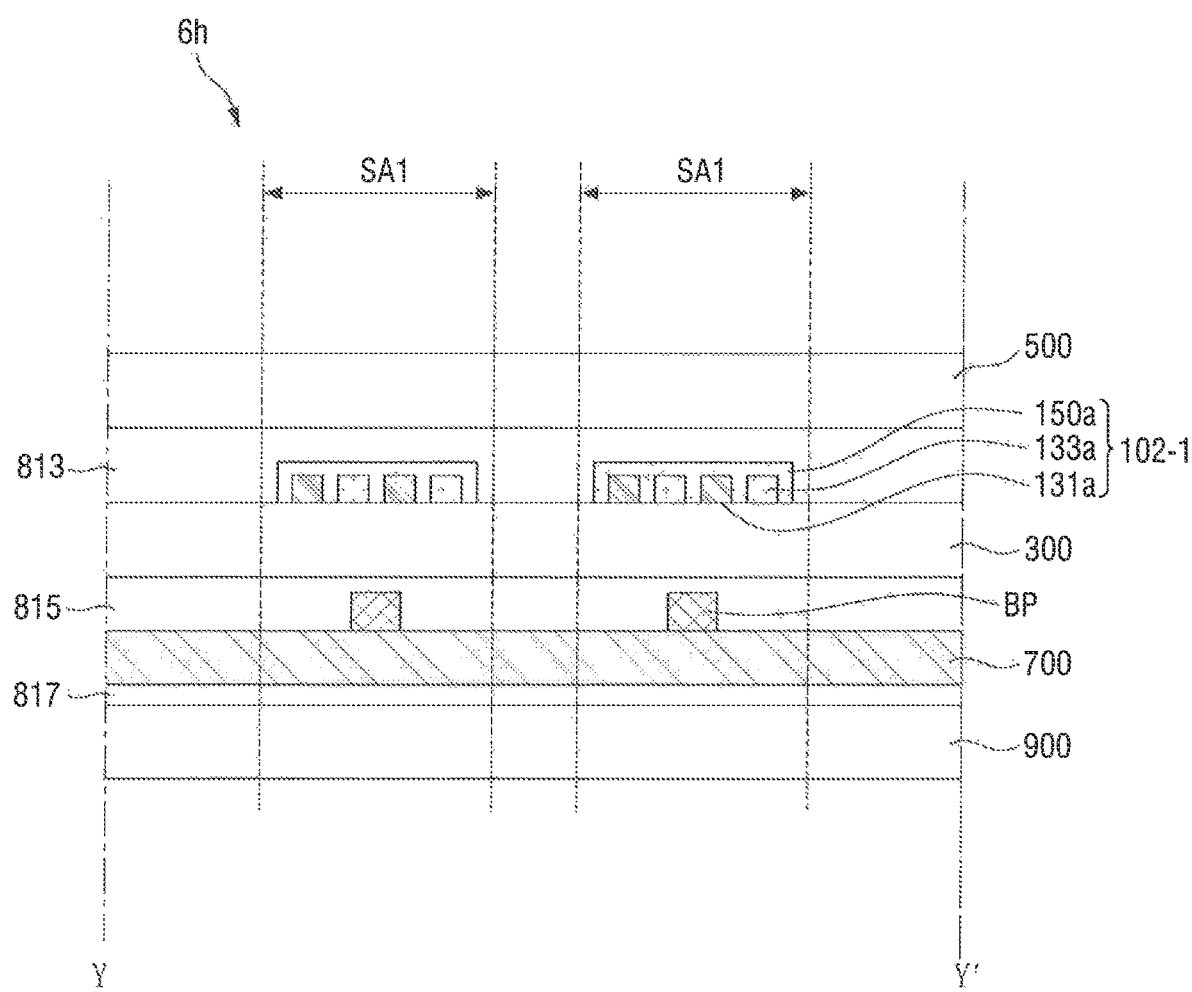
Figure 88:
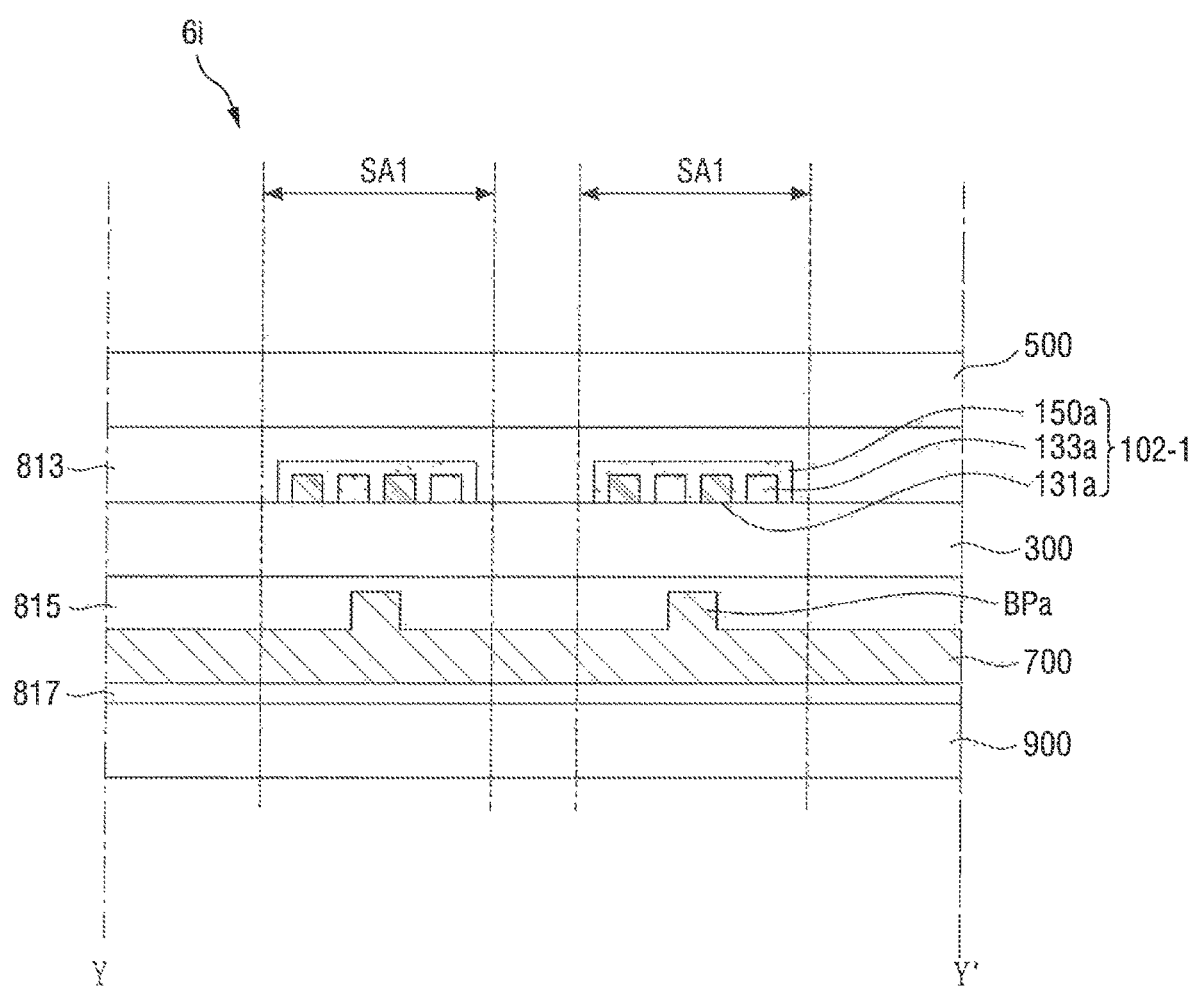

Referring to FIGS. 87 and 88, a display device 6h shown in FIG. 87 and a display device 6i shown in FIG. 88 are different from the display device 6 shown in FIG. 79 and the display device 6a shown in FIG. 80 in that the pressure sensor 102_1 does not include the first base layer 110, the first electrode 131a, the second electrode 133a, and the pressure sensing layer 150a are disposed directly on the lower surface of the display panel 300, and the intermediate bonding layer 811 is omitted, and other configurations of the display devices 6h and 6i are substantially the same as or similar to those of the display devices 6 and 5a.

Figure 89:
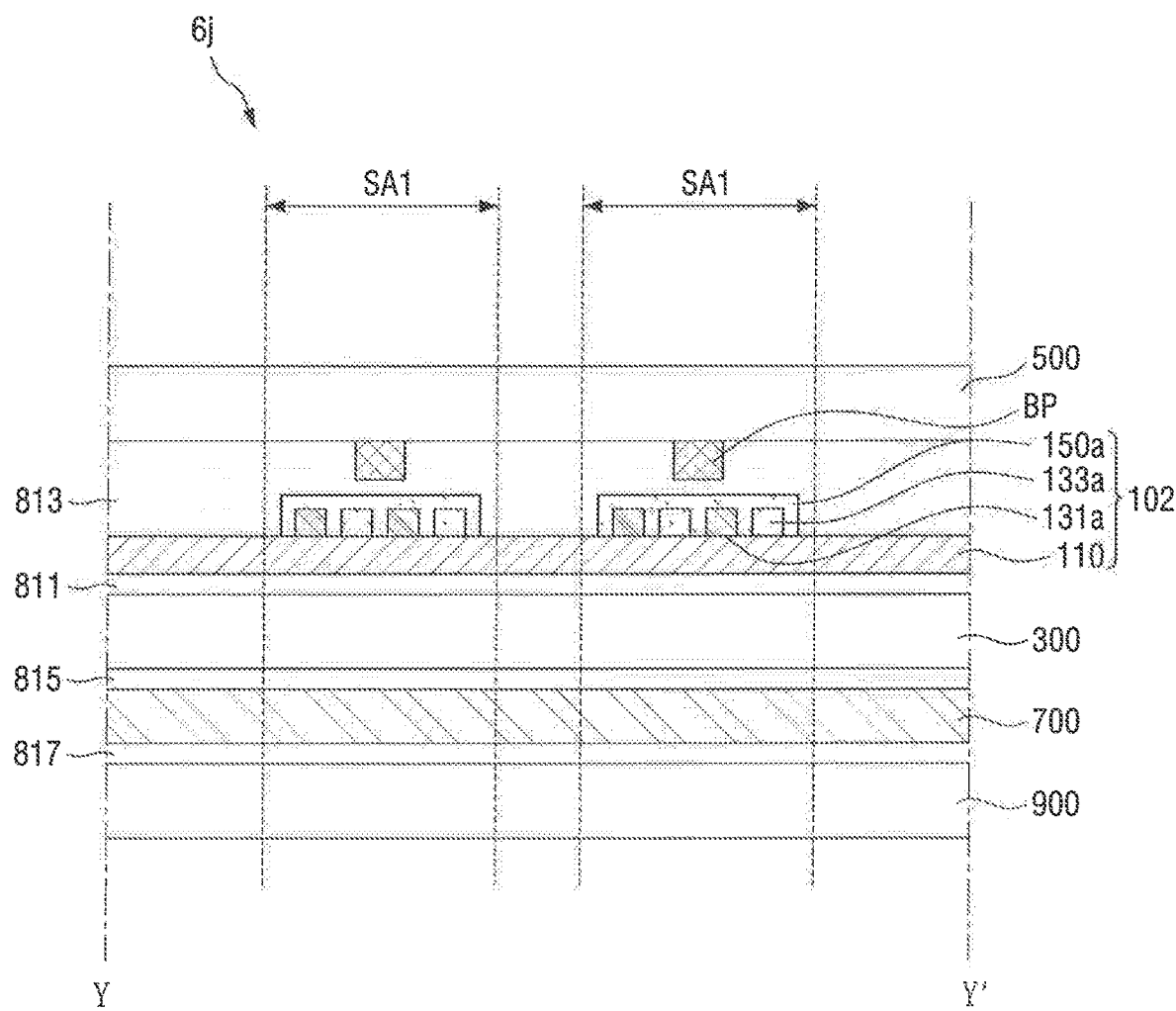
Figure 90:
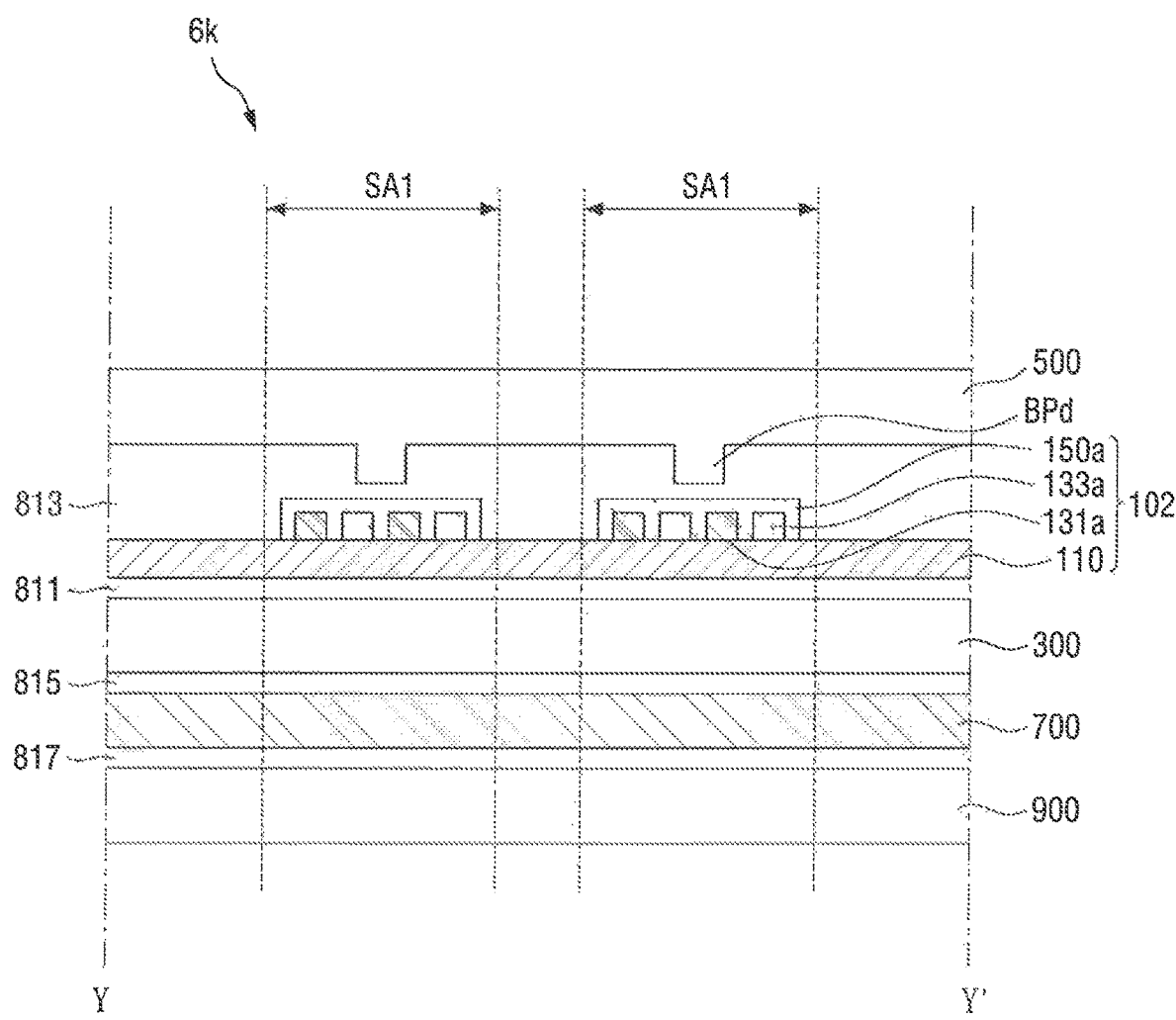

Referring to FIGS. 89 and 90, a display device 6j shown in FIG. 89 and a display device 6k shown in FIG. 90 are different from the display device 5j shown in FIG. 73 and the display device 5k shown in FIG. 74 in that the pressure sensor 102 is disposed between the window 500 and the display panel 300, and other configurations of the display devices 6j and 6k are substantially the same as or similar to those of the display devices 5j and 5k.

Figure 91:
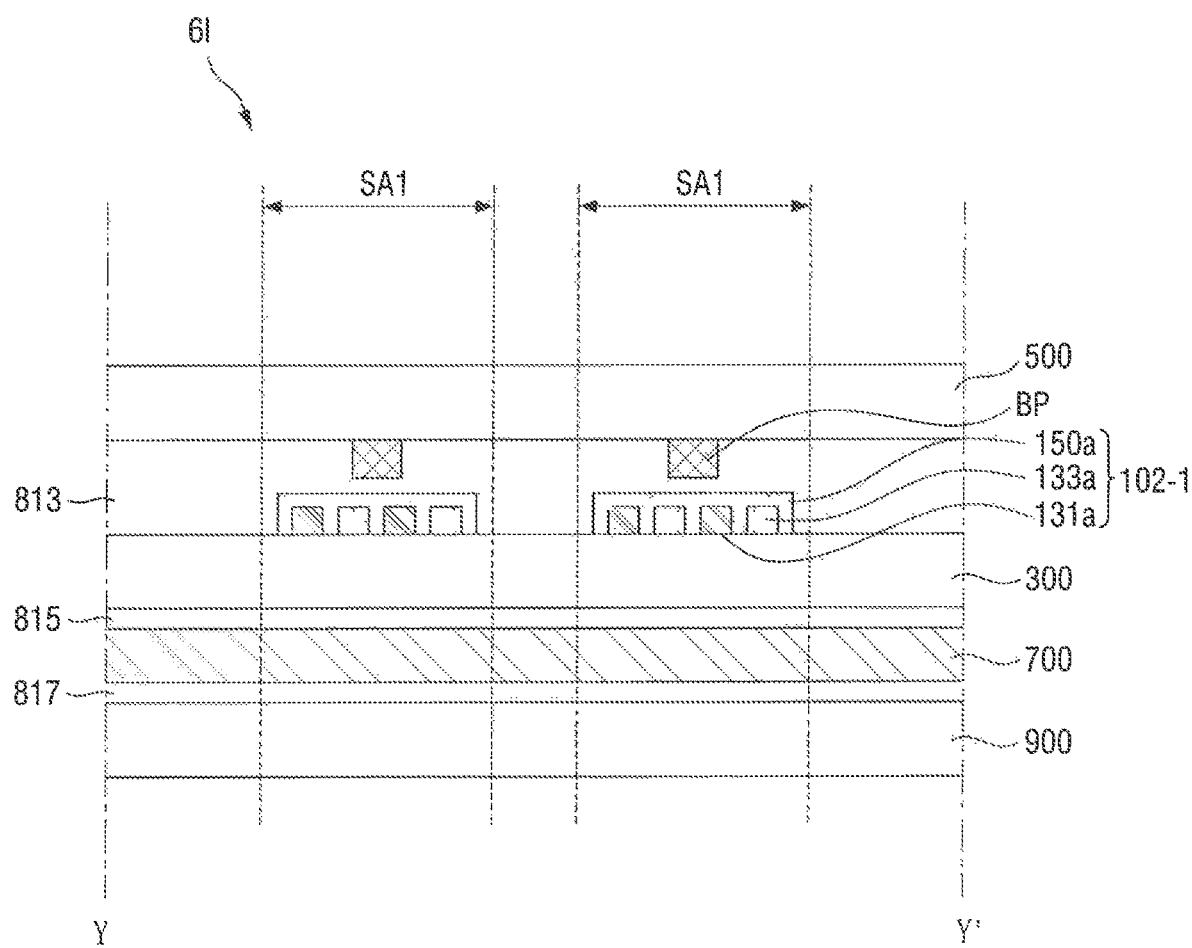
Figure 92:
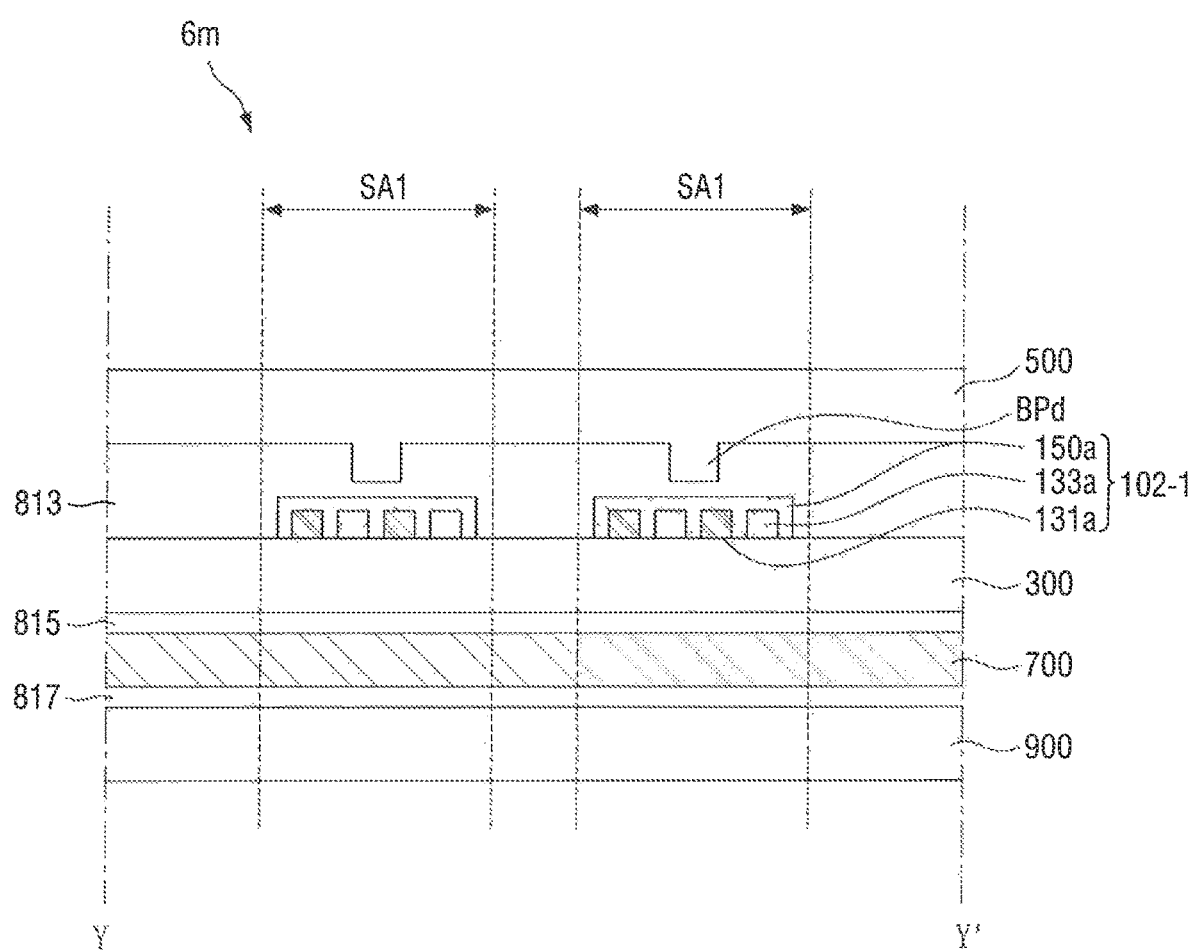

Referring to FIGS. 91 and 92, a display device 6l shown in FIG. 91 and a display device 6m shown in FIG. 92 are different from the display device 6j shown in FIG. 89 and the display device 6k shown in FIG. 90 in that the pressure sensor 102_1 does not include the first base layer 110, the first electrode 131a, the second electrode 133a, and the pressure sensing layer 150a are disposed directly on the lower surface of the display panel 300, and the intermediate bonding layer 811 is omitted.

Figure 93:
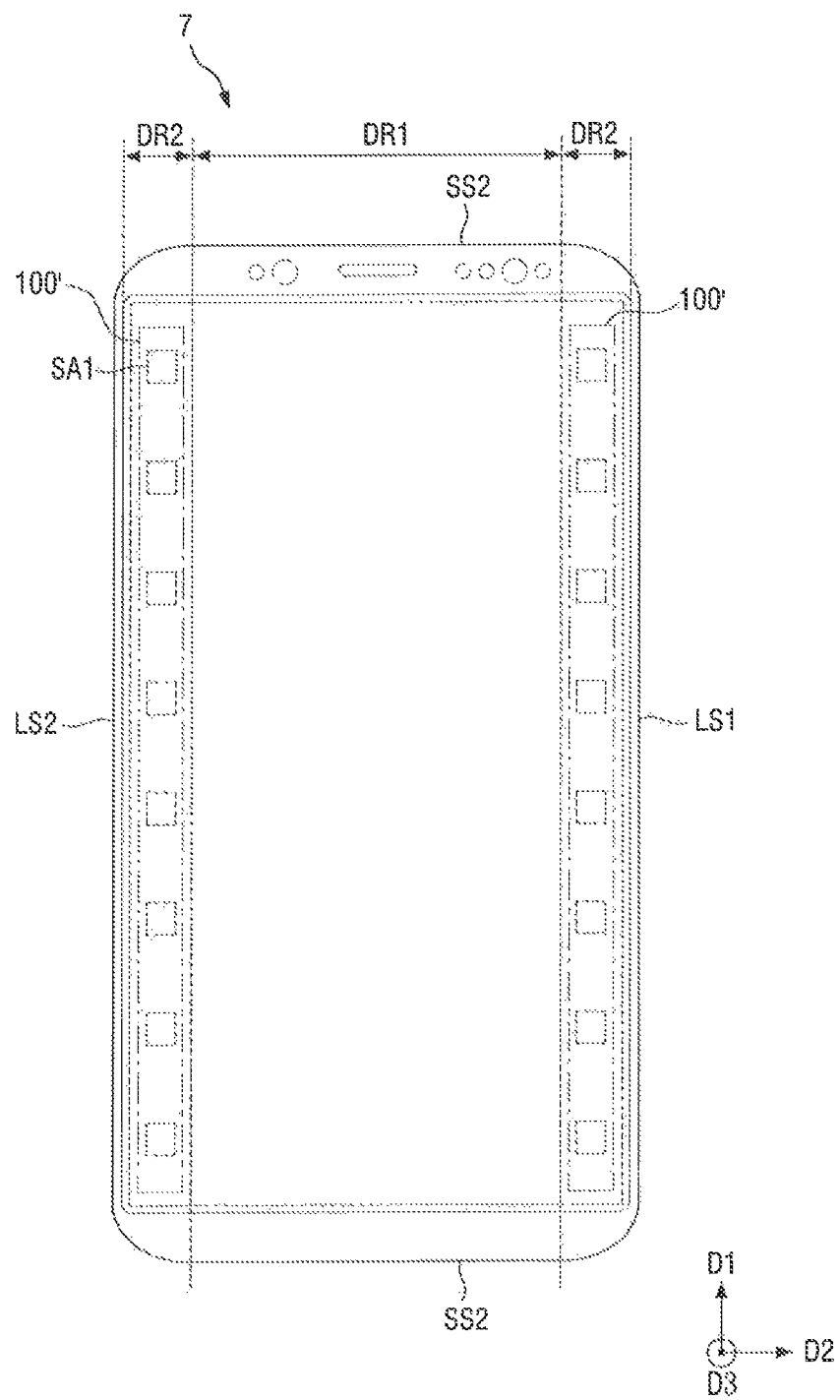
FIG. 93 is a plan view illustrating the layout of a pressure sensor in a display device according to an exemplary embodiment of the present disclosure.

FIG. 93 is a plan view showing the layout of a pressure sensor in a display device according, to an exemplary embodiment of the present disclosure.

Referring to FIG. 93, a display device 7 may include a first area DR1, which is a flat portion, and a second area DR2, which is a curved portion. A pressure sensor 100' is not located at the first area DR1, which is the flat portion of the display device 7, but is located at the second area DR2, which is the curved portion of the display device 7. For example, the pressure sensor 100' is disposed only at the edge of the display device 7.

Figure 94:
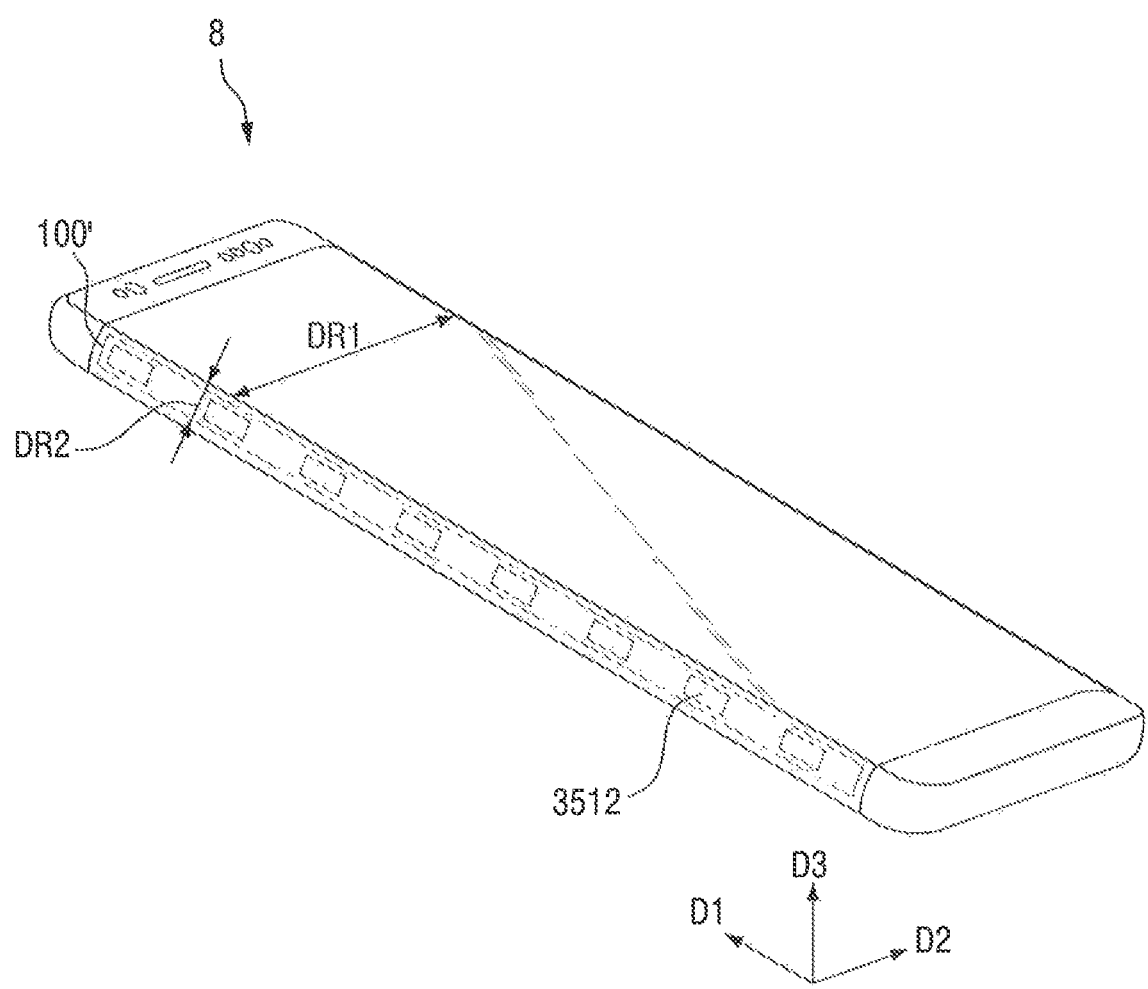
FIG. 94 is a perspective view illustrating a layout of a pressure sensor in a display device according to an exemplary embodiment of the present disclosure.

FIG. 94 is a plan view showing the layout of a pressure sensor in a display device according to an exemplary embodiment of the present disclosure.

Referring to FIG. 94, a display device 8 may include a first area DR1, which is a flat portion, and a second area DR2, which is a curved portion. The second area DR2 may be placed on a plane having an angle of 90° or more with respect to the first area DR1. The second area DR2 may substantially constitute a side surface of the display device 8. The second area DR2 may be a display area, but may be independent of a screen display in terms of display and/or control. The pressure sensor 100' may be located at the second area DR2. In this embodiment, the pressure sensor 100' is located at the side of the display device 8, so that pressure input may be made easier in the state where the display device 8 is gripped.

Figure 95:
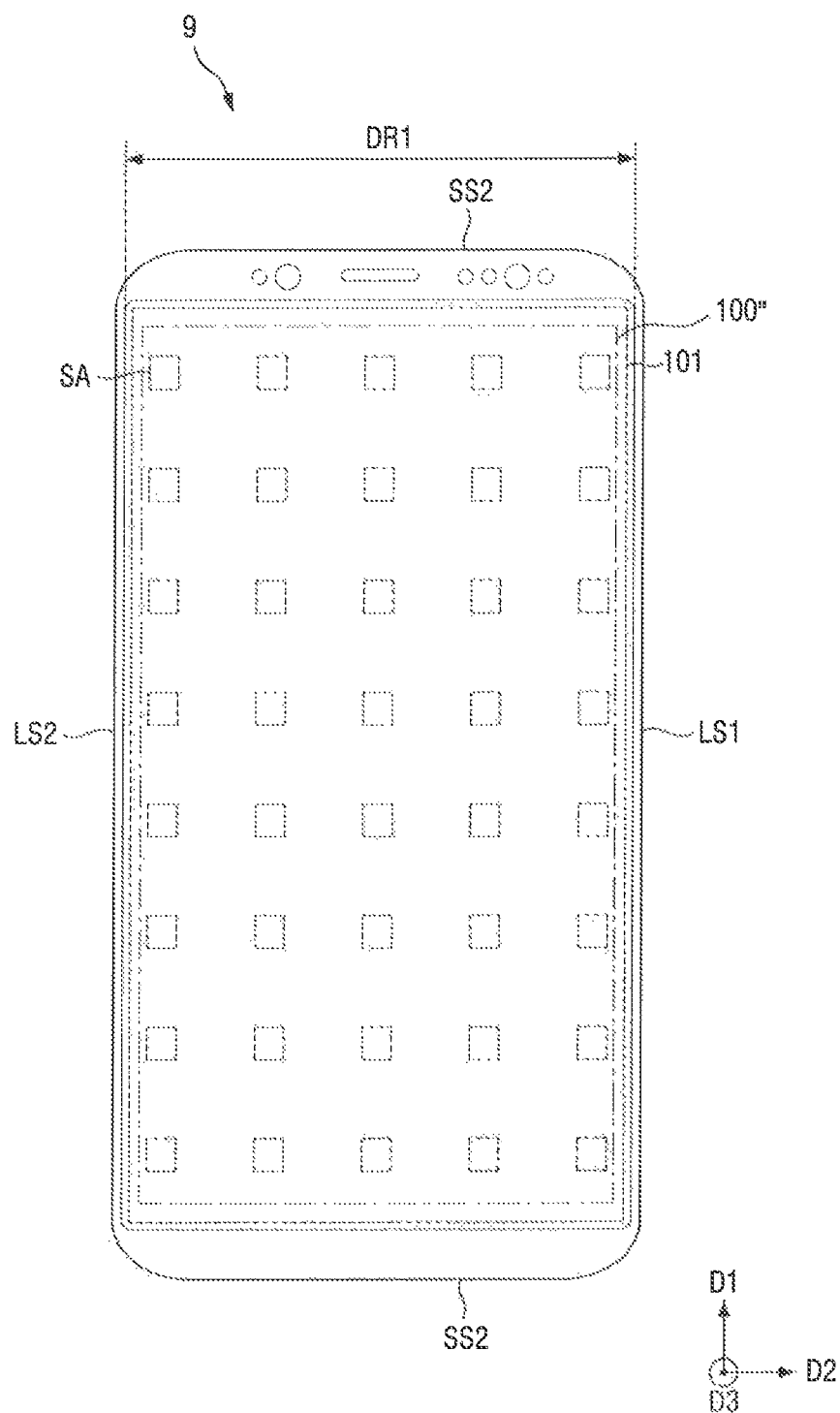
FIG. 95 is a plan view illustrating a layout of a pressure sensor in a display device according to an exemplary embodiment of the present disclosure.

FIG. 95 is a plan view showing the layout of a pressure sensor in a display device according to an exemplary embodiment of the present disclosure.

Referring to FIG. 95, a display device 9 may include a first area DR1, which is a flat portion, and might not include a second area DR2, or any other curved portion. The pressure sensor 100' may be located at the first area DR1, which is a flat portion. For example, the pressure sensor 100' may be disposed at a flat portion constituting the display area of the display device 9 and may be used as an input device.

As described above, according to exemplary embodiments of the present invention, the sensitivity of a pressure sensor can be increased.

The effects of the present invention are not limited by the foregoing, and other various effects are anticipated herein.

Although exemplary embodiments of the present invention have been disclosed for illustrative purposes, those skilled in the art will appreciate that various modifications, additions and substitutions are possible, without departing from the scope and spirit of the invention.

What is claimed is:

1. A display device, comprising:
a display panel;
a window disposed on the display panel;
a conductive sheet disposed beneath the display panel such that the display panel is disposed between the window and the conductive sheet;
a pressure sensor disposed between the display panel and the conductive sheet, the pressure sensor including a sensing area corresponding to a portion of the pressure sensor; and
a pressure concentration bump disposed between the window and the conductive sheet, the pressure concentration bump overlapping the sensing area,
wherein the pressure sensor includes a first electrode disposed within the sensing area and a second electrode spaced apart from the first electrode, and
wherein the pressure concentration bump does not directly contact any one of the first electrode and the second electrode.

2. The display device of claim 1, wherein the pressure concentration bump is disposed between the display panel and the conductive sheet.

3. The display device of claim 2, wherein the pressure concentration bump is integrated with the conductive sheet as a singular continuous structure and is made of a same material as the conductive sheet.

4. A display device, comprising:
a display panel;
a window disposed on the display panel;
a conductive sheet disposed beneath the display panel such that the display panel is disposed between the window and the conductive sheet;
a pressure sensor disposed between the display panel and the conductive sheet, the pressure sensor including a sensing area corresponding to a portion of the pressure sensor; and
a pressure concentration bump disposed between the window and the conductive sheet, the pressure concentration bump overlapping the sensing area;
wherein the pressure sensor includes a first electrode disposed within the sensing area and a second electrode spaced apart from the first electrode,
wherein the pressure concentration bump is disposed between the display panel and the conductive sheet,
wherein the pressure sensor further includes a pressure sensing layer including a pressure sensitive material having a resistance that changes with pressure, and wherein the pressure sensing layer overlaps the first electrode and the second electrode, and the pressure concentration bump overlaps the pressure sensing layer.

5. The display device of claim 4, wherein the first electrode and the second electrode are located at different levels or layers from each other, and the pressure sensing layer is disposed between the first electrode and the second electrode.

6. The display device of claim 5, wherein the pressure sensor further includes a first base layer having a first surface and a second surface opposite to the first surface, and wherein the first electrode is disposed on the first surface of the first base layer, the pressure sensing layer is disposed on the first electrode, the second electrode is disposed on the pressure sensing layer, and the pressure concentration bump is disposed on the second surface of the first base layer.

7. The display device of claim 6, wherein the pressure concentration bump is integrated with the first base layer as a singular continuous structure and is made of a same material as the first base layer.

8. The display device of claim 6, wherein the pressure concentration bump is disposed between the conductive sheet and the pressure sensor.

9. The display device of claim 6, wherein the pressure concentration bump is disposed between the display panel and the pressure sensor.

10. The display device of claim 6, wherein the second electrode is in contact with a lower surface of the display panel.

11. The display device of claim 6, wherein the pressure sensor further includes a second base layer facing the first base layer, and the second electrode is disposed on a first surface of the second base layer facing the first base layer and is in contact with the second base layer.

12. The display device of claim 4, wherein the first electrode and the second electrode are located at a same level or layer, and the pressure sensing layer is disposed on the first electrode and the second electrode.

13. The display device of claim 12, wherein the pressure sensor further includes a first base layer having a first surface and a second surface opposite to the first surface, and wherein the first electrode and the second electrode are disposed on the first surface of the first base layer, the pressure sensing layer is disposed on the first electrode and the second electrode, and the pressure concentration bump is disposed on the second surface of the first base layer.

14. The display device of claim 13, wherein the pressure concentration bump is made of a same material as the first base layer and is integrated with the first base layer as a singular continuous structure.

15. The display device of claim 13, wherein the pressure sensing layer is in contact with a lower surface of the display panel.

16. The display device of claim 13, wherein the pressure sensor further includes a second base layer facing the first base layer, and wherein the pressure sensing layer is disposed on a first surface of the second base layer facing the first base layer and is in contact with the second base layer.

17. The display device of claim 13, wherein the pressure sensing layer is in contact with the first electrode, the second electrode, and a first surface of the first base layer.

18. The display device of claim 13, wherein the first electrode includes a first stem electrode and a plurality of first branch electrodes branched from the first stem electrode, wherein the second electrode includes a second stem electrode and a plurality of second branch electrodes branched from the second stem electrode, and the respective first branch electrodes and the respective second branch electrodes are interlaced with each other.

19. The display device of claim 18, wherein the pressure sensing layer is divided to correspond with the sensing area.

20. The display device of claim 4, wherein the pressure concentration bump is coupled with the pressure sensor.

21. A display device, comprising:
a display panel;
a window disposed on the display panel;
a conductive sheet disposed beneath the display panel such that the display panel is disposed between the window and the conductive sheet;
a pressure sensor disposed between the display panel and the conductive sheet, the pressure sensor including a sensing area corresponding to a portion of the pressure sensor; and
a pressure concentration bump disposed between the window and the conductive sheet, the pressure concentration bump overlapping the sensing area,
wherein the pressure sensor includes a first electrode disposed within the sensing area and a second electrode spaced apart from the first electrode,
wherein the pressure concentration bump is disposed between the window and the display panel.

22. The display device of claim 21, wherein the pressure concentration bump is integrated with the window as a singular continuous structure and is made of a same material as the window.

23. A display device, comprising:
a display panel;
a window disposed on the display panel;
a conductive sheet disposed beneath the display panel such that the display panel is disposed between the window and the conductive sheet;
a pressure sensor disposed between the display panel and the conductive sheet, the pressure sensor including a plurality of sensing areas; and
a plurality of pressure concentration bumps disposed between the window and the conductive sheet and each of which overlapping a corresponding sensing area of the plurality of sensing areas,
wherein the pressure sensor includes a first electrode and a second electrode disposed in each of the plurality of sensing areas and spaced apart from each other,
wherein the pressure sensor further includes a pressure sensing layer disposed in each of the plurality of sensing areas and including a pressure sensitive material with a resistance that is dependent upon pressure, and wherein the pressure sensing layer overlaps the first electrode and the second electrode, and the plurality of pressure concentration bumps overlap the pressure sensing layer.

24. The display device of claim 23, wherein the first electrode and the second electrode are made of a transparent conductive material.

25. The display device of claim 23, wherein the plurality of pressure concentration bumps is coupled with the pressure sensor.

26. The display device of claim 23, wherein the pressure sensor further includes a base layer having a first surface and a second surface opposite to the first surface, wherein the first surface of the pressure sensor is in contact with the first electrode, the second electrode, and/or the pressure sensing layer, and
wherein the plurality of pressure concentration bumps is disposed on the second surface of the base layer, is integrated with the base layer as a singular continuous structure, and is made of a same material as the base layer.

27. A display device, comprising:
a window disposed on the display panel;
a conductive sheet disposed beneath the display panel such that the display panel is disposed between the window and the conductive sheet;
a pressure sensor disposed between the display panel and the conductive sheet, the pressure sensor including a plurality of sensing areas; and
a plurality of pressure concentration bumps disposed between the window and the conductive sheet and each of which overlapping a corresponding sensing area of the plurality of sensing areas,
wherein the plurality of pressure concentration bumps is disposed between the window and the display panel, is integrated with the window as a singular continuous structure, and is made of a same material as the window.

28. The display device of claim 23, wherein the plurality of pressure concentration bumps is disposed between the display panel and the conductive sheet, is integrated with the conductive sheet as a singular continuous structure, and is made of a same material as the conductive sheet.

29. A pressure sensor structure, comprising:
a pressure sensor including a base layer, a first electrode and a second electrode disposed on the base layer, the pressure sensor being in contact with a first surface of the base layer and the first electrode and the second electrode being spaced apart from each other, a pressure sensing layer is disposed on the first electrode and the second electrode and the pressure sensing layer is in contact with the first surface of the base layer; and
a pressure concentration bump is disposed on a second surface of the base layer and overlaps the pressure sensing layer.

30. The pressure sensor structure of claim 29, wherein the pressure concentration bump is coupled with the base layer.

31. The pressure sensor structure of claim 29, wherein the pressure concentration bump is integrated with the base layer as a singular continuous structure and is made of a same material as the base layer.

32. The pressure sensor structure of claim 29, wherein the first electrode is a driving electrode, and the second electrode is a sensing electrode.

33. The pressure sensor structure of claim 32, wherein the first electrode and the second electrode are each comb shaped and are engaged with each other.

34. The pressure sensor structure of claim 29, wherein the pressure sensing layer contains a pressure sensitive material having a resistance that is dependent upon pressure, and
wherein the first electrode and the second electrode are in contact with the pressure sensing layer when pressure is applied to the pressure sensing structure.

\* \* \* \* \*